US011932667B1

(12) United States Patent
Beaudoin et al.

(10) Patent No.: US 11,932,667 B1
(45) Date of Patent: Mar. 19, 2024

(54) EXPRESSION AND PURIFICATION OF CAS ENZYMES

(71) Applicant: INTEGRATED DNA TECHNOLOGIES INC., Coralville, IA (US)

(72) Inventors: Sarah Franz Beaudoin, Iowa City, IA (US); Michael Allen Collingwood, North Liberty, IA (US); Christopher Anthony Vakulskas, North Liberty, IA (US); Mark Aaron Behlke, Coralville, IA (US)

(73) Assignee: INTEGRATED DNNA TECHNOLOGIES INC., Coralville, IA (US)

( * ) Notice: Subject to any disclaimer, the term of this patent is extended or adjusted under 35 U.S.C. 154(b) by 176 days.

(21) Appl. No.: 17/185,788

(22) Filed: Feb. 25, 2021

Related U.S. Application Data

(60) Provisional application No. 62/982,231, filed on Feb. 27, 2020.

(51) Int. Cl.
*C07K 1/36* (2006.01)
*C07K 1/18* (2006.01)
*C07K 1/22* (2006.01)
*C12N 9/22* (2006.01)

(52) U.S. Cl.
CPC .................. *C07K 1/36* (2013.01); *C07K 1/18* (2013.01); *C07K 1/22* (2013.01); *C12N 9/22* (2013.01); *C12Y 301/00* (2013.01)

(58) Field of Classification Search
CPC ... C07K 1/36; C07K 1/18; C07K 1/22; C12N 9/22; C12Y 301/00
See application file for complete search history.

(56) References Cited

U.S. PATENT DOCUMENTS 7,560,529 B2 * 7/2009 Gabibov ............ C07K 16/1063 530/350
9,790,490 B2 * 10/2017 Zhang .................... C12N 15/82
9,840,702 B2 12/2017 Collingwood et al.
10,266,886 B2 * 4/2019 Abudayyeh .............. C12Q 1/68
10,717,978 B2 7/2020 Vakulskas et al.
10,767,176 B2 9/2020 Collingwood et al.
2016/0177304 A1 6/2016 Collingwood et al.
2016/0208243 A1 7/2016 Zhang et al.
2017/0044536 A1 2/2017 Collingwood et al.
2018/0179523 A1 6/2018 Collingwood et al.

(Continued)

FOREIGN PATENT DOCUMENTS

WO 2017127807 A1 7/2017
WO 2018195545 A2 10/2018

(Continued)

OTHER PUBLICATIONS

Carmignotto et al., On the expression of recombinant Cas9 protein in *E. coli* BL21(DE3) and BL21(DE3) Rosetta strains, J Biotechnol. vol. 306:62-70 (epub Sep. 20, 2019) (Year: 2019).*

(Continued)

*Primary Examiner* — Randall L Beane
(74) *Attorney, Agent, or Firm* — Michael Best & Friedrich LLP

(57) ABSTRACT

Described herein are methods for the expression and purification of Cas13a and methods for detecting target RNA using Cas13a.

14 Claims, 4 Drawing Sheets

Specification includes a Sequence Listing.

(56) References Cited

U.S. PATENT DOCUMENTS

2018/0187176 A1 7/2018 Behlke et al.
2018/0273938 A1 9/2018 Turk et al.
2018/0320201 A1 11/2018 Vakulskas et al.
2019/0010481 A1 1/2019 Joung et al.
2019/0032131 A1 1/2019 Turk et al.
2020/0080096 A1 3/2020 Flasinski et al.
2020/0109382 A1 4/2020 Zhang et al.

FOREIGN PATENT DOCUMENTS

WO 2019138052 A1 7/2019
WO 2020172502 A1 8/2020
WO 20210937752 A1 5/2021

OTHER PUBLICATIONS

East-Seletsky et al., Two distinct RNase activities of CRISPR-C2c2 enable guide-RNA processing and RNA detection, Nature, vol. 538:270-273 and 13 pages of Supplemental Information (Oct. 2016) (Year: 2016).*

Evans et al., Concentration of proteins and removal of solutes, Methods Enzymol., vol. 463:97-120 (2009), PMID: 19892169 (Year: 2009).*

Francis et al., Strategies to Optimize Protein Expression in *E. coli*., Current Protocols in Protein Science 5.24.1-5.24.29 (Aug. 2010) (Year: 2010).*

HiTrap Sp Hp cation exchange columns Protocol, SP Sepharose™ High Performance Ion Exchange Medium Instructions 18-1060-26-AG, GE Life Sciences, 20 pages (2014) (Year: 2014).*

Livingstone et al., Protein sequence alignments, CABIOS, vol. 9(6):745-756 (1993) (Year: 1993).*

PET System manual (Novagen, pET System Manual 10th Edition, 68 pages, published May 2003 (Year: 2003).*

Rodrigues et al, Chapter 5: One-Step Isothermal Assembly of DNA Fragments, Synthetic Biology, Methods in Molecular Biology, vol. 1073:43-47 (2013) (Year: 2013).*

Spriestersbach et al., Purification of His-Tagged Proteins, Methods Enzymol., vol. 559:1-15, PMID: 26096499 (Epub May 4, 2015) (Year: 2015).*

International Search Report and Written Opinion for Application No. PCT/US2021/030089 dated May 20, 2022 (25 pages).

Studer, R.A. et al. "Residue mutations and their impact on protein structure and function: detecting beneficial and pathogenic changes." Biochemical journal 449.3 (2013): 581-594.

Australian Patent Office Examination Report No. 1 for application 2020226864, dated Jan. 19, 2023 (4 pages).

Canadian Patent Office Action for application 3,130,087, dated Nov. 24, 2022 (6 pages).

Abudayyeh et al., "C2c2 is a single component programmable RNA-guided RNA-targeting CRISPR effector", Science, vol. 353(6299), 2016.

Bowie et al., "Deciphering the Message in Protein Sequences: Tolerance to Amino Acid Substitutions", Science, vol. 247, 1990, pp. 1306-1310.

East-Seletsky et al., "Two distinct RNase activities of CRISPR-C2c2 enable guide-RNA processing and RNA detection", Nature, vol. 538 (7624), 2016, pp. 270-273.

Gao et al., "Engineered Cpf1 variants with altered PAM specificities increase genome targeting range", Nat Biotechnol., vol. 35, No. 8, 2017, pp. 789-792.

Gao et al., "Type V CRISPR-Cas Cas12a endonuclease employs a unique mechanism for crRNA-mediated target DNA recognition," Cell Research, vol. 26, 2016, pp. 901-913.

Gibson et al., "Enzymatic assembly of DNA molecules up to several hundred kilobases", Nature Methods, vol. 5, No. 5, 2009, pp. 343-34.

Gootenberg et al., "Nucleic acid detection with CRISPR-Cas13a/C2c2" Science, vol. 356(6336), 2017, pp. 438-442.

Hur et al., "Targeted mutagenesis in mice by electroporation of Cpf1 ribonucleoproteins," Nature Biotechnology 34(8):807-808 (2016).

International Search Report and Written Opinion for Application No. PCT/US2020/19168 dated Jul. 23, 2020 (13 pages).

Jinek et al., "A programmable dual-RNA-guided DNA endonuclease in adaptive bacterial 5 immunity", Science, vol. 337, 2012, pp. 816-821.

Kim et al., "CRISPR/Cpf1-mediated DNA-free plant genome editing," Nature Commun., vol. 8(14406), 2017, pp. 1-7.

Kim et al., "Generation of knockdown mice by Cpf1-mediated gene targeting," Nature Biotechnology, vol. 34, No. 8, 2016, pp. 808-810.

Kim et al., "In vivo high-throughput profiling of CRISPR-Cpf1 activity," Nature Methods, vol. 14, No. 2, 2017, pp. 153-159.

Kleinstiver et al., "Engineered CRISPR-Cas 12a variants with increased activities and improved targerting ranges for gene, epigenetic and base editing", Nat. Biotechnol., vol. 37, 2019, pp. 276-282.

Kleinstiver et al., "Genome-wide specificities of CRISPR-Cas Cpf1 nucleases in human cells," Nature Biotechnology, vol. 34, No. 8, 2016, pp. 869-874.

Schindele et al., "Engineering CRISPR/LbCas12a for highly efficient, temperature tolerant plant gene editing", Plant Biotechnol J., vol. 18, No. 5, 2020, pp. 1118-1120.

Wrenbeck et al., "Plasmid-based one-pot saturation mutagenesis", Nat Methods, vol. 13, 2016, pp. 928-930.

Yamano et al., "Crystal Structure of Cpf1 in Complex with Guide RNA and Target RNA," Cell vol. 65, 2016, pp. 949-962.

Zetsche et al., "Cpf1 Is a Single RNA-Guided Endonuclease of a Class 2 CRISPR-Cas System", Cell, vol. 163, 2015, pp. 759-771.

Zetsche et al., "Multiplex gene editing by CRISPR-Cpf1 using a single rRNA array," Nature Biotechnology, vol. 35, No. 1, 2017, pp. 31-34.

Cebrian-Serrano et al., "CRISPR-Cas orthologues and variants: optimizing the repertoire, specificity and delivery of genome engineering tools", Mammalian Genome, 2017, vol. 28, No. 7, pp. 247-261.

Geneseq, "Lachnospiraceae bacterium Cpfl gene (PL-LbCpfl-RR) encoded nuclease", Nov. 2017, EBI Accession No. GS_PROT:BEK39676, 1 pages.

Japanese Patent Office Notification of Reasons for Rejection for Application No. 2021-548687, dated Aug. 4, 2023, 14 pages with translation.

Chinese Patent Office Notification of First Office Action for Application No. 202080015167.9, dated Sep. 27, 2023, 17 pages with translation.

Lu Yifan et al., LbCpf1 "Prokaryotic Expression, Purification of LbCpf1 Protein Gene and in Vitro Cleavage Activity Assay." China Biotechnology 40.8 (2020): 41-48. With English Abstract.

Zhang, Y., et al. "Highly efficient genome editing in plant protoplasts by ribonucleoprotein delivery of CRISPR-Cas12a nucleases." Frontiers in Genome Editing 4 (2022): 780238.

Australian Patent Office Examination Report No. 2 for Application No. 2020226864, dated Jun. 26, 2023 (9 pages).

* cited by examiner

5′-GGCCAGUGAAUUCGAGCUCGGUACCCGGGGAUCCUCUAGAAAUAUGGAUUACUUGGUAGAACA
GCAAUCUACUCGACCUGCAGGCAUGCAAGCUGGCGUAAUCAUGGUCAUAGCUGUUUCCUGUGUUUA
UCCGCUCACAAUUCCACACAACAUACGAGCCGGAAGCAUAAAG-3′

EXPRESSION AND PURIFICATION OF CAS ENZYMES

CROSS-REFERENCE TO RELATED APPLICATIONS

This application claims priority to U.S. Provisional Patent Application No. 62/982,231 filed on Feb. 27, 2020, which is incorporated by reference herein in its entirety.

REFERENCE TO SEQUENCE LISTING

This application is filed with a Computer Readable Form of a Sequence Listing in accordance with 37 C.F.R. § 1.821(c). The text file submitted by EFS, "013670-9065-US02_sequence_listing_25 Feb. 2021_ST25," was created on Feb. 25, 2021, contains 44 sequences, has a file size of 226 Kbytes, and is hereby incorporated by reference in its entirety.

TECHNICAL FIELD

Described herein are methods for the expression and purification of Cas13a and methods for detecting target RNA using Cas13a.

BACKGROUND

The RNA targeting enzyme family Cas13 is a CRISPR system identified in an effort to identify new CRISPR systems in addition to Cas9 and Cas12a (also referred to as Cpf1). Cas13 has four subtypes (Cas13a-d) and Cas13a (formerly known as C2c2) is a single effector protein that lacks homology with any known DNA nuclease; however, the protein contains two Higher Eukaryotes and Prokaryotes Nucleotide-binding (HEPN) domains that more commonly function as ribonucleases (RNases). Abudayyeh et al., demonstrated that Cas13a could act as an RNA-directed RNase [1].

Cas13a is classified as a class 2 type VI Clustered Regularly Interspaced Short Palindromic Repeat (CRISPR) adaptive immune system protein that provides direct cleavage of RNA when complexed with a CRISPR RNA (crRNA). This complex is called a CRISPR ribonucleoprotein (RNP) complex. Once the Cas13a RNP recognizes and cleaves its RNA target, the protein engages in collateral cleavage of nonspecific RNAs. For this reason, Cas13a can provide specific RNA sensing in vitro by utilizing its nonspecific RNase activity in the degradation of fluorescent-labeled RNA. This system has led to the rapid and inexpensive detection of nucleic acids by Cas13a and can be applied in disease diagnostics and epidemiology by detecting single RNA molecules with high specificity.

A method for nucleic acid detection by Cas13a RNP is described by Gootenberg et al., using *Leptotrichia wadei* (Lwa) Cas13a and denoted as SHERLOCK (Specific High Sensitivity Enzymatic Reporter UnLOCKing) [2]. Gootenberg et al. describe LwaCas13a as a superior protein over both *Leptotrichia buccalis* (Lbu) and *Leptotrichia shahii* (Lsh) species, as it yields detection sensitivity of approximately 50 fM. They surveyed the applications of the SHERLOCK technology towards infectious diseases, bacterial pathogens, low frequency cancer mutations in cell free DNA fragments, among others. For instance, they could discriminate between the Zika virus and the related flavivirus, Dengue, down to 2 aM. The SHERLOCK technology is a sensitive nucleic acid detection that can easily be applied for field applications.

The purification of LwaCas13a, as described by Gootenberg et al., consists of four purification steps: affinity chromatography, followed by removal of the 6×His/Twin Strep by SUMO digestion, cation exchange chromatography and finally, gel filtration chromatography [2].

What is needed is a simplified process for the expression and purification of Cas13 proteins.

SUMMARY

One embodiment described herein is a method for expressing and purifying a Cas13a protein, the method comprising: (a) inserting a nucleotide sequence encoding polypeptides having 95-99% identity to polypeptide sequences of SEQ ID NO: 2, 4, 6, 8, 10, 12, or 14 into an expression plasmid; (b) transforming one or more cells with the expression plasmid; (c) inducing expression of the transformed plasmid; (d) isolating the cells; (e) extracting the Cas13a protein; and (f) purifying the protein using affinity purification and ion exchange purification. In one aspect, the Cas13a protein comprises one or more of *Leptotrichia buccalis* (Lbu), *Leptotrichia shahii* (Lsh), and *Leptotrichia wadei* (Lwa) Cas13a proteins, or mutants thereof. In another aspect, the nucleotide sequence has 90-99% identity to SEQ ID NO: 1, 3, 5, 7, 9, 11, or 13. In another aspect, the nucleotide sequence is selected from SEQ ID NO: 1, 3, 5, 7, 9, 11, or 13. In another aspect, the encoded polypeptides are selected from SEQ ID NO: 2, 4, 6, 8, 10, 12, or 14. In another aspect, the cell comprises *E. coli* BL21(DE3). In another aspect, the expression plasmid comprises pET28 or pET28-MBP-TEV plasmids. In another aspect, the nucleotide sequence is inserted into the expression plasmid using isothermal assembly. In another aspect, the affinity purification comprises a nickel or a maltose affinity media.

In one aspect, the affinity purification comprises affinity chromatography comprising: (a) equilibrating a nickel affinity column with a binding buffer and loading the extracted Cas13a protein; (b) washing the nickel affinity column with a wash buffer; and (c) eluting the affinity purified Cas13a protein from the nickel affinity column using an elution buffer.

In one aspect, the affinity purification comprises affinity chromatography comprising: (a) equilibrating a maltose affinity column with a binding buffer and loading the extracted Cas13a protein; (b) washing the maltose affinity column with a wash buffer; and (c) eluting the affinity purified Cas13a protein from the maltose affinity column using an elution buffer. In another aspect, the ion exchange purification comprises a cation exchange media.

In one aspect, the ion exchange purification comprises cation exchange chromatography comprising: (a) equilibrating a cation exchange column with a binding buffer and loading the extracted Cas13a protein; (b) washing the cation exchange column with a wash buffer; and (c) eluting the cation exchange purified Cas13a protein from the cation exchange column using an elution buffer. In another aspect, the method further comprises concentrating the purified Cas13a protein to approximately 10 mg/mL. In another aspect, the method further comprises dialyzing the concentrated purified Cas13a protein.

Another embodiment described herein is a method for purifying a recombinant Cas13a protein, the method comprising: (a) providing an expressed recombinant Cas13a protein having 95-99% identity to the polypeptide sequences of SEQ ID NO: 2, 4, 6, 8, 10, 12, or 14; (b) performing an affinity purification comprising a nickel affinity media; (c) performing an affinity purification comprising maltose affinity media; (d) performing an ion exchange purification comprising a cation exchange media; and (e) collecting the purified Cas12 protein. In another aspect, the Cas13a proteins are encoded by a nucleotide sequence having 90-99% to SEQ ID NO: 1, 3, 5, 7, 9, 11, or 13. In another aspect, the Cas13a proteins are encoded by a nucleotide sequence of SEQ ID NO: 1, 3, 5, 7, 9, 11, or 13. In another aspect, the Cas13a proteins are selected from polypeptide sequences of SEQ ID NO: 2, 4, 6, 8, 10, 12, or 14. In another aspect, the method further comprises comprising concentrating the purified Cas13a protein to approximately 10 mg/mL. In another aspect, the method further comprises dialyzing the concentrated purified Cas13a protein against three rounds of dialysis buffer.

Another embodiment described herein is a nucleic acid detection system comprising: a Cas13a protein; one or more guide RNA designed to hybridize to a corresponding target nucleic acid; and a degradation reporter probe. In one aspect, the Cas13a protein is selected from the group comprising Lwa Cas13a, Lbu Cas13a, or Lsh Cas13a. In another aspect, the Lwa Cas13a or Lbu Cas13a is present at a concentration of 0.98 nM to 1000 nM. In another aspect, the Lbu Cas13a is present at a concentration of 0.98 nM to 1000 nM. In another aspect, the Lbu Cas13a is present at a concentration of 3.91 nM to 31.3 nM. In another aspect, the degradation reporter probe is fluorescently labeled.

Another embodiment described herein is a method of detecting a target nucleic acid comprising: (a) providing a Cas13a protein; (b) one or more guide RNA designed to hybridize to a corresponding target nucleic acid; and (c) a degradation reporter probe; wherein the Cas13a protein is present at an effective concentration to promote cleavage of the corresponding target nucleic acid and the degradation reporter probe to generate a detectable signal. In one aspect, the detectable signal is a fluorescent signal.

DETAILED DESCRIPTION

Figure 1:
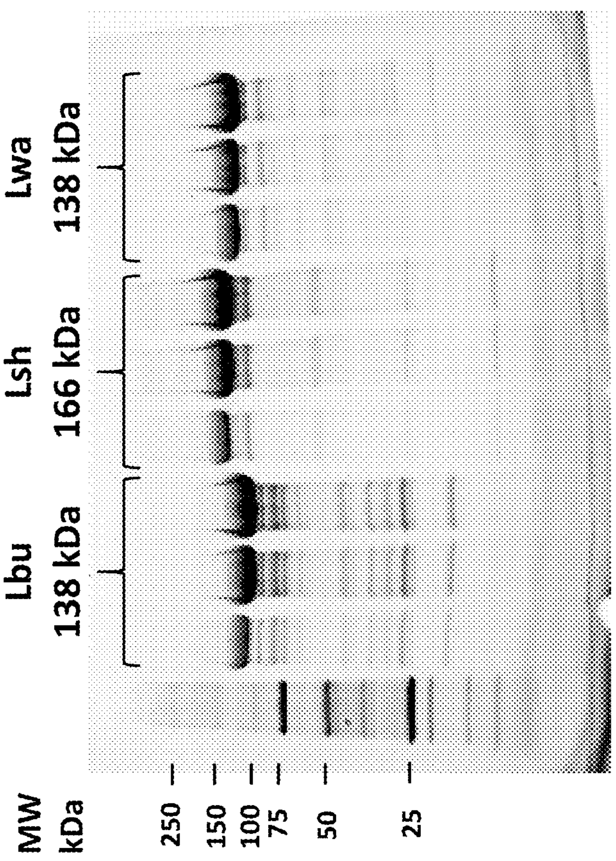
FIG. 1 shows an SDS-PAGE indicating the purity of Cas13a variants after the final step in purification and dialysis into storage buffer.

Unless otherwise defined, all technical and scientific terms used herein have the same meaning as commonly understood by one of ordinary skill in the art. For example, any nomenclatures used in connection with, and techniques of, cell and tissue culture, molecular biology, immunology, microbiology, genetics, and protein and nucleic acid chemistry and hybridization described herein are well known and commonly used in the art. In case of conflict, the present document, including definitions, will control. Representative compositions, methods, and materials are described herein, although equivalent materials and methods can be used in practice.

As used herein, the terms "amino acid," "nucleotide," "polynucleotide," "vector," "polypeptide," and "protein" have their common meanings as would be understood by a biochemist of ordinary skill in the art. Standard single letter nucleotides (A, C, G, T, U) and standard single letter amino acids (A, C, D, E, F, G, H, I, K, L, M, N, P, Q, R, S, T, V, W, or Y) are used herein.

As used herein, the terms such as "include," "including," "contain," "containing," "having," and the like mean "comprising." The present disclosure also contemplates other embodiments "comprising," "consisting of," and "consisting essentially of," the embodiments or elements presented herein, whether explicitly set forth or not.

As used herein, the term "a," "an," "the" and similar terms used in the context of the disclosure (especially in the context of the claims) are to be construed to cover both the singular and plural unless otherwise indicated herein or clearly contradicted by the context. In addition, "a," "an," or "the" means "one or more" unless otherwise specified.

As used herein, the term "or" can be conjunctive or disjunctive.

As used herein, the term "substantially" means to a great or significant extent, but not completely.

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. In one aspect, the term "about" refers to any values, including both integers and fractional components that are within a variation of up to ±10% of the value modified by the term "about." Alternatively, "about" can mean within 3 or more standard deviations, per the practice in the art. Alternatively, such as with respect to biological systems or processes, the term "about" can mean within an order of magnitude, in some embodiments within 5-fold, and in some embodiments within 2-fold, of a value. As used herein, the symbol "-" means "about" or "approximately." All ranges disclosed herein include both end points as discrete values as well as all integers and fractions specified within the range. For example, a range of 0.1-2.0 includes 0.1, 0.2, 0.3, 0.4 . . . 2.0. If the end points are modified by the term "about," the range specified is expanded by a variation of up to ±10% of any value within the range or within 3 or more standard deviations, including the end points.

As used herein, the terms "control," or "reference" are used herein interchangeably. A "reference" or "control" level may be a predetermined value or range, which is employed as a baseline or benchmark against which to assess a measured result. "Control" also refers to control experiments or control cells.

The methods and compositions escribed herein can be used with any CRISPR system wherein the Cas nuclease targets RNA. In one embodiment, the methods described herein utilize Cas13 enzyme. In another embodiment the Cas13 enzyme is a Cas13a subtype. There are two distinct subfamilies of the Cas13a protein family, adenosine (A) or uridine (U) cleaving. In another embodiment described herein, the methods utilize a LbuCas13a, a single effector RNA-directed RNase, an example being a LbuCas13a from the *Leptotrichia buccalis* CRISPR adaptive immune system, which resides in the uridine (U) cleaving subfamily of Cas13a proteins. The ability of LbuCas13a to act as a non-specific RNase was described by East-Seletsky et al. and showed that this class of enzymes is capable of two RNA cleavage activities: crRNA-mediated cleavage of target RNA, followed by non-specific RNase activity [3].

The purification of Cas13a has been described by both Gootenberg et al. [2], and East-Seletsky et al. [3] and consists of four purification steps each. Gootenberg et al. [2] describes the overexpression of LwaCas13a from a pET SUMO expression plasmid. The purification begins with affinity chromatography by StrepTactin® Sepharose (IBL Lifescieneces), followed by removal of the 6×His/Twin Strep by SUMO digestion. The native protein is further purified by cation exchange chromatography (HiTrap™ SP HP) and gel filtration chromatography (Superdex®200).

The purification described by East-Seletsky et al. [3] uses a similar procedure, except that LbuCas13a is N-terminally expressed with a 6×His-MBP-TEV tag. The purification procedure consists of affinity chromatography, removal of 6×His-MBP by TEV protease, cation exchange chromatography with a HiTrap™ SP column (Cytiva) and gel filtration chromatography (Superdex® 200).

The methods described herein simplify the purification process by only using two steps: affinity chromatography and cation exchange chromatography. The purification protocol leaves the 6×HisTag (CTD) intact while not sacrificing activity. Unlike previous methods which use 45 nM purified LwaCas13a with 22.5 nM crRNA to form the RNP complex, the current method utilizes LbuCas13a and a 10-fold reduction of purified protein (4 nM) with an equal concentration of crRNA.

One embodiment described herein is a method for expressing and purifying a Cas13a protein, the method comprising: (a) inserting a nucleotide sequence encoding polypeptides having 95-99% identity to polypeptide sequences of SEQ ID NO: 2, 4, 6, 8, 10, 12, or 14 into an expression plasmid; (b) transforming one or more cells with the expression plasmid; (c) inducing expression of the transformed plasmid; (d) isolating the cells; (e) extracting the Cas13a protein; and (f) purifying the protein using affinity purification and ion exchange purification. In one aspect, the Cas13a protein comprises one or more of *Leptotrichia buccalis* (Lbu), *Leptotrichia shahii* (Lsh), and *Leptotrichia wadei* (Lwa) Cas13a proteins, or mutants thereof. In another aspect, the nucleotide sequence has 90-99% identity to SEQ ID NO: 1, 3, 5, 7, 9, 11, or 13. In another aspect, the nucleotide sequence is selected from SEQ ID NO: 1, 3, 5, 7, 9, 11, or 13. In another aspect, the encoded polypeptides are selected from SEQ ID NO: 2, 4, 6, 8, 10, 12, or 14. In another aspect, the cell comprises *E. coli* BL21(DE3). In another aspect, the expression plasmid comprises pET28 or pMAL plasmids. In another aspect, the nucleotide sequence is inserted into the expression plasmid using isothermal assembly. In another aspect, the affinity purification comprises a nickel or a maltose affinity media.

In one aspect, the affinity purification comprises affinity chromatography comprising: (a) equilibrating a nickel affinity column with a binding buffer and loading the extracted Cas13a protein; (b) washing the nickel affinity column with a wash buffer; and (c) eluting the affinity purified Cas13a protein from the nickel affinity column using an elution buffer.

In one aspect, the affinity purification comprises affinity chromatography comprising: (a) equilibrating a maltose affinity column with a binding buffer and loading the extracted Cas13a protein; (b) washing the maltose affinity column with a wash buffer; and (c) eluting the affinity purified Cas13a protein from the maltose affinity column using an elution buffer. In another aspect, the ion exchange purification comprises a cation exchange media.

In one aspect, the ion exchange purification comprises cation exchange chromatography comprising: (a) equilibrating a cation exchange column with a binding buffer and loading the extracted Cas13a protein; (b) washing the cation exchange column with a wash buffer; and (c) eluting the cation exchange purified Cas13a protein from the cation exchange column using an elution buffer. In another aspect, the method further comprises concentrating the purified Cas13a protein to approximately 10 mg/mL. In another aspect, the method further comprises dialyzing the concentrated purified Cas13a protein.

Another embodiment described herein is a method for purifying a recombinant Cas13a protein, the method comprising: (a) providing an expressed recombinant Cas13a protein having 95-99% identity to the polypeptide sequences of SEQ ID NO: 2, 4, 6, 8, 10, 12, or 14; (b) performing an affinity purification comprising a nickel affinity media; (c) performing an affinity purification comprising maltose affinity media; (d) performing an ion exchange purification comprising a cation exchange media; and (e) collecting the purified Cas12 protein. In another aspect, the Cas13a proteins are encoded by a nucleotide sequence having 90-99% to SEQ ID NO: 1, 3, 5, 7, 9, 11, or 13. In another aspect, the Cas13a proteins are encoded by a nucleotide sequence of SEQ ID NO: 1, 3, 5, 7, 9, 11, or 13. In another aspect, the Cas13a proteins are selected from polypeptide sequences of SEQ ID NO: 2, 4, 6, 8, 10, 12, or 14. In another aspect, the method further comprises comprising concentrating the purified Cas13a protein to approximately 10 mg/mL. In another aspect, the method further comprises dialyzing the concentrated purified Cas13a protein against three rounds of dialysis buffer.

Another embodiment described herein is a nucleic acid detection system comprising: a Cas13a protein; one or more guide RNA designed to hybridize to a corresponding target nucleic acid; and a degradation reporter probe. In one aspect, the Cas13a protein is selected from the group comprising Lwa Cas13a, Lbu Cas13a, or Lsh Cas13a. In another aspect, the Lwa Cas13a or Lbu Cas13a is present at a concentration of 0.98 nM to 1000 nM. In another aspect, the Lbu Cas13a is present at a concentration of 0.98 nM to 1000 nM. In another aspect, the Lbu Cas13a is present at a concentration of 3.91 nM to 31.3 nM. In another aspect, the degradation reporter probe is fluorescently labeled.

Another embodiment described herein is a method of detecting a target nucleic acid comprising: (a) providing a Cas13a protein; (b) one or more guide RNA designed to hybridize to a corresponding target nucleic acid; and (c) a degradation reporter probe; wherein the Cas13a protein is present at an effective concentration to promote cleavage of the corresponding target nucleic acid and the degradation reporter probe to generate a detectable signal. In one aspect, the detectable signal is a fluorescent signal.

Another embodiment described herein is a polynucleotide vector comprising one or more nucleotide sequences described herein.

Another embodiment described herein is a cell comprising one or more nucleotide sequences described herein or a polynucleotide vector described herein.

Another embodiment is a polypeptide encoded by a nucleotide sequence described herein. In one aspect, the polypeptide has 85% to 99% identity to SEQ ID NO: 2, 4, 6, 8, 10, 12, or 14. In another aspect, the polypeptide is selected from SEQ ID NO: 2, 4, 6, 8, 10, 12, or 14.

Another embodiment described herein is a process for manufacturing one or more of the nucleotide sequence described herein or a polypeptide encoded by the nucleotide sequence described herein, the process comprising: transforming or transfecting a cell with a nucleic acid comprising a nucleotide sequence described herein; growing the cells; optionally isolating additional quantities of a nucleotide sequence described herein; inducing expression of a polypeptide encoded by a nucleotide sequence of described herein; isolating the polypeptide encoded by a nucleotide described herein.

Another embodiment described herein is a means for manufacturing one or more of the nucleotide sequences described herein or a polypeptide encoded by a nucleotide sequence described herein, the process comprising: transforming or transfecting a cell with a nucleic acid comprising a nucleotide sequence described herein; growing the cells; optionally isolating additional quantities of a nucleotide sequence described herein; inducing expression of a polypeptide encoded by a nucleotide sequence of described herein; isolating the polypeptide encoded by a nucleotide described herein.

Another embodiment described herein is a nucleotide sequence or a polypeptide encoded by the nucleotide sequence produced by the method or the means described herein.

Another embodiment described herein is the use of an effective amount of a polypeptide encoded by one or more of the nucleotide sequences described herein in SEQ ID NO: 1, 3, 5, 7, 9, 11, or 13.

Another embodiment described herein is a research tool comprising a polypeptide encoded by a nucleotide sequence described herein.

Another embodiment described herein is a reagent comprising a polypeptide encoded by a nucleotide sequence described herein.

The polynucleotides described herein include variants that have substitutions, deletions, and/or additions that can involve one or more nucleotides. The variants can be altered in coding regions, non-coding regions, or both. Alterations in the coding regions can produce conservative or non-conservative amino acid substitutions, deletions, or additions. Especially preferred among these are silent substitutions, additions, and deletions, which do not alter the properties and activities of the binding.

Further embodiments described herein include (a) nucleotide sequences about 50%, 55%, 60%, 65%, 70%, 75%, 80%, 85%, 90%, 91%, 92%, 93%, 94%, 95%, 96%, 97%, 98%, or 99% identical, and more preferably at least about 90-99% or 100% identical to nucleotide sequences encoding polypeptide SEQ ID NO: 2, 4, 6, 8, 10, 12, or 14; (b) nucleotide sequences, or degenerate, homologous, or codon-optimized variants thereof, encoding polypeptides having the amino acid sequences in SEQ ID NO: 2, 4, 6, 8, 10, 12, or 14; and (c) nucleotide sequences capable of hybridizing to the complement of any of the nucleotide sequences in (a) or (b) above and capable of expressing functional polypeptides of amino acid sequences in SEQ ID NO: 2, 4, 6, 8, 10, 12, or 14.

By a polynucleotide having a nucleotide sequence at least, for example, 90-99% "identical" to a reference nucleotide sequence encoding a Cas13 protein is intended that the nucleotide sequence of the polynucleotide be identical to the reference sequence except that the polynucleotide sequence can include up to about 10 to 1 point mutations, additions, or deletions per each 100 nucleotides of the reference nucleotide sequence encoding the Cas13 protein.

In other words, to obtain a polynucleotide having a nucleotide sequence about at least 90-99% identical to a reference nucleotide sequence, up to 10% of the nucleotides in the reference sequence can be deleted, added, or substituted, with another nucleotide, or a number of nucleotides up to 10% of the total nucleotides in the reference sequence can be inserted into the reference sequence. These mutations of the reference sequence can occur at the 5'- or 3'-terminal positions of the reference nucleotide sequence or anywhere between those terminal positions, interspersed either individually among nucleotides in the reference sequence or in one or more contiguous groups within the reference sequence. The same is applicable to polypeptide sequences about at least 90-99% identical to a reference polypeptide sequence.

As noted above, two or more polynucleotide sequences can be compared by determining their percent identity. Two or more amino acid sequences likewise can be compared by determining their percent identity. The percent identity of two sequences, whether nucleic acid or peptide sequences, is generally described as the number of exact matches between two aligned sequences divided by the length of the shorter sequence and multiplied by 100. An approximate alignment for nucleic acid sequences is provided by the local homology algorithm of Smith and Waterman, *Advances in Applied Mathematics* 2: 4 82-489 (1981). This algorithm can be extended to use with peptide sequences using the scoring matrix developed by Dayhoff, *Atlas of Protein Sequences and Structure*, M. O. Dayhoff ed., 5 suppl. 3: 353-358, National Biomedical Research Foundation, Washington, D.C., USA, and normalized by Gribskov, *Nucl. Acids Res.* 14(6): 6745-6763 (1986).

For example, due to the degeneracy of the genetic code, one having ordinary skill in the art will recognize that a large number of the nucleic acid molecules having a sequence at least 50%, 55%, 60%, 65%, 70%, 75%, 80%, 85%, 90%, 91%, 92%, 93%, 94%, 95%, 96%, 97%, 98%, 99%, or 100% identical to the nucleic acid sequence shown in SEQ ID NO: 1, 3, 5, 7, 9, 11, or 13, or degenerate, homologous, or codon-optimized variants thereof, will encode a Cas13 protein.

The polynucleotides described herein include those encoding mutations, variations, substitutions, additions, deletions, and particular examples of the polypeptides described herein. For example, guidance concerning how to make phenotypically silent amino acid substitutions is provided in Bowie, J. U. et al., "Deciphering the Message in Protein Sequences: Tolerance to Amino Acid Substitutions," Science 247: 1306-1310 (1990), wherein the authors indicate that proteins are surprisingly tolerant of amino acid substitutions.

Thus, fragments, derivatives, or analogs of the polypeptides of SEQ ID NO: 2, 4, 6, 8, 10, 12, or 14 can be (i) ones in which one or more of the amino acid residues (e.g., 1, 2, 3, 4, 5, 7, 8, 9, 10, 11, 12, 13, 14, 15, 16, 17, 18, 19, 20, 25, 30, 35, 40, 45, or 50 residues, or even more) are substituted with a conserved or non-conserved amino acid residue (preferably a conserved amino acid residue). Such substituted amino acid residues may or may not be one encoded by the genetic code, or (ii) ones in which one or more of the amino acid residues includes a substituent group (e.g., 1, 2, 3, 4, 5, 7, 8, 9, 10, 15, 20, 25, 30, 35, 40, 45, or 50 residues or even more), or (iii) ones in which the mature polypeptide is fused with another polypeptide or compound, such as a compound to increase the half-life of the polypeptide (for example, polyethylene glycol), or (iv) ones in which the additional amino acids are fused to the mature polypeptide, such as an IgG Fc fusion region peptide or leader or secretory sequence or a sequence which is employed for purification of the mature polypeptide or a proprotein sequence. Such fragments, derivatives, and analogs are deemed to be within the scope of those skilled in the art from the teachings herein.

In addition, fragments, derivatives, or analogs of the polypeptides of SEQ ID NO: 2, 4, 6, 8, 10, 12, or 14 can be substituted with one or more conserved or non-conserved amino acid residue (preferably a conserved amino acid residue). In some cases these polypeptides, fragments, derivatives, or analogs thereof will have a polypeptide sequence at least 50%, 55%, 60%, 65%, 70%, 75%, 80%, 85%, 90%, 91%, 92%, 93%, 94%, 95%, 96%, 97%, 98%, 99% or 100% identical to the polypeptide sequence shown in SEQ ID NO: 2, 4, 6, 8, 10, 12, or 14 and will comprise functional or non-functional proteins or enzymes. Similarly, additions or deletions to the polypeptides can be made either at the N- or C-termini or within non-conserved regions of the polypeptide (which are assumed to be non-critical because they have not been photogenically conserved).

As described herein, in many cases the amino acid substitutions, mutations, additions, or deletions are preferably of a minor nature, such as conservative amino acid substitutions that do not significantly affect the folding or activity of the protein or additions or deletions to the N- or C-termini. Of course, the number of amino acid substitutions, additions, or deletions a skilled artisan would make depends on many factors, including those described herein. Generally, the number of substitutions, additions, or deletions for any given polypeptide will not be more than about 100, 90, 80, 70, 60, 50, 40, 30, 25, 20, 19, 18, 17, 16, 15, 14, 13, 12, 11, 10, 9, 8, 7, 5, 6, 4, 3, 2, or 1.

It will be apparent to one of ordinary skill in the relevant art that suitable modifications and adaptations to the compositions, formulations, methods, processes, apparata, assemblies, and applications described herein can be made without departing from the scope of any embodiments or aspects thereof. The compositions, apparata, assemblies, and methods provided are exemplary and are not intended to limit the scope of any of the disclosed embodiments. All the various embodiments, aspects, and options disclosed herein can be combined in any variations or iterations. The scope of the compositions, formulations, methods, apparata, assemblies, and processes described herein include all actual or potential combinations of embodiments, aspects, options, examples, and preferences described herein. The compositions, formulations, apparata, assemblies, or methods described herein may omit any component or step, substitute any component or step disclosed herein, or include any component or step disclosed elsewhere herein. The ratios of the mass of any component of any of the compositions or formulations disclosed herein to the mass of any other component in the formulation or to the total mass of the other components in the formulation are hereby disclosed as if they were expressly disclosed. Should the meaning of any terms in any of the patents or publications incorporated by reference conflict with the meaning of the terms used in this disclosure, the meanings of the terms or phrases in this disclosure are controlling. All patents and publications cited herein are incorporated by reference herein for the specific teachings thereof.

REFERENCES

1. Abudayyeh et al., "C2c2 is a single-component programmable RNA-guided RNA-targeting CRISPR effector," *Science* 353(6299): aaf5573 (2016).
2. Gootenberg et al., "Nucleic acid detection with CRISPR-Cas13a/C2c2," *Science* 356(6336): 438-442 (2017).
3. East-Seletsky et al., "Two distinct RNase activities of CRISPR-C2c2 enable guide-RNA processing and RNA detection," *Nature* 538 (7624): 270-273 (2016).
4. Gibson et al., "Enzymatic assembly of DNA molecules up to several hundred kilobases," *Nature Methods* 6 (5): 343-34 (2009).

EXAMPLES

Example 1

Three Cas13a variants from *Leptotrichia buccalis* (Lbu), *Leptotrichia shahii* (Lsh), and *Leptotrichia wadei* (Lwa) were overexpressed in *E. coli* cells and purified from lysates thereof. See Table 1. The genes encoding the Lbu, Lsh, and Lwa Cas13a variants were synthesized as gBlocks® Gene Fragments (Integrated DNA Technologies) and inserted into pET28b (SEQ ID NO: 43) and pET28-MBP-TEV (SEQ ID NO: 44) expression plasmids by isothermal assembly of DNA fragments (see [4]) (Table 2). All primers were manufactured by Integrated DNA Technologies Inc.

TABLE 1

| Polynucleotide and Polypeptide Sequences of Cas Constructs |
|---|
| LbuCas13a CTD-His Polynucleotide Sequence<br>SEQ ID NO: 1<br>ATGAAGGTGACCAAAGTTGGTGGTATCAGCCATAAAAAGTATACCAGCGAAGGTCGTCTGGTTAAAAGCGAAAGCG<br>AAGAAAATCGTACCGATGAACGTCTGAGCGCACTGCTGAATATGCGTCTGGATATGTATATCAAAAATCCGAGCAG<br>CACCGAAACCAAAGAAAATCAGAAACGTATCGGCAAGCTGAAAAAGTTCTTCAGCAACAAAATGGTGTACCTGAAA<br>GATAACACCCTGAGCCTGAAAAACGGCAAGAAAGAAAATATCGATCGCGAGTATAGCGAAACCGATATTCTGGAAA<br>GTGATGTGCGTGACAAAAAAAACTTTGCCGTCCTGAAAAAGATCTATCTGAACGAAAATGTGAACAGCGAAGAACT<br>GGAAGTGTTTCGCAACGACATTAAAAAGAAGCTGAACAAGATCAACAGCCTGAAATATAGCTTCGAGAAAAACAAA<br>GCCAACTATCAGAAGATCAACGAGAACAACATCGAAAAAGTGGAAGGTAAAAGCAAGCGCAACATCATCTATGATT<br>ATTATCGTGAAAGCGCCAAACGTGATGCCTATGTTAGCAATGTTAAAGAGGCCTTCGACAAGCTGTATAAAGAAGA<br>AGATATTGCCAAACTGGTGCTGGAAATTGAAAATCTGACCAAGCTGGAAAAATACAAGATCCGCGAATTCTATCAC<br>GAAATCATTGGTCGCAAAAACGATAAAGAGAACTTCGCCAAAATCATCTACGAAGAAATTCAGAACGTGAATAACA<br>TGAAAGAACTGATCGAGAAAGTTCCGGATATGAGCGAACTGAAAAAAAGCCAGGTGTTCTACAAATATTACCTGGA<br>CAAAGAGGAACTGAACGATAAAAACATCAAATACGCCTTTTGCCACTTCGTGGAAATCGAAATGAGCCAGCTGCTG<br>AAAAACTATGTGTATAAACGCCTGAGCAACATCAGCAACGATAAGATTAAACGCATCTTCGAGTACCAGAACCTGA<br>AGAAACTGATTGAAAACAAACTGCTTAACAAACTGGATACCTATGTGCGTAATTGCGGCAAATACAACTATTATCT<br>GCAGGATGGTGAAATTGCGACCAGCGATTTTATTGCACGTAATCGTCAGAATGAAGCCTTTCTGCGTAACATTATT<br>GGTGTTAGCAGCGTTGCATATTTTAGCCTGCGTAATATCCTGGAAACCGAAAACGAGAATGATATCACCGGTCGTA<br>TGCGTGGTAAAACCGTGAAAAACAATAAAGGCGAAGAGAAATATGTGAGCGGTGAGGTGGATAAAATCTACAACGA<br>AAACAAAAAGAACGAAGTGAAAGAAAACCTGAAAATGTTTTACAGCTACGACTTTAACATGGACAACAAGAACGAG<br>ATCGAAGATTTTTTCGCCAACATTGATGAAGCCATTAGCAGCATTCGTCATGGCATTGTTCACTTTAATCTGGAAC |

TABLE 1-continued

Polynucleotide and Polypeptide Sequences of Cas Constructs

TTGAGGGCAAAGACATCTTCGCGTTTAAAAACATTGCACCGAGCGAGATTAGCAAAAAGATGTTCCAGAACGAAAT
TAACGAGAAAAAACTGAAACTGAAGATCTTTCGCCAGCTGAATAGCGCAAATGTTTTTCGCTATCTTGAGAAATAC
AAAATCCTGAACTATCTGAAACGCACCCGCTTTGAATTTGTGAACAAAAACATTCCGTTTGTGCCGAGCTTTACCA
AACTGTATAGCCGTATTGATGATCTGAAAAACAGCCTGGGCATTTATTGGAAAACCCCGAAAACCAACGATGATAA
CAAGACGAAAGAAATCATCGATGCCCAGATTTATCTGCTTAAGAACATCTACTATGGCGAATTTCTGAACTATTTT
ATGAGCAACAACGGCAACTTCTTTGAAATCAGCAAAGAGATTATCGAGCTGAATAAAAACGACAAACGCAATCTGA
AAACCGGCTTCTATAAACTGCAGAAGTTTGAGGATATCCAAGAAAAGATCCCGAAAGAATATCTGGCGAATATTCA
GAGCCTGTACATGATTAATGCAGGCAATCAGGATGAGGAAGAGAAAGATACCTATATCGATTTCATCCAGAAAATC
TTTCTGAAAGGCTTTATGACCTATCTGGCCAATAATGGTCGTCTGAGTCTGATTTATATCGGTAGTGATGAAGAAA
CCAATACCAGCCTGGCAGAAAAAAAACAAGAGTTCGATAAGTTCCTGAAGAAGTACGAACAGAACAACAACATCAA
GATCCCGTATGAAATCAATGAATTTCTGCGCGAAATCAAGCTGGGCAACATTCTGAAATACACCGAACGCCTGAAT
ATGTTCTATCTGATTCTGAAACTGCTGAACCATAAAGAGCTGACGAATCTGAAAGGTAGCCTGGAAAAGTATCAGA
GCGCAAATAAAGAGGAAGCATTTAGCGATCAGCTGGAACTGATTAATCTGCTGAATCTGGATAATAACCGTGTGAC
CGAAGATTTCGAATTAGAAGCAGATGAGATCGGCAAATTCCTGGATTTTAATGGCAACAAAGTGAAGGACAACAAA
GAGCTTAAGAAGTTCGACACCAACAAGATCTATTTTGATGGCGAGAACATCATCAAACACCGTGCCTTTTATAACA
TCAAAAAATACGGTATGCTGAACCTGCTGGAAAAGATTGCAGATAAAGCAGGCTATAAAATCAGCATTGAAGAGTT
GAAAAAATACAGCAACAAGAAAAACGAGATTGAGAAAAACCACAAAATGCAAGAAAATCTGCACCGCAAATATGCA
CGTCCGCGTAAAGATGAAAAATTCACCGATGAAGATTATGAAAGCTACAAACAGGCCATCGAAAACATCGAAGAAT
ATACCCATCTGAAGAACAAAGTCGAATTCAACGAACTGAATCTGCTGCAGGGTCTGCTGCTGCGTATTCTGCATCG
TCTGGTGGGTTATACCAGCATTTGGGAACGTGATCTGCGTTTTCGCCTGAAAGGTGAATTTCCTGAAAACCAGTAT
ATCGAGGAAATCTTCAACTTCGAGAATAAAAAGAATGTGAAGTATAAAGGTGGCCAGATCGTCGAGAAATATATCA
AATTCTACAAAGAACTGCACCAGAACGACGAGGTGAAAATCAACAAATATAGCAGCGCGAACATCAAAGTGCTGAA
ACAAGAGAAAAAAGACCTGTACATCCGCAACTATATCGCCCACTTTAACTATATTCCGCATGCAGAAATTAGTCTG
CTGGAAGTTCTGGAAAACCTGCGTAAACTGCTGTCATATGATCGTAAACTTAAAAACGCCGTGATGAAAAGCGTTG
TGGACATCCTGAAAGAGTATGGTTTTGTTGCGACCTTTAAAATCGGTGCCGATAAAAAGATTGGTATTCAGACCCT
GGAAAGCGAGAAGATTGTTCACCTGAAAAATCTTAAGAAAAAGAAACTTATGACCGATCGCAATAGCGAGGAACTG
TGTAAACTGGTGAAAATTATGTTTGAGTATAAAATGGAAGAGAAGAAATCCGAAAATGGGGATCCGAATTCGAGCT
CCGTCGACAAGCTTGCGGCCGCACTCGAGCACCACCACCACCACCACTGA

LbuCas13a CTD-His Polypeptide Sequence

SEQ ID NO: 2

MKVTKVGGISHKKYTSEGRLVKSESEENRTDERLSALLNMRLDMYIKNPSSTETKENQKRIGKLKKFFSNKMVYLK
DNTLSLKNGKKENIDREYSETDILESDVRDKKNFAVLKKIYLNENVNSEELEVERNDIKKKLNKINSLKYSFEKNK
ANYQKINENNIEKVEGKSKRNIIYDYYRESAKRDAYVSNVKEAFDKLYKEEDIAKLVLEIENLTKLEKYKIREFYH
EIIGRKNDKENFAKIIYEEIQNVNNMKELIEKVPDMSELKKSQVFYKYYLDKEELNDKNIKYAFCHFVEIEMSQLL
KNYVYKRLSNISNDKIKRIFEYQNLKKLIENKLLNKLDTYVRNCGKYNYYLQDGEIATSDFIARNRQNEAFLRNII
GVSSVAYFSLRNILETENENDITGRMRGKTVKNNKGEEKYVSGEVDKIYNENKKNEVKENLKMFYSYDENMDNKNE
IEDFFANIDEAISSIRHGIVHFNLELEGKDIFAFKNIAPSEISKKMFQNEINEKKLKLKIFRQLNSANVFRYLEKY
KILNYLKRTRFEFVNKNIPFVPSFTKLYSRIDDLKNSLGIYWKTPKTNDDNKTKEIIDAQIYLLKNIYYGEFLNYF
MSNNGNFFEISKEIIELNKNDKRNLKTGFYKLQKFEDIQEKIPKEYLANIQSLYMINAGNQDEEEKDTYIDFIQKI
FLKGFMTYLANNGRLSLIYIGSDEETNTSLAEKKQEFDKFLKKYEQNNNIKIPYEINEFLREIKLGNILKYTERLN
MFYLILKLLNHKELTNLKGSLEKYQSANKEEAFSDQLELINLLNLDNNRVTEDFELEADEIGKFLDENGNKVKDNK
ELKKFDTNKIYFDGENIIKHRAFYNIKKYGMLNLLEKIADKAGYKISIEELKKYSNKKNEIEKNHKMQENLHRKYA
RPRKDEKFTDEDYESYKQAIENIEEYTHLKNKVEFNELNLLQGLLLRILHRLVGYTSIWERDLRFRLKGEFPENQY
IEEIFNFENKKNVKYKGGQIVEKYIKFYKELHQNDEVKINKYSSANIKVLKQEKKDLYIRNYIAHFNYIPHAEISL
LEVLENLRKLLSYDRKLKNAVMKSVVDILKEYGFVATFKIGADKKIGIQTLESEKIVHLKNLKKKKLMTDRNSEEL
CKLVKIMFEYKMEEKKSENGDPNSSSVDKLAAALEHHHHHH

LbuCas13a NTD-MBP Polynucleotide Sequence

SEQ ID NO: 3

ATGAAAATCGAAGAAGGTAAACTGGTAATCTGGATTAACGGCGATAAAGGCTATAACGGTCTCGCTGAAGTCGGTA
AGAAATTCGAGAAAGATACCGGAATTAAAGTCACCGTTGAGCATCCGGATAAACTGGAAGAGAAATTCCCACAGGT
TGCGGCAACTGGCGATGGCCCTGACATTATCTTCTGGGCACACGACCGCTTTGGTGGCTACGCTCAATCTGGCCTG
TTGGCTGAAATCACCCCGGACAAAGCGTTCCAGGACAAGCTGTATCCGTTTACCTGGGATGCCGTACGTTACAACG
GCAAGCTGATTGCTTACCCGATCGCTGTTGAAGCGTTATCGCTGATTTATAACAAAGATCTGCTGCCGAACCCGCC
AAAAACCTGGGAAGAGATCCCGGCGCTGGATAAAGAACTGAAAGCGAAAGGTAAGAGCGCGCTGATGTTCAACCTG
CAAGAACCGTACTTCACCTGGCCGCTGATTGCTGCTGACGGGGGTTATGCGTTCAAGTATGAAAACGGCAAGTACG
ACATTAAAGACGTGGGCGTGGATAACGCTGGCGCGAAAGCGGGTCTGACCTTCCTGGTTGACCTGATTAAAAACAA
ACACATGAATGCAGACACCGATTACTCCATCGCAGAAGCTGCCTTTAATAAAGGCGAAACAGCGATGACCATCAAC
GGCCCGTGGGCATGGTCCAACATCGACACCAGCAAAGTGAATTATGGTGTAACGGTACTGCCGACCTTCAAGGGTC
AACCATCCAAACCGTTCGTTGGCGTGCTGAGCGCAGGTATTAACGCCGCCAGTCCGAACAAAGAGCTGGCAAAAGA
GTTCCTCGAAAACTATCTGCTGACTGATGAAGGTCTGGAAGCGGTTAATAAAGACAAACCGCTGGGTGCCGTAGCG
CTGAAGTCTTACGAGGAAGAGTTGGTGAAAGATCCGCGTATTGCCGCCACTATGGAAAACGCCCAGAAAGGTGAAA
TCATGCCGAACATCCCGCAGATGTCCGCTTTCTGGTATGCCGTGCGTACTGCGGTGATCAACGCCGCCAGCGGTCG
TCAGACTGTCGATGAAGCCCTGAAAGACGCGCAGACTAATTCGAGCTCGAACAACAACAACAATAACAATAACAAC
AACCTCGGGATCGAGGGAAGgAAGGTGACCAAAGTTGGTGGTATCAGCCATAAAAAGTATACCAGCGAAGGTCGTC
TGGTTAAAAGCGAAAGCGAAGAAAATCGTACCGATGAACGTCTGAGCGCACTGCTGAATATGCGTCTGGATATGTA
TATCAAAAATCCGAGCAGCACCGAAACCAAAGAAAATCAGAAACGTATCGGCAAGCTGAAAAAGTTCTTCAGCAAC
AAAATGGTGTACCTGAAAGATAACACCCTGAGCCTGAAAAACGGCAAGAAAGAAAATATCGATCGCGAGTATAGCG
AAACCGATATTCTGGAAAGTGATGTGCGTGACAAAAAAAACTTTGCCGTCCTGAAAAAGATCTATCTGAACGAAAA
TGTGAACAGCGAAGAACTGGAAGTGTTTCGCAACGACATTAAAAAGAAGCTGAACAAGATCAACAGCCTGAAATAT
AGCTTCGAGAAAAACAAAGCCAACTATCAGAAGATCAACGAGAACAACATCGAAAAAGTGGAAGGTAAAAGCAAGC
GCAACATCATCTATGATTATTATCGTGAAAGCGCCAAACGTGATGCCTATGTTAGCAATGTTAAAGAGGCCTTCGA
CAAGCTGTATAAAGAAGAAGATATTGCCAAACTGGTGCTGGAAATTGAAAATCTGACCAAGCTGGAAAAATACAAG
ATCCGCGAATTCTATCACGAAATCATTGGTCGCAAAAACGATAAAGAGAACTTCGCCAAAATCATCTACGAAGAAA
TTCAGAACGTGAATAACATGAAAGAACTGATCGAGAAAGTTCCGGATATGAGCGAACTGAAAAAAAGCCAGGTGTT
CTACAAATATTACCTGGACAAAGAGGAACTGAACGATAAAAACATCAAATACGCCTTTTGCCACTTCGTGGAAATC
GAAATGAGCCAGCTGCTGAAAAACTATGTGTATAAACGCCTGAGCAACATCAGCAACGATAAGATTAAACGCATCT

TABLE 1-continued

Polynucleotide and Polypeptide Sequences of Cas Constructs

TCGAGTACCAGAACCTGAAGAAACTGATTGAAAACAAACTGCTTAACAAACTGGATACCTATGTGCGTAATTGCGG
CAAATACAACTATTATCTGCAGGATGGTGAAATTGCGACCAGCGATTTTATTGCACGTAATCGTCAGAATGAAGCC
TTTCTGCGTAACATTATTGGTGTTAGCAGCGTTGCATATTTTAGCCTGCGTAATATCCTGGAAACCGAAAACGAGA
ATGATATCACCGGTCGTATGCGTGGTAAAACCGTGAAAAACAATAAAGGCGAAGAGAAATATGTGAGCGGTGAGGT
GGATAAAATCTACAACGAAAACAAAAAGAACGAAGTGAAAGAAAACCTGAAAATGTTTTACAGCTACGACTTTAAC
ATGGACAACAAGAACGAGATCGAAGATTTTTTCGCCAACATTGATGAAGCCATTAGCAGCATTCGTCATGGCATTG
TTCACTTTAATCTGGAACTTGAGGGCAAAGACATCTTCGCGTTTAAAAACATTGCACCGAGCGAGATTAGCAAAAA
GATGTTCCAGAACGAAATTAACGAGAAAAAACTGAAACTGAAGATCTTTCGCCAGCTGAATAGCGCAAATGTTTTT
CGCTATCTTGAGAAATACAAAATCCTGAACTATCTGAAACGCACCCGCTTTGAATTTGTGAACAAAAACATTCCGT
TTGTGCCGAGCTTTACCAAACTGTATAGCCGTATTGATGATCTGAAAAACAGCCTGGGCATTTATTGGAAAACCCC
GAAAACCAACGATGATAACAAGACGAAAGAAATCATCGATGCCCAGATTTATCTGCTTAAGAACATCTACTATGGC
GAATTTCTGAACTATTTTATGAGCAACAACGGCAACTTCTTTGAAATCAGCAAAGAGATTATCGAGCTGAATAAAA
ACGACAAACGCAATCTGAAAACCGGCTTCTATAAACTGCAGAAGTTTGAGGATATCCAAGAAAAGATCCCGAAAGA
ATATCTGGCGAATATTCAGAGCCTGTACATGATTAATGCAGGCAATCAGGATGAGGAAGAGAAAGATACCTATATC
GATTTCATCCAGAAAATCTTTCTGAAAGGCTTTATGACCTATCTGGCCAATAATGGTCGTCTGAGTCTGATTTATA
TCGGTAGTGATGAAGAAACCAATACCAGCCTGGCAGAAAAAAAACAAGAGTTCGATAAGTTCCTGAAGAAGTACGA
ACAGAACAACAACATCAAGATCCCGTATGAAATCAATGAATTTCTGCGCGAAATCAAGCTGGGCAACATTCTGAAA
TACACCGAACGCCTGAATATGTTCTATCTGATTCTGAAACTGCTGAACCATAAAGAGCTGACGAATCTGAAAGGTA
GCCTGGAAAAGTATCAGAGCGCAAATAAAGAGGAAGCATTTAGCGATCAGCTGGAACTGATTAATCTGCTGAATCT
GGATAATAACCGTGTGACCGAAGATTTCGAATTAGAAGCAGATGAGATCGGCAAATTCCTGGATTTTAATGGCAAC
AAAGTGAAGGACAACAAAGAGCTTAAGAAGTTCGACACCAACAAGATCTATTTTGATGGCGAGAACATCATCAAAC
ACCGTGCCTTTTATAACATCAAAAAATACGGTATGCTGAACCTGCTGGAAAAGATTGCAGATAAAGCAGGCTATAA
AATCAGCATTGAAGAGTTGAAAAAATACAGCAACAAGAAAAACGAGATTGAGAAAAACCACAAAATGCAAGAAAAT
CTGCACCGCAAATATGCACGTCCGCGTAAAGATGAAAAATTCACCGATGAAGATTATGAAAGCTACAAACAGGCCA
TCGAAAACATCGAAGAATATACCCATCTGAAGAACAAAGTCGAATTCAACGAACTGAATCTGCTGCAGGGTCTGCT
GCTGCGTATTCTGCATCGTCTGGTGGGTTATACCAGCATTTGGGAACGTGATCTGCGTTTTCGCCTGAAAGGTGAA
TTTCCTGAAAACCAGTATATCGAGGAAATCTTCAACTTCGAGAATAAAAAGAATGTGAAGTATAAAGGTGGCCAGA
TCGTCGAGAAATATATCAAATTCTACAAAGAACTGCACCAGAACGACGAGGTGAAAATCAACAAATATAGCAGCGC
GAACATCAAAGTGCTGAAACAAGAGAAAAAAGACCTGTACATCCGCAACTATATCGCCCACTTTAACTATATTCCG
CATGCAGAAATTAGTCTGCTGGAAGTTCTGGAAAACCTGCGTAAACTGCTGTCATATGATCGTAAACTTAAAAACG
CCGTGATGAAAAGCGTTGTGGACATCCTGAAAGAGTATGGTTTTGTTGCGACCTTTAAAATCGGTGCCGATAAAAA
GATTGGTATTCAGACCCTGGAAAGCGAGAAGATTGTTCACCTGAAAAATCTTAAGAAAAAGAAACTTATGACCGAT
CGCAATAGCGAGGAACTGTGTAAACTGGTGAAAATTATGTTTGAGTATAAAATGGAAGAGAAGAAATCCGAAAATG
ATCCGAATTCGAGCTCCGTCGACAAGCTTGCGGCCGCACTCGAGCACCACCACCACCACCACTGA

LbuCas13a NTD-MBP Polypeptide Sequence

SEQ ID NO: 4

MKIEEGKLVIWINGDKGYNGLAEVGKKFEKDTGIKVTVEHPDKLEEKFPQVAATGDGPDIIFWAHDRFGGYAQSGL
LAEITPDKAFQDKLYPFTWDAVRYNGKLIAYPIAVEALSLIYNKDLLPNPPKTWEEIPALDKELKAKGKSALMENL
QEPYFTWPLIAADGGYAFKYENGKYDIKDVGVDNAGAKAGLTFLVDLIKNKHMNADTDYSIAEAAFNKGETAMTIN
GPWAWSNIDTSKVNYGVTVLPTFKGQPSKPFVGVLSAGINAASPNKELAKEFLENYLLTDEGLEAVNKDKPLGAVA
LKSYEEELVKDPRIAATMENAQKGEIMPNIPQMSAFWYAVRTAVINAASGRQTVDEALKDAQTNSSSNNNNNNNNN
NLGIEGRKVTKVGGISHKKYTSEGRLVKSESEENRTDERLSALLNMRLDMYIKNPSSTETKENQKRIGKLKKFFSN
KMVYLKDNTLSLKNGKKENIDREYSETDILESDVRDKKNFAVLKKIYLNENVNSEELEVFRNDIKKKLNKINSLKY
SFEKNKANYQKINENNIEKVEGKSKRNIIYDYYRESAKRDAYVSNVKEAFDKLYKEEDIAKLVLEIENLTKLEKYK
IREFYHEIIGRKNDKENFAKIIYEEIQNVNNMKELIEKVPDMSELKKSQVFYKYYLDKEELNDKNIKYAFCHFVEI
EMSQLLKNYVYKRLSNISNDKIKRIFEYQNLKKLIENKLLNKLDTYVRNCGKYNYYLQDGEIATSDFIARNRQNEA
FLRNIIGVSSVAYFSLRNILETENENDITGRMRGKTVKNNKGEEKYVSGEVDKIYNENKKNEVKENLKMFYSYDEN
MDNKNEIEDFFANIDEAISSIRHGIVHFNLELEGKDIFAFKNIAPSEISKKMFQNEINEKKLKLKIFRQLNSANVE
RYLEKYKILNYLKRTRFEFVNKNIPFVPSFTKLYSRIDDLKNSLGIYWKTPKTNDDNKTKEIIDAQIYLLKNIYYG
EFLNYFMSNNGNFFEISKEIIELNKNDKRNLKTGFYKLQKFEDIQEKIPKEYLANIQSLYMINAGNQDEEEKDTYI
DFIQKIFLKGFMTYLANNGRLSLIYIGSDEETNTSLAEKKQEFDKFLKKYEQNNNIKIPYEINEFLREIKLGNILK
YTERLNMFYLILKLLNHKELTNLKGSLEKYQSANKEEAFSDQLELINLLNLDNNRVTEDFELEADEIGKFLDENGN
KVKDNKELKKFDTNKIYFDGENIIKHRAFYNIKKYGMLNLLEKIADKAGYKISIEELKKYSNKKNEIEKNHKMQEN
LHRKYARPRKDEKFTDEDYESYKQAIENIEEYTHLKNKVEFNELNLLQGLLLRILHRLVGYTSIWERDLRFRLKGE
FPENQYIEEIFNFENKKNVKYKGGQIVEKYIKFYKELHQNDEVKINKYSSANIKVLKQEKKDLYIRNYIAHFNYIP
HAEISLLEVLENLRKLLSYDRKLKNAVMKSVVDILKEYGFVATFKIGADKKIGIQTLESEKIVHLKNLKKKKLMTD
RNSEELCKLVKIMFEYKMEEKKSENDPNSSSVDKLAAALEHHHHHH

LshCas13a NTD-His Polynucleotide Sequence

SEQ ID NO: 5

ATGGGTAACCTGTTTGGTCATAAACGTTGGTATGAAGTGCGCGACAAAAAAGACTTTAAAATCAAACGCAAGGTGA
AAGTGAAACGCAACTATGATGGCAACAAATATATCCTGAACATCAACGAGAACAACAACAAAGAGAAGATCGATAA
TAATAAATTCATCCGCAAATACATCAACTACAAAAAAAACGATAACATCCTGAAAGAATTCACCCGCAAGTTTCAT
GCAGGCAACATTCTGTTTAAACTGAAAGGCAAAGAAGGCATCATTCGCATCGAAAACAATGATGATTTTCTGGAAA
CCGAAGAGGTGGTGCTGTATATTGAAGCATATGGCAAAAGCGAAAAACTGAAGGCACTGGGCATTACCAAAAAAAA
GATTATCGATGAAGCCATTCGCCAGGGTATTACCAAAGATGACAAAAAGATCGAGATCAAGCGCCAAGAAAACGAA
GAAGAAATCGAAATTGATATCCGCGACGAGTATACCAATAAAACCCTGAATGATTGCAGCATTATTCTGCGCATTA
TCGAGAATGATGAGCTGGAAACGAAAAAGAGCATCTACGAGATCTTCAAAAACATCAACATGAGCCTGTACAAAAT
CATCGAGAAAATTATCGAAAACGAAACCGAGAAGGTGTTCGAGAATCGCTATTATGAAGAACATCTGCGTGAGAAA
CTGCTGAAAGATGATAAAATTGATGTGATCCTGACCAACTTCATGGAAATCCGCGAAAAGATTAAAAGCAACCTGG
AAATTCTGGGCTTCGTGAAATTCTATCTGAATGTTGGTGGCGACAAGAAAAAAAGCAAGAACAAGAAAATGCTGGT
CGAAAAAATTCTGAACATTAACGTTGATCTGACCGTGGAAGATATTGCCGATTTTGTGATTAAAGAGCTGGAATTC
TGGAACATCACCAAACGCATTGAGAAGGTGAAAAAAGTGAACAACGAGTTCCTGGAAAAACGTCGTAATCGCACCT
ATATCAAAAGCTATGTTCTGCTGGATAAGCACGAGAAATTCAAAATTGAACGCGAGAACAAAAAGGACAAAATCGT
GAAGTTTTTCGTGGAAAATATCAAAAACAACAGCATCAAAGAAAAAATCGAGAAGATCCTGGCCGAGTTCAAAATC
GATGAACTGATCAAAAAGCTGGAAAAAGAACTGAAAAAAGGCAACTGCGATACCGAAATTTTCGGCATCTTTAAGA
AACACTATAAAGTGAACTTCGATAGCAAAAAATTCAGCAAAAAGAGCGACGAAGAGAAAGAGCTGTATAAGATCAT

TABLE 1-continued

Polynucleotide and Polypeptide Sequences of Cas Constructs

TTACCGCTATCTGAAAGGCCGTATTGAAAAAATCCTGGTGAATGAACAGAAAGTGCGCCTGAAAAAAATGGAAAAA
ATTGAGATTGAGAAGATTCTGAACGAGAGCATCCTGAGTGAGAAAATCCTGAAACGTGTTAAACAGTATACCCTGG
AACACATTATGTATCTGGGTAAACTGCGCCATAACGATATTGATATGACCACCGTTAATACCGATGATTTCAGCCG
TCTGCATGCAAAAGAAGAACTGGATCTGGAACTGATTACCTTTTTTGCAAGCACCAATATGGAACTGAACAAGATC
TTTAGCCGTGAAAACATTAACAACGACGAGAACATTGATTTCTTTGGTGGTGATCGCGAGAAAAACTATGTCCTGG
ATAAAAAGATCCTGAATAGCAAAATCAAGATCATCCGCGATCTGGATTTCATCGACAATAAGAACAACATTACCAA
CAACTTTATTCGCAAATTTACCAAAATTGGCACCAATGAACGCAACCGTATTCTGCATGCCATTAGCAAAGAACGT
GATCTGCAGGGCACCCAGGATGATTATAACAAAGTGATTAACATCATCCAGAACCTGAAAATCTCCGATGAAGAAG
TTAGCAAAGCACTGAATCTGGATGTGGTGTTCAAAGATAAGAAAAATATCATCACCAAGATCAACGATATCAAAAT
CAGCGAAGAGAACAATAACGACATCAAATATCTGCCGAGCTTTAGCAAAGTTCTGCCGGAAATTCTTAATCTGTAT
CGCAATAACCCGAAAAACGAACCGTTTGATACCATCGAAACAGAGAAAATTGTTCTGAACGCCCTGATCTATGTGA
ACAAAGAACTGTACAAGAAACTGATCCTGGAAGATGATCTGGAAGAGAACGAATCGAAAAACATCTTTCTGCAAGA
GCTGAAAAAGACCCTGGGTAACATTGATGAGATCGATGAAAACATCATCGAAAATTACTACAAGAACGCACAGATT
AGCGCAAGCAAAGGTAATAACAAAGCCATCAAAAAATACCAGAAAAAGGTGATCGAATGCTACATTGGTTATCTGC
GCAAAAACTACGAAGAACTGTTCGATTTCAGCGATTTCAAAATGAACATCCAAGAGATCAAGAAGCAGATCAAGGA
CATTAACGACAACAAAACCTATGAACGCATCACCGTTAAAACCAGCGATAAAACCATTGTGATCAACGACGATTTC
GAGTACATCATTAGCATTTTTGCACTGCTGAATTCCAACGCCGTGATCAACAAAATTCGCAATCGCTTTTTTGCCA
CCAGTGTTTGGCTGAATACCAGCGAATATCAGAACATTATCGATATCCTGGATGAGATCATGCAGCTGAATACACT
GCGTAATGAATGCATTACCGAAAACTGGAATCTGAACCTTGAAGAATTTATTCAGAAAATGAAAGAGATCGAGAAA
GACTTCGACGACTTCAAAATCCAGACCAAAAAAGAAATCTTCAACAACTACTACGAGGACATCAAAAATAACATTC
TGACCGAATTCAAAGACGATATTAACGGCTGTGACGTGCTGGAAAAGAAGTTGGAAAAGATCGTTATCTTCGATGA
CGAAACCAAATTCGAAATCGACAAAAAGTCCAACATCCTTCAGGATGAACAGCGTAAACTGAGCAATATCAACAAG
AAAGACCTGAAGAAGAAGGTCGACCAGTACATCAAAGACAAAGACCAAGAAATTAAGAGCAAAATCCTGTGCCGCA
TCATCTTTAACAGCGACTTTCTGAAAAAGTATAAGAAAGAGATTGACAACCTGATCGAGGATATGGAAAGCGAGAA
CGAAAACAAGTTTCAAGAGATCTACTATCCGAAAGAACGCAAAAACGAGCTGTACATCTACAAGAAGAACCTGTTC
CTGAATATTGGCAACCCGAACTTCGACAAAATCTATGGTCTGATCAGCAACGACATTAAAATGGCCGATGCAAAAT
TCCTGTTTAATATCGATGGTAAAAACATCCGTAAAAACAAAATTAGCGAGATCGACGCGATCCTGAAAAACCTGAA
CGATAAACTGAATGGCTACAGCAAAGAATATAAAGAGAAATACATTAAAAAGCTGAAAGAAAATGACGACTTCTTC
GCCAAGAACATCCAGAATAAAAACTATAAAAGCTTCGAGAAGGACTACAATCGCGTGTCCGAATATAAGAAAATTC
GTGATCTGGTGGAATTCAACTATCTGAACAAAATCGAAAGCTATCTGATCGATATCAACTGGAAACTGGCAATTCA
GATGGCACGTTTTGAGCGTGATATGCACTATATTGTTAATGGTCTGCGTGAACTGGGCATCATTAAACTGAGTGGT
TATAATACCGGCATTAGCCGTGCATATCCGAAACGTAATGGTTCCGATGGTTTTTATACCACCACCGCCTATTACA
AATTTTTCGACGAAGAAAGCTACAAGAAATTTGAGAAAATTTGCTACGGCTTCGGCATTGATCTGAGCGAAAATAG
CGAAATTAACAAGCCGGAAAATGAGAGCATTCGCAACTATATCTCCCACTTTTATATCGTGCGTAATCCGTTTGCC
GATTATAGCATTGCAGAGCAGATTGATCGTGTTAGCAATCTGCTGAGCTATAGTACCCGTTATAACAATAGCACCT
ATGCCAGCGTGTTTGAGGTGTTTAAAAAGGATGTTAACCTGGACTATGACGAGCTGAAGAAAAAGTTCAAACTGAT
CGGCAACAATGACATCCTGGAACGTCTGATGAAACCGAAAAAAGTTAGTGTGCTGGAACTTGAGAGCTACAACAGC
GATTATATCAAGAACCTGATTATCGAGCTGCTGACCAAGATTGAAAATACCAATGATACCCTGGGGGATCCGAATT
CGAGCTCCGTCGACAAGCTTGCGGCCGCACTCGAGCACCACCACCACCACCACTGA

LshCas13a NTD-His Polypeptide Sequence

SEQ ID NO: 6

MGNLFGHKRWYEVRDKKDFKIKRKVKVKRNYDGNKYILNINENNNKEKIDNNKFIRKYINYKKNDNILKEFTRKFH
AGNILFKLKGKEGIIRIENNDDFLETEEVVLYIEAYGKSEKLKALGITKKKIIDEAIRQGITKDDKKIEIKRQENE
EEIEIDIRDEYTNKTLNDCSIILRIIENDELETKKSIYEIFKNINMSLYKIIEKIIENETEKVFENRYYEEHLREK
LLKDDKIDVILTNFMEIREKIKSNLEILGFVKFYLNVGGDKKKSKNKKMLVEKILNINVDLTVEDIADFVIKELEF
WNITKRIEKVKKVNNEFLEKRRNRTYIKSYVLLDKHEKFKIERENKKDKIVKFFVENIKNNSIKEKIEKILAEFKI
DELIKKLEKELKKGNCDTEIFGIFKKHYKVNFDSKKFSKKSDEEKELYKIIYRYLKGRIEKILVNEQKVRLKKMEK
IEIEKILNESILSEKILKRVKQYTLEHIMYLGKLRHNDIDMTTVNTDDFSRLHAKEELDLELITFFASTNMELNKI
FSRENINNDENIDFFGGDREKNYVLDKKILNSKIKIIRDLDFIDNKNNITNNFIRKFTKIGTNERNRILHAISKER
DLQGTQDDYNKVINIIQNLKISDEEVSKALNLDVVFKDKKNIITKINDIKISEENNNDIKYLPSFSKVLPEILNLY
RNNPKNEPFDTIETEKIVLNALIYVNKELYKKLILEDDLEENESKNIFLQELKKTLGNIDEIDENIIENYYKNAQI
SASKGNNKAIKKYQKKVIECYIGYLRKNYEELFDFSDFKMNIQEIKKQIKDINDNKTYERITVKTSDKTIVINDDE
EYIISIFALLNSNAVINKIRNRFFATSVWLNTSEYQNIIDILDEIMQLNTLRNECITENWNLNLEEFIQKMKEIEK
DFDDFKIQTKKEIFNNYYEDIKNNILTEFKDDINGCDVLEKKLEKIVIFDDETKFEIDKKSNILQDEQRKLSNINK
KDLKKKVDQYIKDKDQEIKSKILCRIIFNSDFLKKYKKEIDNLIEDMESENENKFQEIYYPKERKNELYIYKKNLF
LNIGNPNFDKIYGLISNDIKMADAKFLFNIDGKNIRKNKISEIDAILKNLNDKLNGYSKEYKEKYIKKLKENDDFF
AKNIQNKNYKSFEKDYNRVSEYKKIRDLVEFNYLNKIESYLIDINWKLAIQMARFERDMHYIVNGLRELGIIKLSG
YNTGISRAYPKRNGSDGFYTTTAYYKFFDEESYKKFEKICYGFGIDLSENSEINKPENESIRNYISHFYIVRNPFA
DYSIAEQIDRVSNLLSYSTRYNNSTYASVFEVFKKDVNLDYDELKKKFKLIGNNDILERLMKPKKVSVLELESYNS
DYIKNLIIELLTKIENTNDTLGDPNSSSVDKLAAALEHHHHHH

LshCas13a NTD-MBP Polynucleotide Sequence

SEQ ID NO: 7

ATGAAAATCGAAGAAGGTAAACTGGTAATCTGGATTAACGGCGATAAAGGCTATAACGGTCTCGCTGAAGTCGGTA
AGAAATTCGAGAAAGATACCGGAATTAAAGTCACCGTTGAGCATCCGGATAAACTGGAAGAGAAATTCCCACAGGT
TGCGGCAACTGGCGATGGCCCTGACATTATCTTCTGGGCACACGACCGCTTTGGTGGCTACGCTCAATCTGGCCTG
TTGGCTGAAATCACCCCGGACAAAGCGTTCCAGGACAAGCTGTATCCGTTTACCTGGGATGCCGTACGTTACAACG
GCAAGCTGATTGCTTACCCGATCGCTGTTGAAGCGTTATCGCTGATTTATAACAAAGATCTGCTGCCGAACCCGCC
AAAAACCTGGGAAGAGATCCCGGCGCTGGATAAAGAACTGAAAGCGAAAGGTAAGAGCGCGCTGATGTTCAACCTG
CAAGAACCGTACTTCACCTGGCCGCTGATTGCTGCTGACGGGGGTTATGCGTTCAAGTATGAAAACGGCAAGTACG
ACATTAAAGACGTGGGCGTGGATAACGCTGGCGCGAAAGCGGGTCTGACCTTCCTGGTTGACCTGATTAAAAACAA
ACACATGAATGCAGACACCGATTACTCCATCGCAGAAGCTGCCTTTAATAAAGGCGAAACAGCGATGACCATCAAC
GGCCCGTGGGCATGGTCCAACATCGACACCAGCAAAGTGAATTATGGTGTAACGGTACTGCCGACCTTCAAGGGTC
AACCATCCAAACCGTTCGTTGGCGTGCTGAGCGCAGGTATTAACGCCGCCAGTCCGAACAAAGAGCTGGCAAAAGA
GTTCCTCGAAAACTATCTGCTGACTGATGAAGGTCTGGAAGCGGTTAATAAAGACAAACCGCTGGGTGCCGTAGCG
CTGAAGTCTTACGAGGAAGAGTTGGTGAAAGATCCGCGTATTGCCGCCACTATGGAAAACGCCCAGAAAGGTGAAA
TCATGCCGAACATCCCGCAGATGTCCGCTTTCTGGTATGCCGTGCGTACTGCGGTGATCAACGCCGCCAGCGGTCG

TABLE 1-continued

Polynucleotide and Polypeptide Sequences of Cas Constructs

TCAGACTGTCGATGAAGCCCTGAAAGACGCGCAGACTAATTCGAGCTCGAACAACAACAACAATAACAATAACAAC
AACCTCGGGATCGAGGGAAGgGGTAACCTGTTTGGTCATAAACGTTGGTATGAAGTGCGCGACAAAAAAGACTTTA
AAATCAAACGCAAGGTGAAAGTGAAACGCAACTATGATGGCAACAAATATATCCTGAACATCAACGAGAACAACAA
CAAAGAGAAGATCGATAATAATAAATTCATCCGCAAATACATCAACTACAAAAAAAACGATAACATCCTGAAAGAA
TTCACCCGCAAGTTTCATGCAGGCAACATTCTGTTTAAACTGAAAGGCAAAGAAGGCATCATTCGCATCGAAAACA
ATGATGATTTTCTGGAAACCGAAGAGGTGGTGCTGTATATTGAAGCATATGGCAAAAGCGAAAAACTGAAGGCACT
GGGCATTACCAAAAAAAAGATTATCGATGAAGCCATTCGCCAGGGTATTACCAAAGATGACAAAAAGATCGAGATC
AAGCGCCAAGAAAACGAAGAAGAAATCGAAATTGATATCCGCGACGAGTATACCAATAAAACCCTGAATGATTGCA
GCATTATTCTGCGCATTATCGAGAATGATGAGCTGGAAACGAAAAAGAGCATCTACGAGATCTTCAAAAACATCAA
CATGAGCCTGTACAAAATCATCGAGAAAATTATCGAAAACGAAACCGAGAAGGTGTTCGAGAATCGCTATTATGAA
GAACATCTGCGTGAGAAACTGCTGAAAGATGATAAAATTGATGTGATCCTGACCAACTTCATGGAAATCCGCGAAA
AGATTAAAAGCAACCTGGAAATTCTGGGCTTCGTGAAATTCTATCTGAATGTTGGTGGCGACAAGAAAAAAAGCAA
GAACAAGAAAATGCTGGTCGAAAAAATTCTGAACATTAACGTTGATCTGACCGTGGAAGATATTGCCGATTTTGTG
ATTAAAGAGCTGGAATTCTGGAACATCACCAAACGCATTGAGAAGGTGAAAAAAGTGAACAACGAGTTCCTGGAAA
AACGTCGTAATCGCACCTATATCAAAAGCTATGTTCTGCTGGATAAGCACGAGAAATTCAAAATTGAACGCGAGAA
CAAAAAGGACAAAATCGTGAAGTTTTTCGTGGAAAATATCAAAAACAACAGCATCAAAGAAAAAATCGAGAAGATC
CTGGCCGAGTTCAAAATCGATGAACTGATCAAAAAGCTGGAAAAAGAACTGAAAAAAGGCAACTGCGATACCGAAA
TTTTCGGCATCTTTAAGAAACACTATAAAGTGAACTTCGATAGCAAAAAATTCAGCAAAAAGAGCGACGAAGAGAA
AGAGCTGTATAAGATCATTTACCGCTATCTGAAAGGCCGTATTGAAAAAATCCTGGTGAATGAACAGAAAGTGCGC
CTGAAAAAAATGGAAAAAATTGAGATTGAGAAGATTCTGAACGAGAGCATCCTGAGTGAGAAAATCCTGAAACGTG
TTAAACAGTATACCCTGGAACACATTATGTATCTGGGTAAACTGCGCCATAACGATATTGATATGACCACCGTTAA
TACCGATGATTTCAGCCGTCTGCATGCAAAAGAAGAACTGGATCTGGAACTGATTACCTTTTTTGCAAGCACCAAT
ATGGAACTGAACAAGATCTTTAGCCGTGAAAACATTAACAACGACGAGAACATTGATTTCTTTGGTGGTGATCGCG
AGAAAAACTATGTCCTGGATAAAAAGATCCTGAATAGCAAAATCAAGATCATCCGCGATCTGGATTTCATCGACAA
TAAGAACAACATTACCAACAACTTTATTCGCAAATTTACCAAAATTGGCACCAATGAACGCAACCGTATTCTGCAT
GCCATTAGCAAAGAACGTGATCTGCAGGGCACCCAGGATGATTATAACAAAGTGATTAACATCATCCAGAACCTGA
AAATCTCCGATGAAGAAGTTAGCAAAGCACTGAATCTGGATGTGGTGTTCAAAGATAAGAAAAATATCATCACCAA
GATCAACGATATCAAAATCAGCGAAGAGAACAATAACGACATCAAATATCTGCCGAGCTTTAGCAAAGTTCTGCCG
GAAATTCTTAATCTGTATCGCAATAACCCGAAAAACGAACCGTTTGATACCATCGAAACAGAGAAAATTGTTCTGA
ACGCCCTGATCTATGTGAACAAAGAACTGTACAAGAAACTGATCCTGGAAGATGATCTGGAAGAGAACGAATCGAA
AAACATCTTTCTGCAAGAGCTGAAAAAGACCCTGGGTAACATTGATGAGATCGATGAAAACATCATCGAAAATTAC
TACAAGAACGCACAGATTAGCGCAAGCAAAGGTAATAACAAAGCCATCAAAAAATACCAGAAAAAGGTGATCGAAT
GCTACATTGGTTATCTGCGCAAAAACTACGAAGAACTGTTCGATTTCAGCGATTTCAAAATGAACATCCAAGAGAT
CAAGAAGCAGATCAAGGACATTAACGACAACAAAACCTATGAACGCATCACCGTTAAAACCAGCGATAAAACCATT
GTGATCAACGACGATTTCGAGTACATCATTAGCATTTTTGCACTGCTGAATTCCAACGCCGTGATCAACAAAATTC
GCAATCGCTTTTTTGCCACCAGTGTTTGGCTGAATACCAGCGAATATCAGAACATTATCGATATCCTGGATGAGAT
CATGCAGCTGAATACACTGCGTAATGAATGCATTACCGAAAACTGGAATCTGAACCTTGAAGAATTTATTCAGAAA
ATGAAAGAGATCGAGAAAGACTTCGACGACTTCAAAATCCAGACCAAAAAAGAAATCTTCAACAACTACTACGAGG
ACATCAAAAATAACATTCTGACCGAATTCAAAGACGATATTAACGGCTGTGACGTGCTGGAAAAGAAGTTGGAAAA
GATCGTTATCTTCGATGACGAAACCAAATTCGAAATCGACAAAAAGTCCAACATCCTTCAGGATGAACAGCGTAAA
CTGAGCAATATCAACAAGAAAGACCTGAAGAAGAAGGTCGACCAGTACATCAAAGACAAAGACCAAGAAATTAAGA
GCAAAATCCTGTGCCGCATCATCTTTAACAGCGACTTTCTGAAAAAGTATAAGAAAGAGATTGACAACCTGATCGA
GGATATGGAAAGCGAGAACGAAAACAAGTTTCAAGAGATCTACTATCCGAAAGAACGCAAAAACGAGCTGTACATC
TACAAGAAGAACCTGTTCCTGAATATTGGCAACCCGAACTTCGACAAAATCTATGGTCTGATCAGCAACGACATTA
AAATGGCCGATGCAAAATTCCTGTTTAATATCGATGGTAAAAACATCCGTAAAAACAAAATTAGCGAGATCGACGC
GATCCTGAAAAACCTGAACGATAAACTGAATGGCTACAGCAAAGAATATAAAGAGAAATACATTAAAAAGCTGAAA
GAAAATGACGACTTCTTCGCCAAGAACATCCAGAATAAAAACTATAAAAGCTTCGAGAAGGACTACAATCGCGTGT
CCGAATATAAGAAAATTCGTGATCTGGTGGAATTCAACTATCTGAACAAAATCGAAAGCTATCTGATCGATATCAA
CTGGAAACTGGCAATTCAGATGGCACGTTTTGAGCGTGATATGCACTATATTGTTAATGGTCTGCGTGAACTGGGC
ATCATTAAACTGAGTGGTTATAATACCGGCATTAGCCGTGCATATCCGAAACGTAATGGTTCCGATGGTTTTTATA
CCACCACCGCCTATTACAAATTTTTCGACGAAGAAAGCTACAAGAAATTTGAGAAAATTTGCTACGGCTTCGGCAT
TGATCTGAGCGAAAATAGCGAAATTAACAAGCCGGAAAATGAGAGCATTCGCAACTATATCTCCCACTTTTATATC
GTGCGTAATCCGTTTGCCGATTATAGCATTGCAGAGCAGATTGATCGTGTTAGCAATCTGCTGAGCTATAGTACCC
GTTATAACAATAGCACCTATGCCAGCGTGTTTGAGGTGTTTAAAAAGGATGTTAACCTGGACTATGACGAGCTGAA
GAAAAAGTTCAAACTGATCGGCAACAATGACATCCTGGAACGTCTGATGAAACCGAAAAAAGTTAGTGTGCTGGAA
CTTGAGAGCTACAACAGCGATTATATCAAGAACCTGATTATCGAGCTGCTGACCAAGATTGAAAATACCAATGATA
CCCTGGATCCGAATTCGAGCTCCGTCGACAAGCTTGCGGCCGCACTCGAGCACCACCACCACCACCACTGA

LshCas13a NTD-MBP Polypeptide Sequence

SEQ ID NO: 8

MKIEEGKLVIWINGDKGYNGLAEVGKKFEKDTGIKVTVEHPDKLEEKFPQVAATGDGPDIIFWAHDRFGGYAQSGL
LAEITPDKAFQDKLYPFTWDAVRYNGKLIAYPIAVEALSLIYNKDLLPNPPKTWEEIPALDKELKAKGKSALMENL
QEPYFTWPLIAADGGYAFKYENGKYDIKDVGVDNAGAKAGLTFLVDLIKNKHMNADTDYSIAEAAFNKGETAMTIN
GPWAWSNIDTSKVNYGVTVLPTFKGQPSKPFVGVLSAGINAASPNKELAKEFLENYLLTDEGLEAVNKDKPLGAVA
LKSYEEELVKDPRIAATMENAQKGEIMPNIPQMSAFWYAVRTAVINAASGRQTVDEALKDAQTNSSSNNNNNNNNN
NLGIEGRGNLFGHKRWYEVRDKKDFKIKRKVKVKRNYDGNKYILNINENNNKEKIDNNKFIRKYINYKKNDNILKE
FTRKFHAGNILFKLKGKEGIIRIENNDDELETEEVVLYIEAYGKSEKLKALGITKKKIIDEAIRQGITKDDKKIEI
KRQENEEEIEIDIRDEYTNKTLNDCSIILRIIENDELETKKSIYEIFKNINMSLYKIIEKIIENETEKVFENRYYE
EHLREKLLKDDKIDVILTNFMEIREKIKSNLEILGFVKFYLNVGGDKKKSKNKKMLVEKILNINVDLTVEDIADFV
IKELEFWNITKRIEKVKKVNNEFLEKRRNRTYIKSYVLLDKHEKFKIERENKKDKIVKFFVENIKNNSIKEKIEKI
LAEFKIDELIKKLEKELKKGNCDTEIFGIFKKHYKVNFDSKKESKKSDEEKELYKIIYRYLKGRIEKILVNEQKVR
LKKMEKIEIEKILNESILSEKILKRVKQYTLEHIMYLGKLRHNDIDMTTVNTDDFSRLHAKEELDLELITFFASTN
MELNKIFSRENINNDENIDFFGGDREKNYVLDKKILNSKIKIIRDLDFIDNKNNITNNFIRKFTKIGTNERNRILH
AISKERDLQGTQDDYNKVINIIQNLKISDEEVSKALNLDVVFKDKKNIITKINDIKISEENNNDIKYLPSFSKVLP
EILNLYRNNPKNEPFDTIETEKIVLNALIYVNKELYKKLILEDDLEENESKNIFLQELKKTLGNIDEIDENIIENY
YKNAQISASKGNNKAIKKYQKKVIECYIGYLRKNYEELFDESDFKMNIQEIKKQIKDINDNKTYERITVKTSDKTI
VINDDFEYIISIFALLNSNAVINKIRNRFFATSVWLNTSEYQNIIDILDEIMQLNTLRNECITENWNLNLEEFIQK
MKEIEKDFDDFKIQTKKEIFNNYYEDIKNNILTEFKDDINGCDVLEKKLEKIVIFDDETKFEIDKKSNILQDEQRK

TABLE 1-continued

| Polynucleotide and Polypeptide Sequences of Cas Constructs |
|---|

LSNINKKDLKKKVDQYIKDKDQEIKSKILCRIIFNSDFLKKYKKEIDNLIEDMESENENKFQEIYYPKERKNELYI
YKKNLFLNIGNPNFDKIYGLISNDIKMADAKFLFNIDGKNIRKNKISEIDAILKNLNDKLNGYSKEYKEKYIKKLK
ENDDFFAKNIQNKNYKSFEKDYNRVSEYKKIRDLVEFNYLNKIESYLIDINWKLAIQMARFERDMHYIVNGLRELG
IIKLSGYNTGISRAYPKRNGSDGFYTTTAYYKFFDEESYKKFEKICYGFGIDLSENSEINKPENESIRNYISHFYI
VRNPFADYSIAEQIDRVSNLLSYSTRYNNSTYASVFEVFKKDVNLDYDELKKKFKLIGNNDILERLMKPKKVSVLE
LESYNSDYIKNLIIELLTKIENTNDTLDPNSSSVDKLAAALEHHHHHH

LwaCas13a CTD-His Polynucleotide Sequence

SEQ ID NO: 9

ATGAAAGTGACCAAAGTGGATGGCATCAGCCACAAAAAATACATCGAAGAAGGCAAACTGGTTAAAAGCACCAGCG
AAGAAAATCGTACCAGCGAACGTCTGAGCGAACTGCTGAGCATTCGTCTGGATATCTATATCAAAAATCCGGATAA
TGCCAGCGAGGAAGAAAACCGTATTCGTCGTGAAAACCTGAAAAAGTTCTTCAGCAATAAAGTGCTGCACCTGAAA
GATAGCGTTCTGTATCTGAAAAACCGCAAAGAAAAAAATGCCGTGCAGGACAAAAACTATAGCGAAGAGGATATCA
GCGAGTATGACCTGAAGAACAAAAATAGCTTTAGCGTGCTGAAAAAAATCCTGCTGAATGAAGATGTGAATAGCGA
GGAACTGGAAATCTTTCGTAAAGATGTTGAAGCCAAGCTGAACAAAATCAACAGCCTGAAATATAGCTTTGAAGAA
AACAAGGCCAACTATCAGAAAATCAACGAGAACAACGTGGAAAAAGTTGGTGGTAAAAGCAAACGCAACATCATCT
ATGATTATTATCGCGAAAGCGCGAAACGCAACGATTATATCAATAATGTGCAAGAGGCCTTCGACAAACTGTACAA
AAAAGAGGACATCGAAAAACTGTTTTTTCTGATCGAGAACAGCAAGAAGCACGAGAAATACAAAATCCGCGAGTAC
TACCATAAAATCATCGGTCGCAAAAACGATAAAGAGAACTTCGCCAAAATCATCTACGAAGAAATTCAGAACGTGA
ACAACATCAAAGAACTGATCGAAAAAATTCCGGACATGAGCGAGCTGAAGAAAAGCCAGGTGTTCTATAAATACTA
CCTGGACAAAGAGGAACTGAACGACAAAAACATCAAATATGCCTTTTGCCACTTCGTCGAAATTGAAATGAGCCAG
CTGCTTAAAAACTACGTGTATAAACGCCTGAGCAACATCAGCAACGATAAAATCAAACGTATCTTTGAATATCAGA
ATCTGAAGAAACTGATTGAAAACAAACTGCTGAACAAGCTGGATACCTATGTTCGTAATTGCGGCAAATACAACTA
CTATCTGCAGGTTGGTGAAATTGCAACCAGCGATTTTATTGCACGTAATCGTCAGAATGAAGCCTTTCTGCGTAAC
ATTATTGGTGTTAGCAGCGTTGCATATTTTAGCCTGCGTAATATTCTGGAAACCGAAAACGAAAATGGCATTACCG
GTCGTATGCGTGGTAAAACCGTTAAAAACAATAAAGGCGAAGAGAAGTATGTGAGCGGTGAAGTGGATAAAATCTA
TAACGAAAACAAGCAGAACGAAGTGAAAGAAAATCTGAAAATGTTTTACAGCTACGACTTCAACATGGACAACAAA
AACGAGATCGAAGATTTCTTCGCCAACATTGATGAAGCCATTAGCAGTATTCGTCATGGCATTGTGCACTTTAATC
TGGAACTTGAAGGCAAAGACATCTTCGCGTTTAAAAACATTGCACCGAGCGAGATCAGCAAAAAAATGTTTCAGAA
CGAGATTAACGAAAAAAAACTGAAACTGAAAATCTTCAAACAGCTGAATAGCGCCAACGTGTTCAACTATTATGAG
AAAGACGTGATCATCAAATACCTTAAAAACACCAAATTCAACTTCGTGAATAAAAACATCCCGTTTGTTCCGAGCT
TCACCAAACTGTATAACAAAATTGAAGATCTGCGCAATACCCTGAAGTTTTTTTGGAGCGTTCCGAAAGACAAAGA
AGAAAAAGACGCACAGATCTACCTGCTTAAGAACATCTATTATGGCGAATTTCTGAACAAATTCGTGAAAAAATAGC
AAAGTGTTCTTCAAAATCACCAACGAGGTGATCAAGATTAACAAACAGCGTAATCAGAAAACCGGTCACTACAAAT
ACCAGAAGTTTGAGAACATTGAAAAAACCGTGCCGGTTGAATATCTGGCAATTATTCAGAGCCGTGAGATGATTAA
CAACCAGGATAAAGAAGAGAAAAACACCTACATCGATTTCATCCAGCAGATCTTTCTGAAAGGCTTTATCGATTAC
CTGAACAAGAACAACCTGAAGTATATCGAGTCGAACAACAATAACGACAACAACGACATCTTTAGCAAAATCAAAA
TCAAGAAAGATAATAAAGAAAAATACGACAAGATCCTGAAAAACTATGAGAAGCACAACCGCAACAAAGAAATTCC
GCATGAGATCAATGAATTTGTGCGCGAAATTAAACTGGGCAAAATCCTGAAATACACCGAGAACCTGAATATGTTC
TATCTGATTCTGAAGCTGCTGAACCATAAAGAGCTGACCAATCTGAAAGGTAGCCTGGAAAAATATCAGAGCGCAA
ACAAAGAAGAGACATTTTCTGACGAACTGGAACTGATTAATCTGCTGAATCTGGATAATAACCGTGTGACCGAAGA
TTTTGAACTGGAAGCAAATGAAATCGGCAAATTCCTGGATTTCAATGAGAACAAAATTAAGGACCGGAAAGAGCTT
AAAAAGTTTGATACCAACAAAATCTACTTCGACGGCGAGAACATTATCAAACATCGTGCCTTTTATAACATCAAAA
AGTATGGCATGCTGAACCTGCTGGAAAAAATTGCAGATAAAGCCAAGTACAAAATTAGCCTGAAAGAACTTAAAGA
GTACAGCAACAAAAAGAACGAAATCGAGAAGAACTATACCATGCAGCAGAATCTGCATCGTAAATATGCACGTCCG
AAAAAAGACGAGAAATTCAACGATGAGGACTATAAAGAATACGAGAAAGCCATTGGCAACATCCAGAAATATACCC
ACTTGAAAAACAAAGTGGAATTTAACGAGCTGAATTTACTGCAGGGTCTGCTGCTGAAAATTCTGCACCGTCTGGT
TGGTTATACCAGCATTTGGGAACGTGATCTGCGTTTTCGCCTGAAAGGTGAATTTCCTGAAAACCACTATATCGAG
GAAATTTTCAACTTTGACAACAGCAAAAACGTGAAATATAAGAGCGGTCAGATCGTCGAAAAGTACATCAACTTTT
ACAAAGAACTTTACAAGGATAATGTGGAAAAACGCAGCATCTACAGCGACAAGAAAGTGAAAAAGCTGAAGCAAGA
AAAGAAAGACCTGTACATCCGTAATTATATCGCCCACTTTAACTATATCCCGCATGCAGAAATTAGTCTGCTGGAA
GTTCTGGAAAATCTGCGTAAACTGCTGTCATATGATCGCAAACTGAAGAACGCAATCATGAAAAGCATTGTGGATA
TCCTGAAAGAGTATGGTTTTGTCGCCACCTTTAAAATCGGTGCCGATAAGAAAATTGAGATTCAGACCCTGGAAAG
CGAGAAAATTGTGCATCTTAAGAACCTTAAAAAGAAAAAACTGATGACCGATCGCAACAGCGAAGAGTTATGTGAA
CTGGTGAAAGTGATGTTCGAATACAAAGCACTGGAAGGGGATCCGAATTCGAGCTCCGTCGACAAGCTTGCGGCCG
CACTCGAGCACCACCACCACCACCACTGA

LwaCas13a CTD-His Polypeptide Sequence

SEQ ID NO: 10

MKVTKVDGISHKKYIEEGKLVKSTSEENRTSERLSELLSIRLDIYIKNPDNASEEENRIRRENLKKFFSNKVLHLK
DSVLYLKNRKEKNAVQDKNYSEEDISEYDLKNKNSFSVLKKILLNEDVNSEELEIFRKDVEAKLNKINSLKYSFEE
NKANYQKINENNVEKVGGKSKRNIIYDYYRESAKRNDYINNVQEAFDKLYKKEDIEKLFFLIENSKKHEKYKIREY
YHKIIGRKNDKENFAKIIYEEIQNVNNIKELIEKIPDMSELKKSQVFYKYYLDKEELNDKNIKYAFCHFVEIEMSQ
LLKNYVYKRLSNISNDKIKRIFEYQNLKKLIENKLLNKLDTYVRNCGKYNYYLQVGEIATSDFIARNRQNEAFLRN
IIGVSSVAYFSLRNILETENENGITGRMRGKTVKNNKGEEKYVSGEVDKIYNENKQNEVKENLKMFYSYDENMDNK
NEIEDFFANIDEAISSIRHGIVHFNLELEGKDIFAFKNIAPSEISKKMFQNEINEKKLKLKIFKQLNSANVENYYE
KDVIIKYLKNTKFNFVNKNIPFVPSFTKLYNKIEDLRNTLKFFWSVPKDKEEKDAQIYLLKNIYYGEFLNKFVKNS
KVFFKITNEVIKINKQRNQKTGHYKYQKFENIEKTVPVEYLAIIQSREMINNQDKEEKNTYIDFIQQIFLKGFIDY
LNKNNLKYIESNNNNDNNDIFSKIKIKKDNKEKYDKILKNYEKHNRNKEIPHEINEFVREIKLGKILKYTENLNMF
YLILKLLNHKELTNLKGSLEKYQSANKEETFSDELELINLLNLDNNRVTEDFELEANEIGKELDENENKIKDRKEL
KKFDTNKIYFDGENIIKHRAFYNIKKYGMLNLLEKIADKAKYKISLKELKEYSNKKNEIEKNYTMQQNLHRKYARP
KKDEKFNDEDYKEYEKAIGNIQKYTHLKNKVEFNELNLLQGLLLKILHRLVGYTSIWERDLRFRLKGEFPENHYIE
EIFNFDNSKNVKYKSGQIVEKYINFYKELYKDNVEKRSIYSDKKVKKLKQEKKDLYIRNYIAHFNYIPHAEISLLE
VLENLRKLLSYDRKLKNAIMKSIVDILKEYGFVATFKIGADKKIEIQTLESEKIVHLKNLKKKKLMTDRNSEELCE
LVKVMFEYKALEGDPNSSSVDKLAAALEHHHHHH

TABLE 1-continued

| Polynucleotide and Polypeptide Sequences of Cas Constructs |
|---|

LwaCas13a NTD-MBP Polynucleotide Sequence

SEQ ID NO: 11

ATGAAAATCGAAGAAGGTAAACTGGTAATCTGGATTAACGGCGATAAAGGCTATAACGGTCTCGCTGAAGTCGGTA
AGAAATTCGAGAAAGATACCGGAATTAAAGTCACCGTTGAGCATCCGGATAAACTGGAAGAGAAATTCCCACAGGT
TGCGGCAACTGGCGATGGCCCTGACATTATCTTCTGGGCACACGACCGCTTTGGTGGCTACGCTCAATCTGGCCTG
TTGGCTGAAATCACCCCGGACAAAGCGTTCCAGGACAAGCTGTATCCGTTTACCTGGGATGCCGTACGTTACAACG
GCAAGCTGATTGCTTACCCGATCGCTGTTGAAGCGTTATCGCTGATTTATAACAAAGATCTGCTGCCGAACCCGCC
AAAAACCTGGGAAGAGATCCCGGCGCTGGATAAAGAACTGAAAGCGAAAGGTAAGAGCGCGCTGATGTTCAACCTG
CAAGAACCGTACTTCACCTGGCCGCTGATTGCTGCTGACGGGGGTTATGCGTTCAAGTATGAAAACGGCAAGTACG
ACATTAAAGACGTGGGCGTGGATAACGCTGGCGCGAAAGCGGGTCTGACCTTCCTGGTTGACCTGATTAAAAACAA
ACACATGAATGCAGACACCGATTACTCCATCGCAGAAGCTGCCTTTAATAAAGGCGAAACAGCGATGACCATCAAC
GGCCCGTGGGCATGGTCCAACATCGACACCAGCAAAGTGAATTATGGTGTAACGGTACTGCCGACCTTCAAGGGTC
AACCATCCAAACCGTTCGTTGGCGTGCTGAGCGCAGGTATTAACGCCGCCAGTCCGAACAAAGAGCTGGCAAAAGA
GTTCCTCGAAAACTATCTGCTGACTGATGAAGGTCTGGAAGCGGTTAATAAAGACAAACCGCTGGGTGCCGTAGCG
CTGAAGTCTTACGAGGAAGAGTTGGTGAAAGATCCGCGTATTGCCGCCACTATGGAAAACGCCCAGAAAGGTGAAA
TCATGCCGAACATCCCGCAGATGTCCGCTTTCTGGTATGCCGTGCGTACTGCGGTGATCAACGCCGCCAGCGGTCG
TCAGACTGTCGATGAAGCCCTGAAAGACGCGCAGACTAATTCGAGCTCGAACAACAACAACAATAACAATAACAAC
AACCTCGGGATCGAGGGAAGgAAAGTGACCAAAGTGGATGGCATCAGCCACAAAAAATACATCGAAGAAGGCAAAC
TGGTTAAAAGCACCAGCGAAGAAAATCGTACCAGCGAACGTCTGAGCGAACTGCTGAGCATTCGTCTGGATATCTA
TATCAAAAATCCGGATAATGCCAGCGAGGAAGAAAACCGTATTCGTCGTGAAAACCTGAAAAAGTTCTTCAGCAAT
AAAGTGCTGCACCTGAAAGATAGCGTTCTGTATCTGAAAAACCGCAAAGAAAAAAATGCCGTGCAGGACAAAAACT
ATAGCGAAGAGGATATCAGCGAGTATGACCTGAAGAACAAAAATAGCTTTAGCGTGCTGAAAAAAATCCTGCTGAA
TGAAGATGTGAATAGCGAGGAACTGGAAATCTTTCGTAAAGATGTTGAAGCCAAGCTGAACAAAATCAACAGCCTG
AAATATAGCTTTGAAGAAAACAAGGCCAACTATCAGAAAATCAACGAGAACAACGTGGAAAAAGTTGGTGGTAAAA
GCAAACGCAACATCATCTATGATTATTATCGCGAAAGCGCGAAACGCAACGATTATATCAATAATGTGCAAGAGGC
CTTCGACAAACTGTACAAAAAAGAGGACATCGAAAAACTGTTTTTTCTGATCGAGAACAGCAAGAAGCACGAGAAA
TACAAAATCCGCGAGTACTACCATAAAATCATCGGTCGCAAAAACGATAAAGAGAACTTCGCCAAAATCATCTACG
AAGAAATTCAGAACGTGAACAACATCAAAGAACTGATCGAAAAAATTCCGGACATGAGCGAGCTGAAGAAAAGCCA
GGTGTTCTATAAATACTACCTGGACAAAGAGGAACTGAACGACAAAAACATCAAATATGCCTTTTGCCACTTCGTC
GAAATTGAAATGAGCCAGCTGCTTAAAAACTACGTGTATAAACGCCTGAGCAACATCAGCAACGATAAAATCAAAC
GTATCTTTGAATATCAGAATCTGAAGAAACTGATTGAAAACAAACTGCTGAACAAGCTGGATACCTATGTTCGTAA
TTGCGGCAAATACAACTACTATCTGCAGGTTGGTGAAATTGCAACCAGCGATTTTATTGCACGTAATCGTCAGAAT
GAAGCCTTTCTGCGTAACATTATTGGTGTTAGCAGCGTTGCATATTTTAGCCTGCGTAATATTCTGGAAACCGAAA
ACGAAAATGGTATTACCGGTCGTATGCGTGGTAAAACCGTTAAAAACAATAAAGGCGAAGAGAAGTATGTGAGCGG
TGAAGTGGATAAAATCTATAACGAAAACAAGCAGAACGAAGTGAAAGAAAATCTGAAAATGTTTTACAGCTACGAC
TTCAACATGGACAACAAAAACGAGATCGAAGATTTCTTCGCCAACATTGATGAAGCCATTAGCAGTATTCGTCATG
GCATTGTGCACTTTAATCTGGAACTTGAAGGCAAAGACATCTTCGCGTTTAAAAACATTGCACCGAGCGAGATCAG
CAAAAAAATGTTTCAGAACGAGATTAACGAAAAAAAACTGAAACTGAAAATCTTCAAACAGCTGAATAGCGCCAAC
GTGTTCAACTATTATGAGAAAGACGTGATCATCAAATACCTTAAAAACACCAAATTCAACTTCGTGAATAAAAACA
TCCCGTTTGTTCCGAGCTTCACCAAACTGTATAACAAAATTGAAGATCTGCGCAATACCCTGAAGTTTTTTTGGAG
CGTTCCGAAAGACAAAGAAGAAAAAGACGCACAGATCTACCTGCTTAAGAACATCTATTATGGCGAATTTCTGAAC
AAATTCGTGAAAAATAGCAAAGTGTTCTTCAAAATCACCAACGAGGTGATCAAGATTAACAAACAGCGTAATCAGA
AAACCGGTCACTACAAATACCAGAAGTTTGAGAACATTGAAAAAACCGTGCCGGTTGAATATCTGGCAATTATTCA
GAGCCGTGAGATGATTAACAACCAGGATAAAGAAGAGAAAAACACCTACATCGATTTCATCCAGCAGATCTTTCTG
AAAGGCTTTATCGATTACCTGAACAAGAACAACCTGAAGTATATCGAGTCGAACAACAATAACGACAACAACGACA
TCTTTAGCAAAATCAAAATCAAGAAAGATAATAAAGAAAAATACGACAAGATCCTGAAAAACTATGAGAAGCACAA
CCGCAACAAAGAAATTCCGCATGAGATCAATGAATTTGTGCGCGAAATTAAACTGGGCAAAATCCTGAAATACACC
GAGAACCTGAATATGTTCTATCTGATTCTGAAGCTGCTGAACCATAAAGAGCTGACCAATCTGAAAGGTAGCCTGG
AAAAATATCAGAGCGCAAACAAAGAAGAGACATTTTCTGACGAACTGGAACTGATTAATCTGCTGAATCTGGATAA
TAACCGTGTGACCGAAGATTTTGAACTGGAAGCAAATGAAATCGGCAAATTCCTGGATTTCAATGAGAACAAAATT
AAGGACCGGAAAGAGCTTAAAAAGTTTGATACCAACAAAATCTACTTCGACGGCGAGAACATTATCAAACATCGTG
CCTTTTATAACATCAAAAAGTATGGCATGCTGAACCTGCTGGAAAAAATTGCAGATAAAGCCAAGTACAAAATTAG
CCTGAAAGAACTTAAAGAGTACAGCAACAAAAAGAACGAAATCGAGAAGAACTATACCATGCAGCAGAATCTGCAT
CGTAAATATGCACGTCCGAAAAAAGACGAGAAATTCAACGATGAGGACTATAAAGAATACGAGAAAGCCATTGGCA
ACATCCAGAAATATACCCACTTGAAAAACAAAGTGGAATTTAACGAGCTGAATTTACTGCAGGGTCTGCTGCTGAA
AATTCTGCACCGTCTGGTTGGTTATACCAGCATTTGGGAACGTGATCTGCGTTTTCGCCTGAAAGGTGAATTTCCT
GAAAACCACTATATCGAGGAAATTTTCAACTTTGACAACAGCAAAAACGTGAAATATAAGAGCGGTCAGATCGTCG
AAAAGTACATCAACTTTTACAAAGAACTTTACAAGGATAATGTGGAAAAACGCAGCATCTACAGCGACAAGAAAGT
GAAAAAGCTGAAGCAAGAAAAGAAAGACCTGTACATCCGTAATTATATCGCCCACTTTAACTATATCCCGCATGCA
GAAATTAGTCTGCTGGAAGTTCTGGAAAATCTGCGTAAACTGCTGTCATATGATCGCAAACTGAAGAACGCAATCA
TGAAAAGCATTGTGGATATCCTGAAAGAGTATGGTTTTGTCGCCACCTTTAAAATCGGTGCCGATAAGAAAATTGA
GATTCAGACCCTGGAAAGCGAGAAAATTGTGCATCTTAAGAACCTTAAAAAGAAAAAACTGATGACCGATCGCAAC
AGCGAAGAGTTATGTGAACTGGTGAAAGTGATGTTCGAATACAAAGCACTGGAAGATCCGAATTCGAGCTCCGTCG
ACAAGCTTGCGGCCGCACTCGAGCACCACCACCACCACCACTGA

LwaCas13a NTD-MBP Polypeptide Sequence

SEQ ID NO: 12

MKIEEGKLVIWINGDKGYNGLAEVGKKFEKDTGIKVTVEHPDKLEEKFPQVAATGDGPDIIFWAHDRFGGYAQSGL
LAEITPDKAFQDKLYPFTWDAVRYNGKLIAYPIAVEALSLIYNKDLLPNPPKTWEEIPALDKELKAKGKSALMFNL
QEPYFTWPLIAADGGYAFKYENGKYDIKDVGVDNAGAKAGLTFLVDLIKNKHMNADTDYSIAEAAFNKGETAMTIN
GPWAWSNIDTSKVNYGVTVLPTFKGQPSKPFVGVLSAGINAASPNKELAKEFLENYLLTDEGLEAVNKDKPLGAVA
LKSYEEELVKDPRIAATMENAQKGEIMPNIPQMSAFWYAVRTAVINAASGRQTVDEALKDAQTNSSSNNNNNNNNN
NLGIEGRKVTKVDGISHKKYIEEGKLVKSTSEENRTSERLSELLSIRLDIYIKNPDNASEEENRIRRENLKKFFSN
KVLHLKDSVLYLKNRKEKNAVQDKNYSEEDISEYDLKNKNSFSVLKKILLNEDVNSEELEIFRKDVEAKLNKINSL
KYSFEENKANYQKINENNVEKVGGKSKRNIIYDYYRESAKRNDYINNVQEAFDKLYKKEDIEKLFFLIENSKKHEK
YKIREYYHKIIGRKNDKENFAKIIYEEIQNVNNIKELIEKIPDMSELKKSQVFYKYYLDKEELNDKNIKYAFCHFV
EIEMSQLLKNYVYKRLSNISNDKIKRIFEYQNLKKLIENKLLNKLDTYVRNCGKYNYYLQVGEIATSDFIARNRQN

TABLE 1-continued

Polynucleotide and Polypeptide Sequences of Cas Constructs

EAFLRNIIGVSSVAYFSLRNILETENENGITGRMRGKTVKNNKGEEKYVSGEVDKIYNENKQNEVKENLKMFYSYD
FNMDNKNEIEDFFANIDEAISSIRHGIVHENLELEGKDIFAFKNIAPSEISKKMFQNEINEKKLKLKIFKQLNSAN
VFNYYEKDVIIKYLKNTKFNFVNKNIPFVPSFTKLYNKIEDLRNTLKFFWSVPKDKEEKDAQIYLLKNIYYGEFLN
KFVKNSKVFFKITNEVIKINKQRNQKTGHYKYQKFENIEKTVPVEYLAIIQSREMINNQDKEEKNTYIDFIQQIFL
KGFIDYLNKNNLKYIESNNNNDNNDIFSKIKIKKDNKEKYDKILKNYEKHNRNKEIPHEINEFVREIKLGKILKYT
ENLNMFYLILKLLNHKELTNLKGSLEKYQSANKEETFSDELELINLLNLDNNRVTEDFELEANEIGKELDENENKI
KDRKELKKFDTNKIYFDGENIIKHRAFYNIKKYGMLNLLEKIADKAKYKISLKELKEYSNKKNEIEKNYTMQQNLH
RKYARPKKDEKENDEDYKEYEKAIGNIQKYTHLKNKVEFNELNLLQGLLLKILHRLVGYTSIWERDLRFRLKGEFP
ENHYIEEIFNFDNSKNVKYKSGQIVEKYINFYKELYKDNVEKRSIYSDKKVKKLKQEKKDLYIRNYIAHFNYIPHA
EISLLEVLENLRKLLSYDRKLKNAIMKSIVDILKEYGFVATFKIGADKKIEIQTLESEKIVHLKNLKKKKLMTDRN
SEELCELVKVMFEYKALEDPNSSSVDKLAAALEHHHHHH

LwaCas13a G403D CTD-His Polynucleotide Sequence

SEQ ID NO: 13

ATGAAAGTGACCAAAGTGGATGGCATCAGCCACAAAAAATACATCGAAGAAGGCAAACTGGTTAAAAGCACCAGCG
AAGAAAATCGTACCAGCGAACGTCTGAGCGAACTGCTGAGCATTCGTCTGGATATCTATATCAAAAATCCGGATAA
TGCCAGCGAGGAAGAAAACCGTATTCGTCGTGAAAACCTGAAAAAGTTCTTCAGCAATAAAGTGCTGCACCTGAAA
GATAGCGTTCTGTATCTGAAAAACCGCAAAGAAAAAAATGCCGTGCAGGACAAAAACTATAGCGAAGAGGATATCA
GCGAGTATGACCTGAAGAACAAAAATAGCTTTAGCGTGCTGAAAAAAATCCTGCTGAATGAAGATGTGAATAGCGA
GGAACTGGAAATCTTTCGTAAAGATGTTGAAGCCAAGCTGAACAAAATCAACAGCCTGAAATATAGCTTTGAAGAA
AACAAGGCCAACTATCAGAAAATCAACGAGAACAACGTGGAAAAAGTTGGTGGTAAAAGCAAACGCAACATCATCT
ATGATTATTATCGCGAAAGCGCGAAACGCAACGATTATATCAATAATGTGCAAGAGGCCTTCGACAAACTGTACAA
AAAAGAGGACATCGAAAAACTGTTTTTCTGATCGAGAACAGCAAGAAGCACGAGAAATACAAAATCCGCGAGTAC
TACCATAAAATCATCGGTCGCAAAAACGATAAAGAGAACTTCGCCAAAATCATCTACGAAGAAATTCAGAACGTGA
ACAACATCAAAGAACTGATCGAAAAAATTCCGGACATGAGCGAGCTGAAGAAAAGCCAGGTGTTCTATAAATACTA
CCTGGACAAAGAGGAACTGAACGACAAAAACATCAAATATGCCTTTTGCCACTTCGTCGAAATTGAAATGAGCCAG
CTGCTTAAAAACTACGTGTATAAACGCCTGAGCAACATCAGCAACGATAAAATCAAACGTATCTTTGAATATCAGA
ATCTGAAGAAACTGATTGAAAACAAACTGCTGAACAAGCTGGATACCTATGTTCGTAATTGCGGCAAATACAACTA
CTATCTGCAGGTTGGTGAAATTGCAACCAGCGATTTTATTGCACGTAATCGTCAGAATGAAGCCTTTCTGCGTAAC
ATTATTGGTGTTAGCAGCGTTGCATATTTTAGCCTGCGTAATATTCTGGAAACCGAAAACGAAAATGATATTACCG
GTCGTATGCGTGGTAAAACCGTTAAAAACAATAAAGGCGAAGAGAAGTATGTGAGCGGTGAAGTGGATAAAATCTA
TAACGAAAACAAGCAGAACGAAGTGAAAGAAAATCTGAAAATGTTTTACAGCTACGACTTCAACATGGACAACAAA
AACGAGATCGAAGATTTCTTCGCCAACATTGATGAAGCCATTAGCAGTATTCGTCATGGCATTGTGCACTTTAATC
TGGAACTTGAAGGCAAAGACATCTTCGCGTTTAAAAACATTGCACCGAGCGAGATCAGCAAAAAAATGTTTCAGAA
CGAGATTAACGAAAAAAAACTGAAACTGAAAATCTTCAAACAGCTGAATAGCGCCAACGTGTTCAACTATTATGAG
AAAGACGTGATCATCAAATACCTTAAAAACACCAAATTCAACTTCGTGAATAAAAACATCCCGTTTGTTCCGAGCT
TCACCAAACTGTATAACAAAATTGAAGATCTGCGCAATACCCTGAAGTTTTTTTGGAGCGTTCCGAAAGACAAAGA
AGAAAAAGACGCACAGATCTACCTGCTTAAGAACATCTATTATGGCGAATTTCTGAACAAATTCGTGAAAAATAGC
AAAGTGTTCTTCAAAATCACCAACGAGGTGATCAAGATTAACAAACAGCGTAATCAGAAAACCGGTCACTACAAAT
ACCAGAAGTTTGAGAACATTGAAAAAACCGTGCCGGTTGAATATCTGGCAATTATTCAGAGCCGTGAGATGATTAA
CAACCAGGATAAAGAAGAGAAAAACACCTACATCGATTTCATCCAGCAGATCTTTCTGAAAGGCTTTATCGATTAC
CTGAACAAGAACAACCTGAAGTATATCGAGTCGAACAACAATAACGACAACAACGACATCTTTAGCAAAATCAAAA
TCAAGAAAGATAATAAAGAAAAATACGACAAGATCCTGAAAAACTATGAGAAGCACAACCGCAACAAAGAAATTCC
GCATGAGATCAATGAATTTGTGCGCGAAATTAAACTGGGCAAAATCCTGAAATACACCGAGAACCTGAATATGTTC
TATCTGATTCTGAAGCTGCTGAACCATAAAGAGCTGACCAATCTGAAAGGTAGCCTGGAAAAATATCAGAGCGCAA
ACAAAGAAGAGACATTTTCTGACGAACTGGAACTGATTAATCTGCTGAATCTGGATAATAACCGTGTGACCGAAGA
TTTTGAACTGGAAGCAAATGAAATCGGCAAATTCCTGGATTTCAATGAGAACAAAATTAAGGACCGGAAAGAGCTT
AAAAAGTTTGATACCAACAAAATCTACTTCGACGGCGAGAACATTATCAAACATCGTGCCTTTTATAACATCAAAA
AGTATGGCATGCTGAACCTGCTGGAAAAAATTGCAGATAAAGCCAAGTACAAAATTAGCCTGAAAGAACTTAAAGA
GTACAGCAACAAAAAGAACGAAATCGAGAAGAACTATACCATGCAGCAGAATCTGCATCGTAAATATGCACGTCCG
AAAAAAGACGAGAAATTCAACGATGAGGACTATAAAGAATACGAGAAAGCCATTGGCAACATCCAGAAATATACCC
ACTTGAAAAACAAAGTGGAATTTAACGAGCTGAATTTACTGCAGGGTCTGCTGCTGAAAATTCTGCACCGTCTGGT
TGGTTATACCAGCATTTGGGAACGTGATCTGCGTTTTCGCCTGAAAGGTGAATTTCCTGAAAACCACTATATCGAG
GAAATTTTCAACTTTGACAACAGCAAAAACGTGAAATATAAGAGCGGTCAGATCGTCGAAAAGTACATCAACTTTT
ACAAAGAACTTTACAAGGATAATGTGGAAAAACGCAGCATCTACAGCGACAAGAAAGTGAAAAAGCTGAAGCAAGA
AAAGAAAGACCTGTACATCCGTAATTATATCGCCCACTTTAACTATATCCCGCATGCAGAAATTAGTCTGCTGGAA
GTTCTGGAAAATCTGCGTAAACTGCTGTCATATGATCGCAAACTGAAGAACGCAATCATGAAAAGCATTGTGGATA
TCCTGAAAGAGTATGGTTTTGTCGCCACCTTTAAAATCGGTGCCGATAAGAAAATTGAGATTCAGACCCTGGAAAG
CGAGAAAATTGTGCATCTTAAGAACCTTAAAAAGAAAAAACTGATGACCGATCGCAACAGCGAAGAGTTATGTGAA
CTGGTGAAAGTGATGTTCGAATACAAAGCACTGGAAGGGGATCCGAATTCGAGCTCCGTCGACAAGCTTGCGGCCG
CACTCGAGCACCACCACCACCACCACTGA

LwaCas13a G403D CTD-His Polypeptide Sequence

SEQ ID NO: 14

MKVTKVDGISHKKYIEEGKLVKSTSEENRTSERLSELLSIRLDIYIKNPDNASEEENRIRRENLKKFFSNKVLHLK
DSVLYLKNRKEKNAVQDKNYSEEDISEYDLKNKNSFSVLKKILLNEDVNSEELEIFRKDVEAKLNKINSLKYSFEE
NKANYQKINENNVEKVGGKSKRNIIYDYYRESAKRNDYINNVQEAFDKLYKKEDIEKLFFLIENSKKHEKYKIREY
YHKIIGRKNDKENFAKIIYEEIQNVNNIKELIEKIPDMSELKKSQVFYKYYLDKEELNDKNIKYAFCHFVEIEMSQ
LLKNYVYKRLSNISNDKIKRIFEYQNLKKLIENKLLNKLDTYVRNCGKYNYYLQVGEIATSDFIARNRQNEAFLRN
IIGVSSVAYFSLRNILETENENDITGRMRGKTVKNNKGEEKYVSGEVDKIYNENKQNEVKENLKMFYSYDENMDNK
NEIEDFFANIDEAISSIRHGIVHENLELEGKDIFAFKNIAPSEISKKMFQNEINEKKLKLKIFKQLNSANVENYYE
KDVIIKYLKNTKFNFVNKNIPFVPSFTKLYNKIEDLRNTLKFFWSVPKDKEEKDAQIYLLKNIYYGEFLNKFVKNS
KVFFKITNEVIKINKQRNQKTGHYKYQKFENIEKTVPVEYLAIIQSREMINNQDKEEKNTYIDFIQQIFLKGFIDY
LNKNNLKYIESNNNNDNNDIFSKIKIKKDNKEKYDKILKNYEKHNRNKEIPHEINEFVREIKLGKILKYTENLNMF
YLILKLLNHKELTNLKGSLEKYQSANKEETFSDELELINLLNLDNNRVTEDFELEANEIGKFLDENENKIKDRKEL
KKFDTNKIYFDGENIIKHRAFYNIKKYGMLNLLEKIADKAKYKISLKELKEYSNKKNEIEKNYTMQQNLHRKYARP
KKDEKFNDEDYKEYEKAIGNIQKYTHLKNKVEFNELNLLQGLLLKILHRLVGYTSIWERDLRFRLKGEFPENHYIE
EIFNFDNSKNVKYKSGQIVEKYINFYKELYKDNVEKRSIYSDKKVKKLKQEKKDLYIRNYIAHFNYIPHAEISLLE

TABLE 1-continued

| Polynucleotide and Polypeptide Sequences of Cas Constructs |
|---|
| VLENLRKLLSYDRKLKNAIMKSIVDILKEYGFVATFKIGADKKIEIQTLESEKIVHLKNLKKKKLMTDRNSEELCE LVKVMFEYKALEGDPNSSSVDKLAAALEHHHHHH |
| SEQ ID NO: 36 LbuCas13a-CTD-His Vector (pET28b) |
| SEQ ID NO: 37 LbuCas13a-NTD-MBP Vector (pET28b-MBP-TEV) |
| SEQ ID NO: 38 LshCas13a-NTD-His Vector (pET28b) |
| SEQ ID NO: 39 LshCas13a-NTD-MBP Vector (pET28b-MBP-TEV) |
| SEQ ID NO: 40 LwaCas 13a-CTD-His Vector (pET28b) |
| SEQ ID NO: 41 LwaCas13a-NTD-MBP Vector (pET28b-MBP-TEV) |
| SEQ ID NO: 42 LwaCas13a G403D-CTD-His Vector (pET28b) |
| SEQ ID NO: 43 pET28b |
| SEQ ID NO: 44 pET28-MBP-TEV |

TABLE 2

Sequences of primers used for isothermal assembly (ISO).

| Primer Name | Sequence (5'→3') | SEQ ID NO |
|---|---|---|
| Lbu 5' for pET28 ISO | GAAATAATTTTGTTTAACTTTAAGAAGGAGATATACC ATGAAGGTGACCAAAGTTGGTGG | SEQ ID NO: 15 |
| Lbu 3' for pET28 ISO | CGGCCGCAAGCTTGTCGACGGAGCTCGAATTCGGATC CCCATTTTCGGATTTCTTCTCTTCCATTTTATACTC | SEQ ID NO: 16 |
| Lbu 5' for pMAL ISO | AATAACAATAACAACAACCTCGGGATCGAGGGAAGGA AGGTGACCAAAGTTGGTGGTATC | SEQ ID NO: 17 |
| Lbu 3' for pMAL ISO | GTGCGGCCGCAAGCTTGTCGACGGAGCTCGAATTCGG ATCATTTTCGGATTTCTTCTCTTCCATTTTATACTC | SEQ ID NO: 18 |
| Lsh 5' for pET28 ISO | ATAATTTTGTTTAACTTTAAGAAGGAGATATACCATG GGTAACCTGTTTGGTCATAAACG | SEQ ID NO: 19 |
| Lsh 3' for pET28 ISO | CGGCCGCAAGCTTGTCGACGGAGCTCGAATTCGGATC CCCCAGGGTATCATTGGTATTTTCAATCTTGG | SEQ ID NO: 20 |
| Lsh 5' for pMAL ISO | TAACAATAACAACAACCTCGGGATCGAGGGAAGGGGT AACCTGTTTGGTCATAAACGTTG | SEQ ID NO: 21 |
| Lsh 3' for pMAL ISO | GTGCGGCCGCAAGCTTGTCGACGGAGCTCGAATTCGG ATCCAGGGTATCATTGGTATTTTCAATCTTGG | SEQ ID NO: 22 |
| Lwa 5' for pET28 ISO | AAATAATTTTGTTTAACTTTAAGAAGGAGATATACCA TGAAAGTGACCAAAGTGGATGG | SEQ ID NO: 23 |
| Lwa 3' for pET28 ISO | GCAAGCTTGTCGACGGAGCTCGAATTCGGATCCCCTT CCAGTGCTTTGTATTCGAACATC | SEQ ID NO: 24 |
| Lwa 5' for pMAL ISO | ACAATAACAATAACAACAACCTCGGGATCGAGGGAAG GAAAGTGACCAAAGTGGATGGCA | SEQ ID NO: 25 |
| Lwa 3' for pMAL ISO | CAAGCTTGTCGACGGAGCTCGAATTCGGATCCCCTTC CAGTGCTTTGTATTCGAACATCA | SEQ ID NO: 26 |
| pET28 3' Fwd for ISO | GGGGATCCGAATTCGAGCTC | SEQ ID NO: 27 |
| pET28 5' Rev for ISO | GGTATATCTCCTTCTTAAAGTTAAACAAAATTATTTC | SEQ ID NO: 28 |

TABLE 2-continued

Sequences of primers used for isothermal assembly (ISO).

| Primer Name | Sequence (5'→3') | SEQ ID NO |
|---|---|---|
| pMAL 3' Fwd for ISO | GATCCGAATTCGAGCTCCGT | SEQ ID NO: 29 |
| pMAL 5' Rev for ISO | CCTTCCCTCGATCCCGAGG | SEQ ID NO: 30 |
| LwaCas13a G403D Fwd | GTAATATTCTGGAAACCGAAAACGAAAATGATATTAC CGGTCGTATGCGTGGT | SEQ ID NO: 31 |
| LwaCas13a G403D Rev | ACCACGCATACGACCGGTAATATCATTTTCGTTTTCG GTTTCCAGAATATTAC | SEQ ID NO: 32 |

After transformation into *E. coli* cells, plasmid DNA was isolated and sequenced to verify the desired sequence. The resulting plasmids were transformed into *E. coli* BL21(DE3) cells for protein expression.

A colony with the appropriate strain was used to inoculate TB media (1 L) with kanamycin (0.05 mg/mL) and grown at 37° C. until an $OD_{600}$ of approximately 0.6 was reached, then the flask was cooled to 18° C. for 30 minutes. The addition of 1 M IPTG (500 μL) was used to induce protein expression, followed by growth at 18° C. for 19 hours. Cells were harvested at 4700×g for 10 minutes at 4° C.

The cell pellet was re-suspended in a lysis buffer containing the following: 20 mM $NaPO_4$ pH 6.8, 0.5 M NaCl, 10 mM imidazole, 5% glycerol, DNase 1, 10 mM $CaCl_2$, lysozyme (1 mg/mL), protease inhibitor and 1% CHAPS. The cells were lysed using an Avestin Emulsiflex C3 homogenizer pre-chilled to 4° C. at 15-20 kpsi with three passes. The lysate was centrifuged at 16,000×g for 20 minutes at 4° C. to remove cell debris.

The cleared lysate for 6× histidine tagged Cas13 proteins was loaded on a HisTrap™ HP column (Cytiva). The procedure consisted of equilibrating the resin with His-Bind® buffer (20 mM $NaPO_4$ pH 6.8, 0.5 M NaCl, 10 mM imidazole, 5% glycerol), followed by sample loading. The column was washed with His·Bind® buffer, followed by a 0.5% Triton-X114 wash, followed by an additional standard wash and a 10% wash consisting of 10% His-Elution buffer (10 mM $NaPO_4$ pH 6.8, 500 mM NaCl, 150 mM imidazole, 5% glycerol). Finally, the sample was eluted using His-Elution buffer.

Alternatively, Cas13a variants from the pET28-MBP-TEV expression plasmid were loaded on MBPTrap™ HP column (Cytiva). The procedure consisted of equilibrating the resin with MBP-Bind buffer (20 mM Tris-HCl pH 7.4, 500 mM NaCl, 1 mM EDTA, 10% glycerol), followed by sample loading. The sample was then washed with MBP-Bind buffer. The sample was eluted using MBP-Elution buffer (20 mM Tris-HCl pH 7.4, 500 mM NaCl, 1 mM EDTA, 10 mM maltose, 10% glycerol).

The partially purified Cas13a variants were then loaded on a HiTrap™ SP strong cation exchange column (Cytiva). The procedure consisted of equilibrating the resin with SP-Bind buffer (20 mM Tris-HCl pH 8.0, 130 mM NaCl, 1 mM DTT, 5% glycerol), followed by sample loading. The sample was then washed with SP-Bind buffer. The sample was eluted using a linear gradient to 50% SP-Elution buffer (20 mM Tris-HCl pH 8.0, 2 M NaCl, 1 mM DTT, 5% glycerol). The Cas13a variants eluted from the column at a NaCl concentration between 0.4-0.5 M.

The purified Cas13a variants were concentrated to approximately 10 mg/mL using an Amicon® Ultra-15 (Sigma Aldrich) with a 10 K MWCO filter by centrifuging at 4000×g. The concentrated protein was placed in a hydrated Slide-A-Lyzer™ dialysis cassette (Thermo Fisher) with a 10K MWCO and dialyzed against three rounds of dialysis buffer (50 mM Tris-HCl pH 7.5, 0.6 M NaCl, 2 mM DTT, 50% glycerol). The final concentration was determined by a Nano Drop 8000 (Thermo Scientific) and stored at −20° C. (see FIG. 1 for SDS-PAGE).

Example 2

Figures 2A, 2B:
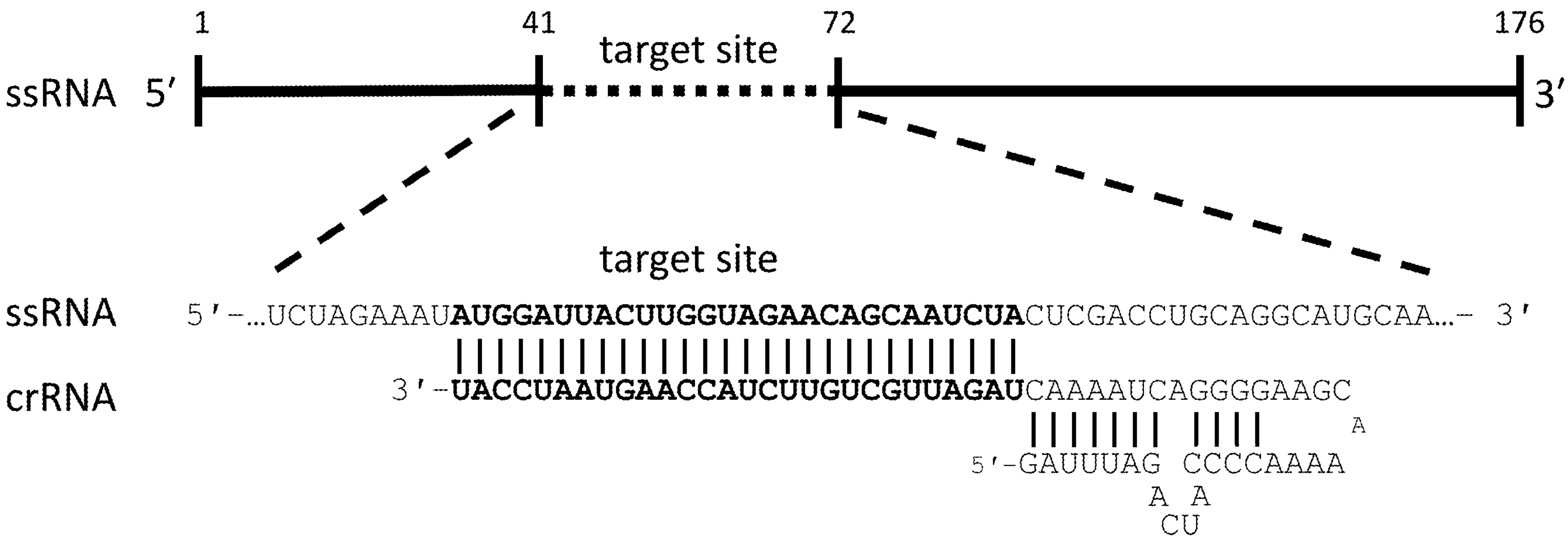
FIG. 2A shows the nucleic acid target sequence with the complementery sequence bolded.
FIG. 2B shows the nucleic acid target and crRNA interactions (bold).

The activity of Cas13a proteins were assayed by observing the non-specific RNase activity in the degradation of fluorescent-labeled RNA. The nucleic acid target (FIG. 2A) was first ordered as two Ultramer® DNA Oligos (Integrated DNA Technologies) and annealed together by heating at 95° C. for 5 min in duplex buffer with a slow cool to room temperature. The dsDNA target was transcribed to RNA by the HiScribe™ T7 High Yield RNA Synthesis Kit (New England Biolabs), followed by a clean-up with the MEGAclear™ Purification Kit (Applied Biosystems). The RNP complex (FIG. 2B) was formed by combining purified Cas13a protein and the corresponding crRNA (Table 3) and incubating at room temperature for 10 minutes.

TABLE 3

Sequences of crRNA for each Cas13a protein variant

| Cas13a variant | Ribonucleotide Sequences (5'→3') | SEQ ID NO |
|---|---|---|
| LwaCas13a | GGGGAUUUAGACUACCCCAAAAACGAAGGGGACUAAAAC<u>UAGAUUGCUGU UCUACCAAGUAAUCCAU</u> | 33 |
| LbuCas13a | GACCACCCCAAAAAUGAAGGGGACUAAAACA<u>UAGAUUGCUGUUCUACCAA GUAAUCCAU</u> | 34 |
| LshCas13a | CCACCCCAAUAUCGAAGGGGACU<u>AAAACUAGAUUGCUGUUCUACCAAGUA AUCCAU</u> | 35 |

All nucleotides are ribonucleotides; spacer sequences are underlined.

The Cas13a RNP complex (1 μM) was titrated down with nuclease reaction buffer (40 mM Tris-HCl pH 7.4, 60 mM NaCl, 6 mM $MgCl_2$) in two-fold dilutions to 1 nM RNP to afford a wide range of Cas13a nuclease reactions. The activity of the Cas13a RNP complex was measured by the addition of RNA reporter (degradation reporter probe) (200 nM, RNaseAlert™ Substrate), RNase inhibitor (1 μL, SUPERase-In™), total human RNA (25 ng, purified from HEK-293 cells), RNA target (20 ng) in nuclease reaction buffer (total volume of 100 μL). Reactions were allowed to proceed for 10 min at 37° C., followed by detection on a fluorescent plate reader (TECAN) using the fluorescein channel (490 nm excitation, 520 nm emission).

These results show a rapid visualization of nucleic acid degradation with LbuCas13a using only 4 nM RNP (Table 4). These proteins were purified using a C-terminal 6× histidine tag.

TABLE 4

Cas13a RNP activity assay data after 10 min at 37° C.

| Lbu | | Lsh | | Lwa | | Lwa G403D | |
|---|---|---|---|---|---|---|---|
| RNP (nM) | Emission | RNP (nM) | Emission | RNP (nM) | Emission | RNP (nM) | Emission |
| 1000 | 17182 | 1000 | 1165 | 1000 | 2948 | 1000 | 8989 |
| 500 | 31575 | 500 | 880 | 500 | 2387 | 500 | 12706 |
| 250 | 41002 | 250 | 739 | 250 | 2113 | 250 | 19003 |
| 125 | 39324 | 125 | 629 | 125 | 1740 | 125 | 22328 |
| 63 | 38526 | 63 | 581 | 63 | 1418 | 63 | 18684 |
| 31 | 50516 | 31 | 568 | 31 | 1158 | 31 | 6429 |
| 16 | 51035 | 16 | 560 | 16 | 1081 | 16 | 1058 |
| 8 | 49605 | 8 | 535 | 8 | 872 | 8 | 738 |
| 4 | 50376 | 4 | 550 | 4 | 752 | 4 | 693 |
| 2 | 25572 | 2 | 552 | 2 | 612 | 2 | 678 |
| 1 | 22674 | 1 | 528 | 1 | 581 | 1 | 676 |
| 0 | 1371 | 0 | 901 | 0 | 1886 | 0 | 5039 |

Figure 3A:
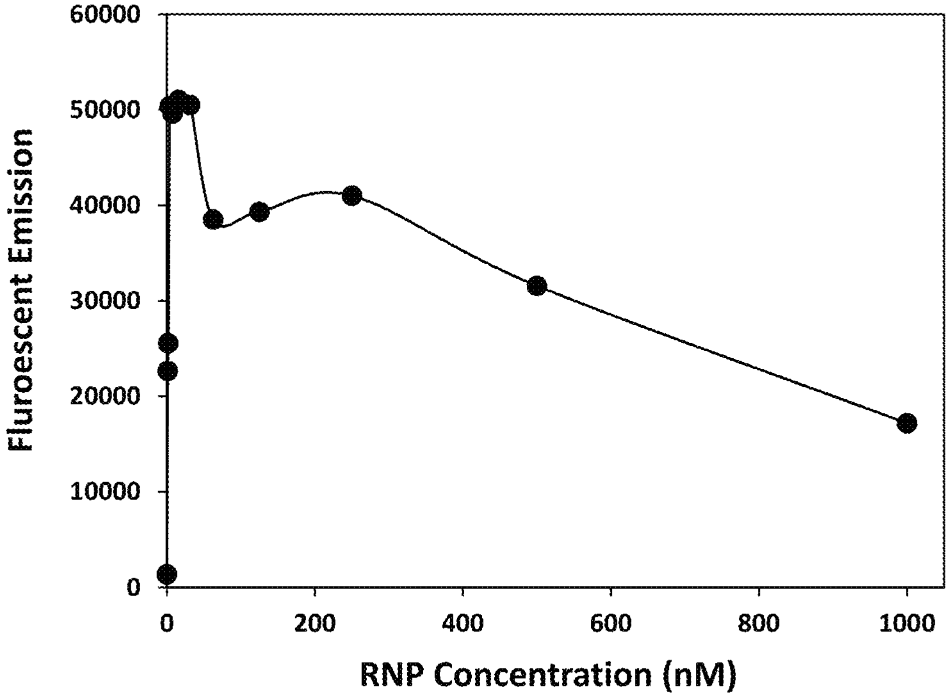
FIG. 3A shows a fluorescent emission of titrated LbuCas13a ribonucleoprotein complex (RNP).
Figure 3B:
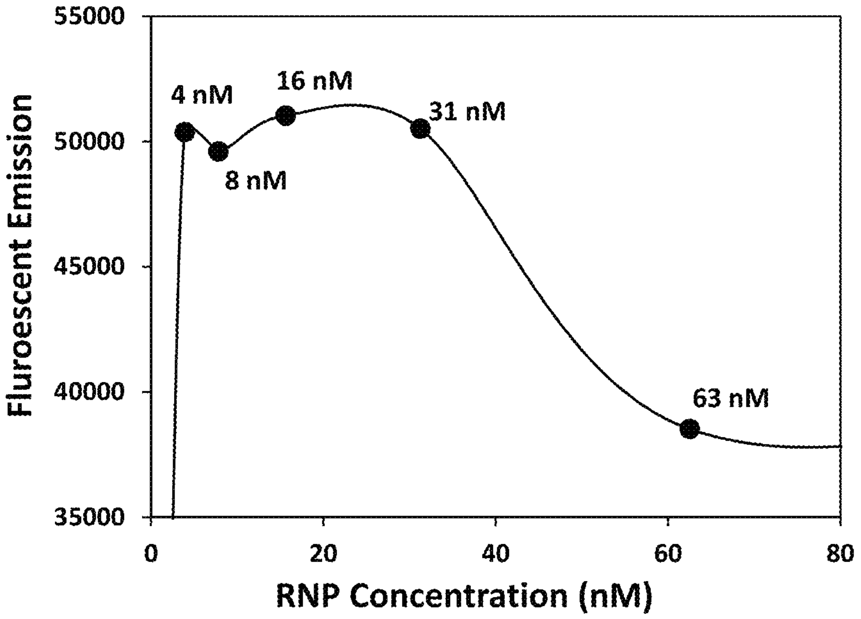
FIG. 3B shows a closeup of the same data in FIG. 3A illustrating a bell-like curve with an optimum RNP concentration range between 4 and 31 nM.

While Lwa and Lsh Cas13a were described in the literature as potentially useful Cas13 variants, RNase activity of these variants was not observed at the concentration ranges for RNP complex used in this study (Table 4). For LbuCas13a, there was a clear bell-like curve representation of the data (FIG. 3A-B). As the concentration of RNP soared from 31 nM to 1 μM, the RNase activity decreased and as the concentration of RNP was reduced from 4 nm, RNase activity also declined.

The N-terminal maltose binding protein (MBP) fusions of each of these variants were also prepared and tested for their non-specific RNase activity; however, activity substantially decreased and required more than 3 hours and a 15-fold increase in LbuCas13a RNP concentration to detect nucleic acid degradation by this assay (Table 5). These proteins were purified with a CTD-6× histidine tag or NTD-MBP.

TABLE 5

MBP-Cas13a RNP activity assay data after 3 hr at 37° C.

| Lbu | | Lsh | | Lwa | |
|---|---|---|---|---|---|
| RNP (nM) | Emission | RNP (nM) | Emission | RNP (nM) | Emission |
| 1000 | 550 | 1000 | 415 | 1000 | 362 |
| 500 | 135 | 500 | 319 | 500 | 2589 |
| 250 | 446 | 250 | 239 | 250 | 2173 |
| 125 | 777 | 125 | 196 | 125 | 2058 |
| 63 | 841 | 63 | 174 | 63 | 1874 |
| 31 | 179 | 31 | 168 | 31 | 1747 |
| 16 | 681 | 16 | 166 | 16 | 163 |
| 8 | 354 | 8 | 160 | 8 | 164 |
| 4 | 254 | 4 | 160 | 4 | 166 |
| 2 | 203 | 2 | 161 | 2 | 166 |
| 1 | 177 | 1 | 160 | 1 | 159 |
| 0 | 541 | 0 | 400 | 0 | 368 |

Using the Basic Local Alignment Search Tool (BLAST) on NCBI, the LwaCas13a protein sequence found in the literature [2] had a mutation at position 403; therefore, LwaCas13a G403D was cloned, overexpressed and purified (SEQ ID NO: 13-14). These results (Table 3) reveal RNase activity for this variant using an RNP concentration range between 62.5-500 nM. Although this single mutation uncovered the non-specific RNase activity of this enzyme, LbuCas13a is still the better alternative in terms of the desired activity per molecule of protein.

Example 3

The ribonucleoprotein (RNP) complex was formed by combining purified Cas13a protein and the corresponding crRNA and incubating at room temperature for 10 minutes.

The Cas13a RNP complex (1 μM) was added to 25 ng of total human RNA (purified from HEK 293), 1 μL RNase Inhibitor, 20 ng of nucleic acid target, 0.2 μM of RNA degradation reporter probe (FAM-IBFQ labeled) in a final volume of 100 μL in nuclease assay buffer (40 mM Tris-HCl, 60 mM NaCl, 6 mM $MgCl_2$, ph 7.4). The mixture was incubated at 37° C. for 10 min. Following incubation, the reaction mixture was visualized by a fluorescent plate reader (490 nm excitation, 520 nm emission).

Figure 4:
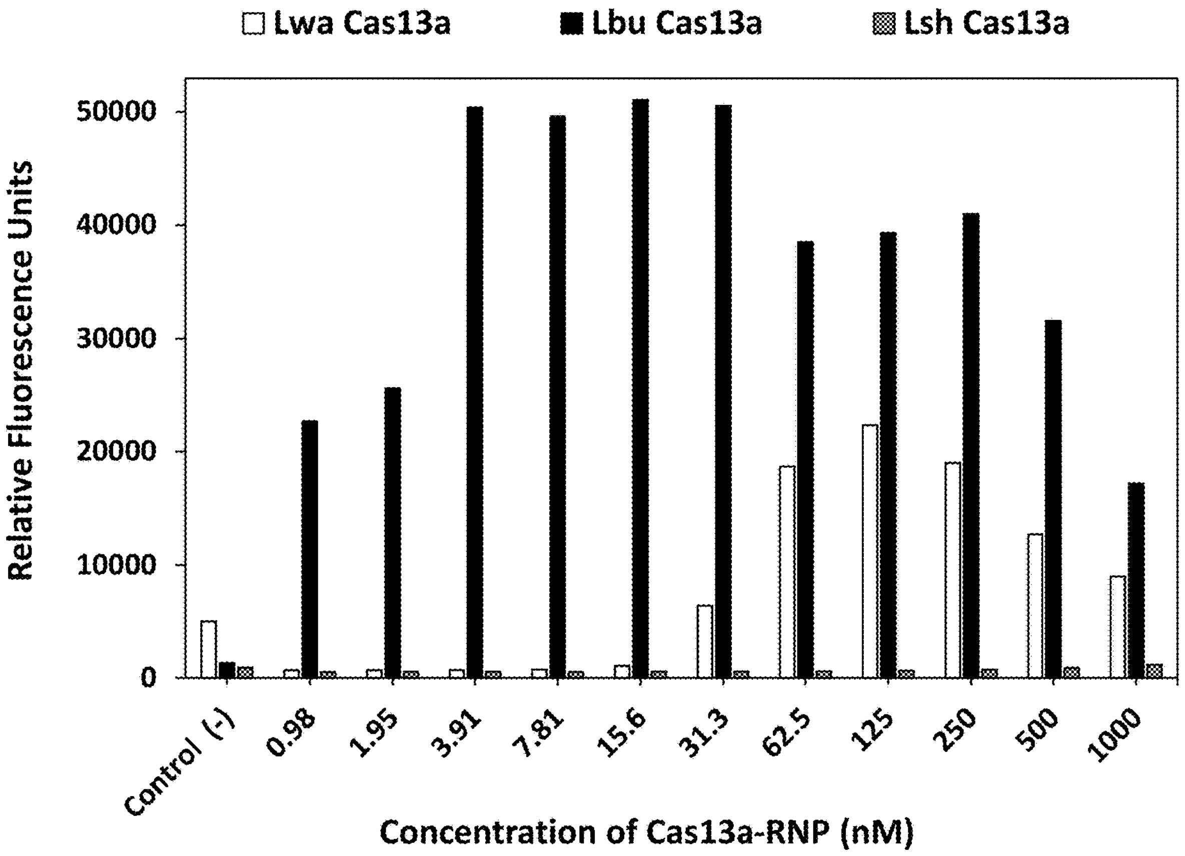
FIG. 4 shows the fluorescent emission of a cleaved RNA reporter by Cas13a variants at different enzyme concentrations.

FIG. 4 shows the activity of Lwa Cas13a, Lbu Cas13a, and Lsh Cas13a variants. Lbu Cas13a is active across a broad range of concentrations with peak activity from about 3.91 nM to 31.3 nM. Lwa Cas13a shows activity across a range of concentrations with peak activity from about 62.5 nM to 250 nM.

What is claimed:

1. A method for expressing and purifying a Cas13a protein, the method comprising:
   (a) inserting a nucleotide sequence encoding a polypeptide having the polypeptide sequences of SEQ ID NO: 10 into an expression plasmid;
   (b) transforming one or more cells with the expression plasmid;
   (c) inducing expression of the transformed plasmid;
   (d) isolating the cells;
   (e) extracting the Cas13a protein; and
   (f) purifying the protein using affinity purification and ion exchange purification.

2. The method of claim 1, wherein the cell comprises *E. coli* BL21(DE3).

3. The method of claim 1, wherein the expression plasmid comprises pET28 or pET28-MBP-TEV plasmids.

4. The method of claim 1, wherein the nucleotide sequence is inserted into the expression plasmid using isothermal assembly.

5. The method of claim 1, wherein the affinity purification comprises a nickel or a maltose affinity media.

6. The method of claim 1, wherein the affinity purification comprises affinity chromatography comprising:
   (f(1) a equilibrating a nickel affinity column with a binding buffer and loading the extracted Cas13a protein;
   f(2) washing the nickel affinity column with a wash buffer; and
   f(3) eluting the affinity purified Cas13a protein from the nickel affinity column using elution buffer.

7. The method of claim 1, wherein the affinity purification comprises affinity chromatography comprising:
   f(1) equilibrating a maltose affinity column with a binding buffer and loading the extracted Cas13a protein;
   f(2) washing the maltose affinity column with a wash buffer; and
   f(3) eluting the affinity purified Cas13a protein from the maltose affinity column using elution buffer.

8. The method of claim 1, wherein the ion exchange purification comprises a cation exchange media.

9. The method of claim 1, wherein the ion exchange purification comprises cation exchange chromatography comprising:
   (1) equilibrating a cation exchange column with a binding buffer and loading the extracted Cas13a protein;
   (2) washing the cation exchange column with a wash buffer; and
   (3) eluting the cation exchange purified Cas13a protein from the cation exchange column using an elution buffer.

10. The method of claim 1, further comprising concentrating the purified Cas13a protein to approximately 10 mg/mL.

11. The method of claim 10, further comprising dialyzing the concentrated purified Cas13a protein.

12. A method for purifying a recombinant Cas13a protein, the method comprising:

(a) providing an expressed recombinant Cas13a protein having the polypeptide sequence of SEQ ID NO: 10;

(b) performing an affinity purification comprising a nickel affinity media or a maltose affinity media;

(c) performing an ion exchange purification comprising a cation exchange media; and (d) collecting the purified Cas13a protein.

13. The method of claim 12, further comprising concentrating the purified Cas13a protein to approximately 10 mg/mL.

14. The method of claim 13, further comprising dialyzing the concentrated purified Cas13a protein against three rounds of dialysis buffer.

* * * * *

SEQUENCE LISTING

```
<160> NUMBER OF SEQ ID NOS: 44

<210> SEQ ID NO 1
<211> LENGTH: 3546
<212> TYPE: DNA
<213> ORGANISM: Artificial Sequence
<220> FEATURE:
<223> OTHER INFORMATION: Synthetic
```

<400> SEQUENCE: 1
atgaaggtga ccaaagttgg tggtatcagc cataaaaagt ataccagcga aggtcgtctg 60
gttaaaagcg aaagcgaaga aaatcgtacc gatgaacgtc tgagcgcact gctgaatatg 120
cgtctggata tgtatatcaa aaatccgagc agcaccgaaa ccaaagaaaa tcagaaacgt 180
atcggcaagc tgaaaaagtt cttcagcaac aaaatggtgt acctgaaaga taacaccctg 240
agcctgaaaa acggcaagaa agaaaatatc gatcgcgagt atagcgaaac cgatattctg 300
gaaagtgatg tgcgtgacaa aaaaaacttt gccgtcctga aaaagatcta tctgaacgaa 360
aatgtgaaca gcgaagaact ggaagtgttt cgcaacgaca ttaaaaagaa gctgaacaag 420
atcaacagcc tgaaatatag cttcgagaaa aacaaagcca actatcagaa gatcaacgag 480
aacaacatcg aaaaagtgga aggtaaaagc aagcgcaaca tcatctatga ttattatcgt 540
gaaagcgcca aacgtgatgc ctatgttagc aatgttaaag aggccttcga caagctgtat 600
aaagaagaag atattgccaa actggtgctg gaaattgaaa atctgaccaa gctggaaaaa 660
tacaagatcc gcgaattcta tcacgaaatc attggtcgca aaaacgataa agagaacttc 720
gccaaaatca tctacgaaga aattcagaac gtgaataaca tgaaagaact gatcgagaaa 780
gttccggata tgagcgaact gaaaaaaagc caggtgttct acaaatatta cctggacaaa 840
gaggaactga acgataaaaa catcaaatac gccttttgcc acttcgtgga aatcgaaatg 900
agccagctgc tgaaaaacta tgtgtataaa cgcctgagca acatcagcaa cgataagatt 960
aaacgcatct tcgagtacca gaacctgaag aaactgattg aaaacaaact gcttaacaaa 1020
ctggatacct atgtgcgtaa ttgcggcaaa tacaactatt atctgcagga tggtgaaatt 1080
gcgaccagcg attttattgc acgtaatcgt cagaatgaag cctttctgcg taacattatt 1140
ggtgttagca gcgttgcata ttttagcctg cgtaatatcc tggaaaccga aaacgagaat 1200
gatatcaccg gtcgtatgcg tggtaaaacc gtgaaaaaca ataaaggcga agagaaatat 1260
gtgagcggtg aggtggataa aatctacaac gaaaacaaaa agaacgaagt gaaagaaaac 1320
ctgaaaatgt tttacagcta cgactttaac atggacaaca agaacgagat cgaagatttt 1380
ttcgccaaca ttgatgaagc cattagcagc attcgtcatg gcattgttca ctttaatctg 1440
gaacttgagg gcaaagacat cttcgcgttt aaaaacattg caccgagcga gattagcaaa 1500
aagatgttcc agaacgaaat taacgagaaa aaactgaaac tgaagatctt tcgccagctg 1560
aatagcgcaa atgtttttcg ctatcttgag aaatacaaaa tcctgaacta tctgaaacgc 1620
acccgctttg aatttgtgaa caaaaacatt ccgtttgtgc cgagctttac caaactgtat 1680
agccgtattg atgatctgaa aaacagcctg ggcatttatt ggaaaacccc gaaaaccaac 1740
gatgataaca agacgaaaga aatcatcgat gcccagattt atctgcttaa gaacatctac 1800
tatggcgaat ttctgaacta ttttatgagc aacaacggca acttctttga aatcagcaaa 1860
gagattatcg agctgaataa aaacgacaaa cgcaatctga aaaccggctt ctataaactg 1920
cagaagtttg aggatatcca agaaaagatc ccgaaagaat atctggcgaa tattcagagc 1980
ctgtacatga ttaatgcagg caatcaggat gaggaagaga aagataccta tatcgatttc 2040
atccagaaaa tctttctgaa aggctttatg acctatctgg ccaataatgg tcgtctgagt 2100
ctgatttata tcggtagtga tgaagaaacc aataccagcc tggcagaaaa aaaacaagag 2160
ttcgataagt tcctgaagaa gtacgaacag aacaacaaca tcaagatccc gtatgaaatc 2220
aatgaatttc tgcgcgaaat caagctgggc aacattctga aatacaccga acgcctgaat 2280

```
atgttctatc tgattctgaa actgctgaac cataaagagc tgacgaatct gaaaggtagc   2340
ctggaaaagt atcagagcgc aaataaagag gaagcattta gcgatcagct ggaactgatt   2400
aatctgctga atctggataa taaccgtgtg accgaagatt tcgaattaga agcagatgag   2460
atcggcaaat tcctggattt taatggcaac aaagtgaagg acaacaaaga gcttaagaag   2520
ttcgacacca acaagatcta ttttgatggc gagaacatca tcaaacaccg tgccttttat   2580
aacatcaaaa aatacggtat gctgaacctg ctggaaaaga ttgcagataa agcaggctat   2640
aaaatcagca ttgaagagtt gaaaaaatac agcaacaaga aaaacgagat tgagaaaaac   2700
cacaaaatgc aagaaaatct gcaccgcaaa tatgcacgtc cgcgtaaaga tgaaaaattc   2760
accgatgaag attatgaaag ctacaaacag gccatcgaaa acatcgaaga atatacccat   2820
ctgaagaaca aagtcgaatt caacgaactg aatctgctgc agggtctgct gctgcgtatt   2880
ctgcatcgtc tggtgggtta taccagcatt tgggaacgtg atctgcgttt tcgcctgaaa   2940
ggtgaatttc ctgaaaacca gtatatcgag gaaatcttca acttcgagaa taaaaagaat   3000
gtgaagtata aaggtggcca gatcgtcgag aaatatatca aattctacaa agaactgcac   3060
cagaacgacg aggtgaaaat caacaaatat agcagcgcga acatcaaagt gctgaaacaa   3120
gagaaaaaag acctgtacat ccgcaactat atcgcccact ttaactatat tccgcatgca   3180
gaaattagtc tgctggaagt tctggaaaac ctgcgtaaac tgctgtcata tgatcgtaaa   3240
cttaaaaacg ccgtgatgaa aagcgttgtg gacatcctga aagagtatgg ttttgttgcg   3300
acctttaaaa tcggtgccga taaaaagatt ggtattcaga ccctggaaag cgagaagatt   3360
gttcacctga aaaatcttaa gaaaaagaaa cttatgaccg atcgcaatag cgaggaactg   3420
tgtaaactgg tgaaaattat gtttgagtat aaaatggaag agaagaaatc cgaaaatggg   3480
gatccgaatt cgagctccgt cgacaagctt gcggccgcac tcgagcacca ccaccaccac   3540
cactga                                                              3546
```

```
<210> SEQ ID NO 2
<211> LENGTH: 1181
<212> TYPE: PRT
<213> ORGANISM: Artificial Sequence
<220> FEATURE:
<223> OTHER INFORMATION: Synthetic

<400> SEQUENCE: 2

Met Lys Val Thr Lys Val Gly Gly Ile Ser His Lys Lys Tyr Thr Ser
1               5                   10                  15

Glu Gly Arg Leu Val Lys Ser Glu Ser Glu Glu Asn Arg Thr Asp Glu
            20                  25                  30

Arg Leu Ser Ala Leu Leu Asn Met Arg Leu Asp Met Tyr Ile Lys Asn
        35                  40                  45

Pro Ser Ser Thr Glu Thr Lys Glu Asn Gln Lys Arg Ile Gly Lys Leu
    50                  55                  60

Lys Lys Phe Phe Ser Asn Lys Met Val Tyr Leu Lys Asp Asn Thr Leu
65                  70                  75                  80

Ser Leu Lys Asn Gly Lys Lys Glu Asn Ile Asp Arg Glu Tyr Ser Glu
                85                  90                  95

Thr Asp Ile Leu Glu Ser Asp Val Arg Asp Lys Lys Asn Phe Ala Val
            100                 105                 110

Leu Lys Lys Ile Tyr Leu Asn Glu Asn Val Asn Ser Glu Glu Leu Glu
        115                 120                 125

Val Phe Arg Asn Asp Ile Lys Lys Lys Leu Asn Lys Ile Asn Ser Leu
```

```
    130                 135                 140

Lys Tyr Ser Phe Glu Lys Asn Lys Ala Asn Tyr Gln Lys Ile Asn Glu
145                 150                 155                 160

Asn Asn Ile Glu Lys Val Glu Gly Lys Ser Lys Arg Asn Ile Ile Tyr
                165                 170                 175

Asp Tyr Tyr Arg Glu Ser Ala Lys Arg Asp Ala Tyr Val Ser Asn Val
            180                 185                 190

Lys Glu Ala Phe Asp Lys Leu Tyr Lys Glu Glu Asp Ile Ala Lys Leu
        195                 200                 205

Val Leu Glu Ile Glu Asn Leu Thr Lys Leu Glu Lys Tyr Lys Ile Arg
    210                 215                 220

Glu Phe Tyr His Glu Ile Ile Gly Arg Lys Asn Asp Lys Glu Asn Phe
225                 230                 235                 240

Ala Lys Ile Ile Tyr Glu Glu Ile Gln Asn Val Asn Asn Met Lys Glu
                245                 250                 255

Leu Ile Glu Lys Val Pro Asp Met Ser Glu Leu Lys Lys Ser Gln Val
            260                 265                 270

Phe Tyr Lys Tyr Tyr Leu Asp Lys Glu Glu Leu Asn Asp Lys Asn Ile
        275                 280                 285

Lys Tyr Ala Phe Cys His Phe Val Glu Ile Glu Met Ser Gln Leu Leu
    290                 295                 300

Lys Asn Tyr Val Tyr Lys Arg Leu Ser Asn Ile Ser Asn Asp Lys Ile
305                 310                 315                 320

Lys Arg Ile Phe Glu Tyr Gln Asn Leu Lys Lys Leu Ile Glu Asn Lys
                325                 330                 335

Leu Leu Asn Lys Leu Asp Thr Tyr Val Arg Asn Cys Gly Lys Tyr Asn
            340                 345                 350

Tyr Tyr Leu Gln Asp Gly Glu Ile Ala Thr Ser Asp Phe Ile Ala Arg
        355                 360                 365

Asn Arg Gln Asn Glu Ala Phe Leu Arg Asn Ile Ile Gly Val Ser Ser
    370                 375                 380

Val Ala Tyr Phe Ser Leu Arg Asn Ile Leu Glu Thr Glu Asn Glu Asn
385                 390                 395                 400

Asp Ile Thr Gly Arg Met Arg Gly Lys Thr Val Lys Asn Asn Lys Gly
                405                 410                 415

Glu Glu Lys Tyr Val Ser Gly Glu Val Asp Lys Ile Tyr Asn Glu Asn
            420                 425                 430

Lys Lys Asn Glu Val Lys Glu Asn Leu Lys Met Phe Tyr Ser Tyr Asp
        435                 440                 445

Phe Asn Met Asp Asn Lys Asn Glu Ile Glu Asp Phe Phe Ala Asn Ile
    450                 455                 460

Asp Glu Ala Ile Ser Ser Ile Arg His Gly Ile Val His Phe Asn Leu
465                 470                 475                 480

Glu Leu Glu Gly Lys Asp Ile Phe Ala Phe Lys Asn Ile Ala Pro Ser
                485                 490                 495

Glu Ile Ser Lys Lys Met Phe Gln Asn Glu Ile Asn Glu Lys Lys Leu
            500                 505                 510

Lys Leu Lys Ile Phe Arg Gln Leu Asn Ser Ala Asn Val Phe Arg Tyr
        515                 520                 525

Leu Glu Lys Tyr Lys Ile Leu Asn Tyr Leu Lys Arg Thr Arg Phe Glu
    530                 535                 540

Phe Val Asn Lys Asn Ile Pro Phe Val Pro Ser Phe Thr Lys Leu Tyr
545                 550                 555                 560
```

```
Ser Arg Ile Asp Asp Leu Lys Asn Ser Leu Gly Ile Tyr Trp Lys Thr
                565                 570                 575

Pro Lys Thr Asn Asp Asp Asn Lys Thr Lys Glu Ile Ile Asp Ala Gln
            580                 585                 590

Ile Tyr Leu Leu Lys Asn Ile Tyr Tyr Gly Glu Phe Leu Asn Tyr Phe
        595                 600                 605

Met Ser Asn Asn Gly Asn Phe Phe Glu Ile Ser Lys Glu Ile Ile Glu
    610                 615                 620

Leu Asn Lys Asn Asp Lys Arg Asn Leu Lys Thr Gly Phe Tyr Lys Leu
625                 630                 635                 640

Gln Lys Phe Glu Asp Ile Gln Glu Lys Ile Pro Lys Glu Tyr Leu Ala
                645                 650                 655

Asn Ile Gln Ser Leu Tyr Met Ile Asn Ala Gly Asn Gln Asp Glu Glu
            660                 665                 670

Glu Lys Asp Thr Tyr Ile Asp Phe Ile Gln Lys Ile Phe Leu Lys Gly
        675                 680                 685

Phe Met Thr Tyr Leu Ala Asn Asn Gly Arg Leu Ser Leu Ile Tyr Ile
    690                 695                 700

Gly Ser Asp Glu Glu Thr Asn Thr Ser Leu Ala Glu Lys Lys Gln Glu
705                 710                 715                 720

Phe Asp Lys Phe Leu Lys Lys Tyr Glu Gln Asn Asn Asn Ile Lys Ile
                725                 730                 735

Pro Tyr Glu Ile Asn Glu Phe Leu Arg Glu Ile Lys Leu Gly Asn Ile
            740                 745                 750

Leu Lys Tyr Thr Glu Arg Leu Asn Met Phe Tyr Leu Ile Leu Lys Leu
        755                 760                 765

Leu Asn His Lys Glu Leu Thr Asn Leu Lys Gly Ser Leu Glu Lys Tyr
    770                 775                 780

Gln Ser Ala Asn Lys Glu Glu Ala Phe Ser Asp Gln Leu Glu Leu Ile
785                 790                 795                 800

Asn Leu Leu Asn Leu Asp Asn Asn Arg Val Thr Glu Asp Phe Glu Leu
                805                 810                 815

Glu Ala Asp Glu Ile Gly Lys Phe Leu Asp Phe Asn Gly Asn Lys Val
            820                 825                 830

Lys Asp Asn Lys Glu Leu Lys Lys Phe Asp Thr Asn Lys Ile Tyr Phe
        835                 840                 845

Asp Gly Glu Asn Ile Ile Lys His Arg Ala Phe Tyr Asn Ile Lys Lys
    850                 855                 860

Tyr Gly Met Leu Asn Leu Leu Glu Lys Ile Ala Asp Lys Ala Gly Tyr
865                 870                 875                 880

Lys Ile Ser Ile Glu Glu Leu Lys Lys Tyr Ser Asn Lys Lys Asn Glu
                885                 890                 895

Ile Glu Lys Asn His Lys Met Gln Glu Asn Leu His Arg Lys Tyr Ala
            900                 905                 910

Arg Pro Arg Lys Asp Glu Lys Phe Thr Asp Glu Asp Tyr Glu Ser Tyr
        915                 920                 925

Lys Gln Ala Ile Glu Asn Ile Glu Glu Tyr Thr His Leu Lys Asn Lys
    930                 935                 940

Val Glu Phe Asn Glu Leu Asn Leu Leu Gln Gly Leu Leu Leu Arg Ile
945                 950                 955                 960

Leu His Arg Leu Val Gly Tyr Thr Ser Ile Trp Glu Arg Asp Leu Arg
                965                 970                 975
```

```
Phe Arg Leu Lys Gly Glu Phe Pro Glu Asn Gln Tyr Ile Glu Glu Ile
            980                 985                 990

Phe Asn Phe Glu Asn Lys Lys Asn  Val Lys Tyr Lys Gly  Gly Gln Ile
        995                 1000                 1005

Val Glu  Lys Tyr Ile Lys Phe  Tyr Lys Glu Leu His  Gln Asn Asp
    1010                 1015                 1020

Glu Val  Lys Ile Asn Lys Tyr  Ser Ser Ala Asn Ile  Lys Val Leu
    1025                 1030                 1035

Lys Gln  Glu Lys Lys Asp Leu  Tyr Ile Arg Asn Tyr  Ile Ala His
    1040                 1045                 1050

Phe Asn  Tyr Ile Pro His Ala  Glu Ile Ser Leu Leu  Glu Val Leu
    1055                 1060                 1065

Glu Asn  Leu Arg Lys Leu Leu  Ser Tyr Asp Arg Lys  Leu Lys Asn
    1070                 1075                 1080

Ala Val  Met Lys Ser Val Val  Asp Ile Leu Lys Glu  Tyr Gly Phe
    1085                 1090                 1095

Val Ala  Thr Phe Lys Ile Gly  Ala Asp Lys Lys Ile  Gly Ile Gln
    1100                 1105                 1110

Thr Leu  Glu Ser Glu Lys Ile  Val His Leu Lys Asn  Leu Lys Lys
    1115                 1120                 1125

Lys Lys  Leu Met Thr Asp Arg  Asn Ser Glu Glu Leu  Cys Lys Leu
    1130                 1135                 1140

Val Lys  Ile Met Phe Glu Tyr  Lys Met Glu Glu Lys  Lys Ser Glu
    1145                 1150                 1155

Asn Gly  Asp Pro Asn Ser Ser  Ser Val Asp Lys Leu  Ala Ala Ala
    1160                 1165                 1170

Leu Glu  His His His His His  His
    1175                 1180


<210> SEQ ID NO 3
<211> LENGTH: 4701
<212> TYPE: DNA
<213> ORGANISM: Artificial Sequence
<220> FEATURE:
<223> OTHER INFORMATION: Synthetic

<400> SEQUENCE: 3

atgaaaatcg aagaaggtaa actggtaatc tggattaacg gcgataaagg ctataacggt     60

ctcgctgaag tcggtaagaa attcgagaaa gataccggaa ttaaagtcac cgttgagcat    120

ccggataaac tggaagagaa attcccacag gttgcggcaa ctggcgatgg ccctgacatt    180

atcttctggg cacacgaccg ctttggtggc tacgctcaat ctggcctgtt ggctgaaatc    240

accccggaca aagcgttcca ggacaagctg tatccgttta cctgggatgc cgtacgttac    300

aacggcaagc tgattgctta cccgatcgct gttgaagcgt tatcgctgat ttataacaaa    360

gatctgctgc cgaacccgcc aaaaacctgg gaagagatcc cggcgctgga taaagaactg    420

aaagcgaaag gtaagagcgc gctgatgttc aacctgcaag aaccgtactt cacctggccg    480

ctgattgctg ctgacggggg ttatgcgttc aagtatgaaa acggcaagta cgacattaaa    540

gacgtgggcg tggataacgc tggcgcgaaa gcgggtctga ccttcctggt tgacctgatt    600

aaaaacaaac acatgaatgc agacaccgat tactccatcg cagaagctgc ctttaataaa    660

ggcgaaacag cgatgaccat caacggcccg tgggcatggt ccaacatcga caccagcaaa    720

gtgaattatg gtgtaacggt actgccgacc ttcaagggtc aaccatccaa accgttcgtt    780

ggcgtgctga gcgcaggtat taacgccgcc agtccgaaca aagagctggc aaaagagttc    840
```

```
ctcgaaaact atctgctgac tgatgaaggt ctggaagcgg ttaataaaga caaaccgctg    900
ggtgccgtag cgctgaagtc ttacgaggaa gagttggtga aagatccgcg tattgccgcc    960
actatggaaa acgcccagaa aggtgaaatc atgccgaaca tcccgcagat gtccgctttc   1020
tggtatgccg tgcgtactgc ggtgatcaac gccgccagcg gtcgtcagac tgtcgatgaa   1080
gccctgaaag acgcgcagac taattcgagc tcgaacaaca acaacaataa caataacaac   1140
aacctcggga tcgagggaag gaaggtgacc aaagttggtg gtatcagcca taaaaagtat   1200
accagcgaag gtcgtctggt taaaagcgaa agcgaagaaa atcgtaccga tgaacgtctg   1260
agcgcactgc tgaatatgcg tctggatatg tatatcaaaa atccgagcag caccgaaacc   1320
aaagaaaatc agaaacgtat cggcaagctg aaaaagttct tcagcaacaa aatggtgtac   1380
ctgaaagata acaccctgag cctgaaaaac ggcaagaaag aaaatatcga tcgcgagtat   1440
agcgaaaccg atattctgga aagtgatgtg cgtgacaaaa aaaactttgc cgtcctgaaa   1500
aagatctatc tgaacgaaaa tgtgaacagc gaagaactgg aagtgtttcg caacgacatt   1560
aaaaagaagc tgaacaagat caacagcctg aaatatagct tcgagaaaaa caaagccaac   1620
tatcagaaga tcaacgagaa caacatcgaa aaagtggaag gtaaaagcaa gcgcaacatc   1680
atctatgatt attatcgtga aagcgccaaa cgtgatgcct atgttagcaa tgttaaagag   1740
gccttcgaca agctgtataa agaagaagat attgccaaac tggtgctgga aattgaaaat   1800
ctgaccaagc tggaaaaata caagatccgc gaattctatc acgaaatcat tggtcgcaaa   1860
aacgataaag agaacttcgc caaaatcatc tacgaagaaa ttcagaacgt gaataacatg   1920
aaagaactga tcgagaaagt tccggatatg agcgaactga aaaaaagcca ggtgttctac   1980
aaatattacc tggacaaaga ggaactgaac gataaaaaca tcaaatacgc cttttgccac   2040
ttcgtggaaa tcgaaatgag ccagctgctg aaaaactatg tgtataaacg cctgagcaac   2100
atcagcaacg ataagattaa acgcatcttc gagtaccaga acctgaagaa actgattgaa   2160
aacaaactgc ttaacaaact ggatacctat gtgcgtaatt gcggcaaata caactattat   2220
ctgcaggatg gtgaaattgc gaccagcgat tttattgcac gtaatcgtca gaatgaagcc   2280
tttctgcgta acattattgg tgttagcagc gttgcatatt ttagcctgcg taatatcctg   2340
gaaaccgaaa acgagaatga tatcaccggt cgtatgcgtg gtaaaaccgt gaaaaacaat   2400
aaaggcgaag agaaatatgt gagcggtgag gtggataaaa tctacaacga aaacaaaaag   2460
aacgaagtga aagaaaacct gaaaatgttt tacagctacg actttaacat ggacaacaag   2520
aacgagatcg aagatttttt cgccaacatt gatgaagcca ttagcagcat tcgtcatggc   2580
attgttcact ttaatctgga acttgagggc aaagacatct tcgcgtttaa aaacattgca   2640
ccgagcgaga ttagcaaaaa gatgttccag aacgaaatta acgagaaaaa actgaaactg   2700
aagatctttc gccagctgaa tagcgcaaat gtttttcgct atcttgagaa atacaaaatc   2760
ctgaactatc tgaaacgcac ccgctttgaa tttgtgaaca aaaacattcc gtttgtgccg   2820
agctttacca aactgtatag ccgtattgat gatctgaaaa acagcctggg catttattgg   2880
aaaaccccga aaccaacga tgataacaag acgaaagaaa tcatcgatgc ccagatttat   2940
ctgcttaaga acatctacta tggcgaattt ctgaactatt ttatgagcaa caacggcaac   3000
ttctttgaaa tcagcaaaga gattatcgag ctgaataaaa acgacaaacg caatctgaaa   3060
accggcttct ataaactgca gaagtttgag gatatccaag aaaagatccc gaaagaatat   3120
ctggcgaata ttcagagcct gtacatgatt aatgcaggca atcaggatga ggaagagaaa   3180
```

```
gatacctata tcgatttcat ccagaaaatc tttctgaaag gctttatgac ctatctggcc   3240
aataatggtc gtctgagtct gatttatatc ggtagtgatg aagaaaccaa taccagcctg   3300
gcagaaaaaa aacaagagtt cgataagttc ctgaagaagt acgaacagaa caacaacatc   3360
aagatcccgt atgaaatcaa tgaatttctg cgcgaaatca agctgggcaa cattctgaaa   3420
tacaccgaac gcctgaatat gttctatctg attctgaaac tgctgaacca taaagagctg   3480
acgaatctga aaggtagcct ggaaaagtat cagagcgcaa ataaagagga agcatttagc   3540
gatcagctgg aactgattaa tctgctgaat ctggataata accgtgtgac cgaagatttc   3600
gaattagaag cagatgagat cggcaaattc ctggatttta atggcaacaa agtgaaggac   3660
aacaaagagc ttaagaagtt cgacaccaac aagatctatt ttgatggcga gaacatcatc   3720
aaacaccgtg ccttttataa catcaaaaaa tacggtatgc tgaacctgct ggaaaagatt   3780
gcagataaag caggctataa aatcagcatt gaagagttga aaaaatacag caacaagaaa   3840
aacgagattg agaaaaacca caaaatgcaa gaaaatctgc accgcaaata tgcacgtccg   3900
cgtaaagatg aaaaattcac cgatgaagat tatgaaagct acaaacaggc catcgaaaac   3960
atcgaagaat atacccatct gaagaacaaa gtcgaattca acgaactgaa tctgctgcag   4020
ggtctgctgc tgcgtattct gcatcgtctg gtgggttata ccagcatttg ggaacgtgat   4080
ctgcgttttc gcctgaaagg tgaatttcct gaaaaccagt atatcgagga aatcttcaac   4140
ttcgagaata aaaagaatgt gaagtataaa ggtggccaga tcgtcgagaa atatatcaaa   4200
ttctacaaag aactgcacca gaacgacgag gtgaaaatca acaaatatag cagcgcgaac   4260
atcaaagtgc tgaaacaaga gaaaaaagac ctgtacatcc gcaactatat cgcccacttt   4320
aactatattc cgcatgcaga aattagtctg ctggaagttc tggaaaacct gcgtaaactg   4380
ctgtcatatg atcgtaaact taaaaacgcc gtgatgaaaa gcgttgtgga catcctgaaa   4440
gagtatggtt ttgttgcgac ctttaaaatc ggtgccgata aaaagattgg tattcagacc   4500
ctggaaagcg agaagattgt tcacctgaaa aatcttaaga aaaagaaact tatgaccgat   4560
cgcaatagcg aggaactgtg taaactggtg aaaattatgt ttgagtataa aatggaagag   4620
aagaaatccg aaaatgatcc gaattcgagc tccgtcgaca agcttgcggc cgcactcgag   4680
caccaccacc accaccactg a                                             4701
```

<210> SEQ ID NO 4
<211> LENGTH: 1566
<212> TYPE: PRT
<213> ORGANISM: Artificial Sequence
<220> FEATURE:
<223> OTHER INFORMATION: Synthetic

<400> SEQUENCE: 4

```
Met Lys Ile Glu Glu Gly Lys Leu Val Ile Trp Ile Asn Gly Asp Lys
1               5                   10                  15

Gly Tyr Asn Gly Leu Ala Glu Val Gly Lys Lys Phe Glu Lys Asp Thr
            20                  25                  30

Gly Ile Lys Val Thr Val Glu His Pro Asp Lys Leu Glu Glu Lys Phe
        35                  40                  45

Pro Gln Val Ala Ala Thr Gly Asp Gly Pro Asp Ile Ile Phe Trp Ala
    50                  55                  60

His Asp Arg Phe Gly Gly Tyr Ala Gln Ser Gly Leu Leu Ala Glu Ile
65                  70                  75                  80

Thr Pro Asp Lys Ala Phe Gln Asp Lys Leu Tyr Pro Phe Thr Trp Asp
                85                  90                  95
```

```
Ala Val Arg Tyr Asn Gly Lys Leu Ile Ala Tyr Pro Ile Ala Val Glu
            100                 105                 110

Ala Leu Ser Leu Ile Tyr Asn Lys Asp Leu Leu Pro Asn Pro Pro Lys
        115                 120                 125

Thr Trp Glu Glu Ile Pro Ala Leu Asp Lys Glu Leu Lys Ala Lys Gly
    130                 135                 140

Lys Ser Ala Leu Met Phe Asn Leu Gln Glu Pro Tyr Phe Thr Trp Pro
145                 150                 155                 160

Leu Ile Ala Ala Asp Gly Gly Tyr Ala Phe Lys Tyr Glu Asn Gly Lys
                165                 170                 175

Tyr Asp Ile Lys Asp Val Gly Val Asp Asn Ala Gly Ala Lys Ala Gly
            180                 185                 190

Leu Thr Phe Leu Val Asp Leu Ile Lys Asn Lys His Met Asn Ala Asp
        195                 200                 205

Thr Asp Tyr Ser Ile Ala Glu Ala Ala Phe Asn Lys Gly Glu Thr Ala
    210                 215                 220

Met Thr Ile Asn Gly Pro Trp Ala Trp Ser Asn Ile Asp Thr Ser Lys
225                 230                 235                 240

Val Asn Tyr Gly Val Thr Val Leu Pro Thr Phe Lys Gly Gln Pro Ser
                245                 250                 255

Lys Pro Phe Val Gly Val Leu Ser Ala Gly Ile Asn Ala Ala Ser Pro
            260                 265                 270

Asn Lys Glu Leu Ala Lys Glu Phe Leu Glu Asn Tyr Leu Leu Thr Asp
        275                 280                 285

Glu Gly Leu Glu Ala Val Asn Lys Asp Lys Pro Leu Gly Ala Val Ala
    290                 295                 300

Leu Lys Ser Tyr Glu Glu Glu Leu Val Lys Asp Pro Arg Ile Ala Ala
305                 310                 315                 320

Thr Met Glu Asn Ala Gln Lys Gly Glu Ile Met Pro Asn Ile Pro Gln
                325                 330                 335

Met Ser Ala Phe Trp Tyr Ala Val Arg Thr Ala Val Ile Asn Ala Ala
            340                 345                 350

Ser Gly Arg Gln Thr Val Asp Glu Ala Leu Lys Asp Ala Gln Thr Asn
        355                 360                 365

Ser Ser Ser Asn Asn Asn Asn Asn Asn Asn Asn Asn Asn Leu Gly Ile
    370                 375                 380

Glu Gly Arg Lys Val Thr Lys Val Gly Gly Ile Ser His Lys Lys Tyr
385                 390                 395                 400

Thr Ser Glu Gly Arg Leu Val Lys Ser Glu Ser Glu Glu Asn Arg Thr
                405                 410                 415

Asp Glu Arg Leu Ser Ala Leu Leu Asn Met Arg Leu Asp Met Tyr Ile
            420                 425                 430

Lys Asn Pro Ser Ser Thr Glu Thr Lys Glu Asn Gln Lys Arg Ile Gly
        435                 440                 445

Lys Leu Lys Lys Phe Phe Ser Asn Lys Met Val Tyr Leu Lys Asp Asn
    450                 455                 460

Thr Leu Ser Leu Lys Asn Gly Lys Lys Glu Asn Ile Asp Arg Glu Tyr
465                 470                 475                 480

Ser Glu Thr Asp Ile Leu Glu Ser Asp Val Arg Asp Lys Lys Asn Phe
                485                 490                 495

Ala Val Leu Lys Lys Ile Tyr Leu Asn Glu Asn Val Asn Ser Glu Glu
            500                 505                 510
```

```
Leu Glu Val Phe Arg Asn Asp Ile Lys Lys Lys Leu Asn Lys Ile Asn
        515                 520                 525

Ser Leu Lys Tyr Ser Phe Glu Lys Asn Lys Ala Asn Tyr Gln Lys Ile
    530                 535                 540

Asn Glu Asn Asn Ile Glu Lys Val Glu Gly Lys Ser Lys Arg Asn Ile
545                 550                 555                 560

Ile Tyr Asp Tyr Tyr Arg Glu Ser Ala Lys Arg Asp Ala Tyr Val Ser
                565                 570                 575

Asn Val Lys Glu Ala Phe Asp Lys Leu Tyr Lys Glu Glu Asp Ile Ala
            580                 585                 590

Lys Leu Val Leu Glu Ile Glu Asn Leu Thr Lys Leu Glu Lys Tyr Lys
        595                 600                 605

Ile Arg Glu Phe Tyr His Glu Ile Ile Gly Arg Lys Asn Asp Lys Glu
    610                 615                 620

Asn Phe Ala Lys Ile Ile Tyr Glu Glu Ile Gln Asn Val Asn Asn Met
625                 630                 635                 640

Lys Glu Leu Ile Glu Lys Val Pro Asp Met Ser Glu Leu Lys Lys Ser
                645                 650                 655

Gln Val Phe Tyr Lys Tyr Tyr Leu Asp Lys Glu Glu Leu Asn Asp Lys
            660                 665                 670

Asn Ile Lys Tyr Ala Phe Cys His Phe Val Glu Ile Glu Met Ser Gln
        675                 680                 685

Leu Leu Lys Asn Tyr Val Tyr Lys Arg Leu Ser Asn Ile Ser Asn Asp
    690                 695                 700

Lys Ile Lys Arg Ile Phe Glu Tyr Gln Asn Leu Lys Lys Leu Ile Glu
705                 710                 715                 720

Asn Lys Leu Leu Asn Lys Leu Asp Thr Tyr Val Arg Asn Cys Gly Lys
                725                 730                 735

Tyr Asn Tyr Tyr Leu Gln Asp Gly Glu Ile Ala Thr Ser Asp Phe Ile
            740                 745                 750

Ala Arg Asn Arg Gln Asn Glu Ala Phe Leu Arg Asn Ile Ile Gly Val
        755                 760                 765

Ser Ser Val Ala Tyr Phe Ser Leu Arg Asn Ile Leu Glu Thr Glu Asn
    770                 775                 780

Glu Asn Asp Ile Thr Gly Arg Met Arg Gly Lys Thr Val Lys Asn Asn
785                 790                 795                 800

Lys Gly Glu Glu Lys Tyr Val Ser Gly Glu Val Asp Lys Ile Tyr Asn
                805                 810                 815

Glu Asn Lys Lys Asn Glu Val Lys Glu Asn Leu Lys Met Phe Tyr Ser
            820                 825                 830

Tyr Asp Phe Asn Met Asp Asn Lys Asn Glu Ile Glu Asp Phe Phe Ala
        835                 840                 845

Asn Ile Asp Glu Ala Ile Ser Ser Ile Arg His Gly Ile Val His Phe
    850                 855                 860

Asn Leu Glu Leu Glu Gly Lys Asp Ile Phe Ala Phe Lys Asn Ile Ala
865                 870                 875                 880

Pro Ser Glu Ile Ser Lys Lys Met Phe Gln Asn Glu Ile Asn Glu Lys
                885                 890                 895

Lys Leu Lys Leu Lys Ile Phe Arg Gln Leu Asn Ser Ala Asn Val Phe
            900                 905                 910

Arg Tyr Leu Glu Lys Tyr Lys Ile Leu Asn Tyr Leu Lys Arg Thr Arg
        915                 920                 925

Phe Glu Phe Val Asn Lys Asn Ile Pro Phe Val Pro Ser Phe Thr Lys
```

```
    930                 935                 940

Leu Tyr Ser Arg Ile Asp Asp Leu Lys Asn Ser Leu Gly Ile Tyr Trp
945                 950                 955                 960

Lys Thr Pro Lys Thr Asn Asp Asp Asn Lys Thr Lys Glu Ile Ile Asp
                965                 970                 975

Ala Gln Ile Tyr Leu Leu Lys Asn Ile Tyr Tyr Gly Glu Phe Leu Asn
            980                 985                 990

Tyr Phe Met Ser Asn Asn Gly Asn  Phe Phe Glu Ile Ser  Lys Glu Ile
        995                 1000                1005

Ile Glu  Leu Asn Lys Asn Asp  Lys Arg Asn Leu Lys  Thr Gly Phe
    1010                1015                1020

Tyr Lys  Leu Gln Lys Phe Glu  Asp Ile Gln Glu Lys  Ile Pro Lys
    1025                1030                1035

Glu Tyr  Leu Ala Asn Ile Gln  Ser Leu Tyr Met Ile  Asn Ala Gly
    1040                1045                1050

Asn Gln  Asp Glu Glu Glu Lys  Asp Thr Tyr Ile Asp  Phe Ile Gln
    1055                1060                1065

Lys Ile  Phe Leu Lys Gly Phe  Met Thr Tyr Leu Ala  Asn Asn Gly
    1070                1075                1080

Arg Leu  Ser Leu Ile Tyr Ile  Gly Ser Asp Glu Glu  Thr Asn Thr
    1085                1090                1095

Ser Leu  Ala Glu Lys Lys Gln  Glu Phe Asp Lys Phe  Leu Lys Lys
    1100                1105                1110

Tyr Glu  Gln Asn Asn Asn Ile  Lys Ile Pro Tyr Glu  Ile Asn Glu
    1115                1120                1125

Phe Leu  Arg Glu Ile Lys Leu  Gly Asn Ile Leu Lys  Tyr Thr Glu
    1130                1135                1140

Arg Leu  Asn Met Phe Tyr Leu  Ile Leu Lys Leu Leu  Asn His Lys
    1145                1150                1155

Glu Leu  Thr Asn Leu Lys Gly  Ser Leu Glu Lys Tyr  Gln Ser Ala
    1160                1165                1170

Asn Lys  Glu Glu Ala Phe Ser  Asp Gln Leu Glu Leu  Ile Asn Leu
    1175                1180                1185

Leu Asn  Leu Asp Asn Asn Arg  Val Thr Glu Asp Phe  Glu Leu Glu
    1190                1195                1200

Ala Asp  Glu Ile Gly Lys Phe  Leu Asp Phe Asn Gly  Asn Lys Val
    1205                1210                1215

Lys Asp  Asn Lys Glu Leu Lys  Lys Phe Asp Thr Asn  Lys Ile Tyr
    1220                1225                1230

Phe Asp  Gly Glu Asn Ile Ile  Lys His Arg Ala Phe  Tyr Asn Ile
    1235                1240                1245

Lys Lys  Tyr Gly Met Leu Asn  Leu Leu Glu Lys Ile  Ala Asp Lys
    1250                1255                1260

Ala Gly  Tyr Lys Ile Ser Ile  Glu Glu Leu Lys Lys  Tyr Ser Asn
    1265                1270                1275

Lys Lys  Asn Glu Ile Glu Lys  Asn His Lys Met Gln  Glu Asn Leu
    1280                1285                1290

His Arg  Lys Tyr Ala Arg Pro  Arg Lys Asp Glu Lys  Phe Thr Asp
    1295                1300                1305

Glu Asp  Tyr Glu Ser Tyr Lys  Gln Ala Ile Glu Asn  Ile Glu Glu
    1310                1315                1320

Tyr Thr  His Leu Lys Asn Lys  Val Glu Phe Asn Glu  Leu Asn Leu
    1325                1330                1335
```

Leu Gln Gly Leu Leu Leu Arg Ile Leu His Arg Leu Val Gly Tyr
1340 1345 1350

Thr Ser Ile Trp Glu Arg Asp Leu Arg Phe Arg Leu Lys Gly Glu
1355 1360 1365

Phe Pro Glu Asn Gln Tyr Ile Glu Glu Ile Phe Asn Phe Glu Asn
1370 1375 1380

Lys Lys Asn Val Lys Tyr Lys Gly Gly Gln Ile Val Glu Lys Tyr
1385 1390 1395

Ile Lys Phe Tyr Lys Glu Leu His Gln Asn Asp Glu Val Lys Ile
1400 1405 1410

Asn Lys Tyr Ser Ser Ala Asn Ile Lys Val Leu Lys Gln Glu Lys
1415 1420 1425

Lys Asp Leu Tyr Ile Arg Asn Tyr Ile Ala His Phe Asn Tyr Ile
1430 1435 1440

Pro His Ala Glu Ile Ser Leu Leu Glu Val Leu Glu Asn Leu Arg
1445 1450 1455

Lys Leu Leu Ser Tyr Asp Arg Lys Leu Lys Asn Ala Val Met Lys
1460 1465 1470

Ser Val Val Asp Ile Leu Lys Glu Tyr Gly Phe Val Ala Thr Phe
1475 1480 1485

Lys Ile Gly Ala Asp Lys Lys Ile Gly Ile Gln Thr Leu Glu Ser
1490 1495 1500

Glu Lys Ile Val His Leu Lys Asn Leu Lys Lys Lys Lys Leu Met
1505 1510 1515

Thr Asp Arg Asn Ser Glu Glu Leu Cys Lys Leu Val Lys Ile Met
1520 1525 1530

Phe Glu Tyr Lys Met Glu Glu Lys Lys Ser Glu Asn Asp Pro Asn
1535 1540 1545

Ser Ser Ser Val Asp Lys Leu Ala Ala Ala Leu Glu His His His
1550 1555 1560

His His His
1565

<210> SEQ ID NO 5
<211> LENGTH: 4236
<212> TYPE: DNA
<213> ORGANISM: Artificial Sequence
<220> FEATURE:
<223> OTHER INFORMATION: Synthetic

<400> SEQUENCE: 5
atgggtaacc tgtttggtca taaacgttgg tatgaagtgc gcgacaaaaa agactttaaa 60
atcaaacgca aggtgaaagt gaaacgcaac tatgatggca acaaatatat cctgaacatc 120
aacgagaaca acaacaaaga gaagatcgat aataataaat tcatccgcaa atacatcaac 180
tacaaaaaaa acgataacat cctgaaagaa ttcacccgca agtttcatgc aggcaacatt 240
ctgtttaaac tgaaaggcaa agaaggcatc attcgcatcg aaaacaatga tgattttctg 300
gaaaccgaag aggtggtgct gtatattgaa gcatatggca aaagcgaaaa actgaaggca 360
ctgggcatta ccaaaaaaaa gattatcgat gaagccattc gccagggtat taccaaagat 420
gacaaaaaga tcgagatcaa gcgccaagaa aacgaagaag aaatcgaaat tgatatccgc 480
gacgagtata ccaataaaac cctgaatgat tgcagcatta ttctgcgcat tatcgagaat 540
gatgagctgg aaacgaaaaa gagcatctac gagatcttca aaaacatcaa catgagcctg 600

-continued

```
tacaaaatca tcgagaaaat tatcgaaaac gaaaccgaga aggtgttcga gaatcgctat    660
tatgaagaac atctgcgtga gaaactgctg aaagatgata aaattgatgt gatcctgacc    720
aacttcatgg aaatccgcga aaagattaaa agcaacctgg aaattctggg cttcgtgaaa    780
ttctatctga atgttggtgg cgacaagaaa aaaagcaaga acaagaaaat gctggtcgaa    840
aaaattctga acattaacgt tgatctgacc gtggaagata ttgccgattt tgtgattaaa    900
gagctggaat tctggaacat caccaaacgc attgagaagg tgaaaaaagt gaacaacgag    960
ttcctggaaa aacgtcgtaa tcgcacctat atcaaaagct atgttctgct ggataagcac   1020
gagaaattca aaattgaacg cgagaacaaa aaggacaaaa tcgtgaagtt tttcgtggaa   1080
aatatcaaaa acaacagcat caaagaaaaa atcgagaaga tcctggccga gttcaaaatc   1140
gatgaactga tcaaaaagct ggaaaaagaa ctgaaaaaag gcaactgcga taccgaaatt   1200
ttcggcatct ttaagaaaca ctataaagtg aacttcgata gcaaaaaatt cagcaaaaag   1260
agcgacgaag agaaagagct gtataagatc atttaccgct atctgaaagg ccgtattgaa   1320
aaaatcctgg tgaatgaaca gaaagtgcgc ctgaaaaaaa tggaaaaaat tgagattgag   1380
aagattctga acgagagcat cctgagtgag aaaatcctga aacgtgttaa acagtatacc   1440
ctggaacaca ttatgtatct gggtaaactg cgccataacg atattgatat gaccaccgtt   1500
aataccgatg atttcagccg tctgcatgca aaagaagaac tggatctgga actgattacc   1560
ttttttgcaa gcaccaatat ggaactgaac aagatcttta gccgtgaaaa cattaacaac   1620
gacgagaaca ttgatttctt tggtggtgat cgcgagaaaa actatgtcct ggataaaaag   1680
atcctgaata gcaaaatcaa gatcatccgc gatctggatt tcatcgacaa taagaacaac   1740
attaccaaca actttattcg caaatttacc aaaattggca ccaatgaacg caaccgtatt   1800
ctgcatgcca ttagcaaaga acgtgatctg cagggcaccc aggatgatta taacaaagtg   1860
attaacatca tccagaacct gaaaatctcc gatgaagaag ttagcaaagc actgaatctg   1920
gatgtggtgt tcaaagataa gaaaaatatc atcaccaaga tcaacgatat caaaatcagc   1980
gaagagaaca ataacgacat caaatatctg ccgagcttta gcaaagttct gccggaaatt   2040
cttaatctgt atcgcaataa cccgaaaaac gaaccgtttg ataccatcga aacagagaaa   2100
attgttctga acgccctgat ctatgtgaac aaagaactgt acaagaaact gatcctggaa   2160
gatgatctgg aagagaacga atcgaaaaac atctttctgc aagagctgaa aaagaccctg   2220
ggtaacattg atgagatcga tgaaaacatc atcgaaaatt actacaagaa cgcacagatt   2280
agcgcaagca aaggtaataa caaagccatc aaaaaatacc agaaaaaggt gatcgaatgc   2340
tacattggtt atctgcgcaa aaactacgaa gaactgttcg atttcagcga tttcaaaatg   2400
aacatccaag agatcaagaa gcagatcaag gacattaacg acaacaaaac ctatgaacgc   2460
atcaccgtta aaaccagcga taaaaccatt gtgatcaacg acgatttcga gtacatcatt   2520
agcatttttg cactgctgaa ttccaacgcc gtgatcaaca aaattcgcaa tcgctttttt   2580
gccaccagtg tttggctgaa taccagcgaa tatcagaaca ttatcgatat cctggatgag   2640
atcatgcagc tgaatacact gcgtaatgaa tgcattaccg aaaactggaa tctgaacctt   2700
gaagaattta ttcagaaaat gaaagagatc gagaaagact tcgacgactt caaaatccag   2760
accaaaaaag aaatcttcaa caactactac gaggacatca aaaataacat tctgaccgaa   2820
ttcaaagacg atattaacgg ctgtgacgtg ctggaaaaga agttggaaaa gatcgttatc   2880
ttcgatgacg aaaccaaatt cgaaatcgac aaaaagtcca acatccttca ggatgaacag   2940
cgtaaactga gcaatatcaa caagaaagac ctgaagaaga aggtcgacca gtacatcaaa   3000
```

gacaaagacc aagaaattaa gagcaaaatc ctgtgccgca tcatctttaa cagcgacttt 3060
ctgaaaaagt ataagaaaga gattgacaac ctgatcgagg atatggaaag cgagaacgaa 3120
aacaagtttc aagagatcta ctatccgaaa gaacgcaaaa acgagctgta catctacaag 3180
aagaacctgt tcctgaatat tggcaacccg aacttcgaca aaatctatgg tctgatcagc 3240
aacgacatta aaatggccga tgcaaaattc ctgtttaata tcgatggtaa aaacatccgt 3300
aaaaacaaaa ttagcgagat cgacgcgatc ctgaaaaacc tgaacgataa actgaatggc 3360
tacagcaaag aatataaaga gaaatacatt aaaaagctga aagaaaatga cgacttcttc 3420
gccaagaaca tccagaataa aaactataaa agcttcgaga aggactacaa tcgcgtgtcc 3480
gaatataaga aaattcgtga tctggtggaa ttcaactatc tgaacaaaat cgaaagctat 3540
ctgatcgata tcaactggaa actggcaatt cagatggcac gttttgagcg tgatatgcac 3600
tatattgtta atggtctgcg tgaactgggc atcattaaac tgagtggtta taataccggc 3660
attagccgtg catatccgaa acgtaatggt tccgatggtt tttataccac caccgcctat 3720
tacaaatttt tcgacgaaga aagctacaag aaatttgaga aaatttgcta cggcttcggc 3780
attgatctga gcgaaaatag cgaaattaac aagccggaaa atgagagcat tcgcaactat 3840
atctcccact tttatatcgt gcgtaatccg tttgccgatt atagcattgc agagcagatt 3900
gatcgtgtta gcaatctgct gagctatagt acccgttata acaatagcac ctatgccagc 3960
gtgtttgagg tgtttaaaaa ggatgttaac ctggactatg acgagctgaa gaaaaagttc 4020
aaactgatcg gcaacaatga catcctggaa cgtctgatga aaccgaaaaa agttagtgtg 4080
ctggaacttg agagctacaa cagcgattat atcaagaacc tgattatcga gctgctgacc 4140
aagattgaaa ataccaatga taccctgggg gatccgaatt cgagctccgt cgacaagctt 4200
gcggccgcac tcgagcacca ccaccaccac cactga 4236

<210> SEQ ID NO 6
<211> LENGTH: 1411
<212> TYPE: PRT
<213> ORGANISM: Artificial Sequence
<220> FEATURE:
<223> OTHER INFORMATION: Synthetic

<400> SEQUENCE: 6

Met Gly Asn Leu Phe Gly His Lys Arg Trp Tyr Glu Val Arg Asp Lys
1               5                   10                  15

Lys Asp Phe Lys Ile Lys Arg Lys Val Lys Val Lys Arg Asn Tyr Asp
            20                  25                  30

Gly Asn Lys Tyr Ile Leu Asn Ile Asn Glu Asn Asn Asn Lys Glu Lys
        35                  40                  45

Ile Asp Asn Asn Lys Phe Ile Arg Lys Tyr Ile Asn Tyr Lys Lys Asn
    50                  55                  60

Asp Asn Ile Leu Lys Glu Phe Thr Arg Lys Phe His Ala Gly Asn Ile
65                  70                  75                  80

Leu Phe Lys Leu Lys Gly Lys Glu Gly Ile Ile Arg Ile Glu Asn Asn
                85                  90                  95

Asp Asp Phe Leu Glu Thr Glu Glu Val Val Leu Tyr Ile Glu Ala Tyr
            100                 105                 110

Gly Lys Ser Glu Lys Leu Lys Ala Leu Gly Ile Thr Lys Lys Lys Ile
        115                 120                 125

Ile Asp Glu Ala Ile Arg Gln Gly Ile Thr Lys Asp Asp Lys Lys Ile
    130                 135                 140

```
Glu Ile Lys Arg Gln Glu Asn Glu Glu Glu Ile Glu Ile Asp Ile Arg
145                 150                 155                 160

Asp Glu Tyr Thr Asn Lys Thr Leu Asn Asp Cys Ser Ile Ile Leu Arg
                165                 170                 175

Ile Ile Glu Asn Asp Glu Leu Glu Thr Lys Lys Ser Ile Tyr Glu Ile
            180                 185                 190

Phe Lys Asn Ile Asn Met Ser Leu Tyr Lys Ile Ile Glu Lys Ile Ile
        195                 200                 205

Glu Asn Glu Thr Glu Lys Val Phe Glu Asn Arg Tyr Tyr Glu Glu His
    210                 215                 220

Leu Arg Glu Lys Leu Leu Lys Asp Asp Lys Ile Asp Val Ile Leu Thr
225                 230                 235                 240

Asn Phe Met Glu Ile Arg Glu Lys Ile Lys Ser Asn Leu Glu Ile Leu
                245                 250                 255

Gly Phe Val Lys Phe Tyr Leu Asn Val Gly Gly Asp Lys Lys Lys Ser
            260                 265                 270

Lys Asn Lys Lys Met Leu Val Glu Lys Ile Leu Asn Ile Asn Val Asp
        275                 280                 285

Leu Thr Val Glu Asp Ile Ala Asp Phe Val Ile Lys Glu Leu Glu Phe
    290                 295                 300

Trp Asn Ile Thr Lys Arg Ile Glu Lys Val Lys Lys Val Asn Asn Glu
305                 310                 315                 320

Phe Leu Glu Lys Arg Arg Asn Arg Thr Tyr Ile Lys Ser Tyr Val Leu
                325                 330                 335

Leu Asp Lys His Glu Lys Phe Lys Ile Glu Arg Glu Asn Lys Lys Asp
            340                 345                 350

Lys Ile Val Lys Phe Phe Val Glu Asn Ile Lys Asn Asn Ser Ile Lys
        355                 360                 365

Glu Lys Ile Glu Lys Ile Leu Ala Glu Phe Lys Ile Asp Glu Leu Ile
    370                 375                 380

Lys Lys Leu Glu Lys Glu Leu Lys Lys Gly Asn Cys Asp Thr Glu Ile
385                 390                 395                 400

Phe Gly Ile Phe Lys Lys His Tyr Lys Val Asn Phe Asp Ser Lys Lys
                405                 410                 415

Phe Ser Lys Lys Ser Asp Glu Glu Lys Glu Leu Tyr Lys Ile Ile Tyr
            420                 425                 430

Arg Tyr Leu Lys Gly Arg Ile Glu Lys Ile Leu Val Asn Glu Gln Lys
        435                 440                 445

Val Arg Leu Lys Lys Met Glu Lys Ile Glu Ile Glu Lys Ile Leu Asn
    450                 455                 460

Glu Ser Ile Leu Ser Glu Lys Ile Leu Lys Arg Val Lys Gln Tyr Thr
465                 470                 475                 480

Leu Glu His Ile Met Tyr Leu Gly Lys Leu Arg His Asn Asp Ile Asp
                485                 490                 495

Met Thr Thr Val Asn Thr Asp Asp Phe Ser Arg Leu His Ala Lys Glu
            500                 505                 510

Glu Leu Asp Leu Glu Leu Ile Thr Phe Phe Ala Ser Thr Asn Met Glu
        515                 520                 525

Leu Asn Lys Ile Phe Ser Arg Glu Asn Ile Asn Asn Asp Glu Asn Ile
    530                 535                 540

Asp Phe Phe Gly Gly Asp Arg Glu Lys Asn Tyr Val Leu Asp Lys Lys
545                 550                 555                 560
```

-continued

```
Ile Leu Asn Ser Lys Ile Lys Ile Ile Arg Asp Leu Asp Phe Ile Asp
                565                 570                 575

Asn Lys Asn Asn Ile Thr Asn Asn Phe Ile Arg Lys Phe Thr Lys Ile
            580                 585                 590

Gly Thr Asn Glu Arg Asn Arg Ile Leu His Ala Ile Ser Lys Glu Arg
        595                 600                 605

Asp Leu Gln Gly Thr Gln Asp Asp Tyr Asn Lys Val Ile Asn Ile Ile
    610                 615                 620

Gln Asn Leu Lys Ile Ser Asp Glu Glu Val Ser Lys Ala Leu Asn Leu
625                 630                 635                 640

Asp Val Val Phe Lys Asp Lys Lys Asn Ile Ile Thr Lys Ile Asn Asp
                645                 650                 655

Ile Lys Ile Ser Glu Glu Asn Asn Asn Asp Ile Lys Tyr Leu Pro Ser
            660                 665                 670

Phe Ser Lys Val Leu Pro Glu Ile Leu Asn Leu Tyr Arg Asn Asn Pro
        675                 680                 685

Lys Asn Glu Pro Phe Asp Thr Ile Glu Thr Glu Lys Ile Val Leu Asn
    690                 695                 700

Ala Leu Ile Tyr Val Asn Lys Glu Leu Tyr Lys Lys Leu Ile Leu Glu
705                 710                 715                 720

Asp Asp Leu Glu Glu Asn Glu Ser Lys Asn Ile Phe Leu Gln Glu Leu
                725                 730                 735

Lys Lys Thr Leu Gly Asn Ile Asp Glu Ile Asp Glu Asn Ile Ile Glu
            740                 745                 750

Asn Tyr Tyr Lys Asn Ala Gln Ile Ser Ala Ser Lys Gly Asn Asn Lys
        755                 760                 765

Ala Ile Lys Lys Tyr Gln Lys Lys Val Ile Glu Cys Tyr Ile Gly Tyr
    770                 775                 780

Leu Arg Lys Asn Tyr Glu Glu Leu Phe Asp Phe Ser Asp Phe Lys Met
785                 790                 795                 800

Asn Ile Gln Glu Ile Lys Lys Gln Ile Lys Asp Ile Asn Asp Asn Lys
                805                 810                 815

Thr Tyr Glu Arg Ile Thr Val Lys Thr Ser Asp Lys Thr Ile Val Ile
            820                 825                 830

Asn Asp Asp Phe Glu Tyr Ile Ile Ser Ile Phe Ala Leu Leu Asn Ser
        835                 840                 845

Asn Ala Val Ile Asn Lys Ile Arg Asn Arg Phe Phe Ala Thr Ser Val
    850                 855                 860

Trp Leu Asn Thr Ser Glu Tyr Gln Asn Ile Ile Asp Ile Leu Asp Glu
865                 870                 875                 880

Ile Met Gln Leu Asn Thr Leu Arg Asn Glu Cys Ile Thr Glu Asn Trp
                885                 890                 895

Asn Leu Asn Leu Glu Glu Phe Ile Gln Lys Met Lys Glu Ile Glu Lys
            900                 905                 910

Asp Phe Asp Asp Phe Lys Ile Gln Thr Lys Lys Glu Ile Phe Asn Asn
        915                 920                 925

Tyr Tyr Glu Asp Ile Lys Asn Asn Ile Leu Thr Glu Phe Lys Asp Asp
    930                 935                 940

Ile Asn Gly Cys Asp Val Leu Glu Lys Lys Leu Glu Lys Ile Val Ile
945                 950                 955                 960

Phe Asp Asp Glu Thr Lys Phe Glu Ile Asp Lys Lys Ser Asn Ile Leu
                965                 970                 975

Gln Asp Glu Gln Arg Lys Leu Ser Asn Ile Asn Lys Lys Asp Leu Lys
```

-continued

```
            980                 985                 990

Lys Lys Val Asp Gln Tyr Ile Lys  Asp Lys Asp Gln Glu  Ile Lys Ser
        995                 1000                1005

Lys Ile  Leu Cys Arg Ile Ile  Phe Asn Ser Asp Phe  Leu Lys Lys
    1010                 1015                1020

Tyr Lys  Lys Glu Ile Asp Asn  Leu Ile Glu Asp Met  Glu Ser Glu
    1025                 1030                1035

Asn Glu  Asn Lys Phe Gln Glu  Ile Tyr Tyr Pro Lys  Glu Arg Lys
    1040                 1045                1050

Asn Glu  Leu Tyr Ile Tyr Lys  Lys Asn Leu Phe Leu  Asn Ile Gly
    1055                 1060                1065

Asn Pro  Asn Phe Asp Lys Ile  Tyr Gly Leu Ile Ser  Asn Asp Ile
    1070                 1075                1080

Lys Met  Ala Asp Ala Lys Phe  Leu Phe Asn Ile Asp  Gly Lys Asn
    1085                 1090                1095

Ile Arg  Lys Asn Lys Ile Ser  Glu Ile Asp Ala Ile  Leu Lys Asn
    1100                 1105                1110

Leu Asn  Asp Lys Leu Asn Gly  Tyr Ser Lys Glu Tyr  Lys Glu Lys
    1115                 1120                1125

Tyr Ile  Lys Lys Leu Lys Glu  Asn Asp Asp Phe Phe  Ala Lys Asn
    1130                 1135                1140

Ile Gln  Asn Lys Asn Tyr Lys  Ser Phe Glu Lys Asp  Tyr Asn Arg
    1145                 1150                1155

Val Ser  Glu Tyr Lys Lys Ile  Arg Asp Leu Val Glu  Phe Asn Tyr
    1160                 1165                1170

Leu Asn  Lys Ile Glu Ser Tyr  Leu Ile Asp Ile Asn  Trp Lys Leu
    1175                 1180                1185

Ala Ile  Gln Met Ala Arg Phe  Glu Arg Asp Met His  Tyr Ile Val
    1190                 1195                1200

Asn Gly  Leu Arg Glu Leu Gly  Ile Ile Lys Leu Ser  Gly Tyr Asn
    1205                 1210                1215

Thr Gly  Ile Ser Arg Ala Tyr  Pro Lys Arg Asn Gly  Ser Asp Gly
    1220                 1225                1230

Phe Tyr  Thr Thr Thr Ala Tyr  Tyr Lys Phe Phe Asp  Glu Glu Ser
    1235                 1240                1245

Tyr Lys  Lys Phe Glu Lys Ile  Cys Tyr Gly Phe Gly  Ile Asp Leu
    1250                 1255                1260

Ser Glu  Asn Ser Glu Ile Asn  Lys Pro Glu Asn Glu  Ser Ile Arg
    1265                 1270                1275

Asn Tyr  Ile Ser His Phe Tyr  Ile Val Arg Asn Pro  Phe Ala Asp
    1280                 1285                1290

Tyr Ser  Ile Ala Glu Gln Ile  Asp Arg Val Ser Asn  Leu Leu Ser
    1295                 1300                1305

Tyr Ser  Thr Arg Tyr Asn Asn  Ser Thr Tyr Ala Ser  Val Phe Glu
    1310                 1315                1320

Val Phe  Lys Lys Asp Val Asn  Leu Asp Tyr Asp Glu  Leu Lys Lys
    1325                 1330                1335

Lys Phe  Lys Leu Ile Gly Asn  Asn Asp Ile Leu Glu  Arg Leu Met
    1340                 1345                1350

Lys Pro  Lys Lys Val Ser Val  Leu Glu Leu Glu Ser  Tyr Asn Ser
    1355                 1360                1365

Asp Tyr  Ile Lys Asn Leu Ile  Ile Glu Leu Leu Thr  Lys Ile Glu
    1370                 1375                1380
```

```
Asn Thr  Asn Asp Thr Leu Gly  Asp Pro Asn Ser Ser  Ser Val Asp
    1385                 1390                 1395

Lys Leu  Ala Ala Ala Leu Glu  His His His His His  His
    1400                 1405                 1410


<210> SEQ ID NO 7
<211> LENGTH: 5391
<212> TYPE: DNA
<213> ORGANISM: Artificial Sequence
<220> FEATURE:
<223> OTHER INFORMATION: Synthetic

<400> SEQUENCE: 7

atgaaaatcg aagaaggtaa actggtaatc tggattaacg gcgataaagg ctataacggt     60

ctcgctgaag tcggtaagaa attcgagaaa gataccggaa ttaaagtcac cgttgagcat    120

ccggataaac tggaagagaa attcccacag gttgcggcaa ctggcgatgg ccctgacatt    180

atcttctggg cacacgaccg ctttggtggc tacgctcaat ctggcctgtt ggctgaaatc    240

accccggaca aagcgttcca ggacaagctg tatccgttta cctgggatgc cgtacgttac    300

aacggcaagc tgattgctta cccgatcgct gttgaagcgt tatcgctgat ttataacaaa    360

gatctgctgc cgaacccgcc aaaaacctgg gaagagatcc cggcgctgga taaagaactg    420

aaagcgaaag gtaagagcgc gctgatgttc aacctgcaag aaccgtactt cacctggccg    480

ctgattgctg ctgacggggg ttatgcgttc aagtatgaaa acggcaagta cgacattaaa    540

gacgtgggcg tggataacgc tggcgcgaaa gcgggtctga ccttcctggt tgacctgatt    600

aaaaacaaac acatgaatgc agacaccgat tactccatcg cagaagctgc ctttaataaa    660

ggcgaaacag cgatgaccat caacggcccg tgggcatggt ccaacatcga caccagcaaa    720

gtgaattatg gtgtaacggt actgccgacc ttcaagggtc aaccatccaa accgttcgtt    780

ggcgtgctga gcgcaggtat taacgccgcc agtccgaaca aagagctggc aaaagagttc    840

ctcgaaaact atctgctgac tgatgaaggt ctggaagcgg ttaataaaga caaaccgctg    900

ggtgccgtag cgctgaagtc ttacgaggaa gagttggtga aagatccgcg tattgccgcc    960

actatggaaa acgcccagaa aggtgaaatc atgccgaaca tcccgcagat gtccgctttc   1020

tggtatgccg tgcgtactgc ggtgatcaac gccgccagcg gtcgtcagac tgtcgatgaa   1080

gccctgaaag acgcgcagac taattcgagc tcgaacaaca acaacaataa caataacaac   1140

aacctcggga tcgagggaag ggtaacctg tttggtcata aacgttggta tgaagtgcgc   1200

gacaaaaaag actttaaaat caaacgcaag gtgaaagtga aacgcaacta tgatggcaac   1260

aaatatatcc tgaacatcaa cgagaacaac aacaaagaga agatcgataa taataaattc   1320

atccgcaaat acatcaacta caaaaaaaac gataacatcc tgaaagaatt cacccgcaag   1380

tttcatgcag gcaacattct gtttaaactg aaaggcaaag aaggcatcat tcgcatcgaa   1440

aacaatgatg attttctgga aaccgaagag gtggtgctgt atattgaagc atatggcaaa   1500

agcgaaaaac tgaaggcact gggcattacc aaaaaaaaga ttatcgatga agccattcgc   1560

cagggtatta ccaaagatga caaaaagatc gagatcaagc gccaagaaaa cgaagaagaa   1620

atcgaaattg atatccgcga cgagtatacc aataaaaccc tgaatgattg cagcattatt   1680

ctgcgcatta tcgagaatga tgagctggaa acgaaaaaga gcatctacga gatcttcaaa   1740

aacatcaaca tgagcctgta caaaatcatc gagaaaatta tcgaaaacga aaccgagaag   1800

gtgttcgaga atcgctatta tgaagaacat ctgcgtgaga aactgctgaa agatgataaa   1860
```

attgatgtga tcctgaccaa cttcatggaa atccgcgaaa agattaaaag caacctggaa 1920
attctgggct tcgtgaaatt ctatctgaat gttggtggcg acaagaaaaa aagcaagaac 1980
aagaaaatgc tggtcgaaaa aattctgaac attaacgttg atctgaccgt ggaagatatt 2040
gccgattttg tgattaaaga gctggaattc tggaacatca ccaaacgcat tgagaaggtg 2100
aaaaaagtga acaacgagtt cctggaaaaa cgtcgtaatc gcacctatat caaaagctat 2160
gttctgctgg ataagcacga gaaattcaaa attgaacgcg agaacaaaaa ggacaaaatc 2220
gtgaagtttt tcgtggaaaa tatcaaaaac aacagcatca aagaaaaaat cgagaagatc 2280
ctggccgagt tcaaaatcga tgaactgatc aaaaagctgg aaaaagaact gaaaaaaggc 2340
aactgcgata ccgaaatttt cggcatcttt aagaaacact ataaagtgaa cttcgatagc 2400
aaaaaattca gcaaaaagag cgacgaagag aaagagctgt ataagatcat ttaccgctat 2460
ctgaaaggcc gtattgaaaa aatcctggtg aatgaacaga aagtgcgcct gaaaaaaatg 2520
gaaaaaattg agattgagaa gattctgaac gagagcatcc tgagtgagaa aatcctgaaa 2580
cgtgttaaac agtataccct ggaacacatt atgtatctgg gtaaactgcg ccataacgat 2640
attgatatga ccaccgttaa taccgatgat ttcagccgtc tgcatgcaaa agaagaactg 2700
gatctggaac tgattacctt ttttgcaagc accaatatgg aactgaacaa gatctttagc 2760
cgtgaaaaca ttaacaacga cgagaacatt gatttctttg gtggtgatcg cgagaaaaac 2820
tatgtcctgg ataaaaagat cctgaatagc aaaatcaaga tcatccgcga tctggatttc 2880
atcgacaata agaacaacat taccaacaac tttattcgca aatttaccaa aattggcacc 2940
aatgaacgca accgtattct gcatgccatt agcaaagaac gtgatctgca gggcacccag 3000
gatgattata acaaagtgat taacatcatc cagaacctga aaatctccga tgaagaagtt 3060
agcaaagcac tgaatctgga tgtggtgttc aaagataaga aaaatatcat caccaagatc 3120
aacgatatca aaatcagcga agagaacaat aacgacatca aatatctgcc gagctttagc 3180
aaagttctgc cggaaattct taatctgtat cgcaataacc cgaaaaacga accgtttgat 3240
accatcgaaa cagagaaaat tgttctgaac gccctgatct atgtgaacaa agaactgtac 3300
aagaaactga tcctggaaga tgatctggaa gagaacgaat cgaaaaacat ctttctgcaa 3360
gagctgaaaa agaccctggg taacattgat gagatcgatg aaaacatcat cgaaaattac 3420
tacaagaacg cacagattag cgcaagcaaa ggtaataaca aagccatcaa aaaataccag 3480
aaaaaggtga tcgaatgcta cattggttat ctgcgcaaaa actacgaaga actgttcgat 3540
ttcagcgatt tcaaaatgaa catccaagag atcaagaagc agatcaagga cattaacgac 3600
aacaaaacct atgaacgcat caccgttaaa accagcgata aaaccattgt gatcaacgac 3660
gatttcgagt acatcattag catttttgca ctgctgaatt ccaacgccgt gatcaacaaa 3720
attcgcaatc gctttttgc caccagtgtt tggctgaata ccagcgaata tcagaacatt 3780
atcgatatcc tggatgagat catgcagctg aatacactgc gtaatgaatg cattaccgaa 3840
aactggaatc tgaaccttga agaatttatt cagaaaatga aagagatcga gaaagacttc 3900
gacgacttca aaatccagac caaaaaagaa atcttcaaca actactacga ggacatcaaa 3960
aataacattc tgaccgaatt caaagacgat attaacggct gtgacgtgct ggaaaagaag 4020
ttggaaaaga tcgttatctt cgatgacgaa accaaattcg aaatcgacaa aaagtccaac 4080
atccttcagg atgaacagcg taaactgagc aatatcaaca agaaagacct gaagaagaag 4140
gtcgaccagt acatcaaaga caaagaccaa gaaattaaga gcaaaatcct gtgccgcatc 4200
atctttaaca gcgactttct gaaaaagtat aagaaagaga ttgacaacct gatcgaggat 4260

```
atggaaagcg agaacgaaaa caagtttcaa gagatctact atccgaaaga acgcaaaaac   4320

gagctgtaca tctacaagaa gaacctgttc ctgaatattg gcaacccgaa cttcgacaaa   4380

atctatggtc tgatcagcaa cgacattaaa atggccgatg caaaattcct gtttaatatc   4440

gatggtaaaa acatccgtaa aaacaaaatt agcgagatcg acgcgatcct gaaaaacctg   4500

aacgataaac tgaatggcta cagcaaagaa tataaagaga aatacattaa aaagctgaaa   4560

gaaaatgacg acttcttcgc caagaacatc cagaataaaa actataaaag cttcgagaag   4620

gactacaatc gcgtgtccga atataagaaa attcgtgatc tggtggaatt caactatctg   4680

aacaaaatcg aaagctatct gatcgatatc aactggaaac tggcaattca gatggcacgt   4740

tttgagcgtg atatgcacta tattgttaat ggtctgcgtg aactgggcat cattaaactg   4800

agtggttata ataccggcat tagccgtgca tatccgaaac gtaatggttc cgatggtttt   4860

tataccacca ccgcctatta caaatttttc gacgaagaaa gctacaagaa atttgagaaa   4920

atttgctacg gcttcggcat tgatctgagc gaaaatagcg aaattaacaa gccggaaaat   4980

gagagcattc gcaactatat ctcccacttt tatatcgtgc gtaatccgtt tgccgattat   5040

agcattgcag agcagattga tcgtgttagc aatctgctga gctatagtac ccgttataac   5100

aatagcacct atgccagcgt gtttgaggtg tttaaaaagg atgttaacct ggactatgac   5160

gagctgaaga aaaagttcaa actgatcggc aacaatgaca tcctggaacg tctgatgaaa   5220

ccgaaaaaag ttagtgtgct ggaacttgag agctacaaca gcgattatat caagaacctg   5280

attatcgagc tgctgaccaa gattgaaaat accaatgata ccctggatcc gaattcgagc   5340

tccgtcgaca agcttgcggc cgcactcgag caccaccacc accaccactg a            5391
```

```
<210> SEQ ID NO 8
<211> LENGTH: 1796
<212> TYPE: PRT
<213> ORGANISM: Artificial Sequence
<220> FEATURE:
<223> OTHER INFORMATION: Synthetic

<400> SEQUENCE: 8

Met Lys Ile Glu Glu Gly Lys Leu Val Ile Trp Ile Asn Gly Asp Lys
1               5                   10                  15

Gly Tyr Asn Gly Leu Ala Glu Val Gly Lys Lys Phe Glu Lys Asp Thr
            20                  25                  30

Gly Ile Lys Val Thr Val Glu His Pro Asp Lys Leu Glu Glu Lys Phe
        35                  40                  45

Pro Gln Val Ala Ala Thr Gly Asp Gly Pro Asp Ile Ile Phe Trp Ala
    50                  55                  60

His Asp Arg Phe Gly Gly Tyr Ala Gln Ser Gly Leu Leu Ala Glu Ile
65                  70                  75                  80

Thr Pro Asp Lys Ala Phe Gln Asp Lys Leu Tyr Pro Phe Thr Trp Asp
                85                  90                  95

Ala Val Arg Tyr Asn Gly Lys Leu Ile Ala Tyr Pro Ile Ala Val Glu
            100                 105                 110

Ala Leu Ser Leu Ile Tyr Asn Lys Asp Leu Leu Pro Asn Pro Pro Lys
        115                 120                 125

Thr Trp Glu Glu Ile Pro Ala Leu Asp Lys Glu Leu Lys Ala Lys Gly
    130                 135                 140

Lys Ser Ala Leu Met Phe Asn Leu Gln Glu Pro Tyr Phe Thr Trp Pro
145                 150                 155                 160
```

```
Leu Ile Ala Ala Asp Gly Gly Tyr Ala Phe Lys Tyr Glu Asn Gly Lys
                165                 170                 175

Tyr Asp Ile Lys Asp Val Gly Val Asp Asn Ala Gly Ala Lys Ala Gly
            180                 185                 190

Leu Thr Phe Leu Val Asp Leu Ile Lys Asn Lys His Met Asn Ala Asp
        195                 200                 205

Thr Asp Tyr Ser Ile Ala Glu Ala Ala Phe Asn Lys Gly Glu Thr Ala
    210                 215                 220

Met Thr Ile Asn Gly Pro Trp Ala Trp Ser Asn Ile Asp Thr Ser Lys
225                 230                 235                 240

Val Asn Tyr Gly Val Thr Val Leu Pro Thr Phe Lys Gly Gln Pro Ser
                245                 250                 255

Lys Pro Phe Val Gly Val Leu Ser Ala Gly Ile Asn Ala Ala Ser Pro
            260                 265                 270

Asn Lys Glu Leu Ala Lys Glu Phe Leu Glu Asn Tyr Leu Leu Thr Asp
        275                 280                 285

Glu Gly Leu Glu Ala Val Asn Lys Asp Lys Pro Leu Gly Ala Val Ala
    290                 295                 300

Leu Lys Ser Tyr Glu Glu Glu Leu Val Lys Asp Pro Arg Ile Ala Ala
305                 310                 315                 320

Thr Met Glu Asn Ala Gln Lys Gly Glu Ile Met Pro Asn Ile Pro Gln
                325                 330                 335

Met Ser Ala Phe Trp Tyr Ala Val Arg Thr Ala Val Ile Asn Ala Ala
            340                 345                 350

Ser Gly Arg Gln Thr Val Asp Glu Ala Leu Lys Asp Ala Gln Thr Asn
        355                 360                 365

Ser Ser Ser Asn Asn Asn Asn Asn Asn Asn Asn Asn Asn Leu Gly Ile
    370                 375                 380

Glu Gly Arg Gly Asn Leu Phe Gly His Lys Arg Trp Tyr Glu Val Arg
385                 390                 395                 400

Asp Lys Lys Asp Phe Lys Ile Lys Arg Lys Val Lys Val Lys Arg Asn
                405                 410                 415

Tyr Asp Gly Asn Lys Tyr Ile Leu Asn Ile Asn Glu Asn Asn Asn Lys
            420                 425                 430

Glu Lys Ile Asp Asn Asn Lys Phe Ile Arg Lys Tyr Ile Asn Tyr Lys
        435                 440                 445

Lys Asn Asp Asn Ile Leu Lys Glu Phe Thr Arg Lys Phe His Ala Gly
    450                 455                 460

Asn Ile Leu Phe Lys Leu Lys Gly Lys Glu Gly Ile Ile Arg Ile Glu
465                 470                 475                 480

Asn Asn Asp Asp Phe Leu Glu Thr Glu Glu Val Val Leu Tyr Ile Glu
                485                 490                 495

Ala Tyr Gly Lys Ser Glu Lys Leu Lys Ala Leu Gly Ile Thr Lys Lys
            500                 505                 510

Lys Ile Ile Asp Glu Ala Ile Arg Gln Gly Ile Thr Lys Asp Asp Lys
        515                 520                 525

Lys Ile Glu Ile Lys Arg Gln Glu Asn Glu Glu Glu Ile Glu Ile Asp
    530                 535                 540

Ile Arg Asp Glu Tyr Thr Asn Lys Thr Leu Asn Asp Cys Ser Ile Ile
545                 550                 555                 560

Leu Arg Ile Ile Glu Asn Asp Glu Leu Glu Thr Lys Lys Ser Ile Tyr
                565                 570                 575

Glu Ile Phe Lys Asn Ile Asn Met Ser Leu Tyr Lys Ile Ile Glu Lys
```

-continued

```
            580                 585                 590

Ile Ile Glu Asn Glu Thr Glu Lys Val Phe Glu Asn Arg Tyr Tyr Glu
        595                 600                 605

Glu His Leu Arg Glu Lys Leu Leu Lys Asp Asp Lys Ile Asp Val Ile
    610                 615                 620

Leu Thr Asn Phe Met Glu Ile Arg Glu Lys Ile Lys Ser Asn Leu Glu
625                 630                 635                 640

Ile Leu Gly Phe Val Lys Phe Tyr Leu Asn Val Gly Gly Asp Lys Lys
                645                 650                 655

Lys Ser Lys Asn Lys Lys Met Leu Val Glu Lys Ile Leu Asn Ile Asn
            660                 665                 670

Val Asp Leu Thr Val Glu Asp Ile Ala Asp Phe Val Ile Lys Glu Leu
        675                 680                 685

Glu Phe Trp Asn Ile Thr Lys Arg Ile Glu Lys Val Lys Lys Val Asn
    690                 695                 700

Asn Glu Phe Leu Glu Lys Arg Arg Asn Arg Thr Tyr Ile Lys Ser Tyr
705                 710                 715                 720

Val Leu Leu Asp Lys His Glu Lys Phe Lys Ile Glu Arg Glu Asn Lys
                725                 730                 735

Lys Asp Lys Ile Val Lys Phe Phe Val Glu Asn Ile Lys Asn Asn Ser
            740                 745                 750

Ile Lys Glu Lys Ile Glu Lys Ile Leu Ala Glu Phe Lys Ile Asp Glu
        755                 760                 765

Leu Ile Lys Lys Leu Glu Lys Glu Leu Lys Lys Gly Asn Cys Asp Thr
    770                 775                 780

Glu Ile Phe Gly Ile Phe Lys Lys His Tyr Lys Val Asn Phe Asp Ser
785                 790                 795                 800

Lys Lys Phe Ser Lys Lys Ser Asp Glu Glu Lys Glu Leu Tyr Lys Ile
                805                 810                 815

Ile Tyr Arg Tyr Leu Lys Gly Arg Ile Glu Lys Ile Leu Val Asn Glu
            820                 825                 830

Gln Lys Val Arg Leu Lys Lys Met Glu Lys Ile Glu Ile Glu Lys Ile
        835                 840                 845

Leu Asn Glu Ser Ile Leu Ser Glu Lys Ile Leu Lys Arg Val Lys Gln
    850                 855                 860

Tyr Thr Leu Glu His Ile Met Tyr Leu Gly Lys Leu Arg His Asn Asp
865                 870                 875                 880

Ile Asp Met Thr Thr Val Asn Thr Asp Asp Phe Ser Arg Leu His Ala
                885                 890                 895

Lys Glu Glu Leu Asp Leu Glu Leu Ile Thr Phe Phe Ala Ser Thr Asn
            900                 905                 910

Met Glu Leu Asn Lys Ile Phe Ser Arg Glu Asn Ile Asn Asn Asp Glu
        915                 920                 925

Asn Ile Asp Phe Phe Gly Gly Asp Arg Glu Lys Asn Tyr Val Leu Asp
    930                 935                 940

Lys Lys Ile Leu Asn Ser Lys Ile Lys Ile Ile Arg Asp Leu Asp Phe
945                 950                 955                 960

Ile Asp Asn Lys Asn Asn Ile Thr Asn Asn Phe Ile Arg Lys Phe Thr
                965                 970                 975

Lys Ile Gly Thr Asn Glu Arg Asn Arg Ile Leu His Ala Ile Ser Lys
            980                 985                 990

Glu Arg Asp Leu Gln Gly Thr Gln  Asp Asp Tyr Asn Lys  Val Ile Asn
        995                 1000                1005
```

```
Ile Ile Gln Asn Leu Lys Ile Ser Asp Glu Glu Val Ser Lys Ala
    1010                1015                1020

Leu Asn Leu Asp Val Val Phe Lys Asp Lys Lys Asn Ile Ile Thr
    1025                1030                1035

Lys Ile Asn Asp Ile Lys Ile Ser Glu Glu Asn Asn Asn Asp Ile
    1040                1045                1050

Lys Tyr Leu Pro Ser Phe Ser Lys Val Leu Pro Glu Ile Leu Asn
    1055                1060                1065

Leu Tyr Arg Asn Asn Pro Lys Asn Glu Pro Phe Asp Thr Ile Glu
    1070                1075                1080

Thr Glu Lys Ile Val Leu Asn Ala Leu Ile Tyr Val Asn Lys Glu
    1085                1090                1095

Leu Tyr Lys Lys Leu Ile Leu Glu Asp Asp Leu Glu Glu Asn Glu
    1100                1105                1110

Ser Lys Asn Ile Phe Leu Gln Glu Leu Lys Lys Thr Leu Gly Asn
    1115                1120                1125

Ile Asp Glu Ile Asp Glu Asn Ile Ile Glu Asn Tyr Tyr Lys Asn
    1130                1135                1140

Ala Gln Ile Ser Ala Ser Lys Gly Asn Asn Lys Ala Ile Lys Lys
    1145                1150                1155

Tyr Gln Lys Lys Val Ile Glu Cys Tyr Ile Gly Tyr Leu Arg Lys
    1160                1165                1170

Asn Tyr Glu Glu Leu Phe Asp Phe Ser Asp Phe Lys Met Asn Ile
    1175                1180                1185

Gln Glu Ile Lys Lys Gln Ile Lys Asp Ile Asn Asp Asn Lys Thr
    1190                1195                1200

Tyr Glu Arg Ile Thr Val Lys Thr Ser Asp Lys Thr Ile Val Ile
    1205                1210                1215

Asn Asp Asp Phe Glu Tyr Ile Ile Ser Ile Phe Ala Leu Leu Asn
    1220                1225                1230

Ser Asn Ala Val Ile Asn Lys Ile Arg Asn Arg Phe Phe Ala Thr
    1235                1240                1245

Ser Val Trp Leu Asn Thr Ser Glu Tyr Gln Asn Ile Ile Asp Ile
    1250                1255                1260

Leu Asp Glu Ile Met Gln Leu Asn Thr Leu Arg Asn Glu Cys Ile
    1265                1270                1275

Thr Glu Asn Trp Asn Leu Asn Leu Glu Glu Phe Ile Gln Lys Met
    1280                1285                1290

Lys Glu Ile Glu Lys Asp Phe Asp Asp Phe Lys Ile Gln Thr Lys
    1295                1300                1305

Lys Glu Ile Phe Asn Asn Tyr Tyr Glu Asp Ile Lys Asn Asn Ile
    1310                1315                1320

Leu Thr Glu Phe Lys Asp Asp Ile Asn Gly Cys Asp Val Leu Glu
    1325                1330                1335

Lys Lys Leu Glu Lys Ile Val Ile Phe Asp Asp Glu Thr Lys Phe
    1340                1345                1350

Glu Ile Asp Lys Lys Ser Asn Ile Leu Gln Asp Glu Gln Arg Lys
    1355                1360                1365

Leu Ser Asn Ile Asn Lys Lys Asp Leu Lys Lys Lys Val Asp Gln
    1370                1375                1380

Tyr Ile Lys Asp Lys Asp Gln Glu Ile Lys Ser Lys Ile Leu Cys
    1385                1390                1395
```

```
Arg Ile  Ile Phe Asn Ser Asp  Phe Leu Lys Lys Tyr  Lys Lys Glu
    1400                 1405                 1410

Ile Asp  Asn Leu Ile Glu Asp  Met Glu Ser Glu Asn  Glu Asn Lys
    1415                 1420                 1425

Phe Gln  Glu Ile Tyr Tyr Pro  Lys Glu Arg Lys Asn  Glu Leu Tyr
    1430                 1435                 1440

Ile Tyr  Lys Lys Asn Leu Phe  Leu Asn Ile Gly Asn  Pro Asn Phe
    1445                 1450                 1455

Asp Lys  Ile Tyr Gly Leu Ile  Ser Asn Asp Ile Lys  Met Ala Asp
    1460                 1465                 1470

Ala Lys  Phe Leu Phe Asn Ile  Asp Gly Lys Asn Ile  Arg Lys Asn
    1475                 1480                 1485

Lys Ile  Ser Glu Ile Asp Ala  Ile Leu Lys Asn Leu  Asn Asp Lys
    1490                 1495                 1500

Leu Asn  Gly Tyr Ser Lys Glu  Tyr Lys Glu Lys Tyr  Ile Lys Lys
    1505                 1510                 1515

Leu Lys  Glu Asn Asp Asp Phe  Phe Ala Lys Asn Ile  Gln Asn Lys
    1520                 1525                 1530

Asn Tyr  Lys Ser Phe Glu Lys  Asp Tyr Asn Arg Val  Ser Glu Tyr
    1535                 1540                 1545

Lys Lys  Ile Arg Asp Leu Val  Glu Phe Asn Tyr Leu  Asn Lys Ile
    1550                 1555                 1560

Glu Ser  Tyr Leu Ile Asp Ile  Asn Trp Lys Leu Ala  Ile Gln Met
    1565                 1570                 1575

Ala Arg  Phe Glu Arg Asp Met  His Tyr Ile Val Asn  Gly Leu Arg
    1580                 1585                 1590

Glu Leu  Gly Ile Ile Lys Leu  Ser Gly Tyr Asn Thr  Gly Ile Ser
    1595                 1600                 1605

Arg Ala  Tyr Pro Lys Arg Asn  Gly Ser Asp Gly Phe  Tyr Thr Thr
    1610                 1615                 1620

Thr Ala  Tyr Tyr Lys Phe Phe  Asp Glu Glu Ser Tyr  Lys Lys Phe
    1625                 1630                 1635

Glu Lys  Ile Cys Tyr Gly Phe  Gly Ile Asp Leu Ser  Glu Asn Ser
    1640                 1645                 1650

Glu Ile  Asn Lys Pro Glu Asn  Glu Ser Ile Arg Asn  Tyr Ile Ser
    1655                 1660                 1665

His Phe  Tyr Ile Val Arg Asn  Pro Phe Ala Asp Tyr  Ser Ile Ala
    1670                 1675                 1680

Glu Gln  Ile Asp Arg Val Ser  Asn Leu Leu Ser Tyr  Ser Thr Arg
    1685                 1690                 1695

Tyr Asn  Asn Ser Thr Tyr Ala  Ser Val Phe Glu Val  Phe Lys Lys
    1700                 1705                 1710

Asp Val  Asn Leu Asp Tyr Asp  Glu Leu Lys Lys Lys  Phe Lys Leu
    1715                 1720                 1725

Ile Gly  Asn Asn Asp Ile Leu  Glu Arg Leu Met Lys  Pro Lys Lys
    1730                 1735                 1740

Val Ser  Val Leu Glu Leu Glu  Ser Tyr Asn Ser Asp  Tyr Ile Lys
    1745                 1750                 1755

Asn Leu  Ile Ile Glu Leu Leu  Thr Lys Ile Glu Asn  Thr Asn Asp
    1760                 1765                 1770

Thr Leu  Asp Pro Asn Ser Ser  Ser Val Asp Lys Leu  Ala Ala Ala
    1775                 1780                 1785

Leu Glu  His His His His His  His
```

1790 1795

<210> SEQ ID NO 9
<211> LENGTH: 3525
<212> TYPE: DNA
<213> ORGANISM: Artificial Sequence
<220> FEATURE:
<223> OTHER INFORMATION: Synthetic

<400> SEQUENCE: 9
atgaaagtga ccaaagtgga tggcatcagc cacaaaaaat acatcgaaga aggcaaactg 60
gttaaaagca ccagcgaaga aaatcgtacc agcgaacgtc tgagcgaact gctgagcatt 120
cgtctggata tctatatcaa aaatccggat aatgccagcg aggaagaaaa ccgtattcgt 180
cgtgaaaacc tgaaaaagtt cttcagcaat aaagtgctgc acctgaaaga tagcgttctg 240
tatctgaaaa accgcaaaga aaaaaatgcc gtgcaggaca aaaactatag cgaagaggat 300
atcagcgagt atgacctgaa gaacaaaaat agctttagcg tgctgaaaaa aatcctgctg 360
aatgaagatg tgaatagcga ggaactggaa atctttcgta aagatgttga agccaagctg 420
aacaaaatca acagcctgaa atatagcttt gaagaaaaca aggccaacta tcagaaaatc 480
aacgagaaca acgtggaaaa agttggtggt aaaagcaaac gcaacatcat ctatgattat 540
tatcgcgaaa gcgcgaaacg caacgattat atcaataatg tgcaagaggc cttcgacaaa 600
ctgtacaaaa aagaggacat cgaaaaactg tttttttctga tcgagaacag caagaagcac 660
gagaaataca aaatccgcga gtactaccat aaaatcatcg gtcgcaaaaa cgataaagag 720
aacttcgcca aaatcatcta cgaagaaatt cagaacgtga acaacatcaa agaactgatc 780
gaaaaaattc cggacatgag cgagctgaag aaaagccagg tgttctataa atactacctg 840
gacaaagagg aactgaacga caaaaacatc aaatatgcct tttgccactt cgtcgaaatt 900
gaaatgagcc agctgcttaa aaactacgtg tataaacgcc tgagcaacat cagcaacgat 960
aaaatcaaac gtatctttga atatcagaat ctgaagaaac tgattgaaaa caaactgctg 1020
aacaagctgg atacctatgt tcgtaattgc ggcaaataca actactatct gcaggttggt 1080
gaaattgcaa ccagcgattt tattgcacgt aatcgtcaga atgaagcctt tctgcgtaac 1140
attattggtg ttagcagcgt tgcatatttt agcctgcgta atattctgga aaccgaaaac 1200
gaaaatggca ttaccggtcg tatgcgtggt aaaaccgtta aaaacaataa aggcgaagag 1260
aagtatgtga gcggtgaagt ggataaaatc tataacgaaa acaagcagaa cgaagtgaaa 1320
gaaaatctga aaatgtttta cagctacgac ttcaacatgg acaacaaaaa cgagatcgaa 1380
gatttcttcg ccaacattga tgaagccatt agcagtattc gtcatggcat tgtgcacttt 1440
aatctggaac ttgaaggcaa agacatcttc gcgtttaaaa acattgcacc gagcgagatc 1500
agcaaaaaaa tgtttcagaa cgagattaac gaaaaaaaac tgaaactgaa aatcttcaaa 1560
cagctgaata gcgccaacgt gttcaactat tatgagaaag acgtgatcat caaatacctt 1620
aaaaacacca aattcaactt cgtgaataaa aacatcccgt ttgttccgag cttcaccaaa 1680
ctgtataaca aaattgaaga tctgcgcaat accctgaagt ttttttggag cgttccgaaa 1740
gacaaagaag aaaaagacgc acagatctac ctgcttaaga acatctatta tggcgaattt 1800
ctgaacaaat tcgtgaaaaa tagcaaagtg ttcttcaaaa tcaccaacga ggtgatcaag 1860
attaacaaac agcgtaatca gaaaaccggt cactacaaat accagaagtt tgagaacatt 1920
gaaaaaaccg tgccggttga atatctggca attattcaga gccgtgagat gattaacaac 1980
caggataaag aagagaaaaa cacctacatc gatttcatcc agcagatctt tctgaaaggc 2040

```
tttatcgatt acctgaacaa gaacaacctg aagtatatcg agtcgaacaa caataacgac   2100

aacaacgaca tctttagcaa aatcaaaatc aagaaagata ataaagaaaa atacgacaag   2160

atcctgaaaa actatgagaa gcacaaccgc aacaaagaaa ttccgcatga gatcaatgaa   2220

tttgtgcgcg aaattaaact gggcaaaatc ctgaaataca ccgagaacct gaatatgttc   2280

tatctgattc tgaagctgct gaaccataaa gagctgacca atctgaaagg tagcctggaa   2340

aaatatcaga gcgcaaacaa agaagagaca ttttctgacg aactggaact gattaatctg   2400

ctgaatctgg ataataaccg tgtgaccgaa gattttgaac tggaagcaaa tgaaatcggc   2460

aaattcctgg atttcaatga gaacaaaatt aaggaccgga aagagcttaa aaagtttgat   2520

accaacaaaa tctacttcga cggcgagaac attatcaaac atcgtgcctt ttataacatc   2580

aaaaagtatg gcatgctgaa cctgctggaa aaaattgcag ataaagccaa gtacaaaatt   2640

agcctgaaag aacttaaaga gtacagcaac aaaaagaacg aaatcgagaa gaactatacc   2700

atgcagcaga atctgcatcg taaatatgca cgtccgaaaa aagacgagaa attcaacgat   2760

gaggactata aagaatacga gaaagccatt ggcaacatcc agaaatatac ccacttgaaa   2820

aacaaagtgg aatttaacga gctgaattta ctgcagggtc tgctgctgaa aattctgcac   2880

cgtctggttg gttataccag catttgggaa cgtgatctgc gttttcgcct gaaaggtgaa   2940

tttcctgaaa accactatat cgaggaaatt ttcaactttg acaacagcaa aaacgtgaaa   3000

tataagagcg gtcagatcgt cgaaaagtac atcaactttt acaaagaact ttacaaggat   3060

aatgtggaaa aacgcagcat ctacagcgac aagaaagtga aaaagctgaa gcaagaaaag   3120

aaagacctgt acatccgtaa ttatatcgcc cactttaact atatcccgca tgcagaaatt   3180

agtctgctgg aagttctgga aaatctgcgt aaactgctgt catatgatcg caaactgaag   3240

aacgcaatca tgaaaagcat tgtggatatc ctgaaagagt atggttttgt cgccaccttt   3300

aaaatcggtg ccgataagaa aattgagatt cagaccctgg aaagcgagaa aattgtgcat   3360

cttaagaacc ttaaaaagaa aaaactgatg accgatcgca acagcgaaga gttatgtgaa   3420

ctggtgaaag tgatgttcga atacaaagca ctggaagggg atccgaattc gagctccgtc   3480

gacaagcttg cggccgcact cgagcaccac caccaccacc actga                  3525
```

<210> SEQ ID NO 10
<211> LENGTH: 1174
<212> TYPE: PRT
<213> ORGANISM: Artificial Sequence
<220> FEATURE:
<223> OTHER INFORMATION: Synthetic

<400> SEQUENCE: 10

```
Met Lys Val Thr Lys Val Asp Gly Ile Ser His Lys Lys Tyr Ile Glu
1               5                   10                  15

Glu Gly Lys Leu Val Lys Ser Thr Ser Glu Glu Asn Arg Thr Ser Glu
            20                  25                  30

Arg Leu Ser Glu Leu Leu Ser Ile Arg Leu Asp Ile Tyr Ile Lys Asn
        35                  40                  45

Pro Asp Asn Ala Ser Glu Glu Glu Asn Arg Ile Arg Arg Glu Asn Leu
    50                  55                  60

Lys Lys Phe Phe Ser Asn Lys Val Leu His Leu Lys Asp Ser Val Leu
65                  70                  75                  80

Tyr Leu Lys Asn Arg Lys Glu Lys Asn Ala Val Gln Asp Lys Asn Tyr
                85                  90                  95
```

```
Ser Glu Glu Asp Ile Ser Glu Tyr Asp Leu Lys Asn Lys Asn Ser Phe
            100                 105                 110

Ser Val Leu Lys Lys Ile Leu Leu Asn Glu Asp Val Asn Ser Glu Glu
        115                 120                 125

Leu Glu Ile Phe Arg Lys Asp Val Glu Ala Lys Leu Asn Lys Ile Asn
    130                 135                 140

Ser Leu Lys Tyr Ser Phe Glu Glu Asn Lys Ala Asn Tyr Gln Lys Ile
145                 150                 155                 160

Asn Glu Asn Asn Val Glu Lys Val Gly Gly Lys Ser Lys Arg Asn Ile
                165                 170                 175

Ile Tyr Asp Tyr Tyr Arg Glu Ser Ala Lys Arg Asn Asp Tyr Ile Asn
            180                 185                 190

Asn Val Gln Glu Ala Phe Asp Lys Leu Tyr Lys Lys Glu Asp Ile Glu
        195                 200                 205

Lys Leu Phe Phe Leu Ile Glu Asn Ser Lys Lys His Glu Lys Tyr Lys
    210                 215                 220

Ile Arg Glu Tyr Tyr His Lys Ile Ile Gly Arg Lys Asn Asp Lys Glu
225                 230                 235                 240

Asn Phe Ala Lys Ile Ile Tyr Glu Glu Ile Gln Asn Val Asn Asn Ile
                245                 250                 255

Lys Glu Leu Ile Glu Lys Ile Pro Asp Met Ser Glu Leu Lys Lys Ser
            260                 265                 270

Gln Val Phe Tyr Lys Tyr Tyr Leu Asp Lys Glu Glu Leu Asn Asp Lys
        275                 280                 285

Asn Ile Lys Tyr Ala Phe Cys His Phe Val Glu Ile Glu Met Ser Gln
    290                 295                 300

Leu Leu Lys Asn Tyr Val Tyr Lys Arg Leu Ser Asn Ile Ser Asn Asp
305                 310                 315                 320

Lys Ile Lys Arg Ile Phe Glu Tyr Gln Asn Leu Lys Lys Leu Ile Glu
                325                 330                 335

Asn Lys Leu Leu Asn Lys Leu Asp Thr Tyr Val Arg Asn Cys Gly Lys
            340                 345                 350

Tyr Asn Tyr Tyr Leu Gln Val Gly Glu Ile Ala Thr Ser Asp Phe Ile
        355                 360                 365

Ala Arg Asn Arg Gln Asn Glu Ala Phe Leu Arg Asn Ile Ile Gly Val
    370                 375                 380

Ser Ser Val Ala Tyr Phe Ser Leu Arg Asn Ile Leu Glu Thr Glu Asn
385                 390                 395                 400

Glu Asn Gly Ile Thr Gly Arg Met Arg Gly Lys Thr Val Lys Asn Asn
                405                 410                 415

Lys Gly Glu Glu Lys Tyr Val Ser Gly Glu Val Asp Lys Ile Tyr Asn
            420                 425                 430

Glu Asn Lys Gln Asn Glu Val Lys Glu Asn Leu Lys Met Phe Tyr Ser
        435                 440                 445

Tyr Asp Phe Asn Met Asp Asn Lys Asn Glu Ile Glu Asp Phe Phe Ala
    450                 455                 460

Asn Ile Asp Glu Ala Ile Ser Ser Ile Arg His Gly Ile Val His Phe
465                 470                 475                 480

Asn Leu Glu Leu Glu Gly Lys Asp Ile Phe Ala Phe Lys Asn Ile Ala
                485                 490                 495

Pro Ser Glu Ile Ser Lys Lys Met Phe Gln Asn Glu Ile Asn Glu Lys
            500                 505                 510

Lys Leu Lys Leu Lys Ile Phe Lys Gln Leu Asn Ser Ala Asn Val Phe
```

```
        515                 520                 525

Asn Tyr Tyr Glu Lys Asp Val Ile Ile Lys Tyr Leu Lys Asn Thr Lys
    530                 535                 540

Phe Asn Phe Val Asn Lys Asn Ile Pro Phe Val Pro Ser Phe Thr Lys
545                 550                 555                 560

Leu Tyr Asn Lys Ile Glu Asp Leu Arg Asn Thr Leu Lys Phe Phe Trp
                565                 570                 575

Ser Val Pro Lys Asp Lys Glu Glu Lys Asp Ala Gln Ile Tyr Leu Leu
            580                 585                 590

Lys Asn Ile Tyr Tyr Gly Glu Phe Leu Asn Lys Phe Val Lys Asn Ser
        595                 600                 605

Lys Val Phe Phe Lys Ile Thr Asn Glu Val Ile Lys Ile Asn Lys Gln
    610                 615                 620

Arg Asn Gln Lys Thr Gly His Tyr Lys Tyr Gln Lys Phe Glu Asn Ile
625                 630                 635                 640

Glu Lys Thr Val Pro Val Glu Tyr Leu Ala Ile Ile Gln Ser Arg Glu
                645                 650                 655

Met Ile Asn Asn Gln Asp Lys Glu Glu Lys Asn Thr Tyr Ile Asp Phe
            660                 665                 670

Ile Gln Gln Ile Phe Leu Lys Gly Phe Ile Asp Tyr Leu Asn Lys Asn
        675                 680                 685

Asn Leu Lys Tyr Ile Glu Ser Asn Asn Asn Asn Asp Asn Asn Asp Ile
    690                 695                 700

Phe Ser Lys Ile Lys Ile Lys Lys Asp Asn Lys Glu Lys Tyr Asp Lys
705                 710                 715                 720

Ile Leu Lys Asn Tyr Glu Lys His Asn Arg Asn Lys Glu Ile Pro His
                725                 730                 735

Glu Ile Asn Glu Phe Val Arg Glu Ile Lys Leu Gly Lys Ile Leu Lys
            740                 745                 750

Tyr Thr Glu Asn Leu Asn Met Phe Tyr Leu Ile Leu Lys Leu Leu Asn
        755                 760                 765

His Lys Glu Leu Thr Asn Leu Lys Gly Ser Leu Glu Lys Tyr Gln Ser
    770                 775                 780

Ala Asn Lys Glu Glu Thr Phe Ser Asp Glu Leu Glu Leu Ile Asn Leu
785                 790                 795                 800

Leu Asn Leu Asp Asn Asn Arg Val Thr Glu Asp Phe Glu Leu Glu Ala
                805                 810                 815

Asn Glu Ile Gly Lys Phe Leu Asp Phe Asn Glu Asn Lys Ile Lys Asp
            820                 825                 830

Arg Lys Glu Leu Lys Lys Phe Asp Thr Asn Lys Ile Tyr Phe Asp Gly
        835                 840                 845

Glu Asn Ile Ile Lys His Arg Ala Phe Tyr Asn Ile Lys Lys Tyr Gly
    850                 855                 860

Met Leu Asn Leu Leu Glu Lys Ile Ala Asp Lys Ala Lys Tyr Lys Ile
865                 870                 875                 880

Ser Leu Lys Glu Leu Lys Glu Tyr Ser Asn Lys Lys Asn Glu Ile Glu
                885                 890                 895

Lys Asn Tyr Thr Met Gln Gln Asn Leu His Arg Lys Tyr Ala Arg Pro
            900                 905                 910

Lys Lys Asp Glu Lys Phe Asn Asp Glu Asp Tyr Lys Glu Tyr Glu Lys
        915                 920                 925

Ala Ile Gly Asn Ile Gln Lys Tyr Thr His Leu Lys Asn Lys Val Glu
    930                 935                 940
```

```
Phe Asn Glu Leu Asn Leu Leu Gln Gly Leu Leu Leu Lys Ile Leu His
945                 950                 955                 960

Arg Leu Val Gly Tyr Thr Ser Ile Trp Glu Arg Asp Leu Arg Phe Arg
                965                 970                 975

Leu Lys Gly Glu Phe Pro Glu Asn His Tyr Ile Glu Glu Ile Phe Asn
            980                 985                 990

Phe Asp Asn Ser Lys Asn Val Lys  Tyr Lys Ser Gly Gln  Ile Val Glu
        995                 1000                 1005

Lys Tyr  Ile Asn Phe Tyr Lys  Glu Leu Tyr Lys Asp  Asn Val Glu
    1010                 1015                 1020

Lys Arg  Ser Ile Tyr Ser Asp  Lys Lys Val Lys Lys  Leu Lys Gln
    1025                 1030                 1035

Glu Lys  Lys Asp Leu Tyr Ile  Arg Asn Tyr Ile Ala  His Phe Asn
    1040                 1045                 1050

Tyr Ile  Pro His Ala Glu Ile  Ser Leu Leu Glu Val  Leu Glu Asn
    1055                 1060                 1065

Leu Arg  Lys Leu Leu Ser Tyr  Asp Arg Lys Leu Lys  Asn Ala Ile
    1070                 1075                 1080

Met Lys  Ser Ile Val Asp Ile  Leu Lys Glu Tyr Gly  Phe Val Ala
    1085                 1090                 1095

Thr Phe  Lys Ile Gly Ala Asp  Lys Lys Ile Glu Ile  Gln Thr Leu
    1100                 1105                 1110

Glu Ser  Glu Lys Ile Val His  Leu Lys Asn Leu Lys  Lys Lys Lys
    1115                 1120                 1125

Leu Met  Thr Asp Arg Asn Ser  Glu Glu Leu Cys Glu  Leu Val Lys
    1130                 1135                 1140

Val Met  Phe Glu Tyr Lys Ala  Leu Glu Gly Asp Pro  Asn Ser Ser
    1145                 1150                 1155

Ser Val  Asp Lys Leu Ala Ala  Ala Leu Glu His His  His His His
    1160                 1165                 1170

His
```

<210> SEQ ID NO 11
<211> LENGTH: 4680
<212> TYPE: DNA
<213> ORGANISM: Artificial Sequence
<220> FEATURE:
<223> OTHER INFORMATION: Synthetic

<400> SEQUENCE: 11

```
atgaaaatcg aagaaggtaa actggtaatc tggattaacg gcgataaagg ctataacggt     60

ctcgctgaag tcggtaagaa attcgagaaa gataccggaa ttaaagtcac cgttgagcat    120

ccggataaac tggaagagaa attcccacag gttgcggcaa ctggcgatgg ccctgacatt    180

atcttctggg cacacgaccg ctttggtggc tacgctcaat ctggcctgtt ggctgaaatc    240

accccggaca aagcgttcca ggacaagctg tatccgttta cctgggatgc cgtacgttac    300

aacggcaagc tgattgctta cccgatcgct gttgaagcgt tatcgctgat ttataacaaa    360

gatctgctgc cgaacccgcc aaaaacctgg gaagagatcc cggcgctgga taaagaactg    420

aaagcgaaag gtaagagcgc gctgatgttc aacctgcaag aaccgtactt cacctggccg    480

ctgattgctg ctgacggggg ttatgcgttc aagtatgaaa acggcaagta cgacattaaa    540

gacgtgggcg tggataacgc tggcgcgaaa gcgggtctga ccttcctggt tgacctgatt    600

aaaaacaaac acatgaatgc agacaccgat tactccatcg cagaagctgc ctttaataaa    660
```

```
ggcgaaacag cgatgaccat caacggcccg tgggcatggt ccaacatcga caccagcaaa    720
gtgaattatg gtgtaacggt actgccgacc ttcaagggtc aaccatccaa accgttcgtt    780
ggcgtgctga gcgcaggtat taacgccgcc agtccgaaca aagagctggc aaaagagttc    840
ctcgaaaact atctgctgac tgatgaaggt ctggaagcgg ttaataaaga caaaccgctg    900
ggtgccgtag cgctgaagtc ttacgaggaa gagttggtga aagatccgcg tattgccgcc    960
actatggaaa acgcccagaa aggtgaaatc atgccgaaca tcccgcagat gtccgctttc   1020
tggtatgccg tgcgtactgc ggtgatcaac gccgccagcg gtcgtcagac tgtcgatgaa   1080
gccctgaaag acgcgcagac taattcgagc tcgaacaaca acaacaataa caataacaac   1140
aacctcggga tcgagggaag gaaagtgacc aaagtggatg gcatcagcca caaaaaatac   1200
atcgaagaag gcaaactggt taaaagcacc agcgaagaaa atcgtaccag cgaacgtctg   1260
agcgaactgc tgagcattcg tctggatatc tatatcaaaa atccggataa tgccagcgag   1320
gaagaaaacc gtattcgtcg tgaaaacctg aaaaagttct tcagcaataa agtgctgcac   1380
ctgaaagata gcgttctgta tctgaaaaac cgcaaagaaa aaaatgccgt gcaggacaaa   1440
aactatagcg aagaggatat cagcgagtat gacctgaaga acaaaaatag ctttagcgtg   1500
ctgaaaaaaa tcctgctgaa tgaagatgtg aatagcgagg aactggaaat ctttcgtaaa   1560
gatgttgaag ccaagctgaa caaaatcaac agcctgaaat atagctttga agaaaacaag   1620
gccaactatc agaaaatcaa cgagaacaac gtggaaaaag ttggtggtaa aagcaaacgc   1680
aacatcatct atgattatta tcgcgaaagc gcgaaacgca acgattatat caataatgtg   1740
caagaggcct tcgacaaact gtacaaaaaa gaggacatcg aaaaactgtt ttttctgatc   1800
gagaacagca agaagcacga gaaatacaaa atccgcgagt actaccataa aatcatcggt   1860
cgcaaaaacg ataaagagaa cttcgccaaa atcatctacg aagaaattca gaacgtgaac   1920
aacatcaaag aactgatcga aaaaattccg gacatgagcg agctgaagaa aagccaggtg   1980
ttctataaat actacctgga caaagaggaa ctgaacgaca aaaacatcaa atatgccttt   2040
tgccacttcg tcgaaattga aatgagccag ctgcttaaaa actacgtgta taaacgcctg   2100
agcaacatca gcaacgataa aatcaaacgt atctttgaat atcagaatct gaagaaactg   2160
attgaaaaca aactgctgaa caagctggat acctatgttc gtaattgcgg caaatacaac   2220
tactatctgc aggttggtga aattgcaacc agcgatttta ttgcacgtaa tcgtcagaat   2280
gaagcctttc tgcgtaacat tattggtgtt agcagcgttg catattttag cctgcgtaat   2340
attctggaaa ccgaaaacga aaatggtatt accggtcgta tgcgtggtaa aaccgttaaa   2400
aacaataaag gcgaagagaa gtatgtgagc ggtgaagtgg ataaaatcta taacgaaaac   2460
aagcagaacg aagtgaaaga aaatctgaaa atgttttaca gctacgactt caacatggac   2520
aacaaaaacg agatcgaaga tttcttcgcc aacattgatg aagccattag cagtattcgt   2580
catggcattg tgcactttaa tctggaactt gaaggcaaag acatcttcgc gtttaaaaac   2640
attgcaccga gcgagatcag caaaaaaatg tttcagaacg agattaacga aaaaaaactg   2700
aaactgaaaa tcttcaaaca gctgaatagc gccaacgtgt tcaactatta tgagaaagac   2760
gtgatcatca aataccttaa aaacaccaaa ttcaacttcg tgaataaaaa catcccgttt   2820
gttccgagct tcaccaaact gtataacaaa attgaagatc tgcgcaatac cctgaagttt   2880
ttttggagcg ttccgaaaga caaagaagaa aaagacgcac agatctacct gcttaagaac   2940
atctattatg gcgaatttct gaacaaattc gtgaaaaata gcaaagtgtt cttcaaaatc   3000
```

```
accaacgagg tgatcaagat taacaaacag cgtaatcaga aaaccggtca ctacaaatac   3060
cagaagtttg agaacattga aaaaaccgtg ccggttgaat atctggcaat tattcagagc   3120
cgtgagatga ttaacaacca ggataaagaa gagaaaaaca cctacatcga tttcatccag   3180
cagatctttc tgaaaggctt tatcgattac ctgaacaaga acaacctgaa gtatatcgag   3240
tcgaacaaca ataacgacaa caacgacatc tttagcaaaa tcaaaatcaa gaaagataat   3300
aaagaaaaat acgacaagat cctgaaaaac tatgagaagc acaaccgcaa caaagaaatt   3360
ccgcatgaga tcaatgaatt tgtgcgcgaa attaaactgg gcaaaatcct gaaatacacc   3420
gagaacctga atatgttcta tctgattctg aagctgctga accataaaga gctgaccaat   3480
ctgaaaggta gcctggaaaa atatcagagc gcaaacaaag aagagacatt ttctgacgaa   3540
ctggaactga ttaatctgct gaatctggat aataaccgtg tgaccgaaga ttttgaactg   3600
gaagcaaatg aaatcggcaa attcctggat ttcaatgaga acaaaattaa ggaccggaaa   3660
gagcttaaaa agtttgatac caacaaaatc tacttcgacg gcgagaacat tatcaaacat   3720
cgtgcctttt ataacatcaa aaagtatggc atgctgaacc tgctggaaaa aattgcagat   3780
aaagccaagt acaaaattag cctgaaagaa cttaaagagt acagcaacaa aaagaacgaa   3840
atcgagaaga actataccat gcagcagaat ctgcatcgta aatatgcacg tccgaaaaaa   3900
gacgagaaat tcaacgatga ggactataaa gaatacgaga aagccattgg caacatccag   3960
aaatataccc acttgaaaaa caaagtggaa tttaacgagc tgaatttact gcagggtctg   4020
ctgctgaaaa ttctgcaccg tctggttggt tataccagca tttgggaacg tgatctgcgt   4080
tttcgcctga aggtgaatt tcctgaaaac cactatatcg aggaaatttt caactttgac   4140
aacagcaaaa acgtgaaata taagagcggt cagatcgtcg aaaagtacat caacttttac   4200
aaagaacttt acaaggataa tgtggaaaaa cgcagcatct acagcgacaa gaaagtgaaa   4260
aagctgaagc aagaaaagaa agacctgtac atccgtaatt atatcgccca ctttaactat   4320
atcccgcatg cagaaattag tctgctggaa gttctggaaa atctgcgtaa actgctgtca   4380
tatgatcgca aactgaagaa cgcaatcatg aaaagcattg tggatatcct gaaagagtat   4440
ggttttgtcg ccacctttaa aatcggtgcc gataagaaaa ttgagattca gaccctggaa   4500
agcgagaaaa ttgtgcatct taagaacctt aaaaagaaaa aactgatgac cgatcgcaac   4560
agcgaagagt tatgtgaact ggtgaaagtg atgttcgaat acaaagcact ggaagatccg   4620
aattcgagct ccgtcgacaa gcttgcggcc gcactcgagc accaccacca ccaccactga   4680
```

<210> SEQ ID NO 12
<211> LENGTH: 1559
<212> TYPE: PRT
<213> ORGANISM: Artificial Sequence
<220> FEATURE:
<223> OTHER INFORMATION: Synthetic

<400> SEQUENCE: 12

```
Met Lys Ile Glu Glu Gly Lys Leu Val Ile Trp Ile Asn Gly Asp Lys
1               5                   10                  15

Gly Tyr Asn Gly Leu Ala Glu Val Gly Lys Lys Phe Glu Lys Asp Thr
            20                  25                  30

Gly Ile Lys Val Thr Val Glu His Pro Asp Lys Leu Glu Glu Lys Phe
        35                  40                  45

Pro Gln Val Ala Ala Thr Gly Asp Gly Pro Asp Ile Ile Phe Trp Ala
    50                  55                  60

His Asp Arg Phe Gly Gly Tyr Ala Gln Ser Gly Leu Leu Ala Glu Ile
```

65 70 75 80

Thr Pro Asp Lys Ala Phe Gln Asp Lys Leu Tyr Pro Phe Thr Trp Asp
85 90 95

Ala Val Arg Tyr Asn Gly Lys Leu Ile Ala Tyr Pro Ile Ala Val Glu
100 105 110

Ala Leu Ser Leu Ile Tyr Asn Lys Asp Leu Leu Pro Asn Pro Pro Lys
115 120 125

Thr Trp Glu Glu Ile Pro Ala Leu Asp Lys Glu Leu Lys Ala Lys Gly
130 135 140

Lys Ser Ala Leu Met Phe Asn Leu Gln Glu Pro Tyr Phe Thr Trp Pro
145 150 155 160

Leu Ile Ala Ala Asp Gly Gly Tyr Ala Phe Lys Tyr Glu Asn Gly Lys
165 170 175

Tyr Asp Ile Lys Asp Val Gly Val Asp Asn Ala Gly Ala Lys Ala Gly
180 185 190

Leu Thr Phe Leu Val Asp Leu Ile Lys Asn Lys His Met Asn Ala Asp
195 200 205

Thr Asp Tyr Ser Ile Ala Glu Ala Ala Phe Asn Lys Gly Glu Thr Ala
210 215 220

Met Thr Ile Asn Gly Pro Trp Ala Trp Ser Asn Ile Asp Thr Ser Lys
225 230 235 240

Val Asn Tyr Gly Val Thr Val Leu Pro Thr Phe Lys Gly Gln Pro Ser
245 250 255

Lys Pro Phe Val Gly Val Leu Ser Ala Gly Ile Asn Ala Ala Ser Pro
260 265 270

Asn Lys Glu Leu Ala Lys Glu Phe Leu Glu Asn Tyr Leu Leu Thr Asp
275 280 285

Glu Gly Leu Glu Ala Val Asn Lys Asp Lys Pro Leu Gly Ala Val Ala
290 295 300

Leu Lys Ser Tyr Glu Glu Glu Leu Val Lys Asp Pro Arg Ile Ala Ala
305 310 315 320

Thr Met Glu Asn Ala Gln Lys Gly Glu Ile Met Pro Asn Ile Pro Gln
325 330 335

Met Ser Ala Phe Trp Tyr Ala Val Arg Thr Ala Val Ile Asn Ala Ala
340 345 350

Ser Gly Arg Gln Thr Val Asp Glu Ala Leu Lys Asp Ala Gln Thr Asn
355 360 365

Ser Ser Ser Asn Asn Asn Asn Asn Asn Asn Asn Asn Asn Leu Gly Ile
370 375 380

Glu Gly Arg Lys Val Thr Lys Val Asp Gly Ile Ser His Lys Lys Tyr
385 390 395 400

Ile Glu Glu Gly Lys Leu Val Lys Ser Thr Ser Glu Glu Asn Arg Thr
405 410 415

Ser Glu Arg Leu Ser Glu Leu Leu Ser Ile Arg Leu Asp Ile Tyr Ile
420 425 430

Lys Asn Pro Asp Asn Ala Ser Glu Glu Glu Asn Arg Ile Arg Arg Glu
435 440 445

Asn Leu Lys Lys Phe Phe Ser Asn Lys Val Leu His Leu Lys Asp Ser
450 455 460

Val Leu Tyr Leu Lys Asn Arg Lys Glu Lys Asn Ala Val Gln Asp Lys
465 470 475 480

Asn Tyr Ser Glu Glu Asp Ile Ser Glu Tyr Asp Leu Lys Asn Lys Asn
485 490 495

```
Ser Phe Ser Val Leu Lys Lys Ile Leu Leu Asn Glu Asp Val Asn Ser
            500                 505                 510

Glu Glu Leu Glu Ile Phe Arg Lys Asp Val Glu Ala Lys Leu Asn Lys
        515                 520                 525

Ile Asn Ser Leu Lys Tyr Ser Phe Glu Glu Asn Lys Ala Asn Tyr Gln
    530                 535                 540

Lys Ile Asn Glu Asn Asn Val Glu Lys Val Gly Gly Lys Ser Lys Arg
545                 550                 555                 560

Asn Ile Ile Tyr Asp Tyr Tyr Arg Glu Ser Ala Lys Arg Asn Asp Tyr
                565                 570                 575

Ile Asn Asn Val Gln Glu Ala Phe Asp Lys Leu Tyr Lys Lys Glu Asp
            580                 585                 590

Ile Glu Lys Leu Phe Phe Leu Ile Glu Asn Ser Lys Lys His Glu Lys
        595                 600                 605

Tyr Lys Ile Arg Glu Tyr Tyr His Lys Ile Ile Gly Arg Lys Asn Asp
    610                 615                 620

Lys Glu Asn Phe Ala Lys Ile Ile Tyr Glu Glu Ile Gln Asn Val Asn
625                 630                 635                 640

Asn Ile Lys Glu Leu Ile Glu Lys Ile Pro Asp Met Ser Glu Leu Lys
                645                 650                 655

Lys Ser Gln Val Phe Tyr Lys Tyr Tyr Leu Asp Lys Glu Glu Leu Asn
            660                 665                 670

Asp Lys Asn Ile Lys Tyr Ala Phe Cys His Phe Val Glu Ile Glu Met
        675                 680                 685

Ser Gln Leu Leu Lys Asn Tyr Val Tyr Lys Arg Leu Ser Asn Ile Ser
    690                 695                 700

Asn Asp Lys Ile Lys Arg Ile Phe Glu Tyr Gln Asn Leu Lys Lys Leu
705                 710                 715                 720

Ile Glu Asn Lys Leu Leu Asn Lys Leu Asp Thr Tyr Val Arg Asn Cys
                725                 730                 735

Gly Lys Tyr Asn Tyr Tyr Leu Gln Val Gly Glu Ile Ala Thr Ser Asp
            740                 745                 750

Phe Ile Ala Arg Asn Arg Gln Asn Glu Ala Phe Leu Arg Asn Ile Ile
        755                 760                 765

Gly Val Ser Ser Val Ala Tyr Phe Ser Leu Arg Asn Ile Leu Glu Thr
    770                 775                 780

Glu Asn Glu Asn Gly Ile Thr Gly Arg Met Arg Gly Lys Thr Val Lys
785                 790                 795                 800

Asn Asn Lys Gly Glu Glu Lys Tyr Val Ser Gly Glu Val Asp Lys Ile
                805                 810                 815

Tyr Asn Glu Asn Lys Gln Asn Glu Val Lys Glu Asn Leu Lys Met Phe
            820                 825                 830

Tyr Ser Tyr Asp Phe Asn Met Asp Asn Lys Asn Glu Ile Glu Asp Phe
        835                 840                 845

Phe Ala Asn Ile Asp Glu Ala Ile Ser Ser Ile Arg His Gly Ile Val
    850                 855                 860

His Phe Asn Leu Glu Leu Glu Gly Lys Asp Ile Phe Ala Phe Lys Asn
865                 870                 875                 880

Ile Ala Pro Ser Glu Ile Ser Lys Lys Met Phe Gln Asn Glu Ile Asn
                885                 890                 895

Glu Lys Lys Leu Lys Leu Lys Ile Phe Lys Gln Leu Asn Ser Ala Asn
            900                 905                 910
```

```
Val Phe Asn Tyr Tyr Glu Lys Asp Val Ile Ile Lys Tyr Leu Lys Asn
        915                 920                 925

Thr Lys Phe Asn Phe Val Asn Lys Asn Ile Pro Phe Val Pro Ser Phe
    930                 935                 940

Thr Lys Leu Tyr Asn Lys Ile Glu Asp Leu Arg Asn Thr Leu Lys Phe
945                 950                 955                 960

Phe Trp Ser Val Pro Lys Asp Lys Glu Glu Lys Asp Ala Gln Ile Tyr
                965                 970                 975

Leu Leu Lys Asn Ile Tyr Tyr Gly Glu Phe Leu Asn Lys Phe Val Lys
            980                 985                 990

Asn Ser Lys Val Phe Phe Lys Ile  Thr Asn Glu Val Ile  Lys Ile Asn
        995                 1000                1005

Lys Gln  Arg Asn Gln Lys Thr  Gly His Tyr Lys Tyr  Gln Lys Phe
    1010                 1015                 1020

Glu Asn  Ile Glu Lys Thr Val  Pro Val Glu Tyr Leu  Ala Ile Ile
    1025                 1030                 1035

Gln Ser  Arg Glu Met Ile Asn  Asn Gln Asp Lys Glu  Glu Lys Asn
    1040                 1045                 1050

Thr Tyr  Ile Asp Phe Ile Gln  Gln Ile Phe Leu Lys  Gly Phe Ile
    1055                 1060                 1065

Asp Tyr  Leu Asn Lys Asn Asn  Leu Lys Tyr Ile Glu  Ser Asn Asn
    1070                 1075                 1080

Asn Asn  Asp Asn Asn Asp Ile  Phe Ser Lys Ile Lys  Ile Lys Lys
    1085                 1090                 1095

Asp Asn  Lys Glu Lys Tyr Asp  Lys Ile Leu Lys Asn  Tyr Glu Lys
    1100                 1105                 1110

His Asn  Arg Asn Lys Glu Ile  Pro His Glu Ile Asn  Glu Phe Val
    1115                 1120                 1125

Arg Glu  Ile Lys Leu Gly Lys  Ile Leu Lys Tyr Thr  Glu Asn Leu
    1130                 1135                 1140

Asn Met  Phe Tyr Leu Ile Leu  Lys Leu Leu Asn His  Lys Glu Leu
    1145                 1150                 1155

Thr Asn  Leu Lys Gly Ser Leu  Glu Lys Tyr Gln Ser  Ala Asn Lys
    1160                 1165                 1170

Glu Glu  Thr Phe Ser Asp Glu  Leu Glu Leu Ile Asn  Leu Leu Asn
    1175                 1180                 1185

Leu Asp  Asn Asn Arg Val Thr  Glu Asp Phe Glu Leu  Glu Ala Asn
    1190                 1195                 1200

Glu Ile  Gly Lys Phe Leu Asp  Phe Asn Glu Asn Lys  Ile Lys Asp
    1205                 1210                 1215

Arg Lys  Glu Leu Lys Lys Phe  Asp Thr Asn Lys Ile  Tyr Phe Asp
    1220                 1225                 1230

Gly Glu  Asn Ile Ile Lys His  Arg Ala Phe Tyr Asn  Ile Lys Lys
    1235                 1240                 1245

Tyr Gly  Met Leu Asn Leu Leu  Glu Lys Ile Ala Asp  Lys Ala Lys
    1250                 1255                 1260

Tyr Lys  Ile Ser Leu Lys Glu  Leu Lys Glu Tyr Ser  Asn Lys Lys
    1265                 1270                 1275

Asn Glu  Ile Glu Lys Asn Tyr  Thr Met Gln Gln Asn  Leu His Arg
    1280                 1285                 1290

Lys Tyr  Ala Arg Pro Lys Lys  Asp Glu Lys Phe Asn  Asp Glu Asp
    1295                 1300                 1305

Tyr Lys  Glu Tyr Glu Lys Ala  Ile Gly Asn Ile Gln  Lys Tyr Thr
```

```
    1310                1315                1320

His Leu  Lys Asn Lys Val Glu  Phe Asn Glu Leu Asn  Leu Leu Gln
    1325                1330                1335

Gly Leu  Leu Leu Lys Ile Leu  His Arg Leu Val Gly  Tyr Thr Ser
    1340                1345                1350

Ile Trp  Glu Arg Asp Leu Arg  Phe Arg Leu Lys Gly  Glu Phe Pro
    1355                1360                1365

Glu Asn  His Tyr Ile Glu Glu  Ile Phe Asn Phe Asp  Asn Ser Lys
    1370                1375                1380

Asn Val  Lys Tyr Lys Ser Gly  Gln Ile Val Glu Lys  Tyr Ile Asn
    1385                1390                1395

Phe Tyr  Lys Glu Leu Tyr Lys  Asp Asn Val Glu Lys  Arg Ser Ile
    1400                1405                1410

Tyr Ser  Asp Lys Lys Val Lys  Lys Leu Lys Gln Glu  Lys Lys Asp
    1415                1420                1425

Leu Tyr  Ile Arg Asn Tyr Ile  Ala His Phe Asn Tyr  Ile Pro His
    1430                1435                1440

Ala Glu  Ile Ser Leu Leu Glu  Val Leu Glu Asn Leu  Arg Lys Leu
    1445                1450                1455

Leu Ser  Tyr Asp Arg Lys Leu  Lys Asn Ala Ile Met  Lys Ser Ile
    1460                1465                1470

Val Asp  Ile Leu Lys Glu Tyr  Gly Phe Val Ala Thr  Phe Lys Ile
    1475                1480                1485

Gly Ala  Asp Lys Lys Ile Glu  Ile Gln Thr Leu Glu  Ser Glu Lys
    1490                1495                1500

Ile Val  His Leu Lys Asn Leu  Lys Lys Lys Lys Leu  Met Thr Asp
    1505                1510                1515

Arg Asn  Ser Glu Glu Leu Cys  Glu Leu Val Lys Val  Met Phe Glu
    1520                1525                1530

Tyr Lys  Ala Leu Glu Asp Pro  Asn Ser Ser Ser Val  Asp Lys Leu
    1535                1540                1545

Ala Ala  Ala Leu Glu His His  His His His His
    1550                1555
```

<210> SEQ ID NO 13
<211> LENGTH: 3525
<212> TYPE: DNA
<213> ORGANISM: Artificial Sequence
<220> FEATURE:
<223> OTHER INFORMATION: Synthetic

<400> SEQUENCE: 13

```
atgaaagtga ccaaagtgga tggcatcagc cacaaaaaat acatcgaaga aggcaaactg     60

gttaaaagca ccagcgaaga aaatcgtacc agcgaacgtc tgagcgaact gctgagcatt    120

cgtctggata tctatatcaa aaatccggat aatgccagcg aggaagaaaa ccgtattcgt    180

cgtgaaaacc tgaaaaagtt cttcagcaat aaagtgctgc acctgaaaga tagcgttctg    240

tatctgaaaa accgcaaaga aaaaaatgcc gtgcaggaca aaaactatag cgaagaggat    300

atcagcgagt atgacctgaa gaacaaaaat agctttagcg tgctgaaaaa aatcctgctg    360

aatgaagatg tgaatagcga ggaactggaa atctttcgta aagatgttga agccaagctg    420

aacaaaatca acagcctgaa atatagcttt gaagaaaaca aggccaacta tcagaaaatc    480

aacgagaaca acgtggaaaa agttggtggt aaaagcaaac gcaacatcat ctatgattat    540

tatcgcgaaa gcgcgaaacg caacgattat atcaataatg tgcaagaggc cttcgacaaa    600
```

```
ctgtacaaaa aagaggacat cgaaaaactg ttttttctga tcgagaacag caagaagcac    660
gagaaataca aaatccgcga gtactaccat aaaatcatcg gtcgcaaaaa cgataaagag    720
aacttcgcca aaatcatcta cgaagaaatt cagaacgtga acaacatcaa agaactgatc    780
gaaaaaattc cggacatgag cgagctgaag aaaagccagg tgttctataa atactacctg    840
gacaaagagg aactgaacga caaaaacatc aaatatgcct tttgccactt cgtcgaaatt    900
gaaatgagcc agctgcttaa aaactacgtg tataaacgcc tgagcaacat cagcaacgat    960
aaaatcaaac gtatctttga atatcagaat ctgaagaaac tgattgaaaa caaactgctg   1020
aacaagctgg atacctatgt tcgtaattgc ggcaaataca actactatct gcaggttggt   1080
gaaattgcaa ccagcgattt tattgcacgt aatcgtcaga atgaagcctt tctgcgtaac   1140
attattggtg ttagcagcgt tgcatatttt agcctgcgta atattctgga aaccgaaaac   1200
gaaaatgata ttaccggtcg tatgcgtggt aaaaccgtta aaaacaataa aggcgaagag   1260
aagtatgtga gcggtgaagt ggataaaatc tataacgaaa acaagcagaa cgaagtgaaa   1320
gaaaatctga aaatgtttta cagctacgac ttcaacatgg acaacaaaaa cgagatcgaa   1380
gatttcttcg ccaacattga tgaagccatt agcagtattc gtcatggcat tgtgcacttt   1440
aatctggaac ttgaaggcaa agacatcttc gcgtttaaaa acattgcacc gagcgagatc   1500
agcaaaaaaa tgtttcagaa cgagattaac gaaaaaaaac tgaaactgaa aatcttcaaa   1560
cagctgaata gcgccaacgt gttcaactat tatgagaaag acgtgatcat caaatacctt   1620
aaaaacacca aattcaactt cgtgaataaa aacatcccgt ttgttccgag cttcaccaaa   1680
ctgtataaca aaattgaaga tctgcgcaat accctgaagt ttttttggag cgttccgaaa   1740
gacaaagaag aaaaagacgc acagatctac ctgcttaaga acatctatta tggcgaattt   1800
ctgaacaaat tcgtgaaaaa tagcaaagtg ttcttcaaaa tcaccaacga ggtgatcaag   1860
attaacaaac agcgtaatca gaaaaccggt cactacaaat accagaagtt tgagaacatt   1920
gaaaaaaccg tgccggttga atatctggca attattcaga gccgtgagat gattaacaac   1980
caggataaag aagagaaaaa cacctacatc gatttcatcc agcagatctt tctgaaaggc   2040
tttatcgatt acctgaacaa gaacaacctg aagtatatcg agtcgaacaa caataacgac   2100
aacaacgaca tctttagcaa aatcaaaatc aagaaagata ataaagaaaa atacgacaag   2160
atcctgaaaa actatgagaa gcacaaccgc aacaaagaaa ttccgcatga gatcaatgaa   2220
tttgtgcgcg aaattaaact gggcaaaatc ctgaaataca ccgagaacct gaatatgttc   2280
tatctgattc tgaagctgct gaaccataaa gagctgacca atctgaaagg tagcctggaa   2340
aaatatcaga gcgcaaacaa agaagagaca ttttctgacg aactggaact gattaatctg   2400
ctgaatctgg ataataaccg tgtgaccgaa gattttgaac tggaagcaaa tgaaatcggc   2460
aaattcctgg atttcaatga gaacaaaatt aaggaccgga aagagcttaa aaagtttgat   2520
accaacaaaa tctacttcga cggcgagaac attatcaaac atcgtgcctt ttataacatc   2580
aaaaagtatg gcatgctgaa cctgctggaa aaaattgcag ataaagccaa gtacaaaatt   2640
agcctgaaag aacttaaaga gtacagcaac aaaaagaacg aaatcgagaa gaactatacc   2700
atgcagcaga atctgcatcg taaatatgca cgtccgaaaa aagacgagaa attcaacgat   2760
gaggactata aagaatacga gaaagccatt ggcaacatcc agaaatatac ccacttgaaa   2820
aacaaagtgg aatttaacga gctgaattta ctgcagggtc tgctgctgaa aattctgcac   2880
cgtctggttg gttataccag catttgggaa cgtgatctgc gttttcgcct gaaaggtgaa   2940
```

```
tttcctgaaa accactatat cgaggaaatt ttcaactttg acaacagcaa aaacgtgaaa   3000

tataagagcg gtcagatcgt cgaaaagtac atcaactttt acaaagaact ttacaaggat   3060

aatgtggaaa aacgcagcat ctacagcgac aagaaagtga aaaagctgaa gcaagaaaag   3120

aaagacctgt acatccgtaa ttatatcgcc cactttaact atatcccgca tgcagaaatt   3180

agtctgctgg aagttctgga aaatctgcgt aaactgctgt catatgatcg caaactgaag   3240

aacgcaatca tgaaaagcat tgtggatatc ctgaaagagt atggttttgt cgccaccttt   3300

aaaatcggtg ccgataagaa aattgagatt cagaccctgg aaagcgagaa aattgtgcat   3360

cttaagaacc ttaaaaagaa aaaactgatg accgatcgca acagcgaaga gttatgtgaa   3420

ctggtgaaag tgatgttcga atacaaagca ctggaagggg atccgaattc gagctccgtc   3480

gacaagcttg cggccgcact cgagcaccac caccaccacc actga                  3525
```

```
<210> SEQ ID NO 14
<211> LENGTH: 1174
<212> TYPE: PRT
<213> ORGANISM: Artificial Sequence
<220> FEATURE:
<223> OTHER INFORMATION: Synthetic

<400> SEQUENCE: 14

Met Lys Val Thr Lys Val Asp Gly Ile Ser His Lys Lys Tyr Ile Glu
1               5                   10                  15

Glu Gly Lys Leu Val Lys Ser Thr Ser Glu Glu Asn Arg Thr Ser Glu
            20                  25                  30

Arg Leu Ser Glu Leu Leu Ser Ile Arg Leu Asp Ile Tyr Ile Lys Asn
        35                  40                  45

Pro Asp Asn Ala Ser Glu Glu Glu Asn Arg Ile Arg Arg Glu Asn Leu
    50                  55                  60

Lys Lys Phe Phe Ser Asn Lys Val Leu His Leu Lys Asp Ser Val Leu
65                  70                  75                  80

Tyr Leu Lys Asn Arg Lys Glu Lys Asn Ala Val Gln Asp Lys Asn Tyr
                85                  90                  95

Ser Glu Glu Asp Ile Ser Glu Tyr Asp Leu Lys Asn Lys Asn Ser Phe
            100                 105                 110

Ser Val Leu Lys Lys Ile Leu Leu Asn Glu Asp Val Asn Ser Glu Glu
        115                 120                 125

Leu Glu Ile Phe Arg Lys Asp Val Glu Ala Lys Leu Asn Lys Ile Asn
    130                 135                 140

Ser Leu Lys Tyr Ser Phe Glu Glu Asn Lys Ala Asn Tyr Gln Lys Ile
145                 150                 155                 160

Asn Glu Asn Asn Val Glu Lys Val Gly Gly Lys Ser Lys Arg Asn Ile
                165                 170                 175

Ile Tyr Asp Tyr Tyr Arg Glu Ser Ala Lys Arg Asn Asp Tyr Ile Asn
            180                 185                 190

Asn Val Gln Glu Ala Phe Asp Lys Leu Tyr Lys Lys Glu Asp Ile Glu
        195                 200                 205

Lys Leu Phe Phe Leu Ile Glu Asn Ser Lys Lys His Glu Lys Tyr Lys
    210                 215                 220

Ile Arg Glu Tyr Tyr His Lys Ile Ile Gly Arg Lys Asn Asp Lys Glu
225                 230                 235                 240

Asn Phe Ala Lys Ile Ile Tyr Glu Glu Ile Gln Asn Val Asn Asn Ile
                245                 250                 255

Lys Glu Leu Ile Glu Lys Ile Pro Asp Met Ser Glu Leu Lys Lys Ser
```

```
            260                 265                 270

Gln Val Phe Tyr Lys Tyr Tyr Leu Asp Lys Glu Glu Leu Asn Asp Lys
        275                 280                 285

Asn Ile Lys Tyr Ala Phe Cys His Phe Val Glu Ile Glu Met Ser Gln
    290                 295                 300

Leu Leu Lys Asn Tyr Val Tyr Lys Arg Leu Ser Asn Ile Ser Asn Asp
305                 310                 315                 320

Lys Ile Lys Arg Ile Phe Glu Tyr Gln Asn Leu Lys Lys Leu Ile Glu
                325                 330                 335

Asn Lys Leu Leu Asn Lys Leu Asp Thr Tyr Val Arg Asn Cys Gly Lys
            340                 345                 350

Tyr Asn Tyr Tyr Leu Gln Val Gly Glu Ile Ala Thr Ser Asp Phe Ile
        355                 360                 365

Ala Arg Asn Arg Gln Asn Glu Ala Phe Leu Arg Asn Ile Ile Gly Val
    370                 375                 380

Ser Ser Val Ala Tyr Phe Ser Leu Arg Asn Ile Leu Glu Thr Glu Asn
385                 390                 395                 400

Glu Asn Asp Ile Thr Gly Arg Met Arg Gly Lys Thr Val Lys Asn Asn
                405                 410                 415

Lys Gly Glu Glu Lys Tyr Val Ser Gly Glu Val Asp Lys Ile Tyr Asn
            420                 425                 430

Glu Asn Lys Gln Asn Glu Val Lys Glu Asn Leu Lys Met Phe Tyr Ser
        435                 440                 445

Tyr Asp Phe Asn Met Asp Asn Lys Asn Glu Ile Glu Asp Phe Phe Ala
    450                 455                 460

Asn Ile Asp Glu Ala Ile Ser Ser Ile Arg His Gly Ile Val His Phe
465                 470                 475                 480

Asn Leu Glu Leu Glu Gly Lys Asp Ile Phe Ala Phe Lys Asn Ile Ala
                485                 490                 495

Pro Ser Glu Ile Ser Lys Lys Met Phe Gln Asn Glu Ile Asn Glu Lys
            500                 505                 510

Lys Leu Lys Leu Lys Ile Phe Lys Gln Leu Asn Ser Ala Asn Val Phe
        515                 520                 525

Asn Tyr Tyr Glu Lys Asp Val Ile Ile Lys Tyr Leu Lys Asn Thr Lys
    530                 535                 540

Phe Asn Phe Val Asn Lys Asn Ile Pro Phe Val Pro Ser Phe Thr Lys
545                 550                 555                 560

Leu Tyr Asn Lys Ile Glu Asp Leu Arg Asn Thr Leu Lys Phe Phe Trp
                565                 570                 575

Ser Val Pro Lys Asp Lys Glu Glu Lys Asp Ala Gln Ile Tyr Leu Leu
            580                 585                 590

Lys Asn Ile Tyr Tyr Gly Glu Phe Leu Asn Lys Phe Val Lys Asn Ser
        595                 600                 605

Lys Val Phe Phe Lys Ile Thr Asn Glu Val Ile Lys Ile Asn Lys Gln
    610                 615                 620

Arg Asn Gln Lys Thr Gly His Tyr Lys Tyr Gln Lys Phe Glu Asn Ile
625                 630                 635                 640

Glu Lys Thr Val Pro Val Glu Tyr Leu Ala Ile Ile Gln Ser Arg Glu
                645                 650                 655

Met Ile Asn Asn Gln Asp Lys Glu Glu Lys Asn Thr Tyr Ile Asp Phe
            660                 665                 670

Ile Gln Gln Ile Phe Leu Lys Gly Phe Ile Asp Tyr Leu Asn Lys Asn
        675                 680                 685
```

```
Asn Leu Lys Tyr Ile Glu Ser Asn Asn Asn Asn Asp Asn Asn Asp Ile
    690                 695                 700

Phe Ser Lys Ile Lys Ile Lys Lys Asp Asn Lys Glu Lys Tyr Asp Lys
705                 710                 715                 720

Ile Leu Lys Asn Tyr Glu Lys His Asn Arg Asn Lys Glu Ile Pro His
                725                 730                 735

Glu Ile Asn Glu Phe Val Arg Glu Ile Lys Leu Gly Lys Ile Leu Lys
            740                 745                 750

Tyr Thr Glu Asn Leu Asn Met Phe Tyr Leu Ile Leu Lys Leu Leu Asn
        755                 760                 765

His Lys Glu Leu Thr Asn Leu Lys Gly Ser Leu Glu Lys Tyr Gln Ser
    770                 775                 780

Ala Asn Lys Glu Glu Thr Phe Ser Asp Glu Leu Glu Leu Ile Asn Leu
785                 790                 795                 800

Leu Asn Leu Asp Asn Asn Arg Val Thr Glu Asp Phe Glu Leu Glu Ala
                805                 810                 815

Asn Glu Ile Gly Lys Phe Leu Asp Phe Asn Glu Asn Lys Ile Lys Asp
            820                 825                 830

Arg Lys Glu Leu Lys Lys Phe Asp Thr Asn Lys Ile Tyr Phe Asp Gly
        835                 840                 845

Glu Asn Ile Ile Lys His Arg Ala Phe Tyr Asn Ile Lys Lys Tyr Gly
    850                 855                 860

Met Leu Asn Leu Leu Glu Lys Ile Ala Asp Lys Ala Lys Tyr Lys Ile
865                 870                 875                 880

Ser Leu Lys Glu Leu Lys Glu Tyr Ser Asn Lys Lys Asn Glu Ile Glu
                885                 890                 895

Lys Asn Tyr Thr Met Gln Gln Asn Leu His Arg Lys Tyr Ala Arg Pro
            900                 905                 910

Lys Lys Asp Glu Lys Phe Asn Asp Glu Asp Tyr Lys Glu Tyr Glu Lys
        915                 920                 925

Ala Ile Gly Asn Ile Gln Lys Tyr Thr His Leu Lys Asn Lys Val Glu
    930                 935                 940

Phe Asn Glu Leu Asn Leu Leu Gln Gly Leu Leu Leu Lys Ile Leu His
945                 950                 955                 960

Arg Leu Val Gly Tyr Thr Ser Ile Trp Glu Arg Asp Leu Arg Phe Arg
                965                 970                 975

Leu Lys Gly Glu Phe Pro Glu Asn His Tyr Ile Glu Glu Ile Phe Asn
            980                 985                 990

Phe Asp Asn Ser Lys Asn Val Lys  Tyr Lys Ser Gly Gln  Ile Val Glu
        995                 1000                1005

Lys Tyr  Ile Asn Phe Tyr Lys  Glu Leu Tyr Lys Asp  Asn Val Glu
    1010                1015                1020

Lys Arg  Ser Ile Tyr Ser Asp  Lys Lys Val Lys Lys  Leu Lys Gln
    1025                1030                1035

Glu Lys  Lys Asp Leu Tyr Ile  Arg Asn Tyr Ile Ala  His Phe Asn
    1040                1045                1050

Tyr Ile  Pro His Ala Glu Ile  Ser Leu Leu Glu Val  Leu Glu Asn
    1055                1060                1065

Leu Arg  Lys Leu Leu Ser Tyr  Asp Arg Lys Leu Lys  Asn Ala Ile
    1070                1075                1080

Met Lys  Ser Ile Val Asp Ile  Leu Lys Glu Tyr Gly  Phe Val Ala
    1085                1090                1095
```

```
Thr Phe  Lys Ile Gly Ala Asp  Lys Lys Ile Glu Ile  Gln Thr Leu
    1100                1105                1110

Glu Ser  Glu Lys Ile Val His  Leu Lys Asn Leu Lys  Lys Lys Lys
    1115                1120                1125

Leu Met  Thr Asp Arg Asn Ser  Glu Glu Leu Cys Glu  Leu Val Lys
    1130                1135                1140

Val Met  Phe Glu Tyr Lys Ala  Leu Glu Gly Asp Pro  Asn Ser Ser
    1145                1150                1155

Ser Val  Asp Lys Leu Ala Ala  Ala Leu Glu His His  His His His
    1160                1165                1170

His


<210> SEQ ID NO 15
<211> LENGTH: 60
<212> TYPE: DNA
<213> ORGANISM: Artificial Sequence
<220> FEATURE:
<223> OTHER INFORMATION: Synthetic

<400> SEQUENCE: 15

gaaataattt tgtttaactt taagaaggag atataccatg aaggtgacca aagttggtgg     60


<210> SEQ ID NO 16
<211> LENGTH: 73
<212> TYPE: DNA
<213> ORGANISM: Artificial Sequence
<220> FEATURE:
<223> OTHER INFORMATION: Synthetic

<400> SEQUENCE: 16

cggccgcaag cttgtcgacg gagctcgaat tcggatcccc attttcggat ttcttctctt     60

ccattttata ctc                                                        73


<210> SEQ ID NO 17
<211> LENGTH: 60
<212> TYPE: DNA
<213> ORGANISM: Artificial Sequence
<220> FEATURE:
<223> OTHER INFORMATION: Synthetic

<400> SEQUENCE: 17

aataacaata acaacaacct cgggatcgag ggaaggaagg tgaccaaagt tggtggtatc     60


<210> SEQ ID NO 18
<211> LENGTH: 73
<212> TYPE: DNA
<213> ORGANISM: Artificial Sequence
<220> FEATURE:
<223> OTHER INFORMATION: Synthetic

<400> SEQUENCE: 18

gtgcggccgc aagcttgtcg acggagctcg aattcggatc attttcggat ttcttctctt     60

ccattttata ctc                                                        73


<210> SEQ ID NO 19
<211> LENGTH: 60
<212> TYPE: DNA
<213> ORGANISM: Artificial Sequence
<220> FEATURE:
<223> OTHER INFORMATION: Synthetic

<400> SEQUENCE: 19
```

ataattttgt ttaactttaa gaaggagata taccatgggt aacctgtttg gtcataaacg 60

<210> SEQ ID NO 20
<211> LENGTH: 69
<212> TYPE: DNA
<213> ORGANISM: Artificial Sequence
<220> FEATURE:
<223> OTHER INFORMATION: Synthetic

<400> SEQUENCE: 20
cggccgcaag cttgtcgacg gagctcgaat tcggatcccc cagggtatca ttggtatttt 60
caatcttgg 69

<210> SEQ ID NO 21
<211> LENGTH: 60
<212> TYPE: DNA
<213> ORGANISM: Artificial Sequence
<220> FEATURE:
<223> OTHER INFORMATION: Synthetic

<400> SEQUENCE: 21
taacaataac aacaacctcg ggatcgaggg aaggggtaac ctgtttggtc ataaacgttg 60

<210> SEQ ID NO 22
<211> LENGTH: 69
<212> TYPE: DNA
<213> ORGANISM: Artificial Sequence
<220> FEATURE:
<223> OTHER INFORMATION: Synthetic

<400> SEQUENCE: 22
gtgcggccgc aagcttgtcg acggagctcg aattcggatc cagggtatca ttggtatttt 60
caatcttgg 69

<210> SEQ ID NO 23
<211> LENGTH: 59
<212> TYPE: DNA
<213> ORGANISM: Artificial Sequence
<220> FEATURE:
<223> OTHER INFORMATION: Synthetic

<400> SEQUENCE: 23
aaataatttt gtttaacttt aagaaggaga tataccatga aagtgaccaa agtggatgg 59

<210> SEQ ID NO 24
<211> LENGTH: 60
<212> TYPE: DNA
<213> ORGANISM: Artificial Sequence
<220> FEATURE:
<223> OTHER INFORMATION: Synthetic

<400> SEQUENCE: 24
gcaagcttgt cgacggagct cgaattcgga tccccttcca gtgctttgta ttcgaacatc 60

<210> SEQ ID NO 25
<211> LENGTH: 60
<212> TYPE: DNA
<213> ORGANISM: Artificial Sequence
<220> FEATURE:
<223> OTHER INFORMATION: Synthetic

<400> SEQUENCE: 25
acaataacaa taacaacaac ctcgggatcg agggaaggaa agtgaccaaa gtggatggca 60

<210> SEQ ID NO 26
<211> LENGTH: 60
<212> TYPE: DNA
<213> ORGANISM: Artificial Sequence
<220> FEATURE:
<223> OTHER INFORMATION: Synthetic

<400> SEQUENCE: 26
caagcttgtc gacggagctc gaattcggat ccccttccag tgctttgtat tcgaacatca 60

<210> SEQ ID NO 27
<211> LENGTH: 20
<212> TYPE: DNA
<213> ORGANISM: Artificial Sequence
<220> FEATURE:
<223> OTHER INFORMATION: Synthetic

<400> SEQUENCE: 27
ggggatccga attcgagctc 20

<210> SEQ ID NO 28
<211> LENGTH: 37
<212> TYPE: DNA
<213> ORGANISM: Artificial Sequence
<220> FEATURE:
<223> OTHER INFORMATION: Synthetic

<400> SEQUENCE: 28
ggtatatctc cttcttaaag ttaaacaaaa ttatttc 37

<210> SEQ ID NO 29
<211> LENGTH: 20
<212> TYPE: DNA
<213> ORGANISM: Artificial Sequence
<220> FEATURE:
<223> OTHER INFORMATION: Synthetic

<400> SEQUENCE: 29
gatccgaatt cgagctccgt 20

<210> SEQ ID NO 30
<211> LENGTH: 19
<212> TYPE: DNA
<213> ORGANISM: Artificial Sequence
<220> FEATURE:
<223> OTHER INFORMATION: Synthetic

<400> SEQUENCE: 30
ccttccctcg atcccgagg 19

<210> SEQ ID NO 31
<211> LENGTH: 53
<212> TYPE: DNA
<213> ORGANISM: Artificial Sequence
<220> FEATURE:
<223> OTHER INFORMATION: Synthetic

<400> SEQUENCE: 31
gtaatattct ggaaaccgaa aacgaaaatg atattaccgg tcgtatgcgt ggt 53

<210> SEQ ID NO 32
<211> LENGTH: 53
<212> TYPE: DNA
<213> ORGANISM: Artificial Sequence
<220> FEATURE:
<223> OTHER INFORMATION: Synthetic

<400> SEQUENCE: 32
accacgcata cgaccggtaa tatcattttc gttttcggtt tccagaatat tac 53

<210> SEQ ID NO 33
<211> LENGTH: 67
<212> TYPE: RNA
<213> ORGANISM: Artificial Sequence
<220> FEATURE:
<223> OTHER INFORMATION: Synthetic

<400> SEQUENCE: 33
ggggauuuag acuaccccaa aaacgaaggg gacuaaaacu agauugcugu ucuaccaagu 60
aauccau 67

<210> SEQ ID NO 34
<211> LENGTH: 59
<212> TYPE: RNA
<213> ORGANISM: Artificial Sequence
<220> FEATURE:
<223> OTHER INFORMATION: Synthetic

<400> SEQUENCE: 34
gaccacccca aaaaugaagg ggacuaaaac auagauugcu guucuaccaa guaauccau 59

<210> SEQ ID NO 35
<211> LENGTH: 56
<212> TYPE: RNA
<213> ORGANISM: Artificial Sequence
<220> FEATURE:
<223> OTHER INFORMATION: Synthetic

<400> SEQUENCE: 35
ccaccccaau aucgaagggg acuaaaacua gauugcuguu cuaccaagua auccau 56

<210> SEQ ID NO 36
<211> LENGTH: 8752
<212> TYPE: DNA
<213> ORGANISM: Artificial Sequence
<220> FEATURE:
<223> OTHER INFORMATION: Synthetic

<400> SEQUENCE: 36
tggcgaatgg gacgcgccct gtagcggcgc attaagcgcg gcgggtgtgg tggttacgcg 60
cagcgtgacc gctacacttg ccagcgccct agcgcccgct cctttcgctt tcttcccttc 120
ctttctcgcc acgttcgccg gctttccccg tcaagctcta aatcgggggc tccctttagg 180
gttccgattt agtgctttac ggcacctcga ccccaaaaaa cttgattagg gtgatggttc 240
acgtagtggg ccatcgccct gatagacggt ttttcgccct ttgacgttgg agtccacgtt 300
ctttaatagt ggactcttgt tccaaactgg aacaacactc aaccctatct cggtctattc 360
ttttgattta taagggattt tgccgatttc ggcctattgg ttaaaaaatg agctgattta 420
acaaaaattt aacgcgaatt ttaacaaaat attaacgttt acaatttcag gtggcacttt 480
tcggggaaat gtgcgcggaa cccctatttg tttatttttc taaatacatt caaatatgta 540
tccgctcatg aattaattct tagaaaaact catcgagcat caaatgaaac tgcaatttat 600
tcatatcagg attatcaata ccatattttt gaaaaagccg tttctgtaat gaaggagaaa 660
actcaccgag gcagttccat aggatggcaa gatcctggta tcggtctgcg attccgactc 720
gtccaacatc aatacaacct attaatttcc cctcgtcaaa aataaggtta tcaagtgaga 780
aatcaccatg agtgacgact gaatccggtg agaatggcaa aagtttatgc atttctttcc 840

```
agacttgttc aacaggccag ccattacgct cgtcatcaaa atcactcgca tcaaccaaac    900
cgttattcat tcgtgattgc gcctgagcga gacgaaatac gcgatcgctg ttaaaaggac    960
aattacaaac aggaatcgaa tgcaaccggc gcaggaacac tgccagcgca tcaacaatat   1020
tttcacctga atcaggatat tcttctaata cctggaatgc tgttttcccg gggatcgcag   1080
tggtgagtaa ccatgcatca tcaggagtac ggataaaatg cttgatggtc ggaagaggca   1140
taaattccgt cagccagttt agtctgacca tctcatctgt aacatcattg gcaacgctac   1200
ctttgccatg tttcagaaac aactctggcg catcgggctt cccatacaat cgatagattg   1260
tcgcacctga ttgcccgaca ttatcgcgag cccatttata cccatataaa tcagcatcca   1320
tgttggaatt taatcgcggc ctagagcaag acgtttcccg ttgaatatgg ctcataacac   1380
cccttgtatt actgtttatg taagcagaca gttttattgt tcatgaccaa aatcccttaa   1440
cgtgagtttt cgttccactg agcgtcagac cccgtagaaa agatcaaagg atcttcttga   1500
gatccttttt ttctgcgcgt aatctgctgc ttgcaaacaa aaaaaccacc gctaccagcg   1560
gtggtttgtt tgccggatca agagctacca actctttttc cgaaggtaac tggcttcagc   1620
agagcgcaga taccaaatac tgtccttcta gtgtagccgt agttaggcca ccacttcaag   1680
aactctgtag caccgcctac atacctcgct ctgctaatcc tgttaccagt ggctgctgcc   1740
agtggcgata agtcgtgtct taccgggttg gactcaagac gatagttacc ggataaggcg   1800
cagcggtcgg gctgaacggg gggttcgtgc acacagccca gcttggagcg aacgacctac   1860
accgaactga gatacctaca gcgtgagcta tgagaaagcg ccacgcttcc cgaagggaga   1920
aaggcggaca ggtatccggt aagcggcagg gtcggaacag gagagcgcac gagggagctt   1980
ccagggggaa acgcctggta tctttatagt cctgtcgggt ttcgccacct ctgacttgag   2040
cgtcgatttt tgtgatgctc gtcagggggg cggagcctat ggaaaaacgc cagcaacgcg   2100
gcctttttac ggttcctggc cttttgctgg ccttttgctc acatgttctt tcctgcgtta   2160
tcccctgatt ctgtggataa ccgtattacc gcctttgagt gagctgatac cgctcgccgc   2220
agccgaacga ccgagcgcag cgagtcagtg agcgaggaag cggaagagcg cctgatgcgg   2280
tattttctcc ttacgcatct gtgcggtatt tcacaccgca tatatggtgc actctcagta   2340
caatctgctc tgatgccgca tagttaagcc agtatacact ccgctatcgc tacgtgactg   2400
ggtcatggct gcgccccgac acccgccaac acccgctgac gcgccctgac gggcttgtct   2460
gctcccggca tccgcttaca gacaagctgt gaccgtctcc gggagctgca tgtgtcagag   2520
gttttcaccg tcatcaccga aacgcgcgag gcagctgcgg taaagctcat cagcgtggtc   2580
gtgaagcgat tcacagatgt ctgcctgttc atccgcgtcc agctcgttga gtttctccag   2640
aagcgttaat gtctggcttc tgataaagcg ggccatgtta agggcggttt tttcctgttt   2700
ggtcactgat gcctccgtgt aagggggatt tctgttcatg gggggtaatga taccgatgaa   2760
acgagagagg atgctcacga tacgggttac tgatgatgaa catgcccggt tactggaacg   2820
ttgtgagggt aaacaactgg cggtatggat gcggcgggac cagagaaaaa tcactcaggg   2880
tcaatgccag cgcttcgtta atacagatgt aggtgttcca cagggtagcc agcagcatcc   2940
tgcgatgcag atccggaaca taatggtgca gggcgctgac ttccgcgttt ccagacttta   3000
cgaaacacgg aaaccgaaga ccattcatgt tgttgctcag gtcgcagacg ttttgcagca   3060
gcagtcgctt cacgttcgct cgcgtatcgg tgattcattc tgctaaccag taaggcaacc   3120
ccgccagcct agccgggtcc tcaacgacag gagcacgatc atgcgcaccc gtggggccgc   3180
```

catgccggcg ataatggcct gcttctcgcc gaaacgtttg gtggcgggac cagtgacgaa 3240
ggcttgagcg agggcgtgca agattccgaa taccgcaagc gacaggccga tcatcgtcgc 3300
gctccagcga aagcggtcct cgccgaaaat gacccagagc gctgccggca cctgtcctac 3360
gagttgcatg ataaagaaga cagtcataag tgcggcgacg atagtcatgc cccgcgccca 3420
ccggaaggag ctgactgggt tgaaggctct caagggcatc ggtcgagatc ccggtgccta 3480
atgagtgagc taacttacat taattgcgtt gcgctcactg cccgctttcc agtcgggaaa 3540
cctgtcgtgc cagctgcatt aatgaatcgg ccaacgcgcg gggagaggcg gtttgcgtat 3600
tgggcgccag ggtggttttt cttttcacca gtgagacggg caacagctga ttgcccttca 3660
ccgcctggcc ctgagagagt tgcagcaagc ggtccacgct ggtttgcccc agcaggcgaa 3720
aatcctgttt gatggtggtt aacggcggga tataacatga gctgtcttcg gtatcgtcgt 3780
atcccactac cgagatatcc gcaccaacgc gcagcccgga ctcggtaatg gcgcgcattg 3840
cgcccagcgc catctgatcg ttggcaacca gcatcgcagt gggaacgatg ccctcattca 3900
gcatttgcat ggtttgttga aaaccggaca tggcactcca gtcgccttcc cgttccgcta 3960
tcggctgaat ttgattgcga gtgagatatt tatgccagcc agccagacgc agacgcgccg 4020
agacagaact taatgggccc gctaacagcg cgatttgctg gtgacccaat gcgaccagat 4080
gctccacgcc cagtcgcgta ccgtcttcat gggagaaaat aatactgttg atgggtgtct 4140
ggtcagagac atcaagaaat aacgccggaa cattagtgca ggcagcttcc acagcaatgg 4200
catcctggtc atccagcgga tagttaatga tcagcccact gacgcgttgc gcgagaagat 4260
tgtgcaccgc cgctttacag gcttcgacgc cgcttcgttc taccatcgac accaccacgc 4320
tggcacccag ttgatcggcg cgagatttaa tcgccgcgac aatttgcgac ggcgcgtgca 4380
gggccagact ggaggtggca acgccaatca gcaacgactg tttgcccgcc agttgttgtg 4440
ccacgcggtt gggaatgtaa ttcagctccg ccatcgccgc ttccactttt tcccgcgttt 4500
tcgcagaaac gtggctggcc tggttcacca cgcgggaaac ggtctgataa gagacaccgg 4560
catactctgc gacatcgtat aacgttactg gtttcacatt caccaccctg aattgactct 4620
cttccgggcg ctatcatgcc ataccgcgaa aggttttgcg ccattcgatg gtgtccggga 4680
tctcgacgct ctcccttatg cgactcctgc attaggaagc agcccagtag taggttgagg 4740
ccgttgagca ccgccgccgc aaggaatggt gcatgcaagg agatggcgcc caacagtccc 4800
ccggccacgg ggcctgccac catacccacg ccgaaacaag cgctcatgag cccgaagtgg 4860
cgagcccgat cttccccatc ggtgatgtcg gcgatatagg cgccagcaac cgcacctgtg 4920
gcgccggtga tgccggccac gatgcgtccg gcgtagagga tcgagatctc gatcccgcga 4980
aattaatacg actcactata ggggaattgt gagcggataa caattcccct ctagaaataa 5040
ttttgtttaa ctttaagaag gagatatacc atgaaggtga ccaaagttgg tggtatcagc 5100
cataaaaagt ataccagcga aggtcgtctg gttaaaagcg aaagcgaaga aaatcgtacc 5160
gatgaacgtc tgagcgcact gctgaatatg cgtctggata tgtatatcaa aaatccgagc 5220
agcaccgaaa ccaaagaaaa tcagaaacgt atcggcaagc tgaaaaagtt cttcagcaac 5280
aaaatggtgt acctgaaaga taacaccctg agcctgaaaa acggcaagaa agaaaatatc 5340
gatcgcgagt atagcgaaac cgatattctg gaaagtgatg tgcgtgacaa aaaaaacttt 5400
gccgtcctga aaaagatcta tctgaacgaa aatgtgaaca gcgaagaact ggaagtgttt 5460
cgcaacgaca ttaaaaagaa gctgaacaag atcaacagcc tgaaatatag cttcgagaaa 5520
aacaaagcca actatcagaa gatcaacgag aacaacatcg aaaaagtgga aggtaaaagc 5580
aagcgcaaca tcatctatga ttattatcgt gaaagcgcca aacgtgatgc ctatgttagc 5640
aatgttaaag aggccttcga caagctgtat aaagaagaag atattgccaa actggtgctg 5700
gaaattgaaa atctgaccaa gctggaaaaa tacaagatcc gcgaattcta tcacgaaatc 5760
attggtcgca aaaacgataa agagaacttc gccaaaatca tctacgaaga aattcagaac 5820
gtgaataaca tgaaagaact gatcgagaaa gttccggata tgagcgaact gaaaaaaagc 5880
caggtgttct acaaatatta cctggacaaa gaggaactga acgataaaaa catcaaatac 5940
gccttttgcc acttcgtgga aatcgaaatg agccagctgc tgaaaaacta tgtgtataaa 6000
cgcctgagca acatcagcaa cgataagatt aaacgcatct tcgagtacca gaacctgaag 6060
aaactgattg aaaacaaact gcttaacaaa ctggatacct atgtgcgtaa ttgcggcaaa 6120
tacaactatt atctgcagga tggtgaaatt gcgaccagcg attttattgc acgtaatcgt 6180
cagaatgaag cctttctgcg taacattatt ggtgttagca gcgttgcata ttttagcctg 6240
cgtaatatcc tggaaaccga aaacgagaat gatatcaccg gtcgtatgcg tggtaaaacc 6300
gtgaaaaaca ataaaggcga agagaaatat gtgagcggtg aggtggataa aatctacaac 6360
gaaaacaaaa agaacgaagt gaaagaaaac ctgaaaatgt tttacagcta cgactttaac 6420
atggacaaca agaacgagat cgaagatttt ttcgccaaca ttgatgaagc cattagcagc 6480
attcgtcatg gcattgttca ctttaatctg gaacttgagg gcaaagacat cttcgcgttt 6540
aaaaacattg caccgagcga gattagcaaa aagatgttcc agaacgaaat taacgagaaa 6600
aaactgaaac tgaagatctt tcgccagctg aatagcgcaa atgtttttcg ctatcttgag 6660
aaatacaaaa tcctgaacta tctgaaacgc acccgctttg aatttgtgaa caaaaacatt 6720
ccgtttgtgc cgagctttac caaactgtat agccgtattg atgatctgaa aaacagcctg 6780
ggcatttatt ggaaaacccc gaaaaccaac gatgataaca agacgaaaga aatcatcgat 6840
gcccagattt atctgcttaa gaacatctac tatggcgaat ttctgaacta ttttatgagc 6900
aacaacggca acttctttga aatcagcaaa gagattatcg agctgaataa aaacgacaaa 6960
cgcaatctga aaaccggctt ctataaactg cagaagtttg aggatatcca agaaaagatc 7020
ccgaaagaat atctggcgaa tattcagagc ctgtacatga ttaatgcagg caatcaggat 7080
gaggaagaga aagataccta tatcgatttc atccagaaaa tctttctgaa aggctttatg 7140
acctatctgg ccaataatgg tcgtctgagt ctgatttata tcggtagtga tgaagaaacc 7200
aataccagcc tggcagaaaa aaaacaagag ttcgataagt tcctgaagaa gtacgaacag 7260
aacaacaaca tcaagatccc gtatgaaatc aatgaatttc tgcgcgaaat caagctgggc 7320
aacattctga aatacaccga acgcctgaat atgttctatc tgattctgaa actgctgaac 7380
cataaagagc tgacgaatct gaaaggtagc ctggaaaagt atcagagcgc aaataaagag 7440
gaagcattta gcgatcagct ggaactgatt aatctgctga atctggataa taaccgtgtg 7500
accgaagatt tcgaattaga agcagatgag atcggcaaat tcctggattt taatggcaac 7560
aaagtgaagg acaacaaaga gcttaagaag ttcgacacca acaagatcta ttttgatggc 7620
gagaacatca tcaaacaccg tgccttttat aacatcaaaa aatacggtat gctgaacctg 7680
ctggaaaaga ttgcagataa agcaggctat aaaatcagca ttgaagagtt gaaaaaatac 7740
agcaacaaga aaaacgagat tgagaaaaac cacaaaatgc aagaaaatct gcaccgcaaa 7800
tatgcacgtc cgcgtaaaga tgaaaaattc accgatgaag attatgaaag ctacaaacag 7860
gccatcgaaa acatcgaaga atatacccat ctgaagaaca aagtcgaatt caacgaactg 7920

```
aatctgctgc agggtctgct gctgcgtatt ctgcatcgtc tggtgggtta taccagcatt   7980

tgggaacgtg atctgcgttt tcgcctgaaa ggtgaatttc ctgaaaacca gtatatcgag   8040

gaaatcttca acttcgagaa taaaaagaat gtgaagtata aaggtggcca gatcgtcgag   8100

aaatatatca aattctacaa agaactgcac cagaacgacg aggtgaaaat caacaaatat   8160

agcagcgcga acatcaaagt gctgaaacaa gagaaaaaag acctgtacat ccgcaactat   8220

atcgcccact ttaactatat tccgcatgca gaaattagtc tgctggaagt tctggaaaac   8280

ctgcgtaaac tgctgtcata tgatcgtaaa cttaaaaacg ccgtgatgaa aagcgttgtg   8340

gacatcctga aagagtatgg ttttgttgcg acctttaaaa tcggtgccga taaaaagatt   8400

ggtattcaga ccctggaaag cgagaagatt gttcacctga aaaatcttaa gaaaaagaaa   8460

cttatgaccg atcgcaatag cgaggaactg tgtaaactgg tgaaaattat gtttgagtat   8520

aaaatggaag agaagaaatc cgaaaatggg gatccgaatt cgagctccgt cgacaagctt   8580

gcggccgcac tcgagcacca ccaccaccac cactgagatc cggctgctaa caaagcccga   8640

aaggaagctg agttggctgc tgccaccgct gagcaataac tagcataacc ccttggggcc   8700

tctaaacggg tcttgagggg ttttttgctg aaaggaggaa ctatatccgg at           8752
```

<210> SEQ ID NO 37
<211> LENGTH: 9907
<212> TYPE: DNA
<213> ORGANISM: Artificial Sequence
<220> FEATURE:
<223> OTHER INFORMATION: Synthetic

<400> SEQUENCE: 37

```
tggcgaatgg gacgcgccct gtagcggcgc attaagcgcg gcgggtgtgg tggttacgcg     60

cagcgtgacc gctacacttg ccagcgccct agcgcccgct cctttcgctt tcttcccttc    120

ctttctcgcc acgttcgccg gctttccccg tcaagctcta aatcgggggc tccctttagg    180

gttccgattt agtgctttac ggcacctcga ccccaaaaaa cttgattagg gtgatggttc    240

acgtagtggg ccatcgccct gatagacggt ttttcgccct ttgacgttgg agtccacgtt    300

ctttaatagt ggactcttgt tccaaactgg aacaacactc aaccctatct cggtctattc    360

ttttgattta taagggattt tgccgatttc ggcctattgg ttaaaaaatg agctgattta    420

acaaaaattt aacgcgaatt ttaacaaaat attaacgttt acaatttcag gtggcacttt    480

tcggggaaat gtgcgcggaa cccctatttg tttatttttc taaatacatt caaatatgta    540

tccgctcatg aattaattct tagaaaaact catcgagcat caaatgaaac tgcaatttat    600

tcatatcagg attatcaata ccatattttt gaaaaagccg tttctgtaat gaaggagaaa    660

actcaccgag gcagttccat aggatggcaa gatcctggta tcggtctgcg attccgactc    720

gtccaacatc aatacaacct attaatttcc cctcgtcaaa aataaggtta tcaagtgaga    780

aatcaccatg agtgacgact gaatccggtg agaatggcaa aagtttatgc atttctttcc    840

agacttgttc aacaggccag ccattacgct cgtcatcaaa atcactcgca tcaaccaaac    900

cgttattcat tcgtgattgc gcctgagcga gacgaaatac gcgatcgctg ttaaaaggac    960

aattacaaac aggaatcgaa tgcaaccggc gcaggaacac tgccagcgca tcaacaatat   1020

tttcacctga atcaggatat tcttctaata cctggaatgc tgttttcccg gggatcgcag   1080

tggtgagtaa ccatgcatca tcaggagtac ggataaaatg cttgatggtc ggaagaggca   1140

taaattccgt cagccagttt agtctgacca tctcatctgt aacatcattg gcaacgctac   1200

ctttgccatg tttcagaaac aactctggcg catcgggctt cccatacaat cgatagattg   1260
```

-continued

```
tcgcacctga ttgcccgaca ttatcgcgag cccatttata cccatataaa tcagcatcca   1320
tgttggaatt taatcgcggc ctagagcaag acgtttcccg ttgaatatgg ctcataacac   1380
cccttgtatt actgtttatg taagcagaca gttttattgt tcatgaccaa aatcccttaa   1440
cgtgagtttt cgttccactg agcgtcagac cccgtagaaa agatcaaagg atcttcttga   1500
gatccttttt ttctgcgcgt aatctgctgc ttgcaaacaa aaaaaccacc gctaccagcg   1560
gtggtttgtt tgccggatca agagctacca actctttttc cgaaggtaac tggcttcagc   1620
agagcgcaga taccaaatac tgtccttcta gtgtagccgt agttaggcca ccacttcaag   1680
aactctgtag caccgcctac atacctcgct ctgctaatcc tgttaccagt ggctgctgcc   1740
agtggcgata agtcgtgtct taccgggttg gactcaagac gatagttacc ggataaggcg   1800
cagcggtcgg gctgaacggg gggttcgtgc acacagccca gcttggagcg aacgacctac   1860
accgaactga gatacctaca gcgtgagcta tgagaaagcg ccacgcttcc cgaagggaga   1920
aaggcggaca ggtatccggt aagcggcagg gtcggaacag gagagcgcac gagggagctt   1980
ccagggggaa acgcctggta tctttatagt cctgtcgggt ttcgccacct ctgacttgag   2040
cgtcgatttt tgtgatgctc gtcagggggg cggagcctat ggaaaaacgc cagcaacgcg   2100
gcctttttac ggttcctggc cttttgctgg ccttttgctc acatgttctt tcctgcgtta   2160
tcccctgatt ctgtggataa ccgtattacc gcctttgagt gagctgatac cgctcgccgc   2220
agccgaacga ccgagcgcag cgagtcagtg agcgaggaag cggaagagcg cctgatgcgg   2280
tattttctcc ttacgcatct gtgcggtatt tcacaccgca tatatggtgc actctcagta   2340
caatctgctc tgatgccgca tagttaagcc agtatacact ccgctatcgc tacgtgactg   2400
ggtcatggct gcgccccgac acccgccaac acccgctgac gcgccctgac gggcttgtct   2460
gctcccggca tccgcttaca gacaagctgt gaccgtctcc gggagctgca tgtgtcagag   2520
gttttcaccg tcatcaccga aacgcgcgag gcagctgcgg taaagctcat cagcgtggtc   2580
gtgaagcgat tcacagatgt ctgcctgttc atccgcgtcc agctcgttga gtttctccag   2640
aagcgttaat gtctggcttc tgataaagcg ggccatgtta agggcggttt tttcctgttt   2700
ggtcactgat gcctccgtgt aagggggatt tctgttcatg gggtaatga taccgatgaa   2760
acgagagagg atgctcacga tacgggttac tgatgatgaa catgcccggt tactggaacg   2820
ttgtgagggt aaacaactgg cggtatggat gcggcgggac cagagaaaaa tcactcaggg   2880
tcaatgccag cgcttcgtta atacagatgt aggtgttcca cagggtagcc agcagcatcc   2940
tgcgatgcag atccggaaca taatggtgca gggcgctgac ttccgcgttt ccagacttta   3000
cgaaacacgg aaaccgaaga ccattcatgt tgttgctcag gtcgcagacg ttttgcagca   3060
gcagtcgctt cacgttcgct cgcgtatcgg tgattcattc tgctaaccag taaggcaacc   3120
ccgccagcct agccgggtcc tcaacgacag gagcacgatc atgcgcaccc gtggggccgc   3180
catgccggcg ataatggcct gcttctcgcc gaaacgtttg gtggcgggac cagtgacgaa   3240
ggcttgagcg agggcgtgca agattccgaa taccgcaagc gacaggccga tcatcgtcgc   3300
gctccagcga aagcggtcct cgccgaaaat gacccagagc gctgccggca cctgtcctac   3360
gagttgcatg ataaagaaga cagtcataag tgcggcgacg atagtcatgc cccgcgccca   3420
ccggaaggag ctgactgggt tgaaggctct caagggcatc ggtcgagatc ccggtgccta   3480
atgagtgagc taacttacat taattgcgtt gcgctcactg cccgctttcc agtcgggaaa   3540
cctgtcgtgc cagctgcatt aatgaatcgg ccaacgcgcg gggagaggcg gtttgcgtat   3600
```

```
tgggcgccag ggtggttttt cttttcacca gtgagacggg caacagctga ttgcccttca   3660
ccgcctggcc ctgagagagt tgcagcaagc ggtccacgct ggtttgcccc agcaggcgaa   3720
aatcctgttt gatggtggtt aacggcggga tataacatga gctgtcttcg gtatcgtcgt   3780
atcccactac cgagatatcc gcaccaacgc gcagcccgga ctcggtaatg gcgcgcattg   3840
cgcccagcgc catctgatcg ttggcaacca gcatcgcagt gggaacgatg ccctcattca   3900
gcatttgcat ggtttgttga aaaccggaca tggcactcca gtcgccttcc cgttccgcta   3960
tcggctgaat ttgattgcga gtgagatatt tatgccagcc agccagacgc agacgcgccg   4020
agacagaact taatgggccc gctaacagcg cgatttgctg gtgacccaat gcgaccagat   4080
gctccacgcc cagtcgcgta ccgtcttcat gggagaaaat aatactgttg atgggtgtct   4140
ggtcagagac atcaagaaat aacgccggaa cattagtgca ggcagcttcc acagcaatgg   4200
catcctggtc atccagcgga tagttaatga tcagcccact gacgcgttgc gcgagaagat   4260
tgtgcaccgc cgctttacag gcttcgacgc cgcttcgttc taccatcgac accaccacgc   4320
tggcacccag ttgatcggcg cgagatttaa tcgccgcgac aatttgcgac ggcgcgtgca   4380
gggccagact ggaggtggca acgccaatca gcaacgactg tttgcccgcc agttgttgtg   4440
ccacgcggtt gggaatgtaa ttcagctccg ccatcgccgc ttccactttt tcccgcgttt   4500
tcgcagaaac gtggctggcc tggttcacca cgcgggaaac ggtctgataa gagacaccgg   4560
catactctgc gacatcgtat aacgttactg gtttcacatt caccaccctg aattgactct   4620
cttccgggcg ctatcatgcc ataccgcgaa aggttttgcg ccattcgatg gtgtccggga   4680
tctcgacgct ctcccttatg cgactcctgc attaggaagc agcccagtag taggttgagg   4740
ccgttgagca ccgccgccgc aaggaatggt gcatgcaagg agatggcgcc caacagtccc   4800
ccggccacgg ggcctgccac catacccacg ccgaaacaag cgctcatgag cccgaagtgg   4860
cgagcccgat cttccccatc ggtgatgtcg gcgatatagg cgccagcaac cgcacctgtg   4920
gcgccggtga tgccggccac gatgcgtccg gcgtagagga tcgagatctc gatcccgcga   4980
aattaatacg actcactata ggggaattgt gagcggataa caattcccct ctagaaataa   5040
ttttgtttaa ctttaagaag gagatatacc atgaaaatcg aagaaggtaa actggtaatc   5100
tggattaacg gcgataaagg ctataacggt ctcgctgaag tcggtaagaa attcgagaaa   5160
gataccggaa ttaaagtcac cgttgagcat ccggataaac tggaagagaa attcccacag   5220
gttgcggcaa ctggcgatgg ccctgacatt atcttctggg cacacgaccg ctttggtggc   5280
tacgctcaat ctggcctgtt ggctgaaatc accccggaca aagcgttcca ggacaagctg   5340
tatccgttta cctgggatgc cgtacgttac aacggcaagc tgattgctta cccgatcgct   5400
gttgaagcgt tatcgctgat ttataacaaa gatctgctgc cgaacccgcc aaaaacctgg   5460
gaagagatcc cggcgctgga taaagaactg aaagcgaaag gtaagagcgc gctgatgttc   5520
aacctgcaag aaccgtactt cacctggccg ctgattgctg ctgacggggg ttatgcgttc   5580
aagtatgaaa acggcaagta cgacattaaa gacgtgggcg tggataacgc tggcgcgaaa   5640
gcgggtctga ccttcctggt tgacctgatt aaaaacaaac acatgaatgc agacaccgat   5700
tactccatcg cagaagctgc ctttaataaa ggcgaaacag cgatgaccat caacggcccg   5760
tgggcatggt ccaacatcga caccagcaaa gtgaattatg gtgtaacggt actgccgacc   5820
ttcaagggtc aaccatccaa accgttcgtt ggcgtgctga gcgcaggtat taacgccgcc   5880
agtccgaaca aagagctggc aaaagagttc ctcgaaaact atctgctgac tgatgaaggt   5940
ctggaagcgg ttaataaaga caaaccgctg ggtgccgtag cgctgaagtc ttacgaggaa   6000
```

```
gagttggtga aagatccgcg tattgccgcc actatggaaa acgcccagaa aggtgaaatc   6060
atgccgaaca tcccgcagat gtccgctttc tggtatgccg tgcgtactgc ggtgatcaac   6120
gccgccagcg gtcgtcagac tgtcgatgaa gccctgaaag acgcgcagac taattcgagc   6180
tcgaacaaca acaacaataa caataacaac aacctcggga tcgagggaag gaaggtgacc   6240
aaagttggtg gtatcagcca taaaaagtat accagcgaag gtcgtctggt taaaagcgaa   6300
agcgaagaaa atcgtaccga tgaacgtctg agcgcactgc tgaatatgcg tctggatatg   6360
tatatcaaaa atccgagcag caccgaaacc aaagaaaatc agaaacgtat cggcaagctg   6420
aaaaagttct tcagcaacaa aatggtgtac ctgaaagata acaccctgag cctgaaaaac   6480
ggcaagaaag aaaatatcga tcgcgagtat agcgaaaccg atattctgga aagtgatgtg   6540
cgtgacaaaa aaaactttgc cgtcctgaaa aagatctatc tgaacgaaaa tgtgaacagc   6600
gaagaactgg aagtgtttcg caacgacatt aaaaagaagc tgaacaagat caacagcctg   6660
aaatatagct tcgagaaaaa caaagccaac tatcagaaga tcaacgagaa caacatcgaa   6720
aaagtggaag gtaaaagcaa gcgcaacatc atctatgatt attatcgtga aagcgccaaa   6780
cgtgatgcct atgttagcaa tgttaaagag gccttcgaca agctgtataa agaagaagat   6840
attgccaaac tggtgctgga aattgaaaat ctgaccaagc tggaaaaata caagatccgc   6900
gaattctatc acgaaatcat tggtcgcaaa aacgataaag agaacttcgc caaaatcatc   6960
tacgaagaaa ttcagaacgt gaataacatg aaagaactga tcgagaaagt tccggatatg   7020
agcgaactga aaaaaagcca ggtgttctac aaatattacc tggacaaaga ggaactgaac   7080
gataaaaaca tcaaatacgc cttttgccac ttcgtggaaa tcgaaatgag ccagctgctg   7140
aaaaactatg tgtataaacg cctgagcaac atcagcaacg ataagattaa acgcatcttc   7200
gagtaccaga acctgaagaa actgattgaa aacaaactgc ttaacaaact ggatacctat   7260
gtgcgtaatt gcggcaaata caactattat ctgcaggatg gtgaaattgc gaccagcgat   7320
tttattgcac gtaatcgtca gaatgaagcc tttctgcgta acattattgg tgttagcagc   7380
gttgcatatt ttagcctgcg taatatcctg gaaaccgaaa acgagaatga tatcaccggt   7440
cgtatgcgtg gtaaaaccgt gaaaaacaat aaaggcgaag agaaatatgt gagcggtgag   7500
gtggataaaa tctacaacga aaacaaaaag aacgaagtga aagaaaacct gaaaatgttt   7560
tacagctacg actttaacat ggacaacaag aacgagatcg aagatttttt cgccaacatt   7620
gatgaagcca ttagcagcat tcgtcatggc attgttcact ttaatctgga acttgagggc   7680
aaagacatct tcgcgtttaa aaacattgca ccgagcgaga ttagcaaaaa gatgttccag   7740
aacgaaatta acgagaaaaa actgaaactg aagatctttc gccagctgaa tagcgcaaat   7800
gtttttcgct atcttgagaa atacaaaatc ctgaactatc tgaaacgcac ccgctttgaa   7860
tttgtgaaca aaaacattcc gtttgtgccg agctttacca aactgtatag ccgtattgat   7920
gatctgaaaa acagcctggg catttattgg aaaaccccga aaaccaacga tgataacaag   7980
acgaaagaaa tcatcgatgc ccagatttat ctgcttaaga acatctacta tggcgaattt   8040
ctgaactatt ttatgagcaa caacggcaac ttctttgaaa tcagcaaaga gattatcgag   8100
ctgaataaaa acgacaaacg caatctgaaa accggcttct ataaactgca gaagtttgag   8160
gatatccaag aaaagatccc gaaagaatat ctggcgaata ttcagagcct gtacatgatt   8220
aatgcaggca atcaggatga ggaagagaaa gatacctata tcgatttcat ccagaaaatc   8280
tttctgaaag gctttatgac ctatctggcc aataatggtc gtctgagtct gatttatatc   8340
```

ggtagtgatg aagaaaccaa taccagcctg gcagaaaaaa aacaagagtt cgataagttc 8400
ctgaagaagt acgaacagaa caacaacatc aagatcccgt atgaaatcaa tgaatttctg 8460
cgcgaaatca agctgggcaa cattctgaaa tacaccgaac gcctgaatat gttctatctg 8520
attctgaaac tgctgaacca taaagagctg acgaatctga aaggtagcct ggaaaagtat 8580
cagagcgcaa ataaagagga agcatttagc gatcagctgg aactgattaa tctgctgaat 8640
ctggataata accgtgtgac cgaagatttc gaattagaag cagatgagat cggcaaattc 8700
ctggatttta atggcaacaa agtgaaggac aacaaagagc ttaagaagtt cgacaccaac 8760
aagatctatt ttgatggcga gaacatcatc aaacaccgtg ccttttataa catcaaaaaa 8820
tacggtatgc tgaacctgct ggaaaagatt gcagataaag caggctataa aatcagcatt 8880
gaagagttga aaaaatacag caacaagaaa aacgagattg agaaaaacca caaaatgcaa 8940
gaaaatctgc accgcaaata tgcacgtccg cgtaaagatg aaaaattcac cgatgaagat 9000
tatgaaagct acaaacaggc catcgaaaac atcgaagaat atacccatct gaagaacaaa 9060
gtcgaattca acgaactgaa tctgctgcag ggtctgctgc tgcgtattct gcatcgtctg 9120
gtgggttata ccagcatttg ggaacgtgat ctgcgttttc gcctgaaagg tgaatttcct 9180
gaaaaccagt atatcgagga aatcttcaac ttcgagaata aaaagaatgt gaagtataaa 9240
ggtggccaga tcgtcgagaa atatatcaaa ttctacaaag aactgcacca gaacgacgag 9300
gtgaaaatca acaaatatag cagcgcgaac atcaaagtgc tgaaacaaga gaaaaaagac 9360
ctgtacatcc gcaactatat cgcccacttt aactatattc cgcatgcaga aattagtctg 9420
ctggaagttc tggaaaacct gcgtaaactg ctgtcatatg atcgtaaact taaaaacgcc 9480
gtgatgaaaa gcgttgtgga catcctgaaa gagtatggtt ttgttgcgac ctttaaaatc 9540
ggtgccgata aaaagattgg tattcagacc ctggaaagcg agaagattgt tcacctgaaa 9600
aatcttaaga aaaagaaact tatgaccgat cgcaatagcg aggaactgtg taaactggtg 9660
aaaattatgt ttgagtataa aatggaagag aagaaatccg aaaatgatcc gaattcgagc 9720
tccgtcgaca agcttgcggc cgcactcgag caccaccacc accaccactg agatccggct 9780
gctaacaaag cccgaaagga agctgagttg gctgctgcca ccgctgagca ataactagca 9840
taaccccttg gggcctctaa acgggtcttg aggggttttt tgctgaaagg aggaactata 9900
tccggat 9907

<210> SEQ ID NO 38
<211> LENGTH: 9442
<212> TYPE: DNA
<213> ORGANISM: Artificial Sequence
<220> FEATURE:
<223> OTHER INFORMATION: Synthetic

<400> SEQUENCE: 38
tggcgaatgg gacgcgccct gtagcggcgc attaagcgcg gcgggtgtgg tggttacgcg 60
cagcgtgacc gctacacttg ccagcgccct agcgcccgct cctttcgctt tcttcccttc 120
ctttctcgcc acgttcgccg gctttccccg tcaagctcta aatcgggggc tccctttagg 180
gttccgattt agtgctttac ggcacctcga ccccaaaaaa cttgattagg gtgatggttc 240
acgtagtggg ccatcgccct gatagacggt ttttcgccct ttgacgttgg agtccacgtt 300
ctttaatagt ggactcttgt tccaaactgg aacaacactc aaccctatct cggtctattc 360
ttttgattta taagggattt tgccgatttc ggcctattgg ttaaaaaatg agctgattta 420
acaaaaattt aacgcgaatt ttaacaaaat attaacgttt acaatttcag gtggcacttt 480

```
tcggggaaat gtgcgcggaa cccctatttg tttatttttc taaatacatt caaatatgta    540
tccgctcatg aattaattct tagaaaaact catcgagcat caaatgaaac tgcaatttat    600
tcatatcagg attatcaata ccatattttt gaaaaagccg tttctgtaat gaaggagaaa    660
actcaccgag gcagttccat aggatggcaa gatcctggta tcggtctgcg attccgactc    720
gtccaacatc aatacaacct attaatttcc cctcgtcaaa aataaggtta tcaagtgaga    780
aatcaccatg agtgacgact gaatccggtg agaatggcaa aagtttatgc atttctttcc    840
agacttgttc aacaggccag ccattacgct cgtcatcaaa atcactcgca tcaaccaaac    900
cgttattcat tcgtgattgc gcctgagcga gacgaaatac gcgatcgctg ttaaaaggac    960
aattacaaac aggaatcgaa tgcaaccggc gcaggaacac tgccagcgca tcaacaatat   1020
tttcacctga atcaggatat tcttctaata cctggaatgc tgttttcccg gggatcgcag   1080
tggtgagtaa ccatgcatca tcaggagtac ggataaaatg cttgatggtc ggaagaggca   1140
taaattccgt cagccagttt agtctgacca tctcatctgt aacatcattg gcaacgctac   1200
ctttgccatg tttcagaaac aactctggcg catcgggctt cccatacaat cgatagattg   1260
tcgcacctga ttgcccgaca ttatcgcgag cccatttata cccatataaa tcagcatcca   1320
tgttggaatt taatcgcggc ctagagcaag acgtttcccg ttgaatatgg ctcataacac   1380
cccttgtatt actgtttatg taagcagaca gttttattgt tcatgaccaa aatcccttaa   1440
cgtgagtttt cgttccactg agcgtcagac cccgtagaaa agatcaaagg atcttcttga   1500
gatccttttt ttctgcgcgt aatctgctgc ttgcaaacaa aaaaaccacc gctaccagcg   1560
gtggtttgtt tgccggatca agagctacca actctttttc cgaaggtaac tggcttcagc   1620
agagcgcaga taccaaatac tgtccttcta gtgtagccgt agttaggcca ccacttcaag   1680
aactctgtag caccgcctac atacctcgct ctgctaatcc tgttaccagt ggctgctgcc   1740
agtggcgata agtcgtgtct taccgggttg gactcaagac gatagttacc ggataaggcg   1800
cagcggtcgg gctgaacggg gggttcgtgc acacagccca gcttggagcg aacgacctac   1860
accgaactga gatacctaca gcgtgagcta tgagaaagcg ccacgcttcc cgaagggaga   1920
aaggcggaca ggtatccggt aagcggcagg gtcggaacag gagagcgcac gagggagctt   1980
ccagggggaa acgcctggta tctttatagt cctgtcgggt ttcgccacct ctgacttgag   2040
cgtcgatttt tgtgatgctc gtcagggggg cggagcctat ggaaaaacgc cagcaacgcg   2100
gcctttttac ggttcctggc cttttgctgg ccttttgctc acatgttctt tcctgcgtta   2160
tcccctgatt ctgtggataa ccgtattacc gcctttgagt gagctgatac cgctcgccgc   2220
agccgaacga ccgagcgcag cgagtcagtg agcgaggaag cggaagagcg cctgatgcgg   2280
tattttctcc ttacgcatct gtgcggtatt tcacaccgca tatatggtgc actctcagta   2340
caatctgctc tgatgccgca tagttaagcc agtatacact ccgctatcgc tacgtgactg   2400
ggtcatggct gcgccccgac acccgccaac acccgctgac gcgccctgac gggcttgtct   2460
gctcccggca tccgcttaca gacaagctgt gaccgtctcc gggagctgca tgtgtcagag   2520
gttttcaccg tcatcaccga aacgcgcgag gcagctgcgg taaagctcat cagcgtggtc   2580
gtgaagcgat tcacagatgt ctgcctgttc atccgcgtcc agctcgttga gtttctccag   2640
aagcgttaat gtctggcttc tgataaagcg ggccatgtta agggcggttt tttcctgttt   2700
ggtcactgat gcctccgtgt aagggggatt tctgttcatg ggggtaatga taccgatgaa   2760
acgagagagg atgctcacga tacgggttac tgatgatgaa catgcccggt tactggaacg   2820
```

-continued ttgtgagggt aaacaactgg cggtatggat gcggcgggac cagagaaaaa tcactcaggg 2880
tcaatgccag cgcttcgtta atacagatgt aggtgttcca cagggtagcc agcagcatcc 2940
tgcgatgcag atccggaaca taatggtgca gggcgctgac ttccgcgttt ccagacttta 3000
cgaaacacgg aaaccgaaga ccattcatgt tgttgctcag gtcgcagacg ttttgcagca 3060
gcagtcgctt cacgttcgct cgcgtatcgg tgattcattc tgctaaccag taaggcaacc 3120
ccgccagcct agccgggtcc tcaacgacag gagcacgatc atgcgcaccc gtggggccgc 3180
catgccggcg ataatggcct gcttctcgcc gaaacgtttg gtggcgggac cagtgacgaa 3240
ggcttgagcg agggcgtgca agattccgaa taccgcaagc gacaggccga tcatcgtcgc 3300
gctccagcga aagcggtcct cgccgaaaat gacccagagc gctgccggca cctgtcctac 3360
gagttgcatg ataaagaaga cagtcataag tgcggcgacg atagtcatgc cccgcgccca 3420
ccggaaggag ctgactgggt tgaaggctct caagggcatc ggtcgagatc ccggtgccta 3480
atgagtgagc taacttacat taattgcgtt gcgctcactg cccgctttcc agtcgggaaa 3540
cctgtcgtgc cagctgcatt aatgaatcgg ccaacgcgcg gggagaggcg gtttgcgtat 3600
tgggcgccag ggtggttttt cttttcacca gtgagacggg caacagctga ttgcccttca 3660
ccgcctggcc ctgagagagt tgcagcaagc ggtccacgct ggtttgcccc agcaggcgaa 3720
aatcctgttt gatggtggtt aacggcggga tataacatga gctgtcttcg gtatcgtcgt 3780
atcccactac cgagatatcc gcaccaacgc gcagcccgga ctcggtaatg gcgcgcattg 3840
cgcccagcgc catctgatcg ttggcaacca gcatcgcagt gggaacgatg ccctcattca 3900
gcatttgcat ggtttgttga aaaccggaca tggcactcca gtcgccttcc cgttccgcta 3960
tcggctgaat ttgattgcga gtgagatatt tatgccagcc agccagacgc agacgcgccg 4020
agacagaact taatgggccc gctaacagcg cgatttgctg gtgacccaat gcgaccagat 4080
gctccacgcc cagtcgcgta ccgtcttcat gggagaaaat aatactgttg atgggtgtct 4140
ggtcagagac atcaagaaat aacgccggaa cattagtgca ggcagcttcc acagcaatgg 4200
catcctggtc atccagcgga tagttaatga tcagcccact gacgcgttgc gcgagaagat 4260
tgtgcaccgc cgctttacag gcttcgacgc cgcttcgttc taccatcgac accaccacgc 4320
tggcacccag ttgatcggcg cgagatttaa tcgccgcgac aatttgcgac ggcgcgtgca 4380
gggccagact ggaggtggca acgccaatca gcaacgactg tttgcccgcc agttgttgtg 4440
ccacgcggtt gggaatgtaa ttcagctccg ccatcgccgc ttccactttt tcccgcgttt 4500
tcgcagaaac gtggctggcc tggttcacca cgcgggaaac ggtctgataa gagacaccgg 4560
catactctgc gacatcgtat aacgttactg gtttcacatt caccaccctg aattgactct 4620
cttccgggcg ctatcatgcc ataccgcgaa aggttttgcg ccattcgatg gtgtccggga 4680
tctcgacgct ctcccttatg cgactcctgc attaggaagc agcccagtag taggttgagg 4740
ccgttgagca ccgccgccgc aaggaatggt gcatgcaagg agatggcgcc caacagtccc 4800
ccggccacgg ggcctgccac catacccacg ccgaaacaag cgctcatgag cccgaagtgg 4860
cgagcccgat cttccccatc ggtgatgtcg gcgatatagg cgccagcaac cgcacctgtg 4920
gcgccggtga tgccggccac gatgcgtccg gcgtagagga tcgagatctc gatcccgcga 4980
aattaatacg actcactata ggggaattgt gagcggataa caattcccct ctagaaataa 5040
ttttgtttaa ctttaagaag gagatatacc atgggtaacc tgtttggtca taaacgttgg 5100
tatgaagtgc gcgacaaaaa agactttaaa atcaaacgca aggtgaaagt gaaacgcaac 5160
tatgatggca acaaatatat cctgaacatc aacgagaaca acaacaaaga gaagatcgat 5220

```
aataataaat tcatccgcaa atacatcaac tacaaaaaaa acgataacat cctgaaagaa   5280
ttcacccgca agtttcatgc aggcaacatt ctgtttaaac tgaaaggcaa agaaggcatc   5340
attcgcatcg aaaacaatga tgattttctg gaaaccgaag aggtggtgct gtatattgaa   5400
gcatatggca aaagcgaaaa actgaaggca ctgggcatta ccaaaaaaaa gattatcgat   5460
gaagccattc gccagggtat taccaaagat gacaaaaaga tcgagatcaa gcgccaagaa   5520
aacgaagaag aaatcgaaat tgatatccgc gacgagtata ccaataaaac cctgaatgat   5580
tgcagcatta ttctgcgcat tatcgagaat gatgagctgg aaacgaaaaa gagcatctac   5640
gagatcttca aaaacatcaa catgagcctg tacaaaatca tcgagaaaat tatcgaaaac   5700
gaaaccgaga aggtgttcga gaatcgctat tatgaagaac atctgcgtga gaaactgctg   5760
aaagatgata aaattgatgt gatcctgacc aacttcatgg aaatccgcga aaagattaaa   5820
agcaacctgg aaattctggg cttcgtgaaa ttctatctga atgttggtgg cgacaagaaa   5880
aaaagcaaga acaagaaaat gctggtcgaa aaaattctga acattaacgt tgatctgacc   5940
gtggaagata ttgccgattt tgtgattaaa gagctggaat tctggaacat caccaaacgc   6000
attgagaagg tgaaaaaagt gaacaacgag ttcctggaaa aacgtcgtaa tcgcacctat   6060
atcaaaagct atgttctgct ggataagcac gagaaattca aaattgaacg cgagaacaaa   6120
aaggacaaaa tcgtgaagtt tttcgtggaa aatatcaaaa acaacagcat caaagaaaaa   6180
atcgagaaga tcctggccga gttcaaaatc gatgaactga tcaaaaagct ggaaaaagaa   6240
ctgaaaaaag gcaactgcga taccgaaatt ttcggcatct ttaagaaaca ctataaagtg   6300
aacttcgata gcaaaaaatt cagcaaaaag agcgacgaag agaaagagct gtataagatc   6360
atttaccgct atctgaaagg ccgtattgaa aaaatcctgg tgaatgaaca gaaagtgcgc   6420
ctgaaaaaaa tggaaaaaat tgagattgag aagattctga acgagagcat cctgagtgag   6480
aaaatcctga aacgtgttaa acagtatacc ctggaacaca ttatgtatct gggtaaactg   6540
cgccataacg atattgatat gaccaccgtt aataccgatg atttcagccg tctgcatgca   6600
aaagaagaac tggatctgga actgattacc ttttttgcaa gcaccaatat ggaactgaac   6660
aagatcttta gccgtgaaaa cattaacaac gacgagaaca ttgatttctt tggtggtgat   6720
cgcgagaaaa actatgtcct ggataaaaag atcctgaata gcaaaatcaa gatcatccgc   6780
gatctggatt tcatcgacaa taagaacaac attaccaaca actttattcg caaatttacc   6840
aaaattggca ccaatgaacg caaccgtatt ctgcatgcca ttagcaaaga acgtgatctg   6900
cagggcaccc aggatgatta taacaaagtg attaacatca tccagaacct gaaaatctcc   6960
gatgaagaag ttagcaaagc actgaatctg gatgtggtgt tcaaagataa gaaaaatatc   7020
atcaccaaga tcaacgatat caaaatcagc gaagagaaca ataacgacat caaatatctg   7080
ccgagcttta gcaaagttct gccggaaatt cttaatctgt atcgcaataa cccgaaaaac   7140
gaaccgtttg ataccatcga aacagagaaa attgttctga acgccctgat ctatgtgaac   7200
aaagaactgt acaagaaact gatcctggaa gatgatctgg aagagaacga atcgaaaaac   7260
atctttctgc aagagctgaa aaagaccctg ggtaacattg atgagatcga tgaaaacatc   7320
atcgaaaatt actacaagaa cgcacagatt agcgcaagca aaggtaataa caaagccatc   7380
aaaaaatacc agaaaaaggt gatcgaatgc tacattggtt atctgcgcaa aaactacgaa   7440
gaactgttcg atttcagcga tttcaaaatg aacatccaag agatcaagaa gcagatcaag   7500
gacattaacg acaacaaaac ctatgaacgc atcaccgtta aaaccagcga taaaaccatt   7560
```

gtgatcaacg acgatttcga gtacatcatt agcatttttg cactgctgaa ttccaacgcc 7620
gtgatcaaca aaattcgcaa tcgctttttt gccaccagtg tttggctgaa taccagcgaa 7680
tatcagaaca ttatcgatat cctggatgag atcatgcagc tgaatacact gcgtaatgaa 7740
tgcattaccg aaaactggaa tctgaacctt gaagaattta ttcagaaaat gaaagagatc 7800
gagaaagact tcgacgactt caaaatccag accaaaaaag aaatcttcaa caactactac 7860
gaggacatca aaaataacat tctgaccgaa ttcaaagacg atattaacgg ctgtgacgtg 7920
ctggaaaaga agttggaaaa gatcgttatc ttcgatgacg aaaccaaatt cgaaatcgac 7980
aaaaagtcca acatccttca ggatgaacag cgtaaactga gcaatatcaa caagaaagac 8040
ctgaagaaga aggtcgacca gtacatcaaa gacaaagacc aagaaattaa gagcaaaatc 8100
ctgtgccgca tcatctttaa cagcgacttt ctgaaaaagt ataagaaaga gattgacaac 8160
ctgatcgagg atatggaaag cgagaacgaa aacaagtttc aagagatcta ctatccgaaa 8220
gaacgcaaaa acgagctgta catctacaag aagaacctgt tcctgaatat tggcaacccg 8280
aacttcgaca aaatctatgg tctgatcagc aacgacatta aaatggccga tgcaaaattc 8340
ctgtttaata tcgatggtaa aaacatccgt aaaaacaaaa ttagcgagat cgacgcgatc 8400
ctgaaaaacc tgaacgataa actgaatggc tacagcaaag aatataaaga gaaatacatt 8460
aaaaagctga aagaaaatga cgacttcttc gccaagaaca tccagaataa aaactataaa 8520
agcttcgaga aggactacaa tcgcgtgtcc gaatataaga aaattcgtga tctggtggaa 8580
ttcaactatc tgaacaaaat cgaaagctat ctgatcgata tcaactggaa actggcaatt 8640
cagatggcac gttttgagcg tgatatgcac tatattgtta atggtctgcg tgaactgggc 8700
atcattaaac tgagtggtta taataccggc attagccgtg catatccgaa acgtaatggt 8760
tccgatggtt tttataccac caccgcctat tacaaatttt tcgacgaaga aagctacaag 8820
aaatttgaga aaatttgcta cggcttcggc attgatctga gcgaaaatag cgaaattaac 8880
aagccggaaa atgagagcat tcgcaactat atctccccact tttatatcgt gcgtaatccg 8940
tttgccgatt atagcattgc agagcagatt gatcgtgtta gcaatctgct gagctatagt 9000
acccgttata acaatagcac ctatgccagc gtgtttgagg tgtttaaaaa ggatgttaac 9060
ctggactatg acgagctgaa gaaaaagttc aaactgatcg gcaacaatga catcctggaa 9120
cgtctgatga aaccgaaaaa agttagtgtg ctggaacttg agagctacaa cagcgattat 9180
atcaagaacc tgattatcga gctgctgacc aagattgaaa ataccaatga taccctgggg 9240
gatccgaatt cgagctccgt cgacaagctt gcggccgcac tcgagcacca ccaccaccac 9300
cactgagatc cggctgctaa caaagcccga aaggaagctg agttggctgc tgccaccgct 9360
gagcaataac tagcataacc ccttggggcc tctaaacggg tcttgagggg ttttttgctg 9420
aaaggaggaa ctatatccgg at 9442

<210> SEQ ID NO 39
<211> LENGTH: 10597
<212> TYPE: DNA
<213> ORGANISM: Artificial Sequence
<220> FEATURE:
<223> OTHER INFORMATION: Synthetic

<400> SEQUENCE: 39
tggcgaatgg gacgcgccct gtagcggcgc attaagcgcg gcgggtgtgg tggttacgcg 60
cagcgtgacc gctacacttg ccagcgccct agcgcccgct cctttcgctt tcttcccttc 120
ctttctcgcc acgttcgccg gctttccccg tcaagctcta aatcgggggc tccctttagg 180

```
gttccgattt agtgctttac ggcacctcga ccccaaaaaa cttgattagg gtgatggttc    240
acgtagtggg ccatcgccct gatagacggt ttttcgccct ttgacgttgg agtccacgtt    300
ctttaatagt ggactcttgt tccaaactgg aacaacactc aaccctatct cggtctattc    360
ttttgattta taagggattt tgccgatttc ggcctattgg ttaaaaaatg agctgattta    420
acaaaaattt aacgcgaatt ttaacaaaat attaacgttt acaatttcag gtggcacttt    480
tcggggaaat gtgcgcggaa cccctatttg tttatttttc taaatacatt caaatatgta    540
tccgctcatg aattaattct tagaaaaact catcgagcat caaatgaaac tgcaatttat    600
tcatatcagg attatcaata ccatattttt gaaaaagccg tttctgtaat gaaggagaaa    660
actcaccgag gcagttccat aggatggcaa gatcctggta tcggtctgcg attccgactc    720
gtccaacatc aatacaacct attaatttcc cctcgtcaaa aataaggtta tcaagtgaga    780
aatcaccatg agtgacgact gaatccggtg agaatggcaa aagtttatgc atttctttcc    840
agacttgttc aacaggccag ccattacgct cgtcatcaaa atcactcgca tcaaccaaac    900
cgttattcat tcgtgattgc gcctgagcga gacgaaatac gcgatcgctg ttaaaaggac    960
aattacaaac aggaatcgaa tgcaaccggc gcaggaacac tgccagcgca tcaacaatat   1020
tttcacctga atcaggatat tcttctaata cctggaatgc tgttttcccg gggatcgcag   1080
tggtgagtaa ccatgcatca tcaggagtac ggataaaatg cttgatggtc ggaagaggca   1140
taaattccgt cagccagttt agtctgacca tctcatctgt aacatcattg gcaacgctac   1200
ctttgccatg tttcagaaac aactctggcg catcgggctt cccatacaat cgatagattg   1260
tcgcacctga ttgcccgaca ttatcgcgag cccatttata cccatataaa tcagcatcca   1320
tgttggaatt taatcgcggc ctagagcaag acgtttcccg ttgaatatgg ctcataacac   1380
cccttgtatt actgtttatg taagcagaca gttttattgt tcatgaccaa aatcccttaa   1440
cgtgagtttt cgttccactg agcgtcagac cccgtagaaa agatcaaagg atcttcttga   1500
gatccttttt ttctgcgcgt aatctgctgc ttgcaaacaa aaaaaccacc gctaccagcg   1560
gtggtttgtt tgccggatca agagctacca actctttttc cgaaggtaac tggcttcagc   1620
agagcgcaga taccaaatac tgtccttcta gtgtagccgt agttaggcca ccacttcaag   1680
aactctgtag caccgcctac atacctcgct ctgctaatcc tgttaccagt ggctgctgcc   1740
agtggcgata agtcgtgtct taccgggttg gactcaagac gatagttacc ggataaggcg   1800
cagcggtcgg gctgaacggg gggttcgtgc acacagccca gcttggagcg aacgacctac   1860
accgaactga gatacctaca gcgtgagcta tgagaaagcg ccacgcttcc cgaagggaga   1920
aaggcggaca ggtatccggt aagcggcagg gtcggaacag gagagcgcac gagggagctt   1980
ccagggggaa acgcctggta tctttatagt cctgtcgggt ttcgccacct ctgacttgag   2040
cgtcgatttt tgtgatgctc gtcagggggg cggagcctat ggaaaaacgc cagcaacgcg   2100
gcctttttac ggttcctggc cttttgctgg ccttttgctc acatgttctt tcctgcgtta   2160
tcccctgatt ctgtggataa ccgtattacc gcctttgagt gagctgatac cgctcgccgc   2220
agccgaacga ccgagcgcag cgagtcagtg agcgaggaag cggaagagcg cctgatgcgg   2280
tattttctcc ttacgcatct gtgcggtatt tcacaccgca tatatggtgc actctcagta   2340
caatctgctc tgatgccgca tagttaagcc agtatacact ccgctatcgc tacgtgactg   2400
ggtcatggct gcgccccgac acccgccaac acccgctgac gcgccctgac gggcttgtct   2460
gctcccggca tccgcttaca gacaagctgt gaccgtctcc gggagctgca tgtgtcagag   2520
```

gttttcaccg tcatcaccga aacgcgcgag gcagctgcgg taaagctcat cagcgtggtc 2580
gtgaagcgat tcacagatgt ctgcctgttc atccgcgtcc agctcgttga gtttctccag 2640
aagcgttaat gtctggcttc tgataaagcg ggccatgtta agggcggttt tttcctgttt 2700
ggtcactgat gcctccgtgt aagggggatt tctgttcatg gggtaatga taccgatgaa 2760 acgagagagg atgctcacga tacgggttac tgatgatgaa catgcccggt tactggaacg 2820
ttgtgagggt aaacaactgg cggtatggat gcggcgggac cagagaaaaa tcactcaggg 2880
tcaatgccag cgcttcgtta atacagatgt aggtgttcca cagggtagcc agcagcatcc 2940
tgcgatgcag atccggaaca taatggtgca gggcgctgac ttccgcgttt ccagacttta 3000
cgaaacacgg aaaccgaaga ccattcatgt tgttgctcag gtcgcagacg ttttgcagca 3060
gcagtcgctt cacgttcgct cgcgtatcgg tgattcattc tgctaaccag taaggcaacc 3120
ccgccagcct agccgggtcc tcaacgacag gagcacgatc atgcgcaccc gtggggccgc 3180
catgccggcg ataatggcct gcttctcgcc gaaacgtttg gtggcgggac cagtgacgaa 3240
ggcttgagcg agggcgtgca agattccgaa taccgcaagc gacaggccga tcatcgtcgc 3300
gctccagcga aagcggtcct cgccgaaaat gacccagagc gctgccggca cctgtcctac 3360
gagttgcatg ataaagaaga cagtcataag tgcggcgacg atagtcatgc cccgcgccca 3420
ccggaaggag ctgactgggt tgaaggctct caagggcatc ggtcgagatc ccggtgccta 3480
atgagtgagc taacttacat taattgcgtt gcgctcactg cccgctttcc agtcgggaaa 3540
cctgtcgtgc cagctgcatt aatgaatcgg ccaacgcgcg gggagaggcg gtttgcgtat 3600
tgggcgccag ggtggttttt cttttcacca gtgagacggg caacagctga ttgcccttca 3660
ccgcctggcc ctgagagagt tgcagcaagc ggtccacgct ggtttgcccc agcaggcgaa 3720
aatcctgttt gatggtggtt aacggcggga tataacatga gctgtcttcg gtatcgtcgt 3780
atcccactac cgagatatcc gcaccaacgc gcagcccgga ctcggtaatg gcgcgcattg 3840
cgcccagcgc catctgatcg ttggcaacca gcatcgcagt gggaacgatg ccctcattca 3900
gcatttgcat ggtttgttga aaaccggaca tggcactcca gtcgccttcc cgttccgcta 3960
tcggctgaat ttgattgcga gtgagatatt tatgccagcc agccagacgc agacgcgccg 4020
agacagaact taatgggccc gctaacagcg cgatttgctg gtgacccaat gcgaccagat 4080
gctccacgcc cagtcgcgta ccgtcttcat gggagaaaat aatactgttg atgggtgtct 4140
ggtcagagac atcaagaaat aacgccggaa cattagtgca ggcagcttcc acagcaatgg 4200
catcctggtc atccagcgga tagttaatga tcagcccact gacgcgttgc gcgagaagat 4260
tgtgcaccgc cgctttacag gcttcgacgc cgcttcgttc taccatcgac accaccacgc 4320
tggcacccag ttgatcggcg cgagatttaa tcgccgcgac aatttgcgac ggcgcgtgca 4380
gggccagact ggaggtggca acgccaatca gcaacgactg tttgcccgcc agttgttgtg 4440
ccacgcggtt gggaatgtaa ttcagctccg ccatcgccgc ttccactttt tcccgcgttt 4500
tcgcagaaac gtggctggcc tggttcacca cgcgggaaac ggtctgataa gagacaccgg 4560
catactctgc gacatcgtat aacgttactg gtttcacatt caccaccctg aattgactct 4620
cttccgggcg ctatcatgcc ataccgcgaa aggttttgcg ccattcgatg gtgtccggga 4680
tctcgacgct ctcccttatg cgactcctgc attaggaagc agcccagtag taggttgagg 4740
ccgttgagca ccgccgccgc aaggaatggt gcatgcaagg agatggcgcc caacagtccc 4800
ccggccacgg ggcctgccac catacccacg ccgaaacaag cgctcatgag cccgaagtgg 4860
cgagcccgat cttccccatc ggtgatgtcg gcgatatagg cgccagcaac cgcacctgtg 4920
gcgccggtga tgccggccac gatgcgtccg gcgtagagga tcgagatctc gatcccgcga 4980
aattaatacg actcactata ggggaattgt gagcggataa caattcccct ctagaaataa 5040
ttttgtttaa ctttaagaag gagatatacc atgaaaatcg aagaaggtaa actggtaatc 5100
tggattaacg gcgataaagg ctataacggt ctcgctgaag tcggtaagaa attcgagaaa 5160
gataccggaa ttaaagtcac cgttgagcat ccggataaac tggaagagaa attcccacag 5220
gttgcggcaa ctggcgatgg ccctgacatt atcttctggg cacacgaccg ctttggtggc 5280
tacgctcaat ctggcctgtt ggctgaaatc accccggaca aagcgttcca ggacaagctg 5340
tatccgttta cctgggatgc cgtacgttac aacggcaagc tgattgctta cccgatcgct 5400
gttgaagcgt tatcgctgat ttataacaaa gatctgctgc cgaacccgcc aaaaacctgg 5460
gaagagatcc cggcgctgga taaagaactg aaagcgaaag gtaagagcgc gctgatgttc 5520
aacctgcaag aaccgtactt cacctggccg ctgattgctg ctgacggggg ttatgcgttc 5580
aagtatgaaa acggcaagta cgacattaaa gacgtgggcg tggataacgc tggcgcgaaa 5640
gcgggtctga ccttcctggt tgacctgatt aaaaacaaac acatgaatgc agacaccgat 5700
tactccatcg cagaagctgc ctttaataaa ggcgaaacag cgatgaccat caacggcccg 5760
tgggcatggt ccaacatcga caccagcaaa gtgaattatg gtgtaacggt actgccgacc 5820
ttcaagggtc aaccatccaa accgttcgtt ggcgtgctga gcgcaggtat taacgccgcc 5880
agtccgaaca aagagctggc aaaagagttc ctcgaaaact atctgctgac tgatgaaggt 5940
ctggaagcgg ttaataaaga caaaccgctg ggtgccgtag cgctgaagtc ttacgaggaa 6000
gagttggtga aagatccgcg tattgccgcc actatggaaa acgcccagaa aggtgaaatc 6060
atgccgaaca tcccgcagat gtccgctttc tggtatgccg tgcgtactgc ggtgatcaac 6120
gccgccagcg gtcgtcagac tgtcgatgaa gccctgaaag acgcgcagac taattcgagc 6180
tcgaacaaca acaacaataa caataacaac aacctcggga tcgagggaag ggtaacctg 6240
tttggtcata aacgttggta tgaagtgcgc gacaaaaaag actttaaaat caaacgcaag 6300
gtgaaagtga aacgcaacta tgatggcaac aaatatatcc tgaacatcaa cgagaacaac 6360
aacaaagaga agatcgataa taataaattc atccgcaaat acatcaacta caaaaaaaac 6420
gataacatcc tgaaagaatt cacccgcaag tttcatgcag gcaacattct gtttaaactg 6480
aaaggcaaag aaggcatcat tcgcatcgaa aacaatgatg attttctgga aaccgaagag 6540
gtggtgctgt atattgaagc atatggcaaa agcgaaaaac tgaaggcact gggcattacc 6600
aaaaaaaaga ttatcgatga agccattcgc cagggtatta ccaaagatga caaaaagatc 6660
gagatcaagc gccaagaaaa cgaagaagaa atcgaaattg atatccgcga cgagtatacc 6720
aataaaaccc tgaatgattg cagcattatt ctgcgcatta tcgagaatga tgagctggaa 6780
acgaaaaaga gcatctacga gatcttcaaa aacatcaaca tgagcctgta caaaatcatc 6840
gagaaaatta tcgaaaacga aaccgagaag gtgttcgaga atcgctatta tgaagaacat 6900
ctgcgtgaga aactgctgaa agatgataaa attgatgtga tcctgaccaa cttcatggaa 6960
atccgcgaaa agattaaaag caacctggaa attctgggct tcgtgaaatt ctatctgaat 7020
gttggtggcg acaagaaaaa aagcaagaac aagaaaatgc tggtcgaaaa aattctgaac 7080
attaacgttg atctgaccgt ggaagatatt gccgattttg tgattaaaga gctggaattc 7140
tggaacatca ccaaacgcat tgagaaggtg aaaaaagtga acaacgagtt cctggaaaaa 7200
cgtcgtaatc gcacctatat caaaagctat gttctgctgg ataagcacga gaaattcaaa 7260
attgaacgcg agaacaaaaa ggacaaaatc gtgaagtttt tcgtggaaaa tatcaaaaac 7320
aacagcatca aagaaaaaat cgagaagatc ctggccgagt tcaaaatcga tgaactgatc 7380
aaaaagctgg aaaaagaact gaaaaaaggc aactgcgata ccgaaatttt cggcatcttt 7440
aagaaacact ataaagtgaa cttcgatagc aaaaaattca gcaaaaagag cgacgaagag 7500
aaagagctgt ataagatcat ttaccgctat ctgaaaggcc gtattgaaaa aatcctggtg 7560
aatgaacaga aagtgcgcct gaaaaaaatg gaaaaaattg agattgagaa gattctgaac 7620
gagagcatcc tgagtgagaa aatcctgaaa cgtgttaaac agtataccct ggaacacatt 7680
atgtatctgg gtaaactgcg ccataacgat attgatatga ccaccgttaa taccgatgat 7740
ttcagccgtc tgcatgcaaa agaagaactg gatctggaac tgattacctt ttttgcaagc 7800
accaatatgg aactgaacaa gatctttagc cgtgaaaaca ttaacaacga cgagaacatt 7860
gatttctttg gtggtgatcg cgagaaaaac tatgtcctgg ataaaaagat cctgaatagc 7920
aaaatcaaga tcatccgcga tctggatttc atcgacaata agaacaacat taccaacaac 7980
tttattcgca aatttaccaa aattggcacc aatgaacgca accgtattct gcatgccatt 8040
agcaaagaac gtgatctgca gggcacccag gatgattata acaaagtgat taacatcatc 8100
cagaacctga aaatctccga tgaagaagtt agcaaagcac tgaatctgga tgtggtgttc 8160
aaagataaga aaaatatcat caccaagatc aacgatatca aaatcagcga agagaacaat 8220
aacgacatca aatatctgcc gagctttagc aaagttctgc cggaaattct taatctgtat 8280
cgcaataacc cgaaaaacga accgtttgat accatcgaaa cagagaaaat tgttctgaac 8340
gccctgatct atgtgaacaa agaactgtac aagaaactga tcctggaaga tgatctggaa 8400
gagaacgaat cgaaaaacat ctttctgcaa gagctgaaaa agaccctggg taacattgat 8460
gagatcgatg aaaacatcat cgaaaattac tacaagaacg cacagattag cgcaagcaaa 8520
ggtaataaca aagccatcaa aaaataccag aaaaaggtga tcgaatgcta cattggttat 8580
ctgcgcaaaa actacgaaga actgttcgat ttcagcgatt tcaaaatgaa catccaagag 8640
atcaagaagc agatcaagga cattaacgac aacaaaacct atgaacgcat caccgttaaa 8700
accagcgata aaaccattgt gatcaacgac gatttcgagt acatcattag catttttgca 8760
ctgctgaatt ccaacgccgt gatcaacaaa attcgcaatc gctttttttgc caccagtgtt 8820
tggctgaata ccagcgaata tcagaacatt atcgatatcc tggatgagat catgcagctg 8880
aatacactgc gtaatgaatg cattaccgaa aactggaatc tgaaccttga agaatttatt 8940
cagaaaatga aagagatcga gaaagacttc gacgacttca aaatccagac caaaaaagaa 9000
atcttcaaca actactacga ggacatcaaa aataacattc tgaccgaatt caaagacgat 9060
attaacggct gtgacgtgct ggaaaagaag ttggaaaaga tcgttatctt cgatgacgaa 9120
accaaattcg aaatcgacaa aaagtccaac atccttcagg atgaacagcg taaactgagc 9180
aatatcaaca agaaagacct gaagaagaag gtcgaccagt acatcaaaga caaagaccaa 9240
gaaattaaga gcaaaatcct gtgccgcatc atctttaaca gcgactttct gaaaaagtat 9300
aagaaagaga ttgacaacct gatcgaggat atggaaagcg agaacgaaaa caagtttcaa 9360
gagatctact atccgaaaga acgcaaaaac gagctgtaca tctacaagaa gaacctgttc 9420
ctgaatattg gcaacccgaa cttcgacaaa atctatggtc tgatcagcaa cgacattaaa 9480
atggccgatg caaaattcct gtttaatatc gatggtaaaa acatccgtaa aaacaaaatt 9540
agcgagatcg acgcgatcct gaaaaacctg aacgataaac tgaatggcta cagcaaagaa 9600
tataaagaga aatacattaa aaagctgaaa gaaaatgacg acttcttcgc caagaacatc 9660
cagaataaaa actataaaag cttcgagaag gactacaatc gcgtgtccga atataagaaa 9720
attcgtgatc tggtggaatt caactatctg aacaaaatcg aaagctatct gatcgatatc 9780
aactggaaac tggcaattca gatggcacgt tttgagcgtg atatgcacta tattgttaat 9840
ggtctgcgtg aactgggcat cattaaactg agtggttata ataccggcat tagccgtgca 9900
tatccgaaac gtaatggttc cgatggtttt tataccacca ccgcctatta caaatttttc 9960
gacgaagaaa gctacaagaa atttgagaaa atttgctacg gcttcggcat tgatctgagc 10020
gaaaatagcg aaattaacaa gccggaaaat gagagcattc gcaactatat ctcccacttt 10080
tatatcgtgc gtaatccgtt tgccgattat agcattgcag agcagattga tcgtgttagc 10140
aatctgctga gctatagtac ccgttataac aatagcacct atgccagcgt gtttgaggtg 10200
tttaaaaagg atgttaacct ggactatgac gagctgaaga aaaagttcaa actgatcggc 10260
aacaatgaca tcctggaacg tctgatgaaa ccgaaaaaag ttagtgtgct ggaacttgag 10320
agctacaaca gcgattatat caagaacctg attatcgagc tgctgaccaa gattgaaaat 10380
accaatgata ccctggatcc gaattcgagc tccgtcgaca agcttgcggc cgcactcgag 10440
caccaccacc accaccactg agatccggct gctaacaaag cccgaaagga agctgagttg 10500
gctgctgcca ccgctgagca ataactagca taaccccttg gggcctctaa acgggtcttg 10560
aggggttttt tgctgaaagg aggaactata tccggat 10597

<210> SEQ ID NO 40
<211> LENGTH: 8731
<212> TYPE: DNA
<213> ORGANISM: Artificial Sequence
<220> FEATURE:
<223> OTHER INFORMATION: Synthetic

<400> SEQUENCE: 40
tggcgaatgg gacgcgccct gtagcggcgc attaagcgcg gcgggtgtgg tggttacgcg 60
cagcgtgacc gctacacttg ccagcgccct agcgcccgct cctttcgctt tcttcccttc 120
ctttctcgcc acgttcgccg gctttccccg tcaagctcta aatcgggggc tccctttagg 180
gttccgattt agtgctttac ggcacctcga ccccaaaaaa cttgattagg gtgatggttc 240
acgtagtggg ccatcgccct gatagacggt ttttcgccct ttgacgttgg agtccacgtt 300
ctttaatagt ggactcttgt tccaaactgg aacaacactc aaccctatct cggtctattc 360
ttttgattta taagggattt tgccgatttc ggcctattgg ttaaaaaatg agctgattta 420
acaaaaattt aacgcgaatt ttaacaaaat attaacgttt acaatttcag gtggcacttt 480
tcggggaaat gtgcgcggaa cccctatttg tttatttttc taaatacatt caaatatgta 540
tccgctcatg aattaattct tagaaaaact catcgagcat caaatgaaac tgcaatttat 600
tcatatcagg attatcaata ccatattttt gaaaaagccg tttctgtaat gaaggagaaa 660
actcaccgag gcagttccat aggatggcaa gatcctggta tcggtctgcg attccgactc 720
gtccaacatc aatacaacct attaatttcc cctcgtcaaa aataaggtta tcaagtgaga 780
aatcaccatg agtgacgact gaatccggtg agaatggcaa aagtttatgc atttctttcc 840
agacttgttc aacaggccag ccattacgct cgtcatcaaa atcactcgca tcaaccaaac 900
cgttattcat tcgtgattgc gcctgagcga gacgaaatac gcgatcgctg ttaaaaggac 960
aattacaaac aggaatcgaa tgcaaccggc gcaggaacac tgccagcgca tcaacaatat 1020
tttcacctga atcaggatat tcttctaata cctggaatgc tgttttcccg gggatcgcag 1080

-continued

```
tggtgagtaa ccatgcatca tcaggagtac ggataaaatg cttgatggtc ggaagaggca   1140
taaattccgt cagccagttt agtctgacca tctcatctgt aacatcattg gcaacgctac   1200
ctttgccatg tttcagaaac aactctggcg catcgggctt cccatacaat cgatagattg   1260
tcgcacctga ttgcccgaca ttatcgcgag cccatttata cccatataaa tcagcatcca   1320
tgttggaatt taatcgcggc ctagagcaag acgtttcccg ttgaatatgg ctcataacac   1380
cccttgtatt actgtttatg taagcagaca gttttattgt tcatgaccaa aatcccttaa   1440
cgtgagtttt cgttccactg agcgtcagac cccgtagaaa agatcaaagg atcttcttga   1500
gatccttttt ttctgcgcgt aatctgctgc ttgcaaacaa aaaaaccacc gctaccagcg   1560
gtggtttgtt tgccggatca agagctacca actctttttc cgaaggtaac tggcttcagc   1620
agagcgcaga taccaaatac tgtccttcta gtgtagccgt agttaggcca ccacttcaag   1680
aactctgtag caccgcctac atacctcgct ctgctaatcc tgttaccagt ggctgctgcc   1740
agtggcgata agtcgtgtct taccgggttg gactcaagac gatagttacc ggataaggcg   1800
cagcggtcgg gctgaacggg gggttcgtgc acacagccca gcttggagcg aacgacctac   1860
accgaactga gatacctaca gcgtgagcta tgagaaagcg ccacgcttcc cgaagggaga   1920
aaggcggaca ggtatccggt aagcggcagg gtcggaacag gagagcgcac gagggagctt   1980
ccagggggaa acgcctggta tctttatagt cctgtcgggt ttcgccacct ctgacttgag   2040
cgtcgatttt tgtgatgctc gtcagggggg cggagcctat ggaaaaacgc cagcaacgcg   2100
gcctttttac ggttcctggc cttttgctgg ccttttgctc acatgttctt tcctgcgtta   2160
tcccctgatt ctgtggataa ccgtattacc gcctttgagt gagctgatac cgctcgccgc   2220
agccgaacga ccgagcgcag cgagtcagtg agcgaggaag cggaagagcg cctgatgcgg   2280
tattttctcc ttacgcatct gtgcggtatt tcacaccgca tatatggtgc actctcagta   2340
caatctgctc tgatgccgca tagttaagcc agtatacact ccgctatcgc tacgtgactg   2400
ggtcatggct gcgccccgac acccgccaac acccgctgac gcgccctgac gggcttgtct   2460
gctcccggca tccgcttaca gacaagctgt gaccgtctcc gggagctgca tgtgtcagag   2520
gttttcaccg tcatcaccga aacgcgcgag gcagctgcgg taaagctcat cagcgtggtc   2580
gtgaagcgat tcacagatgt ctgcctgttc atccgcgtcc agctcgttga gtttctccag   2640
aagcgttaat gtctggcttc tgataaagcg ggccatgtta agggcggttt tttcctgttt   2700
ggtcactgat gcctccgtgt aagggggatt tctgttcatg gggggtaatga taccgatgaa   2760
acgagagagg atgctcacga tacgggttac tgatgatgaa catgcccggt tactggaacg   2820
ttgtgagggt aaacaactgg cggtatggat gcggcgggac cagagaaaaa tcactcaggg   2880
tcaatgccag cgcttcgtta atacagatgt aggtgttcca cagggtagcc agcagcatcc   2940
tgcgatgcag atccggaaca taatggtgca gggcgctgac ttccgcgttt ccagacttta   3000
cgaaacacgg aaaccgaaga ccattcatgt tgttgctcag gtcgcagacg ttttgcagca   3060
gcagtcgctt cacgttcgct cgcgtatcgg tgattcattc tgctaaccag taaggcaacc   3120
ccgccagcct agccgggtcc tcaacgacag gagcacgatc atgcgcaccc gtggggccgc   3180
catgccggcg ataatggcct gcttctcgcc gaaacgtttg gtggcgggac cagtgacgaa   3240
ggcttgagcg agggcgtgca agattccgaa taccgcaagc gacaggccga tcatcgtcgc   3300
gctccagcga aagcggtcct cgccgaaaat gacccagagc gctgccggca cctgtcctac   3360
gagttgcatg ataaagaaga cagtcataag tgcggcgacg atagtcatgc cccgcgccca   3420
ccggaaggag ctgactgggt tgaaggctct caagggcatc ggtcgagatc ccggtgccta   3480
```

```
atgagtgagc taacttacat taattgcgtt gcgctcactg cccgctttcc agtcgggaaa   3540
cctgtcgtgc cagctgcatt aatgaatcgg ccaacgcgcg gggagaggcg gtttgcgtat   3600
tgggcgccag ggtggttttt cttttcacca gtgagacggg caacagctga ttgcccttca   3660
ccgcctggcc ctgagagagt tgcagcaagc ggtccacgct ggtttgcccc agcaggcgaa   3720
aatcctgttt gatggtggtt aacggcggga tataacatga gctgtcttcg gtatcgtcgt   3780
atcccactac cgagatatcc gcaccaacgc gcagcccgga ctcggtaatg gcgcgcattg   3840
cgcccagcgc catctgatcg ttggcaacca gcatcgcagt gggaacgatg ccctcattca   3900
gcatttgcat ggtttgttga aaaccggaca tggcactcca gtcgccttcc cgttccgcta   3960
tcggctgaat ttgattgcga gtgagatatt tatgccagcc agccagacgc agacgcgccg   4020
agacagaact taatgggccc gctaacagcg cgatttgctg gtgacccaat gcgaccagat   4080
gctccacgcc cagtcgcgta ccgtcttcat gggagaaaat aatactgttg atgggtgtct   4140
ggtcagagac atcaagaaat aacgccggaa cattagtgca ggcagcttcc acagcaatgg   4200
catcctggtc atccagcgga tagttaatga tcagcccact gacgcgttgc gcgagaagat   4260
tgtgcaccgc cgctttacag gcttcgacgc cgcttcgttc taccatcgac accaccacgc   4320
tggcacccag ttgatcggcg cgagatttaa tcgccgcgac aatttgcgac ggcgcgtgca   4380
gggccagact ggaggtggca acgccaatca gcaacgactg tttgcccgcc agttgttgtg   4440
ccacgcggtt gggaatgtaa ttcagctccg ccatcgccgc ttccactttt tcccgcgttt   4500
tcgcagaaac gtggctggcc tggttcacca cgcgggaaac ggtctgataa gagacaccgg   4560
catactctgc gacatcgtat aacgttactg gtttcacatt caccaccctg aattgactct   4620
cttccgggcg ctatcatgcc ataccgcgaa aggttttgcg ccattcgatg gtgtccggga   4680
tctcgacgct ctcccttatg cgactcctgc attaggaagc agcccagtag taggttgagg   4740
ccgttgagca ccgccgccgc aaggaatggt gcatgcaagg agatggcgcc caacagtccc   4800
ccggccacgg ggcctgccac catacccacg ccgaaacaag cgctcatgag cccgaagtgg   4860
cgagcccgat cttccccatc ggtgatgtcg gcgatatagg cgccagcaac cgcacctgtg   4920
gcgccggtga tgccggccac gatgcgtccg gcgtagagga tcgagatctc gatcccgcga   4980
aattaatacg actcactata ggggaattgt gagcggataa caattcccct ctagaaataa   5040
ttttgtttaa ctttaagaag gagatatacc atgaaagtga ccaaagtgga tggcatcagc   5100
cacaaaaaat acatcgaaga aggcaaactg gttaaaagca ccagcgaaga aaatcgtacc   5160
agcgaacgtc tgagcgaact gctgagcatt cgtctggata tctatatcaa aaatccggat   5220
aatgccagcg aggaagaaaa ccgtattcgt cgtgaaaacc tgaaaaagtt cttcagcaat   5280
aaagtgctgc acctgaaaga tagcgttctg tatctgaaaa accgcaaaga aaaaaatgcc   5340
gtgcaggaca aaaactatag cgaagaggat atcagcgagt atgacctgaa gaacaaaaat   5400
agctttagcg tgctgaaaaa aatcctgctg aatgaagatg tgaatagcga ggaactggaa   5460
atctttcgta aagatgttga agccaagctg aacaaaatca acagcctgaa atatagcttt   5520
gaagaaaaca aggccaacta tcagaaaatc aacgagaaca acgtggaaaa agttggtggt   5580
aaaagcaaac gcaacatcat ctatgattat tatcgcgaaa gcgcgaaacg caacgattat   5640
atcaataatg tgcaagaggc cttcgacaaa ctgtacaaaa aagaggacat cgaaaaactg   5700
ttttttctga tcgagaacag caagaagcac gagaaataca aaatccgcga gtactaccat   5760
aaaatcatcg gtcgcaaaaa cgataaagag aacttcgcca aaatcatcta cgaagaaatt   5820
```

cagaacgtga acaacatcaa agaactgatc gaaaaaattc cggacatgag cgagctgaag 5880
aaaagccagg tgttctataa atactacctg gacaaagagg aactgaacga caaaaacatc 5940
aaatatgcct tttgccactt cgtcgaaatt gaaatgagcc agctgcttaa aaactacgtg 6000
tataaacgcc tgagcaacat cagcaacgat aaaatcaaac gtatctttga atatcagaat 6060
ctgaagaaac tgattgaaaa caaactgctg aacaagctgg atacctatgt tcgtaattgc 6120
ggcaaataca actactatct gcaggttggt gaaattgcaa ccagcgattt tattgcacgt 6180
aatcgtcaga atgaagcctt tctgcgtaac attattggtg ttagcagcgt tgcatatttt 6240
agcctgcgta atattctgga aaccgaaaac gaaaatggca ttaccggtcg tatgcgtggt 6300
aaaaccgtta aaaacaataa aggcgaagag aagtatgtga gcggtgaagt ggataaaatc 6360
tataacgaaa acaagcagaa cgaagtgaaa gaaaatctga aatgtttta cagctacgac 6420
ttcaacatgg acaacaaaaa cgagatcgaa gatttcttcg ccaacattga tgaagccatt 6480
agcagtattc gtcatggcat tgtgcacttt aatctggaac ttgaaggcaa agacatcttc 6540
gcgtttaaaa acattgcacc gagcgagatc agcaaaaaaa tgtttcagaa cgagattaac 6600
gaaaaaaaac tgaaactgaa aatcttcaaa cagctgaata gcgccaacgt gttcaactat 6660
tatgagaaag acgtgatcat caaatacctt aaaaacacca aattcaactt cgtgaataaa 6720
aacatcccgt ttgttccgag cttcaccaaa ctgtataaca aaattgaaga tctgcgcaat 6780
accctgaagt ttttttggag cgttccgaaa gacaaagaag aaaaagacgc acagatctac 6840
ctgcttaaga acatctatta tggcgaattt ctgaacaaat tcgtgaaaaa tagcaaagtg 6900
ttcttcaaaa tcaccaacga ggtgatcaag attaacaaac agcgtaatca gaaaaccggt 6960
cactacaaat accagaagtt tgagaacatt gaaaaaaccg tgccggttga atatctggca 7020
attattcaga gccgtgagat gattaacaac caggataaag aagagaaaaa cacctacatc 7080
gatttcatcc agcagatctt tctgaaaggc tttatcgatt acctgaacaa gaacaacctg 7140
aagtatatcg agtcgaacaa caataacgac aacaacgaca tctttagcaa aatcaaaatc 7200
aagaaagata ataaagaaaa atacgacaag atcctgaaaa actatgagaa gcacaaccgc 7260
aacaaagaaa ttccgcatga gatcaatgaa tttgtgcgcg aaattaaact gggcaaaatc 7320
ctgaaataca ccgagaacct gaatatgttc tatctgattc tgaagctgct gaaccataaa 7380
gagctgacca atctgaaagg tagcctggaa aaatatcaga gcgcaaacaa agaagagaca 7440
ttttctgacg aactggaact gattaatctg ctgaatctgg ataataaccg tgtgaccgaa 7500
gattttgaac tggaagcaaa tgaaatcggc aaattcctgg atttcaatga gaacaaaatt 7560
aaggaccgga aagagcttaa aaagtttgat accaacaaaa tctacttcga cggcgagaac 7620
attatcaaac atcgtgcctt ttataacatc aaaaagtatg gcatgctgaa cctgctggaa 7680
aaaattgcag ataaagccaa gtacaaaatt agcctgaaag aacttaaaga gtacagcaac 7740
aaaaagaacg aaatcgagaa gaactatacc atgcagcaga atctgcatcg taaatatgca 7800
cgtccgaaaa aagacgagaa attcaacgat gaggactata aagaatacga gaaagccatt 7860
ggcaacatcc agaaatatac ccacttgaaa aacaaagtgg aatttaacga gctgaattta 7920
ctgcagggtc tgctgctgaa aattctgcac cgtctggttg gttataccag catttgggaa 7980
cgtgatctgc gttttcgcct gaaaggtgaa tttcctgaaa accactatat cgaggaaatt 8040
ttcaactttg acaacagcaa aaacgtgaaa tataagagcg gtcagatcgt cgaaaagtac 8100
atcaactttt acaaagaact ttacaaggat aatgtggaaa aacgcagcat ctacagcgac 8160
aagaaagtga aaaagctgaa gcaagaaaag aaagacctgt acatccgtaa ttatatcgcc 8220
cactttaact atatcccgca tgcagaaatt agtctgctgg aagttctgga aaatctgcgt 8280
aaactgctgt catatgatcg caaactgaag aacgcaatca tgaaaagcat tgtggatatc 8340
ctgaaagagt atggttttgt cgccaccttt aaaatcggtg ccgataagaa aattgagatt 8400
cagaccctgg aaagcgagaa aattgtgcat cttaagaacc ttaaaaagaa aaaactgatg 8460
accgatcgca acagcgaaga gttatgtgaa ctggtgaaag tgatgttcga atacaaagca 8520
ctggaagggg atccgaattc gagctccgtc gacaagcttg cggccgcact cgagcaccac 8580
caccaccacc actgagatcc ggctgctaac aaagcccgaa aggaagctga gttggctgct 8640
gccaccgctg agcaataact agcataaccc cttggggcct ctaaacgggt cttgaggggt 8700
tttttgctga aaggaggaac tatatccgga t 8731

<210> SEQ ID NO 41
<211> LENGTH: 9886
<212> TYPE: DNA
<213> ORGANISM: Artificial Sequence
<220> FEATURE:
<223> OTHER INFORMATION: Synthetic

<400> SEQUENCE: 41
tggcgaatgg gacgcgccct gtagcggcgc attaagcgcg gcgggtgtgg tggttacgcg 60
cagcgtgacc gctacacttg ccagcgccct agcgcccgct cctttcgctt tcttcccttc 120
ctttctcgcc acgttcgccg gctttccccg tcaagctcta aatcgggggc tccctttagg 180
gttccgattt agtgctttac ggcacctcga ccccaaaaaa cttgattagg gtgatggttc 240
acgtagtggg ccatcgccct gatagacggt ttttcgccct ttgacgttgg agtccacgtt 300
ctttaatagt ggactcttgt tccaaactgg aacaacactc aaccctatct cggtctattc 360
ttttgattta taagggattt tgccgatttc ggcctattgg ttaaaaaatg agctgattta 420
acaaaaattt aacgcgaatt ttaacaaaat attaacgttt acaatttcag gtggcacttt 480
tcggggaaat gtgcgcggaa cccctatttg tttatttttc taaatacatt caaatatgta 540
tccgctcatg aattaattct tagaaaaact catcgagcat caaatgaaac tgcaatttat 600
tcatatcagg attatcaata ccatattttt gaaaaagccg tttctgtaat gaaggagaaa 660
actcaccgag gcagttccat aggatggcaa gatcctggta tcggtctgcg attccgactc 720
gtccaacatc aatacaacct attaatttcc cctcgtcaaa aataaggtta tcaagtgaga 780
aatcaccatg agtgacgact gaatccggtg agaatggcaa aagtttatgc atttctttcc 840
agacttgttc aacaggccag ccattacgct cgtcatcaaa atcactcgca tcaaccaaac 900
cgttattcat tcgtgattgc gcctgagcga gacgaaatac gcgatcgctg ttaaaaggac 960
aattacaaac aggaatcgaa tgcaaccggc gcaggaacac tgccagcgca tcaacaatat 1020
tttcacctga atcaggatat tcttctaata cctggaatgc tgttttcccg gggatcgcag 1080
tggtgagtaa ccatgcatca tcaggagtac ggataaaatg cttgatggtc ggaagaggca 1140
taaattccgt cagccagttt agtctgacca tctcatctgt aacatcattg gcaacgctac 1200
ctttgccatg tttcagaaac aactctggcg catcgggctt cccatacaat cgatagattg 1260
tcgcacctga ttgcccgaca ttatcgcgag cccatttata cccatataaa tcagcatcca 1320
tgttggaatt taatcgcggc ctagagcaag acgtttcccg ttgaatatgg ctcataacac 1380
cccttgtatt actgtttatg taagcagaca gttttattgt tcatgaccaa aatcccttaa 1440
cgtgagtttt cgttccactg agcgtcagac cccgtagaaa agatcaaagg atcttcttga 1500

-continued

```
gatccttttt ttctgcgcgt aatctgctgc ttgcaaacaa aaaaaccacc gctaccagcg   1560
gtggtttgtt tgccggatca agagctacca actctttttc cgaaggtaac tggcttcagc   1620
agagcgcaga taccaaatac tgtccttcta gtgtagccgt agttaggcca ccacttcaag   1680
aactctgtag caccgcctac atacctcgct ctgctaatcc tgttaccagt ggctgctgcc   1740
agtggcgata agtcgtgtct taccgggttg gactcaagac gatagttacc ggataaggcg   1800
cagcggtcgg gctgaacggg gggttcgtgc acacagccca gcttggagcg aacgacctac   1860
accgaactga gatacctaca gcgtgagcta tgagaaagcg ccacgcttcc cgaagggaga   1920
aaggcggaca ggtatccggt aagcggcagg gtcggaacag gagagcgcac gagggagctt   1980
ccagggggaa acgcctggta tctttatagt cctgtcgggt ttcgccacct ctgacttgag   2040
cgtcgatttt tgtgatgctc gtcagggggg cggagcctat ggaaaaacgc cagcaacgcg   2100
gcctttttac ggttcctggc cttttgctgg ccttttgctc acatgttctt tcctgcgtta   2160
tcccctgatt ctgtggataa ccgtattacc gcctttgagt gagctgatac cgctcgccgc   2220
agccgaacga ccgagcgcag cgagtcagtg agcgaggaag cggaagagcg cctgatgcgg   2280
tattttctcc ttacgcatct gtgcggtatt tcacaccgca tatatggtgc actctcagta   2340
caatctgctc tgatgccgca tagttaagcc agtatacact ccgctatcgc tacgtgactg   2400
ggtcatggct gcgccccgac acccgccaac acccgctgac gcgccctgac gggcttgtct   2460
gctcccggca tccgcttaca gacaagctgt gaccgtctcc gggagctgca tgtgtcagag   2520
gttttcaccg tcatcaccga aacgcgcgag gcagctgcgg taaagctcat cagcgtggtc   2580
gtgaagcgat tcacagatgt ctgcctgttc atccgcgtcc agctcgttga gtttctccag   2640
aagcgttaat gtctggcttc tgataaagcg ggccatgtta agggcggttt tttcctgttt   2700
ggtcactgat gcctccgtgt aagggggatt tctgttcatg gggtaatga taccgatgaa   2760
acgagagagg atgctcacga tacgggttac tgatgatgaa catgcccggt tactggaacg   2820
ttgtgagggt aaacaactgg cggtatggat gcggcgggac cagagaaaaa tcactcaggg   2880
tcaatgccag cgcttcgtta atacagatgt aggtgttcca cagggtagcc agcagcatcc   2940
tgcgatgcag atccggaaca taatggtgca gggcgctgac ttccgcgttt ccagacttta   3000
cgaaacacgg aaaccgaaga ccattcatgt tgttgctcag gtcgcagacg ttttgcagca   3060
gcagtcgctt cacgttcgct cgcgtatcgg tgattcattc tgctaaccag taaggcaacc   3120
ccgccagcct agccgggtcc tcaacgacag gagcacgatc atgcgcaccc gtggggccgc   3180
catgccggcg ataatggcct gcttctcgcc gaaacgtttg gtggcgggac cagtgacgaa   3240
ggcttgagcg agggcgtgca agattccgaa taccgcaagc gacaggccga tcatcgtcgc   3300
gctccagcga aagcggtcct cgccgaaaat gacccagagc gctgccggca cctgtcctac   3360
gagttgcatg ataaagaaga cagtcataag tgcggcgacg atagtcatgc cccgcgccca   3420
ccggaaggag ctgactgggt tgaaggctct caagggcatc ggtcgagatc ccggtgccta   3480
atgagtgagc taacttacat taattgcgtt gcgctcactg cccgctttcc agtcgggaaa   3540
cctgtcgtgc cagctgcatt aatgaatcgg ccaacgcgcg gggagaggcg gtttgcgtat   3600
tgggcgccag ggtggttttt cttttcacca gtgagacggg caacagctga ttgcccttca   3660
ccgcctggcc ctgagagagt tgcagcaagc ggtccacgct ggtttgcccc agcaggcgaa   3720
aatcctgttt gatggtggtt aacggcggga tataacatga gctgtcttcg gtatcgtcgt   3780
atcccactac cgagatatcc gcaccaacgc gcagcccgga ctcggtaatg gcgcgcattg   3840
cgcccagcgc catctgatcg ttggcaacca gcatcgcagt gggaacgatg ccctcattca   3900
```

gcatttgcat ggtttgttga aaaccggaca tggcactcca gtcgccttcc cgttccgcta 3960
tcggctgaat ttgattgcga gtgagatatt tatgccagcc agccagacgc agacgcgccg 4020
agacagaact taatgggccc gctaacagcg cgatttgctg gtgacccaat gcgaccagat 4080
gctccacgcc cagtcgcgta ccgtcttcat gggagaaaat aatactgttg atgggtgtct 4140
ggtcagagac atcaagaaat aacgccggaa cattagtgca ggcagcttcc acagcaatgg 4200
catcctggtc atccagcgga tagttaatga tcagcccact gacgcgttgc gcgagaagat 4260
tgtgcaccgc cgctttacag gcttcgacgc cgcttcgttc taccatcgac accaccacgc 4320
tggcacccag ttgatcggcg cgagatttaa tcgccgcgac aatttgcgac ggcgcgtgca 4380
gggccagact ggaggtggca acgccaatca gcaacgactg tttgcccgcc agttgttgtg 4440
ccacgcggtt gggaatgtaa ttcagctccg ccatcgccgc ttccactttt tcccgcgttt 4500
tcgcagaaac gtggctggcc tggttcacca cgcgggaaac ggtctgataa gagacaccgg 4560
catactctgc gacatcgtat aacgttactg gtttcacatt caccaccctg aattgactct 4620
cttccgggcg ctatcatgcc ataccgcgaa aggttttgcg ccattcgatg gtgtccggga 4680
tctcgacgct ctcccttatg cgactcctgc attaggaagc agcccagtag taggttgagg 4740
ccgttgagca ccgccgccgc aaggaatggt gcatgcaagg agatggcgcc caacagtccc 4800
ccggccacgg ggcctgccac catacccacg ccgaaacaag cgctcatgag cccgaagtgg 4860
cgagcccgat cttccccatc ggtgatgtcg gcgatatagg cgccagcaac cgcacctgtg 4920
gcgccggtga tgccggccac gatgcgtccg gcgtagagga tcgagatctc gatcccgcga 4980
aattaatacg actcactata ggggaattgt gagcggataa caattcccct ctagaaataa 5040
ttttgtttaa ctttaagaag gagatatacc atgaaaatcg aagaaggtaa actggtaatc 5100
tggattaacg gcgataaagg ctataacggt ctcgctgaag tcggtaagaa attcgagaaa 5160
gataccggaa ttaaagtcac cgttgagcat ccggataaac tggaagagaa attcccacag 5220
gttgcggcaa ctggcgatgg ccctgacatt atcttctggg cacacgaccg ctttggtggc 5280
tacgctcaat ctggcctgtt ggctgaaatc accccggaca aagcgttcca ggacaagctg 5340
tatccgttta cctgggatgc cgtacgttac aacggcaagc tgattgctta cccgatcgct 5400
gttgaagcgt tatcgctgat ttataacaaa gatctgctgc cgaacccgcc aaaaacctgg 5460
gaagagatcc cggcgctgga taaagaactg aaagcgaaag gtaagagcgc gctgatgttc 5520
aacctgcaag aaccgtactt cacctggccg ctgattgctg ctgacggggg ttatgcgttc 5580
aagtatgaaa acggcaagta cgacattaaa gacgtgggcg tggataacgc tggcgcgaaa 5640
gcgggtctga ccttcctggt tgacctgatt aaaaacaaac acatgaatgc agacaccgat 5700
tactccatcg cagaagctgc ctttaataaa ggcgaaacag cgatgaccat caacggcccg 5760
tgggcatggt ccaacatcga caccagcaaa gtgaattatg gtgtaacggt actgccgacc 5820
ttcaagggtc aaccatccaa accgttcgtt ggcgtgctga gcgcaggtat taacgccgcc 5880
agtccgaaca aagagctggc aaaagagttc ctcgaaaact atctgctgac tgatgaaggt 5940
ctggaagcgg ttaataaaga caaaccgctg ggtgccgtag cgctgaagtc ttacgaggaa 6000
gagttggtga aagatccgcg tattgccgcc actatggaaa acgcccagaa aggtgaaatc 6060
atgccgaaca tcccgcagat gtccgctttc tggtatgccg tgcgtactgc ggtgatcaac 6120
gccgccagcg gtcgtcagac tgtcgatgaa gccctgaaag acgcgcagac taattcgagc 6180
tcgaacaaca acaacaataa caataacaac aacctcggga tcgagggaag gaaagtgacc 6240

```
aaagtggatg gcatcagcca caaaaaatac atcgaagaag gcaaactggt taaaagcacc   6300
agcgaagaaa atcgtaccag cgaacgtctg agcgaactgc tgagcattcg tctggatatc   6360
tatatcaaaa atccggataa tgccagcgag gaagaaaacc gtattcgtcg tgaaaacctg   6420
aaaaagttct tcagcaataa agtgctgcac ctgaaagata gcgttctgta tctgaaaaac   6480
cgcaaagaaa aaaatgccgt gcaggacaaa aactatagcg aagaggatat cagcgagtat   6540
gacctgaaga acaaaaatag ctttagcgtg ctgaaaaaaa tcctgctgaa tgaagatgtg   6600
aatagcgagg aactggaaat ctttcgtaaa gatgttgaag ccaagctgaa caaaatcaac   6660
agcctgaaat atagctttga agaaaacaag gccaactatc agaaaatcaa cgagaacaac   6720
gtggaaaaag ttggtggtaa aagcaaacgc aacatcatct atgattatta tcgcgaaagc   6780
gcgaaacgca acgattatat caataatgtg caagaggcct tcgacaaact gtacaaaaaa   6840
gaggacatcg aaaaactgtt ttttctgatc gagaacagca agaagcacga gaaatacaaa   6900
atccgcgagt actaccataa aatcatcggt cgcaaaaacg ataaagagaa cttcgccaaa   6960
atcatctacg aagaaattca gaacgtgaac aacatcaaag aactgatcga aaaaattccg   7020
gacatgagcg agctgaagaa aagccaggtg ttctataaat actacctgga caaagaggaa   7080
ctgaacgaca aaaacatcaa atatgccttt tgccacttcg tcgaaattga aatgagccag   7140
ctgcttaaaa actacgtgta taaacgcctg agcaacatca gcaacgataa aatcaaacgt   7200
atctttgaat atcagaatct gaagaaactg attgaaaaca aactgctgaa caagctggat   7260
acctatgttc gtaattgcgg caaatacaac tactatctgc aggttggtga aattgcaacc   7320
agcgatttta ttgcacgtaa tcgtcagaat gaagcctttc tgcgtaacat tattggtgtt   7380
agcagcgttg catattttag cctgcgtaat attctggaaa ccgaaaacga aaatggtatt   7440
accggtcgta tgcgtggtaa aaccgttaaa aacaataaag gcgaagagaa gtatgtgagc   7500
ggtgaagtgg ataaaatcta taacgaaaac aagcagaacg aagtgaaaga aaatctgaaa   7560
atgttttaca gctacgactt caacatggac aacaaaaacg agatcgaaga tttcttcgcc   7620
aacattgatg aagccattag cagtattcgt catggcattg tgcactttaa tctggaactt   7680
gaaggcaaag acatcttcgc gtttaaaaac attgcaccga gcgagatcag caaaaaaatg   7740
tttcagaacg agattaacga aaaaaaactg aaactgaaaa tcttcaaaca gctgaatagc   7800
gccaacgtgt tcaactatta tgagaaagac gtgatcatca aataccttaa aaacaccaaa   7860
ttcaacttcg tgaataaaaa catcccgttt gttccgagct tcaccaaact gtataacaaa   7920
attgaagatc tgcgcaatac cctgaagttt ttttggagcg ttccgaaaga caaagaagaa   7980
aaagacgcac agatctacct gcttaagaac atctattatg gcgaatttct gaacaaattc   8040
gtgaaaaata gcaaagtgtt cttcaaaatc accaacgagg tgatcaagat taacaaacag   8100
cgtaatcaga aaaccggtca ctacaaatac cagaagtttg agaacattga aaaaaccgtg   8160
ccggttgaat atctggcaat tattcagagc cgtgagatga ttaacaacca ggataaagaa   8220
gagaaaaaca cctacatcga tttcatccag cagatctttc tgaaaggctt tatcgattac   8280
ctgaacaaga acaacctgaa gtatatcgag tcgaacaaca ataacgacaa caacgacatc   8340
tttagcaaaa tcaaaatcaa gaaagataat aaagaaaaat acgacaagat cctgaaaaac   8400
tatgagaagc acaaccgcaa caaagaaatt ccgcatgaga tcaatgaatt tgtgcgcgaa   8460
attaaactgg gcaaaatcct gaaatacacc gagaacctga atatgttcta tctgattctg   8520
aagctgctga accataaaga gctgaccaat ctgaaaggta gcctggaaaa atatcagagc   8580
gcaaacaaag aagagacatt ttctgacgaa ctggaactga ttaatctgct gaatctggat   8640
```

```
aataaccgtg tgaccgaaga ttttgaactg gaagcaaatg aaatcggcaa attcctggat   8700
ttcaatgaga acaaaattaa ggaccggaaa gagcttaaaa agtttgatac caacaaaatc   8760
tacttcgacg gcgagaacat tatcaaacat cgtgcctttt ataacatcaa aaagtatggc   8820
atgctgaacc tgctggaaaa aattgcagat aaagccaagt acaaaattag cctgaaagaa   8880
cttaaagagt acagcaacaa aaagaacgaa atcgagaaga actataccat gcagcagaat   8940
ctgcatcgta aatatgcacg tccgaaaaaa gacgagaaat tcaacgatga ggactataaa   9000
gaatacgaga aagccattgg caacatccag aaatataccc acttgaaaaa caaagtggaa   9060
tttaacgagc tgaatttact gcagggtctg ctgctgaaaa ttctgcaccg tctggttggt   9120
tataccagca tttgggaacg tgatctgcgt tttcgcctga aaggtgaatt tcctgaaaac   9180
cactatatcg aggaaatttt caactttgac aacagcaaaa acgtgaaata taagagcggt   9240
cagatcgtcg aaaagtacat caacttttac aaagaacttt acaaggataa tgtggaaaaa   9300
cgcagcatct acagcgacaa gaaagtgaaa aagctgaagc aagaaaagaa agacctgtac   9360
atccgtaatt atatcgccca ctttaactat atcccgcatg cagaaattag tctgctggaa   9420
gttctggaaa atctgcgtaa actgctgtca tatgatcgca aactgaagaa cgcaatcatg   9480
aaaagcattg tggatatcct gaaagagtat ggttttgtcg ccacctttaa aatcggtgcc   9540
gataagaaaa ttgagattca gaccctggaa agcgagaaaa ttgtgcatct taagaacctt   9600
aaaaagaaaa aactgatgac cgatcgcaac agcgaagagt tatgtgaact ggtgaaagtg   9660
atgttcgaat acaaagcact ggaagatccg aattcgagct ccgtcgacaa gcttgcggcc   9720
gcactcgagc accaccacca ccaccactga gatccggctg ctaacaaagc ccgaaaggaa   9780
gctgagttgg ctgctgccac cgctgagcaa taactagcat aaccccttgg ggcctctaaa   9840
cgggtcttga ggggtttttt gctgaaagga ggaactatat ccggat                  9886
```

<210> SEQ ID NO 42
<211> LENGTH: 8731
<212> TYPE: DNA
<213> ORGANISM: Artificial Sequence
<220> FEATURE:
<223> OTHER INFORMATION: Synthetic

<400> SEQUENCE: 42

```
tggcgaatgg gacgcgccct gtagcggcgc attaagcgcg gcgggtgtgg tggttacgcg     60
cagcgtgacc gctacacttg ccagcgccct agcgcccgct cctttcgctt tcttcccttc    120
ctttctcgcc acgttcgccg gctttccccg tcaagctcta aatcgggggc tccctttagg    180
gttccgattt agtgctttac ggcacctcga ccccaaaaaa cttgattagg gtgatggttc    240
acgtagtggg ccatcgccct gatagacggt ttttcgccct ttgacgttgg agtccacgtt    300
ctttaatagt ggactcttgt tccaaactgg aacaacactc aaccctatct cggtctattc    360
ttttgattta taagggattt tgccgatttc ggcctattgg ttaaaaaatg agctgattta    420
acaaaaattt aacgcgaatt ttaacaaaat attaacgttt acaatttcag gtggcacttt    480
tcggggaaat gtgcgcggaa cccctatttg tttatttttc taaatacatt caaatatgta    540
tccgctcatg aattaattct tagaaaaact catcgagcat caaatgaaac tgcaatttat    600
tcatatcagg attatcaata ccatattttt gaaaaagccg tttctgtaat gaaggagaaa    660
actcaccgag gcagttccat aggatggcaa gatcctggta tcggtctgcg attccgactc    720
gtccaacatc aatacaacct attaatttcc cctcgtcaaa aataaggtta tcaagtgaga    780
```

```
aatcaccatg agtgacgact gaatccggtg agaatggcaa aagtttatgc atttctttcc    840
agacttgttc aacaggccag ccattacgct cgtcatcaaa atcactcgca tcaaccaaac    900
cgttattcat tcgtgattgc gcctgagcga gacgaaatac gcgatcgctg ttaaaaggac    960
aattacaaac aggaatcgaa tgcaaccggc gcaggaacac tgccagcgca tcaacaatat   1020
tttcacctga atcaggatat tcttctaata cctggaatgc tgttttcccg gggatcgcag   1080
tggtgagtaa ccatgcatca tcaggagtac ggataaaatg cttgatggtc ggaagaggca   1140
taaattccgt cagccagttt agtctgacca tctcatctgt aacatcattg gcaacgctac   1200
ctttgccatg tttcagaaac aactctggcg catcgggctt cccatacaat cgatagattg   1260
tcgcacctga ttgcccgaca ttatcgcgag cccatttata cccatataaa tcagcatcca   1320
tgttggaatt taatcgcggc ctagagcaag acgtttcccg ttgaatatgg ctcataacac   1380
cccttgtatt actgtttatg taagcagaca gttttattgt tcatgaccaa aatcccttaa   1440
cgtgagtttt cgttccactg agcgtcagac cccgtagaaa agatcaaagg atcttcttga   1500
gatccttttt ttctgcgcgt aatctgctgc ttgcaaacaa aaaaaccacc gctaccagcg   1560
gtggtttgtt tgccggatca agagctacca actctttttc cgaaggtaac tggcttcagc   1620
agagcgcaga taccaaatac tgtccttcta gtgtagccgt agttaggcca ccacttcaag   1680
aactctgtag caccgcctac atacctcgct ctgctaatcc tgttaccagt ggctgctgcc   1740
agtggcgata agtcgtgtct taccgggttg gactcaagac gatagttacc ggataaggcg   1800
cagcggtcgg gctgaacggg gggttcgtgc acacagccca gcttggagcg aacgacctac   1860
accgaactga gatacctaca gcgtgagcta tgagaaagcg ccacgcttcc cgaagggaga   1920
aaggcggaca ggtatccggt aagcggcagg gtcggaacag gagagcgcac gagggagctt   1980
ccagggggaa acgcctggta tctttatagt cctgtcgggt ttcgccacct ctgacttgag   2040
cgtcgatttt tgtgatgctc gtcagggggg cggagcctat ggaaaaacgc cagcaacgcg   2100
gcctttttac ggttcctggc cttttgctgg ccttttgctc acatgttctt tcctgcgtta   2160
tcccctgatt ctgtggataa ccgtattacc gcctttgagt gagctgatac cgctcgccgc   2220
agccgaacga ccgagcgcag cgagtcagtg agcgaggaag cggaagagcg cctgatgcgg   2280
tattttctcc ttacgcatct gtgcggtatt tcacaccgca tatatggtgc actctcagta   2340
caatctgctc tgatgccgca tagttaagcc agtatacact ccgctatcgc tacgtgactg   2400
ggtcatggct gcgccccgac acccgccaac acccgctgac gcgccctgac gggcttgtct   2460
gctcccggca tccgcttaca gacaagctgt gaccgtctcc gggagctgca tgtgtcagag   2520
gttttcaccg tcatcaccga aacgcgcgag gcagctgcgg taaagctcat cagcgtggtc   2580
gtgaagcgat tcacagatgt ctgcctgttc atccgcgtcc agctcgttga gtttctccag   2640
aagcgttaat gtctggcttc tgataaagcg ggccatgtta agggcggttt tttcctgttt   2700
ggtcactgat gcctccgtgt aagggggatt tctgttcatg ggggtaatga taccgatgaa   2760
acgagagagg atgctcacga tacgggttac tgatgatgaa catgcccggt tactggaacg   2820
ttgtgagggt aaacaactgg cggtatggat gcggcgggac cagagaaaaa tcactcaggg   2880
tcaatgccag cgcttcgtta atacagatgt aggtgttcca cagggtagcc agcagcatcc   2940
tgcgatgcag atccggaaca taatggtgca gggcgctgac ttccgcgttt ccagacttta   3000
cgaaacacgg aaaccgaaga ccattcatgt tgttgctcag gtcgcagacg ttttgcagca   3060
gcagtcgctt cacgttcgct cgcgtatcgg tgattcattc tgctaaccag taaggcaacc   3120
ccgccagcct agccgggtcc tcaacgacag gagcacgatc atgcgcaccc gtggggccgc   3180
```

catgccggcg ataatggcct gcttctcgcc gaaacgtttg gtggcgggac cagtgacgaa 3240
ggcttgagcg agggcgtgca agattccgaa taccgcaagc gacaggccga tcatcgtcgc 3300
gctccagcga aagcggtcct cgccgaaaat gacccagagc gctgccggca cctgtcctac 3360
gagttgcatg ataaagaaga cagtcataag tgcggcgacg atagtcatgc cccgcgccca 3420
ccggaaggag ctgactgggt tgaaggctct caagggcatc ggtcgagatc ccggtgccta 3480
atgagtgagc taacttacat taattgcgtt gcgctcactg cccgctttcc agtcgggaaa 3540
cctgtcgtgc cagctgcatt aatgaatcgg ccaacgcgcg gggagaggcg gtttgcgtat 3600
tgggcgccag ggtggttttt cttttcacca gtgagacggg caacagctga ttgcccttca 3660
ccgcctggcc ctgagagagt tgcagcaagc ggtccacgct ggtttgcccc agcaggcgaa 3720
aatcctgttt gatggtggtt aacggcggga tataacatga gctgtcttcg gtatcgtcgt 3780
atcccactac cgagatatcc gcaccaacgc gcagcccgga ctcggtaatg gcgcgcattg 3840
cgcccagcgc catctgatcg ttggcaacca gcatcgcagt gggaacgatg ccctcattca 3900
gcatttgcat ggtttgttga aaaccggaca tggcactcca gtcgccttcc cgttccgcta 3960
tcggctgaat ttgattgcga gtgagatatt tatgccagcc agccagacgc agacgcgccg 4020
agacagaact taatgggccc gctaacagcg cgatttgctg gtgacccaat gcgaccagat 4080
gctccacgcc cagtcgcgta ccgtcttcat gggagaaaat aatactgttg atgggtgtct 4140
ggtcagagac atcaagaaat aacgccggaa cattagtgca ggcagcttcc acagcaatgg 4200
catcctggtc atccagcgga tagttaatga tcagcccact gacgcgttgc gcgagaagat 4260
tgtgcaccgc cgctttacag gcttcgacgc cgcttcgttc taccatcgac accaccacgc 4320
tggcacccag ttgatcggcg cgagatttaa tcgccgcgac aatttgcgac ggcgcgtgca 4380
gggccagact ggaggtggca acgccaatca gcaacgactg tttgcccgcc agttgttgtg 4440
ccacgcggtt gggaatgtaa ttcagctccg ccatcgccgc ttccactttt tcccgcgttt 4500
tcgcagaaac gtggctggcc tggttcacca cgcgggaaac ggtctgataa gagacaccgg 4560
catactctgc gacatcgtat aacgttactg gtttcacatt caccaccctg aattgactct 4620
cttccgggcg ctatcatgcc ataccgcgaa aggttttgcg ccattcgatg gtgtccggga 4680
tctcgacgct ctcccttatg cgactcctgc attaggaagc agcccagtag taggttgagg 4740
ccgttgagca ccgccgccgc aaggaatggt gcatgcaagg agatggcgcc caacagtccc 4800
ccggccacgg ggcctgccac catacccacg ccgaaacaag cgctcatgag cccgaagtgg 4860
cgagcccgat cttccccatc ggtgatgtcg gcgatatagg cgccagcaac cgcacctgtg 4920
gcgccggtga tgccggccac gatgcgtccg gcgtagagga tcgagatctc gatcccgcga 4980
aattaatacg actcactata ggggaattgt gagcggataa caattcccct ctagaaataa 5040
ttttgtttaa ctttaagaag gagatatacc atgaaagtga ccaaagtgga tggcatcagc 5100
cacaaaaaat acatcgaaga aggcaaactg gttaaaagca ccagcgaaga aaatcgtacc 5160
agcgaacgtc tgagcgaact gctgagcatt cgtctggata tctatatcaa aaatccggat 5220
aatgccagcg aggaagaaaa ccgtattcgt cgtgaaaacc tgaaaaagtt cttcagcaat 5280
aaagtgctgc acctgaaaga tagcgttctg tatctgaaaa accgcaaaga aaaaaatgcc 5340
gtgcaggaca aaaactatag cgaagaggat atcagcgagt atgacctgaa gaacaaaaat 5400
agctttagcg tgctgaaaaa aatcctgctg aatgaagatg tgaatagcga ggaactggaa 5460
atctttcgta aagatgttga agccaagctg aacaaaatca acagcctgaa atatagcttt 5520

```
gaagaaaaca aggccaacta tcagaaaatc aacgagaaca acgtggaaaa agttggtggt   5580
aaaagcaaac gcaacatcat ctatgattat tatcgcgaaa gcgcgaaacg caacgattat   5640
atcaataatg tgcaagaggc cttcgacaaa ctgtacaaaa aagaggacat cgaaaaactg   5700
tttttctga tcgagaacag caagaagcac gagaaataca aaatccgcga gtactaccat   5760
aaaatcatcg gtcgcaaaaa cgataaagag aacttcgcca aaatcatcta cgaagaaatt   5820
cagaacgtga acaacatcaa agaactgatc gaaaaaattc cggacatgag cgagctgaag   5880
aaaagccagg tgttctataa atactacctg gacaaagagg aactgaacga caaaaacatc   5940
aaatatgcct tttgccactt cgtcgaaatt gaaatgagcc agctgcttaa aaactacgtg   6000
tataaacgcc tgagcaacat cagcaacgat aaaatcaaac gtatctttga atatcagaat   6060
ctgaagaaac tgattgaaaa caaactgctg aacaagctgg atacctatgt tcgtaattgc   6120
ggcaaataca actactatct gcaggttggt gaaattgcaa ccagcgattt tattgcacgt   6180
aatcgtcaga atgaagcctt tctgcgtaac attattggtg ttagcagcgt tgcatatttt   6240
agcctgcgta atattctgga aaccgaaaac gaaaatgata ttaccggtcg tatgcgtggt   6300
aaaaccgtta aaaacaataa aggcgaagag aagtatgtga gcggtgaagt ggataaaatc   6360
tataacgaaa acaagcagaa cgaagtgaaa gaaaatctga aaatgtttta cagctacgac   6420
ttcaacatgg acaacaaaaa cgagatcgaa gatttcttcg ccaacattga tgaagccatt   6480
agcagtattc gtcatggcat tgtgcacttt aatctggaac ttgaaggcaa agacatcttc   6540
gcgtttaaaa acattgcacc gagcgagatc agcaaaaaaa tgtttcagaa cgagattaac   6600
gaaaaaaaac tgaaactgaa aatcttcaaa cagctgaata gcgccaacgt gttcaactat   6660
tatgagaaag acgtgatcat caaatacctt aaaaacacca aattcaactt cgtgaataaa   6720
aacatcccgt ttgttccgag cttcaccaaa ctgtataaca aaattgaaga tctgcgcaat   6780
accctgaagt ttttttggag cgttccgaaa gacaaagaag aaaaagacgc acagatctac   6840
ctgcttaaga acatctatta tggcgaattt ctgaacaaat tcgtgaaaaa tagcaaagtg   6900
ttcttcaaaa tcaccaacga ggtgatcaag attaacaaac agcgtaatca gaaaaccggt   6960
cactacaaat accagaagtt tgagaacatt gaaaaaaccg tgccggttga atatctggca   7020
attattcaga gccgtgagat gattaacaac caggataaag aagagaaaaa cacctacatc   7080
gatttcatcc agcagatctt tctgaaaggc tttatcgatt acctgaacaa gaacaacctg   7140
aagtatatcg agtcgaacaa caataacgac aacaacgaca tctttagcaa aatcaaaatc   7200
aagaaagata ataaagaaaa atacgacaag atcctgaaaa actatgagaa gcacaaccgc   7260
aacaaagaaa ttccgcatga gatcaatgaa tttgtgcgcg aaattaaact gggcaaaatc   7320
ctgaaataca ccgagaacct gaatatgttc tatctgattc tgaagctgct gaaccataaa   7380
gagctgacca atctgaaagg tagcctggaa aaatatcaga gcgcaaacaa agaagagaca   7440
ttttctgacg aactggaact gattaatctg ctgaatctgg ataataaccg tgtgaccgaa   7500
gattttgaac tggaagcaaa tgaaatcggc aaattcctgg atttcaatga gaacaaaatt   7560
aaggaccgga aagagcttaa aaagtttgat accaacaaaa tctacttcga cggcgagaac   7620
attatcaaac atcgtgcctt ttataacatc aaaaagtatg gcatgctgaa cctgctggaa   7680
aaaattgcag ataaagccaa gtacaaaatt agcctgaaag aacttaaaga gtacagcaac   7740
aaaaagaacg aaatcgagaa gaactatacc atgcagcaga atctgcatcg taaatatgca   7800
cgtccgaaaa aagacgagaa attcaacgat gaggactata aagaatacga gaaagccatt   7860
ggcaacatcc agaaatatac ccacttgaaa aacaaagtgg aatttaacga gctgaattta   7920
```

ctgcagggtc tgctgctgaa aattctgcac cgtctggttg gttataccag catttgggaa 7980
cgtgatctgc gttttcgcct gaaaggtgaa tttcctgaaa accactatat cgaggaaatt 8040
ttcaactttg acaacagcaa aaacgtgaaa tataagagcg gtcagatcgt cgaaaagtac 8100
atcaactttt acaaagaact ttacaaggat aatgtggaaa aacgcagcat ctacagcgac 8160
aagaaagtga aaaagctgaa gcaagaaaag aaagacctgt acatccgtaa ttatatcgcc 8220
cactttaact atatcccgca tgcagaaatt agtctgctgg aagttctgga aaatctgcgt 8280
aaactgctgt catatgatcg caaactgaag aacgcaatca tgaaaagcat tgtggatatc 8340
ctgaaagagt atggttttgt cgccaccttt aaaatcggtg ccgataagaa aattgagatt 8400
cagaccctgg aaagcgagaa aattgtgcat cttaagaacc ttaaaaagaa aaaactgatg 8460
accgatcgca acagcgaaga gttatgtgaa ctggtgaaag tgatgttcga atacaaagca 8520
ctggaagggg atccgaattc gagctccgtc gacaagcttg cggccgcact cgagcaccac 8580
caccaccacc actgagatcc ggctgctaac aaagcccgaa aggaagctga gttggctgct 8640
gccaccgctg agcaataact agcataaccc cttggggcct ctaaacgggt cttgaggggt 8700
tttttgctga aaggaggaac tatatccgga t 8731

<210> SEQ ID NO 43
<211> LENGTH: 5206
<212> TYPE: DNA
<213> ORGANISM: Artificial Sequence
<220> FEATURE:
<223> OTHER INFORMATION: Synthetic

<400> SEQUENCE: 43
tggcgaatgg gacgcgccct gtagcggcgc attaagcgcg gcgggtgtgg tggttacgcg 60
cagcgtgacc gctacacttg ccagcgccct agcgcccgct cctttcgctt tcttcccttc 120
ctttctcgcc acgttcgccg gctttccccg tcaagctcta aatcgggggc tccctttagg 180
gttccgattt agtgctttac ggcacctcga ccccaaaaaa cttgattagg gtgatggttc 240
acgtagtggg ccatcgccct gatagacggt ttttcgccct ttgacgttgg agtccacgtt 300
ctttaatagt ggactcttgt tccaaactgg aacaacactc aaccctatct cggtctattc 360
ttttgattta taagggattt tgccgatttc ggcctattgg ttaaaaaatg agctgattta 420
acaaaaattt aacgcgaatt ttaacaaaat attaacgttt acaatttcag gtggcacttt 480
tcggggaaat gtgcgcggaa cccctatttg tttatttttc taaatacatt caaatatgta 540
tccgctcatg aattaattct tagaaaaact catcgagcat caaatgaaac tgcaatttat 600
tcatatcagg attatcaata ccatattttt gaaaaagccg tttctgtaat gaaggagaaa 660
actcaccgag gcagttccat aggatggcaa gatcctggta tcggtctgcg attccgactc 720
gtccaacatc aatacaacct attaatttcc cctcgtcaaa aataaggtta tcaagtgaga 780
aatcaccatg agtgacgact gaatccggtg agaatggcaa aagtttatgc atttctttcc 840
agacttgttc aacaggccag ccattacgct cgtcatcaaa atcactcgca tcaaccaaac 900
cgttattcat tcgtgattgc gcctgagcga gacgaaatac gcgatcgctg ttaaaaggac 960
aattacaaac aggaatcgaa tgcaaccggc gcaggaacac tgccagcgca tcaacaatat 1020
tttcacctga atcaggatat tcttctaata cctggaatgc tgttttcccg gggatcgcag 1080
tggtgagtaa ccatgcatca tcaggagtac ggataaaatg cttgatggtc ggaagaggca 1140
taaattccgt cagccagttt agtctgacca tctcatctgt aacatcattg gcaacgctac 1200

```
ctttgccatg tttcagaaac aactctggcg catcgggctt cccatacaat cgatagattg   1260
tcgcacctga ttgcccgaca ttatcgcgag cccatttata cccatataaa tcagcatcca   1320
tgttggaatt taatcgcggc ctagagcaag acgtttcccg ttgaatatgg ctcataacac   1380
cccttgtatt actgtttatg taagcagaca gttttattgt tcatgaccaa aatcccttaa   1440
cgtgagtttt cgttccactg agcgtcagac cccgtagaaa agatcaaagg atcttcttga   1500
gatccttttt ttctgcgcgt aatctgctgc ttgcaaacaa aaaaaccacc gctaccagcg   1560
gtggtttgtt tgccggatca agagctacca actctttttc cgaaggtaac tggcttcagc   1620
agagcgcaga taccaaatac tgtccttcta gtgtagccgt agttaggcca ccacttcaag   1680
aactctgtag caccgcctac atacctcgct ctgctaatcc tgttaccagt ggctgctgcc   1740
agtggcgata agtcgtgtct taccgggttg gactcaagac gatagttacc ggataaggcg   1800
cagcggtcgg gctgaacggg gggttcgtgc acacagccca gcttggagcg aacgacctac   1860
accgaactga gatacctaca gcgtgagcta tgagaaagcg ccacgcttcc cgaagggaga   1920
aaggcggaca ggtatccggt aagcggcagg gtcggaacag gagagcgcac gagggagctt   1980
ccagggggaa acgcctggta tctttatagt cctgtcgggt ttcgccacct ctgacttgag   2040
cgtcgatttt tgtgatgctc gtcagggggg cggagcctat ggaaaaacgc cagcaacgcg   2100
gcctttttac ggttcctggc cttttgctgg ccttttgctc acatgttctt tcctgcgtta   2160
tcccctgatt ctgtggataa ccgtattacc gcctttgagt gagctgatac cgctcgccgc   2220
agccgaacga ccgagcgcag cgagtcagtg agcgaggaag cggaagagcg cctgatgcgg   2280
tattttctcc ttacgcatct gtgcggtatt tcacaccgca tatatggtgc actctcagta   2340
caatctgctc tgatgccgca tagttaagcc agtatacact ccgctatcgc tacgtgactg   2400
ggtcatggct gcgccccgac acccgccaac acccgctgac gcgccctgac gggcttgtct   2460
gctcccggca tccgcttaca gacaagctgt gaccgtctcc gggagctgca tgtgtcagag   2520
gttttcaccg tcatcaccga aacgcgcgag gcagctgcgg taaagctcat cagcgtggtc   2580
gtgaagcgat tcacagatgt ctgcctgttc atccgcgtcc agctcgttga gtttctccag   2640
aagcgttaat gtctggcttc tgataaagcg ggccatgtta agggcggttt tttcctgttt   2700
ggtcactgat gcctccgtgt aagggggatt tctgttcatg gggtaatga taccgatgaa    2760
acgagagagg atgctcacga tacgggttac tgatgatgaa catgcccggt tactggaacg   2820
ttgtgagggt aaacaactgg cggtatggat gcggcgggac cagagaaaaa tcactcaggg   2880
tcaatgccag cgcttcgtta atacagatgt aggtgttcca cagggtagcc agcagcatcc   2940
tgcgatgcag atccggaaca taatggtgca gggcgctgac ttccgcgttt ccagacttta   3000
cgaaacacgg aaaccgaaga ccattcatgt tgttgctcag gtcgcagacg ttttgcagca   3060
gcagtcgctt cacgttcgct cgcgtatcgg tgattcattc tgctaaccag taaggcaacc   3120
ccgccagcct agccgggtcc tcaacgacag gagcacgatc atgcgcaccc gtggggccgc   3180
catgccggcg ataatggcct gcttctcgcc gaaacgtttg gtggcgggac cagtgacgaa   3240
ggcttgagcg agggcgtgca agattccgaa taccgcaagc gacaggccga tcatcgtcgc   3300
gctccagcga aagcggtcct cgccgaaaat gacccagagc gctgccggca cctgtcctac   3360
gagttgcatg ataaagaaga cagtcataag tgcggcgacg atagtcatgc cccgcgccca   3420
ccggaaggag ctgactgggt tgaaggctct caagggcatc ggtcgagatc ccggtgccta   3480
atgagtgagc taacttacat taattgcgtt gcgctcactg cccgctttcc agtcgggaaa   3540
cctgtcgtgc cagctgcatt aatgaatcgg ccaacgcgcg gggagaggcg gtttgcgtat   3600
```

```
tgggcgccag ggtggttttt cttttcacca gtgagacggg caacagctga ttgcccttca   3660
ccgcctggcc ctgagagagt tgcagcaagc ggtccacgct ggtttgcccc agcaggcgaa   3720
aatcctgttt gatggtggtt aacggcggga tataacatga gctgtcttcg gtatcgtcgt   3780
atcccactac cgagatatcc gcaccaacgc gcagcccgga ctcggtaatg gcgcgcattg   3840
cgcccagcgc catctgatcg ttggcaacca gcatcgcagt gggaacgatg ccctcattca   3900
gcatttgcat ggtttgttga aaaccggaca tggcactcca gtcgccttcc cgttccgcta   3960
tcggctgaat ttgattgcga gtgagatatt tatgccagcc agccagacgc agacgcgccg   4020
agacagaact taatgggccc gctaacagcg cgatttgctg gtgacccaat gcgaccagat   4080
gctccacgcc cagtcgcgta ccgtcttcat gggagaaaat aatactgttg atgggtgtct   4140
ggtcagagac atcaagaaat aacgccggaa cattagtgca ggcagcttcc acagcaatgg   4200
catcctggtc atccagcgga tagttaatga tcagcccact gacgcgttgc gcgagaagat   4260
tgtgcaccgc cgctttacag gcttcgacgc cgcttcgttc taccatcgac accaccacgc   4320
tggcacccag ttgatcggcg cgagatttaa tcgccgcgac aatttgcgac ggcgcgtgca   4380
gggccagact ggaggtggca acgccaatca gcaacgactg tttgcccgcc agttgttgtg   4440
ccacgcggtt gggaatgtaa ttcagctccg ccatcgccgc ttccactttt tcccgcgttt   4500
tcgcagaaac gtggctggcc tggttcacca cgcgggaaac ggtctgataa gagacaccgg   4560
catactctgc gacatcgtat aacgttactg gtttcacatt caccaccctg aattgactct   4620
cttccgggcg ctatcatgcc ataccgcgaa aggttttgcg ccattcgatg gtgtccggga   4680
tctcgacgct ctcccttatg cgactcctgc attaggaagc agcccagtag taggttgagg   4740
ccgttgagca ccgccgccgc aaggaatggt gcatgcaagg agatggcgcc caacagtccc   4800
ccggccacgg ggcctgccac catacccacg ccgaaacaag cgctcatgag cccgaagtgg   4860
cgagcccgat cttccccatc ggtgatgtcg gcgatatagg cgccagcaac cgcacctgtg   4920
gcgccggtga tgccggccac gatgcgtccg gcgtagagga tcgagatctc gatcccgcga   4980
aattaatacg actcactata ggggaattgt gagcggataa caattcccct ctagaaataa   5040
ttttgtttaa ctttaagaag gagatatacc gatccggctg ctaacaaagc ccgaaaggaa   5100
gctgagttgg ctgctgccac cgctgagcaa taactagcat aaccccttgg ggcctctaaa   5160
cgggtcttga ggggtttttt gctgaaagga ggaactatat ccggat                 5206
```

<210> SEQ ID NO 44
<211> LENGTH: 6367
<212> TYPE: DNA
<213> ORGANISM: Artificial Sequence
<220> FEATURE:
<223> OTHER INFORMATION: Synthetic

<400> SEQUENCE: 44

```
tggcgaatgg gacgcgccct gtagcggcgc attaagcgcg gcgggtgtgg tggttacgcg     60
cagcgtgacc gctacacttg ccagcgccct agcgcccgct cctttcgctt tcttcccttc    120
ctttctcgcc acgttcgccg gctttccccg tcaagctcta aatcgggggc tccctttagg    180
gttccgattt agtgctttac ggcacctcga ccccaaaaaa cttgattagg gtgatggttc    240
acgtagtggg ccatcgccct gatagacggt ttttcgccct ttgacgttgg agtccacgtt    300
ctttaatagt ggactcttgt tccaaactgg aacaacactc aaccctatct cggtctattc    360
ttttgattta taagggattt tgccgatttc ggcctattgg ttaaaaaatg agctgattta    420
```

```
acaaaaattt aacgcgaatt ttaacaaaat attaacgttt acaatttcag gtggcacttt    480
tcggggaaat gtgcgcggaa cccctatttg tttatttttc taaatacatt caaatatgta    540
tccgctcatg aattaattct tagaaaaact catcgagcat caaatgaaac tgcaatttat    600
tcatatcagg attatcaata ccatattttt gaaaaagccg tttctgtaat gaaggagaaa    660
actcaccgag gcagttccat aggatggcaa gatcctggta tcggtctgcg attccgactc    720
gtccaacatc aatacaacct attaatttcc cctcgtcaaa aataaggtta tcaagtgaga    780
aatcaccatg agtgacgact gaatccggtg agaatggcaa aagtttatgc atttctttcc    840
agacttgttc aacaggccag ccattacgct cgtcatcaaa atcactcgca tcaaccaaac    900
cgttattcat tcgtgattgc gcctgagcga gacgaaatac gcgatcgctg ttaaaaggac    960
aattacaaac aggaatcgaa tgcaaccggc gcaggaacac tgccagcgca tcaacaatat   1020
tttcacctga atcaggatat tcttctaata cctggaatgc tgttttcccg gggatcgcag   1080
tggtgagtaa ccatgcatca tcaggagtac ggataaaatg cttgatggtc ggaagaggca   1140
taaattccgt cagccagttt agtctgacca tctcatctgt aacatcattg gcaacgctac   1200
ctttgccatg tttcagaaac aactctggcg catcgggctt cccatacaat cgatagattg   1260
tcgcacctga ttgcccgaca ttatcgcgag cccatttata cccatataaa tcagcatcca   1320
tgttggaatt taatcgcggc ctagagcaag acgtttcccg ttgaatatgg ctcataacac   1380
cccttgtatt actgtttatg taagcagaca gttttattgt tcatgaccaa aatcccttaa   1440
cgtgagtttt cgttccactg agcgtcagac cccgtagaaa agatcaaagg atcttcttga   1500
gatccttttt ttctgcgcgt aatctgctgc ttgcaaacaa aaaaaccacc gctaccagcg   1560
gtggtttgtt tgccggatca agagctacca actctttttc cgaaggtaac tggcttcagc   1620
agagcgcaga taccaaatac tgtccttcta gtgtagccgt agttaggcca ccacttcaag   1680
aactctgtag caccgcctac atacctcgct ctgctaatcc tgttaccagt ggctgctgcc   1740
agtggcgata agtcgtgtct taccgggttg gactcaagac gatagttacc ggataaggcg   1800
cagcggtcgg gctgaacggg gggttcgtgc acacagccca gcttggagcg aacgacctac   1860
accgaactga gatacctaca gcgtgagcta tgagaaagcg ccacgcttcc cgaagggaga   1920
aaggcggaca ggtatccggt aagcggcagg gtcggaacag gagagcgcac gagggagctt   1980
ccagggggaa acgcctggta tctttatagt cctgtcgggt ttcgccacct ctgacttgag   2040
cgtcgatttt tgtgatgctc gtcagggggg cggagcctat ggaaaaacgc cagcaacgcg   2100
gcctttttac ggttcctggc cttttgctgg ccttttgctc acatgttctt tcctgcgtta   2160
tcccctgatt ctgtggataa ccgtattacc gcctttgagt gagctgatac cgctcgccgc   2220
agccgaacga ccgagcgcag cgagtcagtg agcgaggaag cggaagagcg cctgatgcgg   2280
tattttctcc ttacgcatct gtgcggtatt tcacaccgca tatatggtgc actctcagta   2340
caatctgctc tgatgccgca tagttaagcc agtatacact ccgctatcgc tacgtgactg   2400
ggtcatggct gcgccccgac acccgccaac acccgctgac gcgccctgac gggcttgtct   2460
gctcccggca tccgcttaca gacaagctgt gaccgtctcc gggagctgca tgtgtcagag   2520
gttttcaccg tcatcaccga aacgcgcgag gcagctgcgg taaagctcat cagcgtggtc   2580
gtgaagcgat tcacagatgt ctgcctgttc atccgcgtcc agctcgttga gtttctccag   2640
aagcgttaat gtctggcttc tgataaagcg ggccatgtta agggcggttt tttcctgttt   2700
ggtcactgat gcctccgtgt aagggggatt tctgttcatg ggggtaatga taccgatgaa   2760
acgagagagg atgctcacga tacgggttac tgatgatgaa catgcccggt tactggaacg   2820
```

```
ttgtgagggt aaacaactgg cggtatggat gcggcgggac cagagaaaaa tcactcaggg   2880
tcaatgccag cgcttcgtta atacagatgt aggtgttcca cagggtagcc agcagcatcc   2940
tgcgatgcag atccggaaca taatggtgca gggcgctgac ttccgcgttt ccagacttta   3000
cgaaacacgg aaaccgaaga ccattcatgt tgttgctcag gtcgcagacg ttttgcagca   3060
gcagtcgctt cacgttcgct cgcgtatcgg tgattcattc tgctaaccag taaggcaacc   3120
ccgccagcct agccgggtcc tcaacgacag gagcacgatc atgcgcaccc gtggggccgc   3180
catgccggcg ataatggcct gcttctcgcc gaaacgtttg gtggcgggac cagtgacgaa   3240
ggcttgagcg agggcgtgca agattccgaa taccgcaagc gacaggccga tcatcgtcgc   3300
gctccagcga aagcggtcct cgccgaaaat gacccagagc gctgccggca cctgtcctac   3360
gagttgcatg ataaagaaga cagtcataag tgcggcgacg atagtcatgc cccgcgccca   3420
ccggaaggag ctgactgggt tgaaggctct caagggcatc ggtcgagatc ccggtgccta   3480
atgagtgagc taacttacat taattgcgtt gcgctcactg cccgctttcc agtcgggaaa   3540
cctgtcgtgc cagctgcatt aatgaatcgg ccaacgcgcg gggagaggcg gtttgcgtat   3600
tgggcgccag ggtggttttt cttttcacca gtgagacggg caacagctga ttgcccttca   3660
ccgcctggcc ctgagagagt tgcagcaagc ggtccacgct ggtttgcccc agcaggcgaa   3720
aatcctgttt gatggtggtt aacggcggga tataacatga gctgtcttcg gtatcgtcgt   3780
atcccactac cgagatatcc gcaccaacgc gcagcccgga ctcggtaatg gcgcgcattg   3840
cgcccagcgc catctgatcg ttggcaacca gcatcgcagt gggaacgatg ccctcattca   3900
gcatttgcat ggtttgttga aaaccggaca tggcactcca gtcgccttcc cgttccgcta   3960
tcggctgaat ttgattgcga gtgagatatt tatgccagcc agccagacgc agacgcgccg   4020
agacagaact taatgggccc gctaacagcg cgatttgctg gtgacccaat gcgaccagat   4080
gctccacgcc cagtcgcgta ccgtcttcat gggagaaaat aatactgttg atgggtgtct   4140
ggtcagagac atcaagaaat aacgccggaa cattagtgca ggcagcttcc acagcaatgg   4200
catcctggtc atccagcgga tagttaatga tcagcccact gacgcgttgc gcgagaagat   4260
tgtgcaccgc cgctttacag gcttcgacgc cgcttcgttc taccatcgac accaccacgc   4320
tggcacccag ttgatcggcg cgagatttaa tcgccgcgac aatttgcgac ggcgcgtgca   4380
gggccagact ggaggtggca acgccaatca gcaacgactg tttgcccgcc agttgttgtg   4440
ccacgcggtt gggaatgtaa ttcagctccg ccatcgccgc ttccactttt tcccgcgttt   4500
tcgcagaaac gtggctggcc tggttcacca cgcgggaaac ggtctgataa gagacaccgg   4560
catactctgc gacatcgtat aacgttactg gtttcacatt caccaccctg aattgactct   4620
cttccgggcg ctatcatgcc ataccgcgaa aggttttgcg ccattcgatg gtgtccggga   4680
tctcgacgct ctcccttatg cgactcctgc attaggaagc agcccagtag taggttgagg   4740
ccgttgagca ccgccgccgc aaggaatggt gcatgcaagg agatggcgcc caacagtccc   4800
ccggccacgg ggcctgccac catacccacg ccgaaacaag cgctcatgag cccgaagtgg   4860
cgagcccgat cttccccatc ggtgatgtcg gcgatatagg cgccagcaac cgcacctgtg   4920
gcgccggtga tgccggccac gatgcgtccg gcgtagagga tcgagatctc gatcccgcga   4980
aattaatacg actcactata ggggaattgt gagcggataa caattcccct ctagaaataa   5040
ttttgtttaa ctttaagaag gagatatacc atgaaaatcg aagaaggtaa actggtaatc   5100
tggattaacg gcgataaagg ctataacggt ctcgctgaag tcggtaagaa attcgagaaa   5160
```

-continued

```
gataccggaa ttaaagtcac cgttgagcat ccggataaac tggaagagaa attcccacag   5220

gttgcggcaa ctggcgatgg ccctgacatt atcttctggg cacacgaccg ctttggtggc   5280

tacgctcaat ctggcctgtt ggctgaaatc accccggaca aagcgttcca ggacaagctg   5340

tatccgttta cctgggatgc cgtacgttac aacggcaagc tgattgctta cccgatcgct   5400

gttgaagcgt tatcgctgat ttataacaaa gatctgctgc cgaacccgcc aaaaacctgg   5460

gaagagatcc cggcgctgga taaagaactg aaagcgaaag gtaagagcgc gctgatgttc   5520

aacctgcaag aaccgtactt cacctggccg ctgattgctg ctgacggggg ttatgcgttc   5580

aagtatgaaa acggcaagta cgacattaaa gacgtgggcg tggataacgc tggcgcgaaa   5640

gcgggtctga ccttcctggt tgacctgatt aaaaacaaac acatgaatgc agacaccgat   5700

tactccatcg cagaagctgc ctttaataaa ggcgaaacag cgatgaccat caacggcccg   5760

tgggcatggt ccaacatcga caccagcaaa gtgaattatg gtgtaacggt actgccgacc   5820

ttcaagggtc aaccatccaa accgttcgtt ggcgtgctga gcgcaggtat taacgccgcc   5880

agtccgaaca aagagctggc aaaagagttc ctcgaaaact atctgctgac tgatgaaggt   5940

ctggaagcgg ttaataaaga caaaccgctg ggtgccgtag cgctgaagtc ttacgaggaa   6000

gagttggtga aagatccgcg tattgccgcc actatggaaa acgcccagaa aggtgaaatc   6060

atgccgaaca tcccgcagat gtccgctttc tggtatgccg tgcgtactgc ggtgatcaac   6120

gccgccagcg gtcgtcagac tgtcgatgaa gccctgaaag acgcgcagac taattcgagc   6180

tcgaacaaca acaacaataa caataacaac aacctcggga tcgagggaag ggatccggct   6240

gctaacaaag cccgaaagga agctgagttg gctgctgcca ccgctgagca ataactagca   6300

taaccccttg gggcctctaa acgggtcttg aggggttttt tgctgaaagg aggaactata   6360

tccggat                                                              6367
```